United States Patent
Aoki

(10) Patent No.: US 7,636,230 B2
(45) Date of Patent: Dec. 22, 2009

(54) MULTILAYER CAPACITOR ARRAY

(75) Inventor: Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 140 days.

(21) Appl. No.: 12/051,342

(22) Filed: Mar. 19, 2008

(65) Prior Publication Data

US 2008/0239623 A1    Oct. 2, 2008

(30) Foreign Application Priority Data

Mar. 30, 2007    (JP)    ............................ 2007-092774

(51) Int. Cl.
  *H01G 4/005*    (2006.01)
  *H01G 4/06*    (2006.01)
(52) U.S. Cl. ..................... 361/303; 361/311; 361/306.3
(58) Field of Classification Search ......... 361/303–305, 361/311, 306.1, 306.3
  See application file for complete search history.

(56) References Cited

U.S. PATENT DOCUMENTS

| | | | | |
|---|---|---|---|---|
| 6,366,443 B1 * | 4/2002 | Devoe et al. | ................. | 361/313 |
| 6,407,906 B1 * | 6/2002 | Ahiko et al. | ............. | 361/306.1 |
| 6,441,459 B1 * | 8/2002 | Togashi et al. | ............... | 257/532 |
| 6,452,781 B1 * | 9/2002 | Ahiko et al. | ............. | 361/321.2 |
| 6,515,842 B1 * | 2/2003 | Hayworth et al. | ............ | 361/303 |
| 6,577,491 B1 * | 6/2003 | Ohtsuka et al. | ........... | 361/306.3 |
| 6,768,630 B2 * | 7/2004 | Togashi | .................... | 361/306.1 |
| 7,436,650 B2 | 10/2008 | Oguni et al. | | |
| 2008/0084651 A1 | 4/2008 | Oguni et al. | | |

FOREIGN PATENT DOCUMENTS

| JP | A-10-335168 | 12/1998 |
|---|---|---|
| JP | A 2000-331879 | 11/2000 |
| JP | A-2002-305125 | 10/2002 |
| JP | A-2004-022859 | 1/2004 |
| JP | B2-3682392 | 8/2005 |
| JP | A-2007-013132 | 1/2007 |

* cited by examiner

*Primary Examiner*—Eric Thomas
(74) *Attorney, Agent, or Firm*—Oliff & Berridge, PLC

(57) ABSTRACT

A multilayer capacitor array comprises a capacitor body having rectangular first and second main faces opposing each other. In the capacitor body having a dielectric characteristic, a first electrode group including first and second inner electrodes and a second electrode group including third and fourth inner electrodes are arranged in a row. The first and third inner electrodes are arranged in contact with a reference plane parallel to the opposing direction of the first and second main faces between the first electrode group and second electrode group. The second and fourth inner electrodes are arranged such as to be separated from the reference plane by a predetermined distance.

4 Claims, 48 Drawing Sheets

MULTILAYER CAPACITOR ARRAY

BACKGROUND OF THE INVENTION

1. Field of the Invention

The present invention relates to a multilayer capacitor array.

2. Related Background Art

Conventionally known as a multilayer capacitor array is one comprising a capacitor body in which a plurality of inner electrode layers having inner electrodes arranged in a row are alternately laminated with dielectric layers, and a plurality of terminal electrodes formed on the capacitor body (see, for example, Japanese Patent Application Laid-Open No. 2000-331879).

When the multilayer capacitor array described in Japanese Patent Application Laid-Open No. 2000-331879 is seen in the opposing direction of the inner electrodes, a plurality of inner electrodes are arranged in a row in each inner electrode layer, while being separated from each other by a predetermined distance. Therefore, when seen in the opposing direction of the inner electrodes, an area having no inner electrodes exists between a plurality of inner electrodes opposing each other. Namely, the opposing inner electrodes form a plurality of capacitors in the multilayer capacitor array, while the plurality of capacitors are clearly separated from each other by an area having no inner electrodes between the opposing inner electrodes.

SUMMARY OF THE INVENTION

When a voltage is applied to the multilayer capacitor array described in Patent Document 1, however, a distortion corresponding to the applied voltage occurs in each of the capacitors, so that stresses caused by the distortions of the capacitors are concentrated at the area having no inner electrodes between the capacitors.

It is an object of the present invention to provide a multilayer capacitor array which restrains stresses from being concentrated between a plurality of capacitors.

The present invention provides a multilayer capacitor array comprising a capacitor body including rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other, the capacitor body having a dielectric characteristic, and first, second, third, and fourth terminal electrodes arranged on outer surface of the capacitor body; wherein a first electrode group including first and second inner electrodes and a second electrode group including third and fourth inner electrodes are arranged in a row in a direction orthogonal to the opposing direction of the first and second main faces in the capacitor body; wherein the first inner electrode is connected to the first terminal electrode; wherein the second inner electrode is connected to the second terminal electrode, wherein the third inner electrode is connected to the third terminal electrode; wherein the fourth inner electrode is connected to the fourth terminal electrode; wherein the first and second inner electrodes are arranged within the capacitor body such as to oppose each other along the opposing direction of the first and second main faces with a portion of the capacitor body therebetween; wherein the third and fourth inner electrodes are arranged within the capacitor body such as to oppose each other along the opposing direction of the first and second main faces with a portion of the capacitor body therebetween; wherein a reference plane is taken parallel to the opposing direction of the first and second main faces between the first and second electrode groups; wherein each of the first and third inner electrodes is arranged in contact with the reference plane; and wherein each of the second and fourth inner electrodes is arranged such as to be separated by a predetermined distance from the reference plane.

In the multilayer capacitor array, the first and second inner electrodes included in the first electrode group oppose each other, so as to form a capacitor, while the third and fourth inner electrodes included in the second electrode group oppose each other, so as to form a capacitor. The first inner electrode included in the first electrode group and the third inner electrode included in the second electrode group are respectively arranged in contact with a reference plane between the first and second electrode groups. Therefore, when a voltage is applied to the capacitor formed by the first and second inner electrodes and the capacitor formed by the third and fourth inner electrodes so that electrostriction occurs in each capacitor, electrostriction also occurs near the reference plane between the capacitors, since the first and third inner electrodes are arranged in contact with the reference plane. This restrains stresses from being concentrated near the reference plane. Each of the opposing first and second inner electrodes and the opposing third and fourth inner electrodes has an inner electrode positioned such as to be separated from the reference plane by a predetermined distance. This keeps distortions from occurring in excess near the reference plane.

Preferably, at least one of the first and second inner electrodes is arranged at a position different from any of the third and fourth inner electrodes in the opposing direction of the first and second main faces. In this case, none of the first and second inner electrodes has the third or fourth inner electrode arranged at the same position in the opposing direction of the first and second main faces. Also, none of the third and fourth inner electrodes has the first or second inner electrode arranged at the same position in the opposing direction of the first and second main faces. Therefore, the multilayer capacitor array has a portion where a large distance can be acquired between the inner electrodes, whereby vibrations caused by electrostriction can be suppressed.

Preferably, the first electrode group includes a plurality of first and second inner electrodes arranged along the opposing direction of the first and second main faces, while the plurality of first and second inner electrodes include at least one of a set constituted by at least two first inner electrodes arranged adjacent to each other as seen in the opposing direction of the first and second main faces and a set constituted by at least two second inner electrodes arranged adjacent to each other as seen in the opposing direction of the first and second main faces. Preferably, the second electrode group includes a plurality of third and fourth inner electrodes arranged along the opposing direction of the first and second main faces, while the plurality of third and fourth inner electrodes include at least one of a set constituted by at least two third inner electrodes arranged adjacent to each other as seen in the opposing direction of the first and second main faces and a set constituted by at least two fourth inner electrodes arranged adjacent to each other as seen in the opposing direction of the first and second main faces. At a location where inner electrodes having the same polarity are arranged adjacent to each other and oppose each other, no electric fields occur even when a voltage is applied to the multilayer capacitor array. This accordingly suppresses vibrations of the multilayer capacitor array caused by electrostriction.

The present invention can provide a multilayer capacitor array which restrains stresses from being concentrated between a plurality of capacitors.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions. In the following sectional views, areas corresponding to dielectric layers are not hatched for the convenience of viewing.

First Embodiment

Figure 1:
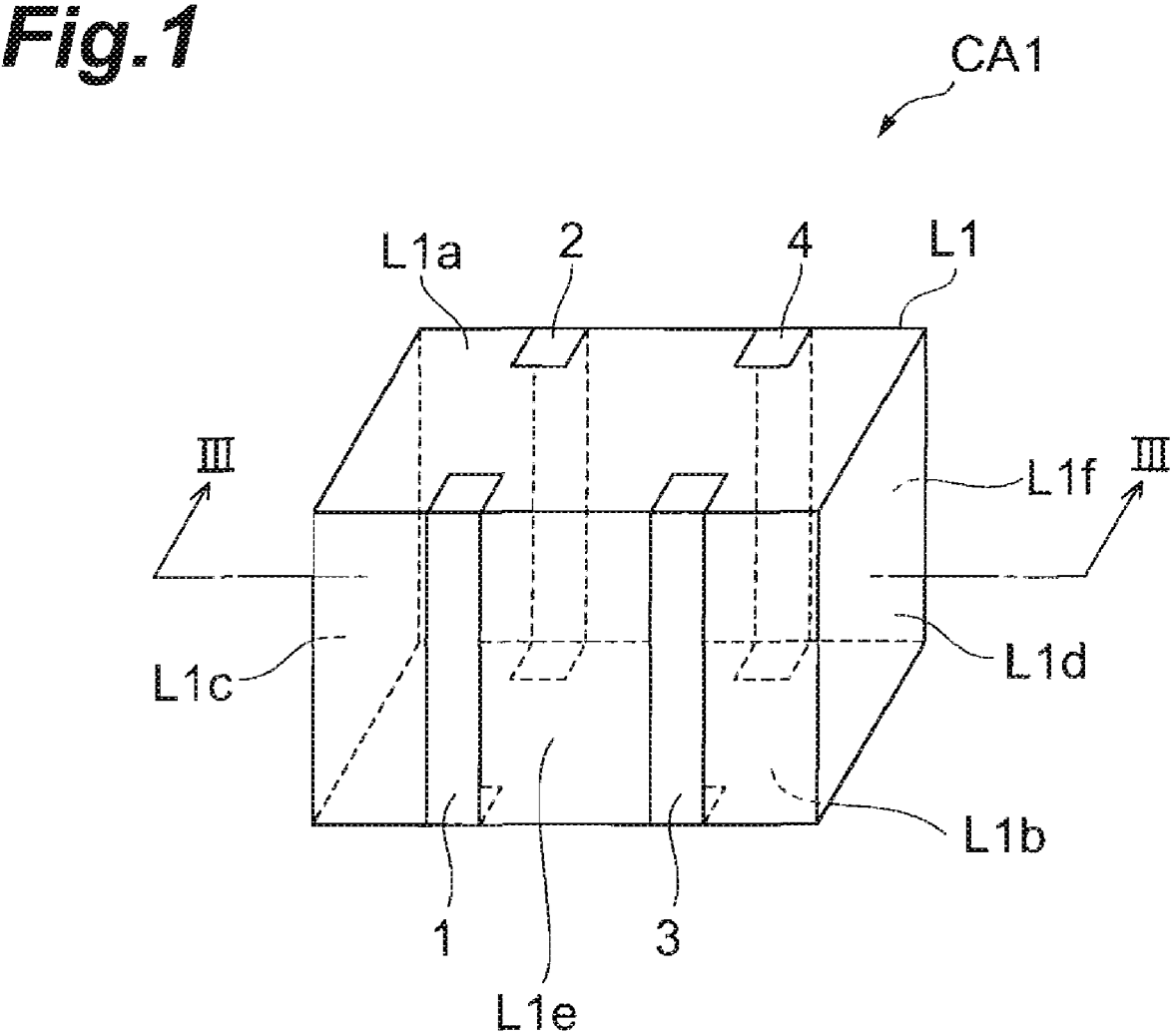
FIG. 1 is a perspective view of the multilayer capacitor array in accordance with the first embodiment.
Figure 2:
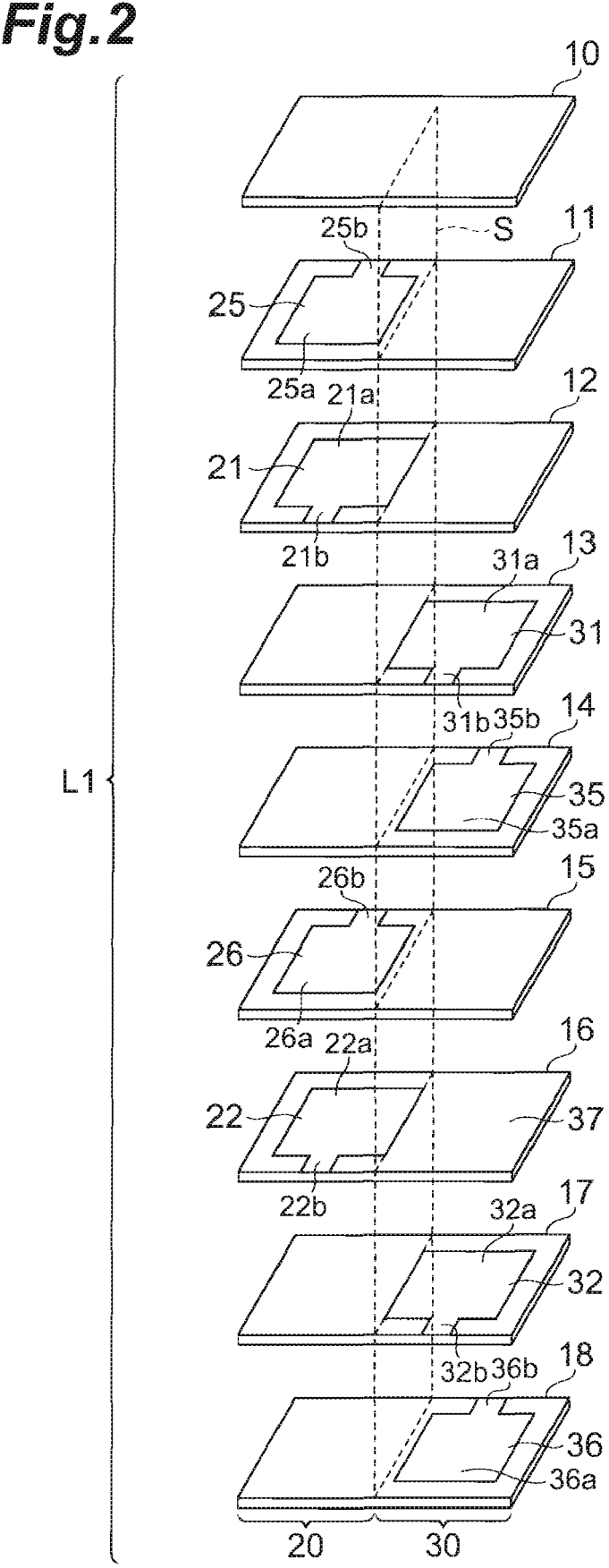
FIG. 2 is an exploded perspective view of the capacitor body included in the multilayer capacitor array in accordance with the first embodiment.
Figure 3:
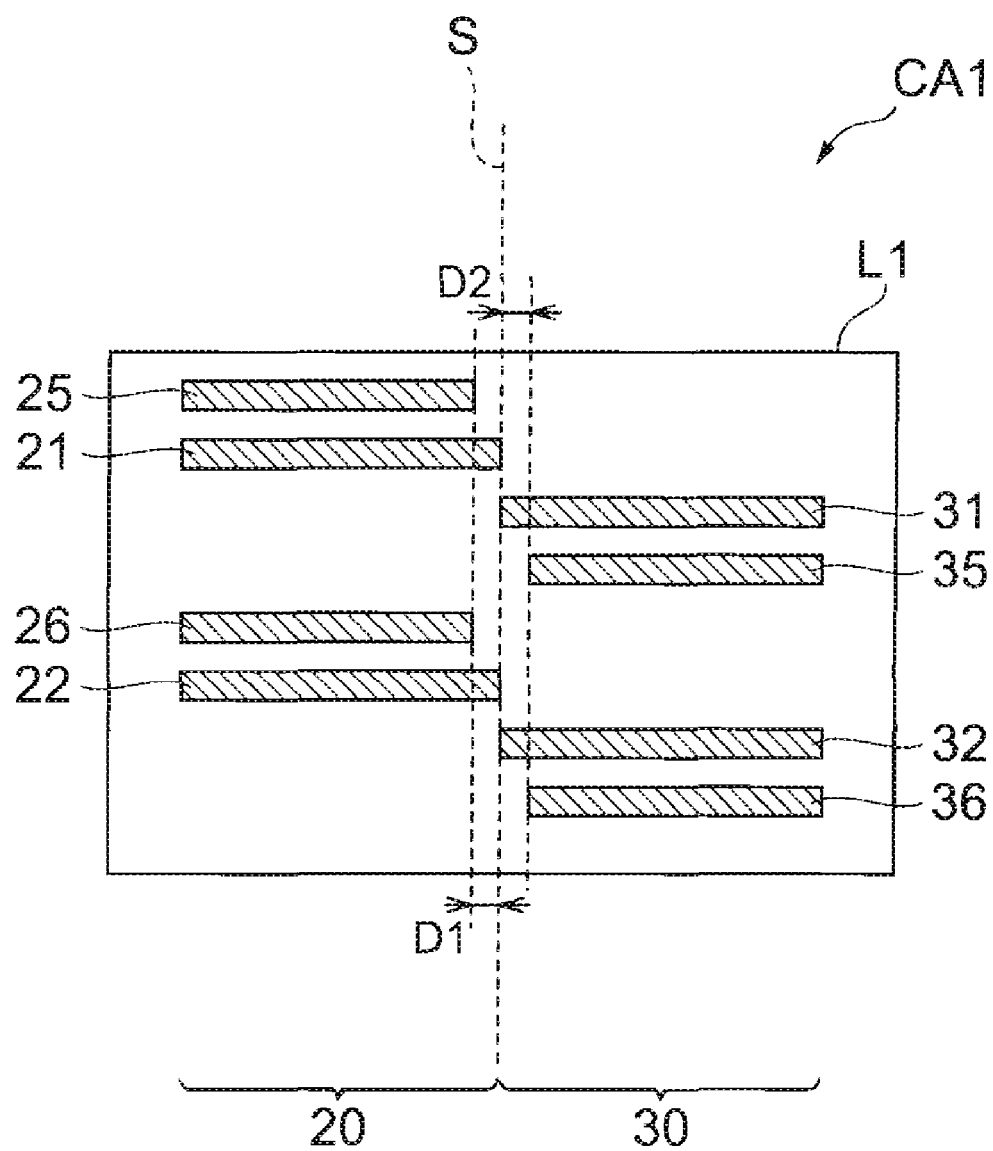
FIG. 3 is a view for explaining the structure of a cross section of the multilayer capacitor array taken along the line III-III of FIG. 1.

With reference to FIGS. 1 to 3, the structure of the multilayer capacitor array CA1 in accordance with the first embodiment will be explained. FIG. 1 is a perspective view of the multilayer capacitor array in accordance with the first embodiment. FIG. 2 is an exploded perspective view of the capacitor body included in the multilayer capacitor array in accordance with the first embodiment. FIG. 3 is a view for explaining the structure of a cross section of the multilayer capacitor array taken along the line III-III of FIG. 1.

As shown in FIG. 1, the multilayer capacitor array CA1 in accordance with the first embodiment comprises a capacitor body L1 and first to fourth terminal electrodes 1 to 4 arranged on outer surface of the capacitor body L1. The first to fourth terminal electrodes 1 to 4 are formed, for example, by attaching and burning a conductive paste, which contains a conductive metal powder and a glass flit, onto outer surface of the capacitor body. A plating layer may be formed on the burned terminal electrodes when necessary. The first to fourth terminal electrodes 1 to 4 are formed such as to be electrically insulated from each other on the surfaces of the capacitor body L1.

As shown in FIG. 1, the capacitor body L1 is shaped like a rectangular parallelepiped having rectangular first and second main faces L1a, L1b opposing each other, first and second end faces L1c, L1d opposing each other and extending in the shorter-side direction of the first and second main faces L1a, L1b so as to connect them to each other, and first and second side faces L1e, L1f opposing each other and extending in the longer-side direction of the first and second main faces L1a, L1b so as to connect them to each other.

The first and third terminal electrodes 1, 3 are arranged on the first side face L1e of the capacitor body L1. The first and third terminal electrodes 1, 3 are successively arranged from the first end face L1c side to the second end face L1d side. The second and fourth terminal electrodes 2, 4 are arranged on the second side face L1f opposing the first side face L1e of the capacitor body L1. The second and fourth terminal electrodes 2, 4 are successively arranged from the first end face L1c side to the second end face L1d side.

The first terminal electrode 1 and second terminal electrode 2 oppose each other along a direction in which the first side face L1e and second side face L1f oppose each other. The third terminal electrode 3 and fourth terminal electrode 4 oppose each other along the direction in which the first side face L1e and second side face L1f oppose each other.

As shown in FIG. 2, the capacitor body L1 has a plurality of (9 in this embodiment) laminated dielectric layers 10 to 18. Each of the dielectric layers 10 to 18 is constituted by a sintered body of a ceramic green sheet containing a dielectric ceramic, for example. In the actual multilayer capacitor array CA1, the dielectric layers 10 to 18 are integrated to such an extent that their boundaries are indiscernible.

As shown in FIG. 2, the capacitor body L1 includes first and second electrode groups 20, 30. The first electrode group 20 has a plurality (2 layers each in this embodiment) of first and second inner electrodes 21, 22, 25, 26. The second electrode group 30 has a plurality (2 layers each in this embodiment) of third and fourth inner electrodes 31, 32, 35, 36. The first electrode group 20 and second electrode group 30 are arranged in a row in a direction orthogonal to the opposing direction of the first and second main faces L1a, L1b within the capacitor body L1, i.e., along the opposing direction of the first and second end faces L1c, L1d of the capacitor body L1. Specifically, the first electrode group 20 is arranged on the first end face L1c side, while the second electrode group 30 is arranged on the second end face L1d side. Each of the inner electrodes 21, 22, 25, 26, 31, 32, 35, 36 is constituted by a sintered body of a conductive paste, for example.

The first and second inner electrodes 21, 22, 25, 26 included in the first electrode group 20 are arranged in the order of the second inner electrode 25, first inner electrode 21, second inner electrode 26, and first inner electrode 22 from the first main face L1a toward the second main face L1b. The third and fourth inner electrodes 31, 32, 35, 36 included in the second electrode group 30 are arranged in the order of the third inner electrode 31, fourth inner electrode 35, third inner electrode 32, and fourth inner electrode 36 from the first main face L1a toward the second main face L1b.

Within the capacitor body L1, the first inner electrodes 21, 22 are arranged at positions different from any of the third and fourth inner electrodes 31, 32, 35, 36 in the opposing direction of the first and second main faces L1a, L1b. Within the capacitor body L1, the second inner electrodes 25, 26 are arranged at positions different from any of the third and fourth inner electrodes 31, 32, 35, 36 in the opposing direction of the first and second main faces L1a, L1b.

The first and second inner electrodes 21, 25 oppose each other along the opposing direction of the first and second main faces L1a, L1b, with one dielectric layer 11 therebetween, the dielectric layer 11 being a portion of the capacitor body L1. The first and second inner electrodes 22, 26 oppose each other along the opposing direction of the first and second main faces L1a, L1b, with one dielectric layer 15 therebetween, the dielectric layer 15 being a portion of the capacitor body L1.

A set of the first and second inner electrodes 21, 25 and a set of the first and second inner electrodes 22, 26 respectively oppose each other with one dielectric layer therebetween. The first and second inner electrodes 21, 26 oppose each other along the opposing direction of the first and second main faces L1a, L1b, with three dielectric layers 12, 13, 14 therebetween, whose number is greater than the number of respective dielectric layers positioned between the first and second inner electrodes 21, 25 and between the first and second inner electrodes 22, 26.

The third and fourth inner electrodes 31, 35 oppose each other along the opposing direction of the first and second main faces L1a, L1b, with one dielectric layer 13 therebetween, the dielectric layer 13 being a portion of the capacitor body L1. The third and fourth inner electrodes 32, 36 oppose each other along the opposing direction of the first and second main faces L1a, L1b, with one dielectric layer 17 therebetween, the dielectric layer 17 being a portion of the capacitor body L1.

A set of the third and fourth inner electrodes 31, 35 and a set of the third and fourth inner electrodes 32, 36 respectively oppose each other with one dielectric layer therebetween. The third and fourth inner electrodes 32, 35 oppose each other along the opposing direction of the first and second main faces L1a, L1b, with three dielectric layers 14, 15, 16 therebetween, whose number is greater than the number of respective dielectric layers positioned between the third and fourth inner electrodes 31, 35 and between the third and fourth inner electrodes 32, 36.

The first inner electrodes 21, 22 include quadrilateral main electrode portions 21a, 22a each having four sides two sides of which are parallel to the first and second end faces L1c, L1d and the other two sides of which are parallel to the first and second side faces L1e, L1f, and lead portions 21b, 22b extending from the main electrode portions 21a, 22a so as to be exposed at the first side face L1e. The lead portions 21b, 22b exposed at the first side face L1e are physically and electrically connected to the first terminal electrode 1. Namely, the first inner electrodes 21, 22 are physically and electrically connected to the first terminal electrode 1.

The second inner electrodes 25, 26 include quadrilateral main electrode portions 25a, 26a each having four sides two of sides of which are parallel to the first and second end faces L1c, L1d and the other two sides of which are parallel to the first and second side faces L1e, L1f, and lead portions 25b, 26b extending from the main electrode portions 25a, 26a so as to be exposed at the second side face L1f. The lead portions 25b, 26b exposed at the second side face L1f are physically and electrically connected to the second terminal electrode 2. Namely, the second inner electrodes 25, 26 are physically and electrically connected to the second terminal electrode 2.

The third inner electrodes 31, 32 include quadrilateral main electrode portions 31a, 32a each having four sides two sides of which are parallel to the first and second end faces L1c, L1d and the other two sides of which are parallel to the first and second side faces L1e, L1f, respectively, and lead portions 31b, 32b extending from the main electrode portions 31a, 32a so as to be exposed at the first side face L1e. The lead portions 31b, 32b exposed at the first side face L1e are physically and electrically connected to the third terminal electrode 3. Namely, the third inner electrodes 31, 32 are physically and electrically connected to the third terminal electrode 3.

The fourth inner electrodes 35, 36 include quadrilateral main electrode portions 35a, 36a each having four sides two sides of which are parallel to the first and second end faces L1c, L1d and the other two sides of which are parallel to the first and second side faces L1e, L1f, and lead portions 35b, 36b extending from the main electrode portions 35a, 36a so as to be exposed at the second side face L1f. The lead portions 35b, 36b exposed at the second side face L1f are physically and electrically connected to the fourth terminal electrode 4. Namely, the fourth inner electrodes 35, 36 are physically and electrically connected to the fourth terminal electrode 4.

As shown in FIGS. 2 and 3, a virtual plane parallel to the opposing direction of the first and second main faces L1a, L1b is taken as a virtual reference plane S. The first and second electrode groups 20, 30 are arranged in a row along a direction orthogonal to the reference plane S. The direction orthogonal to the reference plane S corresponds to a direction orthogonal to the opposing direction of the first and second main faces L1a, L1b. Namely, within the capacitor body L1, the first and second inner electrodes 21, 22, 25, 26 are arranged on the first end face L1c side of the reference plane S, while third and fourth inner electrodes 31, 32, 35, 36 are arranged on the second end face L1d side of the reference plane S.

The first inner electrodes 21, 22 are arranged in contact with the reference plane S. Specifically, the sides on the second end face L1d side of the main electrode portions 21a, 22a of the first inner electrodes 21, 22 are in contact with the reference plane S.

The second inner electrodes 25, 26 are arranged such as to be separated from the reference plane S by a predetermined distance. Specifically, the sides on the second end face L1d side of the main electrode portions 25a, 26a of the second inner electrodes 25, 26 are arranged such as to be separated from the reference plane S by a predetermined distance D1 toward the first end face L1c.

The third inner electrodes 31, 32 are arranged in contact with the reference plane S. Specifically, the sides on the first end face L1c side of the main electrode portions 31a, 32a of the third inner electrodes 31, 32 are in contact with the reference plane S.

The fourth inner electrodes 35, 36 are arranged such as to be separated from the reference plane S by a predetermined distance. Specifically, the sides on the first end face L1c side of the main electrode portions 35a, 36a of the fourth inner electrodes 35, 36 are arranged such as to be separated from the reference plane S by a predetermined distance D2 toward the second end face L1d.

In the multilayer capacitor array CA1, the first and second inner electrodes 21, 25 oppose each other with the dielectric layer 11 therebetween, whereas the first and second inner electrodes 22, 26 oppose each other with the dielectric layer 15 therebetween. Further, in the multilayer capacitor array CA1, the first and second inner electrodes 21, 26 oppose each other with the dielectric layers 12, 13, 14 therebetween. Therefore, the first and second inner electrodes 21, 22, 25, 26 form a capacitance C1, so as to construct one of capacitors included in the multilayer capacitor array CA1.

Figure 46:
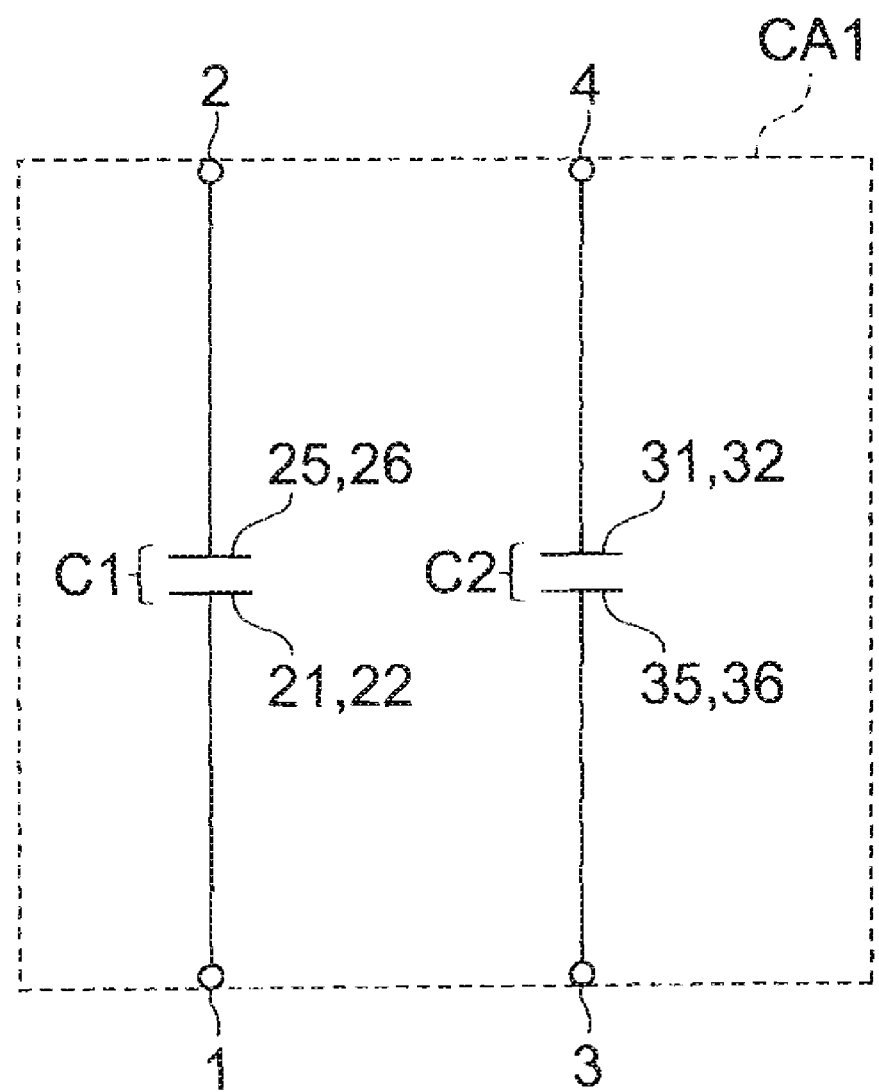
FIG. 46 is an equivalent circuit diagram of the multilayer capacitor array in accordance with the first embodiment.

In the multilayer capacitor array CA1, the third and fourth inner electrodes 31, 35 oppose each other with the dielectric layer 13 therebetween, whereas the third and fourth inner electrodes 32, 36 oppose each other with the dielectric layer 17 therebetween. Further, in the multilayer capacitor array CA1, the third and fourth inner electrodes 32, 35 oppose each other with the dielectric layers 14, 15, 16 therebetween. Therefore, the third and fourth inner electrodes 31, 32, 35, 36 form a capacitance C2, so as to construct one of the capacitors included in the multilayer capacitor array CA1. Hence, an equivalent circuit diagram of the multilayer capacitor array CA1 is illustrated as shown in FIG. 46.

In the multilayer capacitor array CA1, as mentioned above, the first and second inner electrodes 21, 22, 25, 26 included in the first electrode group 20 oppose each other, so as to form a capacitor, while the third and fourth inner electrodes 31, 32, 35, 36 included in the second electrode group 30 oppose each other, so as to form a capacitor. The first inner electrodes 21, 22 included in the first electrode group 20 and the third inner electrodes 31, 32 included in the second electrode group 30 are arranged in contact with the reference plane S between the first and second electrode groups 20, 30. When a voltage is applied to the capacitor formed by the first and second inner electrodes 21, 22, 25, 26 and the capacitor formed by the third and fourth inner electrodes 31, 32, 35, 36 so that electrostriction is generated in each capacitor, electrostriction also occurs near the reference plane S, since the first and third inner electrodes 21, 22, 31, 32 are arranged in contact with the reference plane S. This restrains stresses from being concentrated near the reference plane S.

Restraining stresses from being concentrated can also keep cracks from occurring in the multilayer capacitor array CA1.

While the first inner electrodes 21, 22 among the opposing first and second inner electrodes 21, 22, 25, 26 are in contact with the reference plane S, the second inner electrodes 25, 26 are positioned such as to be separated from the reference plane S by the predetermined distance D1. While the third inner electrodes 31, 32 among the opposing third and fourth inner electrodes 31, 32, 35, 36 are in contact with the reference plane S, the fourth inner electrodes 35, 36 are positioned such as to be separated from the reference plane S by the predetermined distance D2. This restrains electrostriction from causing distortions in excess near the reference plane S.

The first and second inner electrodes 21, 22, 25, 26 are arranged at positions different from any of the third and fourth inner electrodes 31, 32, 35, 36 in the opposing direction of the first and second main faces L1a, L1b. Therefore, in the multilayer capacitor array CA1, three dielectric layers 12, 13, 14 can be arranged between the set of first and second inner electrodes 21, 25 and the set of first and second inner electrodes 22, 26, three dielectric layers 16, 17, 18 can be arranged between the set of first and second inner electrodes 22, 26 and the second main face L1b, and a large gap can be acquired between these sets. Further, in the multilayer capacitor array CA1, three dielectric layers 14, 15, 16 can be arranged between the set of third and fourth inner electrodes 31, 35 and the set of third and fourth inner electrodes 32, 36, three dielectric layers 10, 11, 12 can be arranged between the set of third and fourth inner electrodes 32, 36 and the first main face L1a, and a large gap can be acquired between these sets. The respective gaps between the sets of inner electrodes function as layers for alleviating electrostriction (electrostriction alleviating layer). The multilayer capacitor array CA1 can expand the electrostriction alleviating layer, and thus can restrain vibrations from being caused by electrostriction.

Second Embodiment

Figure 4:
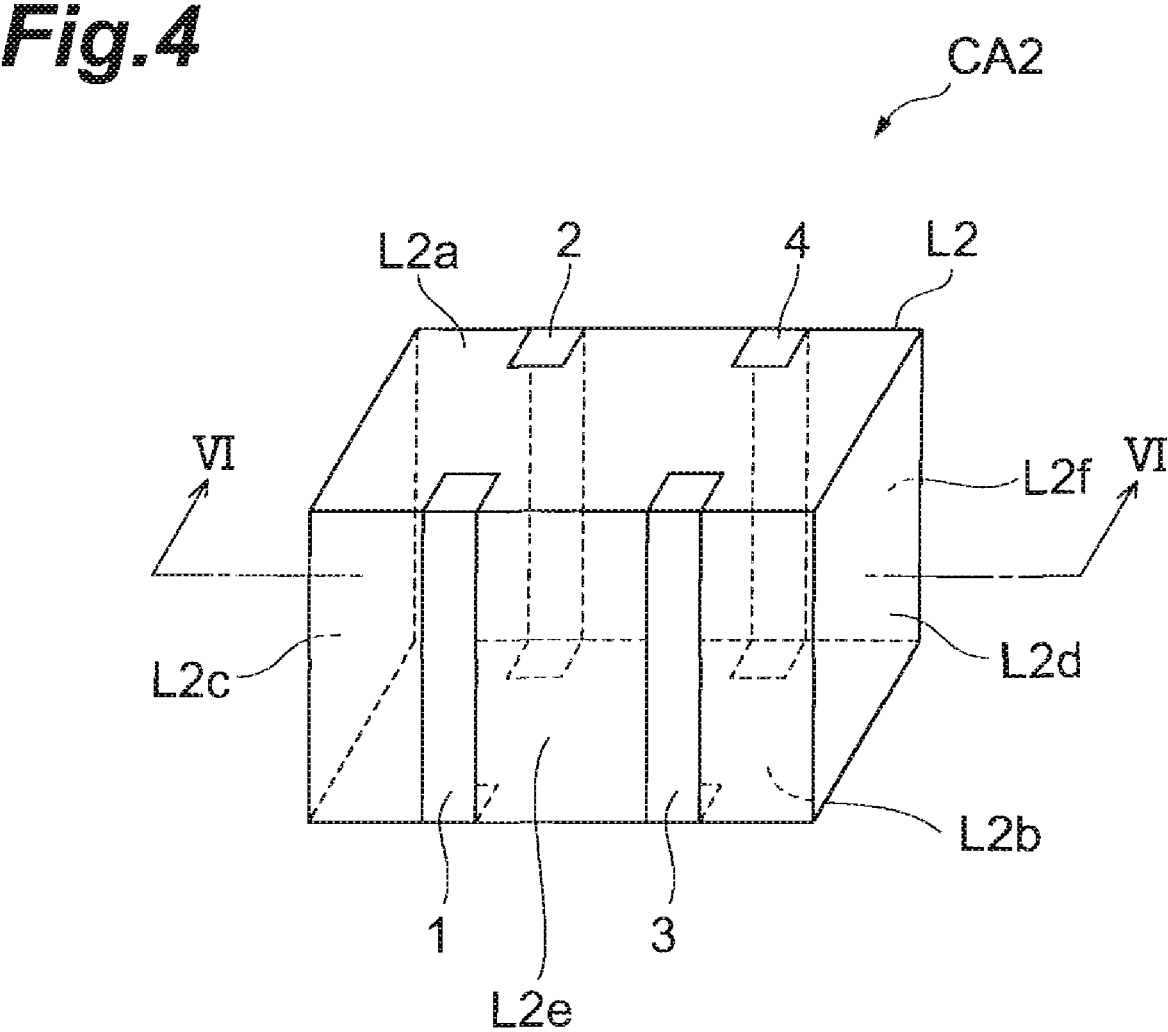
FIG. 4 is a perspective view of the multilayer capacitor array in accordance with the second embodiment.
Figure 5:
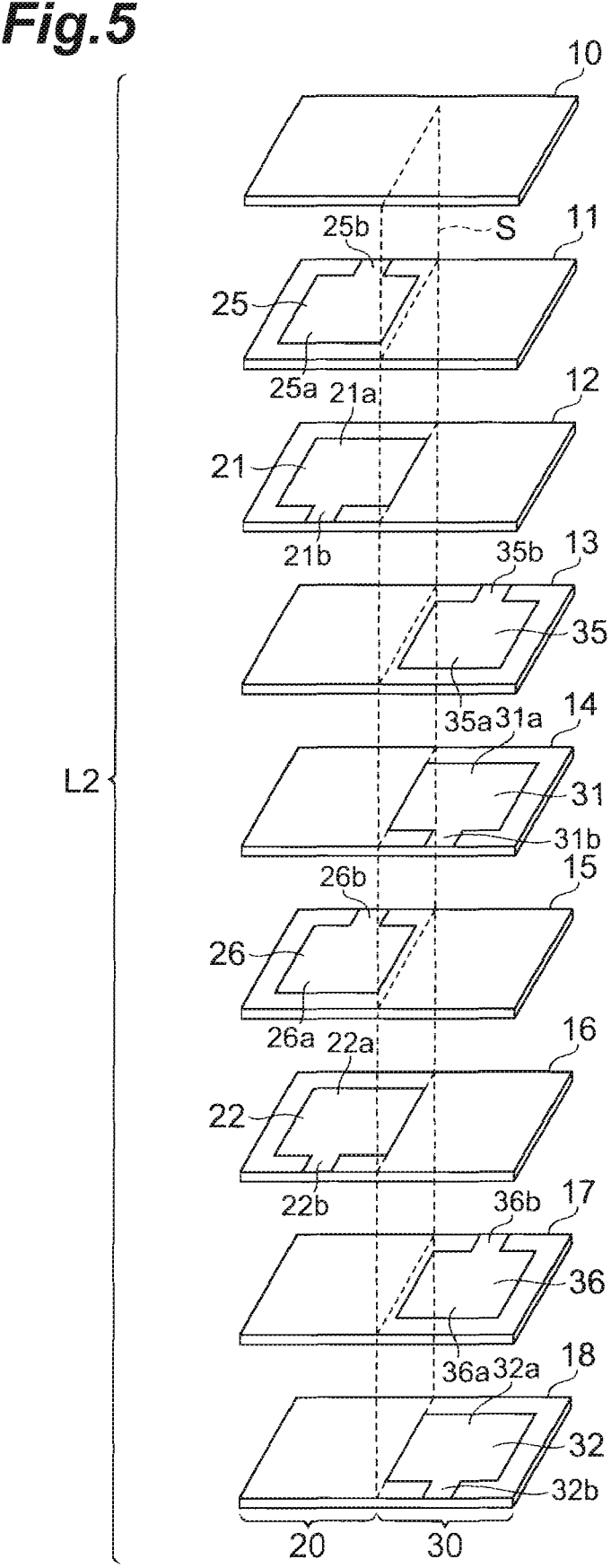
FIG. 5 is an exploded perspective view of the capacitor body included in the multilayer capacitor array in accordance with the second embodiment.
Figure 6:
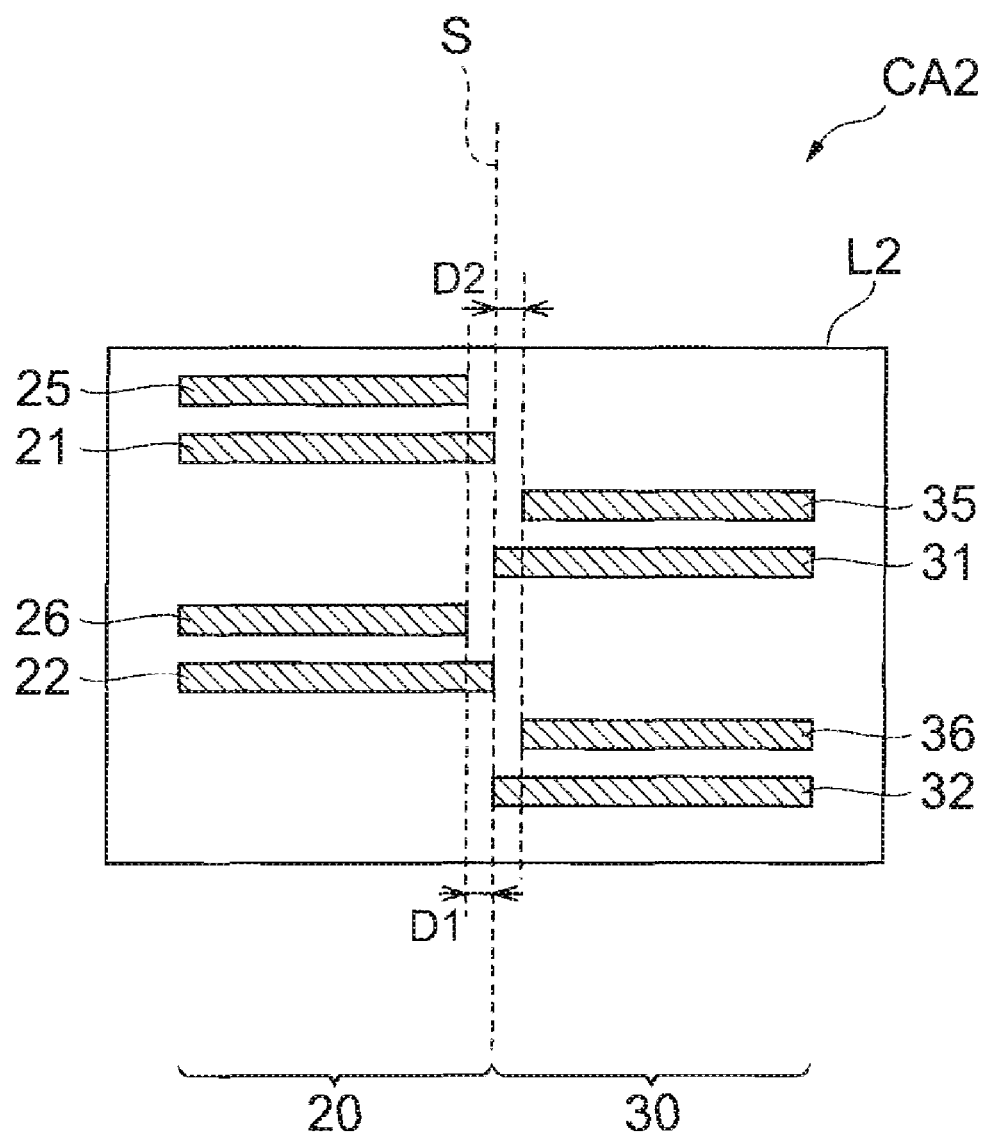
FIG. 6 is a view for explaining the structure of a cross section of the multilayer capacitor array taken along the line VI-VI of FIG. 4.

With reference to FIGS. 4 to 6, the structure of the multilayer capacitor array CA2 in accordance with the second embodiment will be explained. The capacitor array CA2 in accordance with the second embodiment differs from the capacitor array CA1 in accordance with the first embodiment in terms of the arrangement of first to fourth inner electrodes. FIG. 4 is a perspective view of the multilayer capacitor array in accordance with the second embodiment. FIG. 5 is an exploded perspective view of the capacitor body included in the multilayer capacitor array in accordance with the second embodiment. FIG. 6 is a view for explaining the structure of a cross section of the multilayer capacitor array taken along the line VI-VI of FIG. 4.

As shown in FIG. 4, the multilayer capacitor array CA1 in accordance with the second embodiment comprises a capacitor body L2 and first to fourth terminal electrodes 1 to 4 arranged on outer surface of the capacitor body L2.

As shown in FIG. 4, the capacitor body L2 is shaped like a rectangular parallelepiped having rectangular first and second main faces L2a, L2b opposing each other, first and second end faces L2c, L2d opposing each other and extending in the shorter-side direction of the first and second main faces L2a, L2b so as to connect them to each other, and first and second side faces L2e, L2f opposing each other and extending in the longer-side direction of the first and second main faces L2a, L2b so as to connect them to each other.

The first to fourth terminal electrodes 1 to 4 are arranged on outer surface of the capacitor body L2 in the same manner as the first to fourth terminal electrodes 1 to 4 arranged on outer surface of the capacitor body L1 of the multilayer capacitor array CA1 in accordance with the first embodiment.

As shown in FIG. 5, the capacitor body L2 has a plurality of (9 in this embodiment) laminated dielectric layers 10 to 18.

As shown in FIG. 5, the capacitor body L2 includes first and second electrode groups 20, 30. The first electrode group 20 has a plurality (2 layers each in this embodiment) of first and second inner electrodes 21, 22, 25, 26. The second electrode group 30 has a plurality (2 layers each in this embodiment) of third and fourth inner electrodes 31, 32, 35, 36. The first electrode group 20 and second electrode group 30 are arranged in a row along the opposing direction of the first and second end faces L2c, L2d of the capacitor body L2. Specifically, the first electrode group 20 is arranged on the first end face L2c side, while the second electrode group 30 is arranged on the second end face L2d side.

The first and second inner electrodes 21, 22, 25, 26 included in the first electrode group 20 are arranged in the order of the second inner electrode 25, first inner electrode 21, second inner electrode 26, and first inner electrode 22 from the first main face L2a toward the second main face L2b. The third and fourth inner electrodes 31, 32, 35, 36 included in the second electrode group 30 are arranged in the order of the fourth inner electrode 35, third inner electrode 31, fourth inner electrode 36, and third inner electrode 32 from the first main face L2a toward the second main face L2b.

Within the capacitor body L2, the first and second inner electrodes 21, 22, 25, 26 are arranged at positions different from any of the third and, fourth inner electrodes 31, 32, 35, 36 in the opposing direction of the first and, second main faces L2a, L2b.

Along the opposing direction of the first and second main faces L2a, L2b, the first and second inner electrodes 21, 25 oppose each other with one dielectric layer 11 therebetween, and the first and second inner electrodes 22, 26 oppose each other with one dielectric layer 15 therebetween. The first and second inner electrodes 21, 26 oppose each other along the opposing direction of the first and second main faces L2a, L2b, with three dielectric layers 12, 13, 14 therebetween, whose number is greater than the number of dielectric layers positioned between the first and second inner electrodes 21, 25 and between the first and second inner electrodes 22, 26.

Along the opposing direction of the first and second main faces L2a, L2b, the third and fourth inner electrodes 31, 35 oppose each other with one dielectric layer 13 therebetween, and the third and fourth inner electrodes 32, 36 oppose each other with one dielectric layer 17 therebetween. The third and fourth inner electrodes 31, 36 oppose each other along the opposing direction of the first and second main faces L2a, L2b, with three dielectric layers 14, 15, 16 therebetween, whose number is greater than the number of dielectric layers positioned between the third and fourth inner electrodes 31, 35 and between the third and fourth inner electrodes 32, 36.

The first inner electrodes 21, 22 include main electrode portions 21a, 22a and lead portions 21b, 22b extending from the main electrode portions 21a, 22a so as to be exposed at the first side face L2e. The lead portions 21b, 22b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side face L2f. The lead portions 25b, 26b are physically and electrically connected to the second terminal electrode 2.

The third inner electrodes 31, 32 include main electrode portions 31a, 32a and lead portions 31b, 32b extending from the main electrode portions 31a, 32a so as to be exposed at the first side face L2e. The lead portions 31b, 32b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the second side face L2f. The lead portions 35b, 36b are physically and electrically connected to the fourth terminal electrode 4.

As shown in FIGS. 5 and 6, a virtual plane parallel to the opposing direction of the first and second main faces L2a, L2b is taken as a virtual reference plane S. When based on the virtual reference plane S, the first and second electrode groups 20, 30 are arranged in a row along a direction orthogonal to the opposing direction of the first and second main faces L2a, L2b which is a direction orthogonal to the reference plane S. Namely, within the capacitor body L2, the first and second inner electrodes 21, 22, 25, 26 are arranged on the first end face L2c side of the reference plane S, while third and fourth inner electrodes 31, 32, 35, 36 are arranged on the second end face L2d side of the reference plane S.

The first inner electrodes 21, 22 are arranged such that the sides on the second end face L2d side of the main electrode portions 21a, 22a are in contact with the reference plane S. The second inner electrodes 25, 26 are arranged such that the sides on the second end face L2d side of the main electrode portions 25a, 26a are separated from the reference plane S by a predetermined distance D1 toward the first end face L2c.

The sides on the first end race L2c side of the main electrode portions 31a, 32a of the third inner electrodes 31, 32 are in contact with the reference plane S. The fourth inner electrodes 35, 36 are arranged such that the sides on the first end face L2c side of the main electrode portions 35a, 36a are separated from the reference plane S by a predetermined distance D2 toward the second end face L2d.

In the multilayer capacitor array CA2, the first and second inner electrodes 21, 22, 25, 26 include inner electrodes opposing each other with a dielectric layer therebetween. These opposing first and second inner electrodes form one of capacitors included in the multilayer capacitor array CA2. In the multilayer capacitor array CA2, the third and fourth inner electrodes 31, 32, 35, 36 include inner electrodes opposing each other with a dielectric layer therebetween. These opposing third and fourth inner electrodes form one of the capacitors included, in the multilayer capacitor array CA2.

When a voltage is applied to the capacitor formed by the first and second inner electrodes 21, 22, 25, 26 and the capacitor formed by the third and fourth inner electrodes 31, 32, 35, 36 in the multilayer capacitor array CA2 so that electrostriction is generated in each capacitor, electrostriction also occurs near the reference plane S, since the first and third inner electrodes 21, 22, 31, 32 are arranged in contact with the reference plane S as mentioned above. This restrains stresses from being concentrated near the reference plane S.

Restraining stresses from being concentrated can also keep cracks from occurring in the multilayer capacitor array CA2. While the first inner electrodes 21, 22 are in contact with the reference plane S, the second inner electrodes 25, 26 are positioned such as to be separated from the reference plane S by the predetermined distance D1. While the third inner electrodes 31, 32 are in contact with the reference plane S, the fourth inner electrodes 35, 36 are positioned such as to be separated from the reference plane S by the predetermined distance D2. This restrains electrostriction from causing distortions in excess near the reference plane S.

The first and second inner electrodes 21, 22, 25, 26 are arranged at positions different from any of the third and fourth inner electrodes 31, 32, 35, 36 in the opposing direction of the first and second main faces L2a, L2b. Therefore, in the multilayer capacitor array CA2, there is a portion where a large gap by three dielectric layers can be acquired between inner electrodes. As a result, an electrostriction alleviating layer can be made greater, whereby the multilayer capacitor array CA2 can restrain vibrations from being caused by electrostriction.

Third Embodiment

Figure 7:
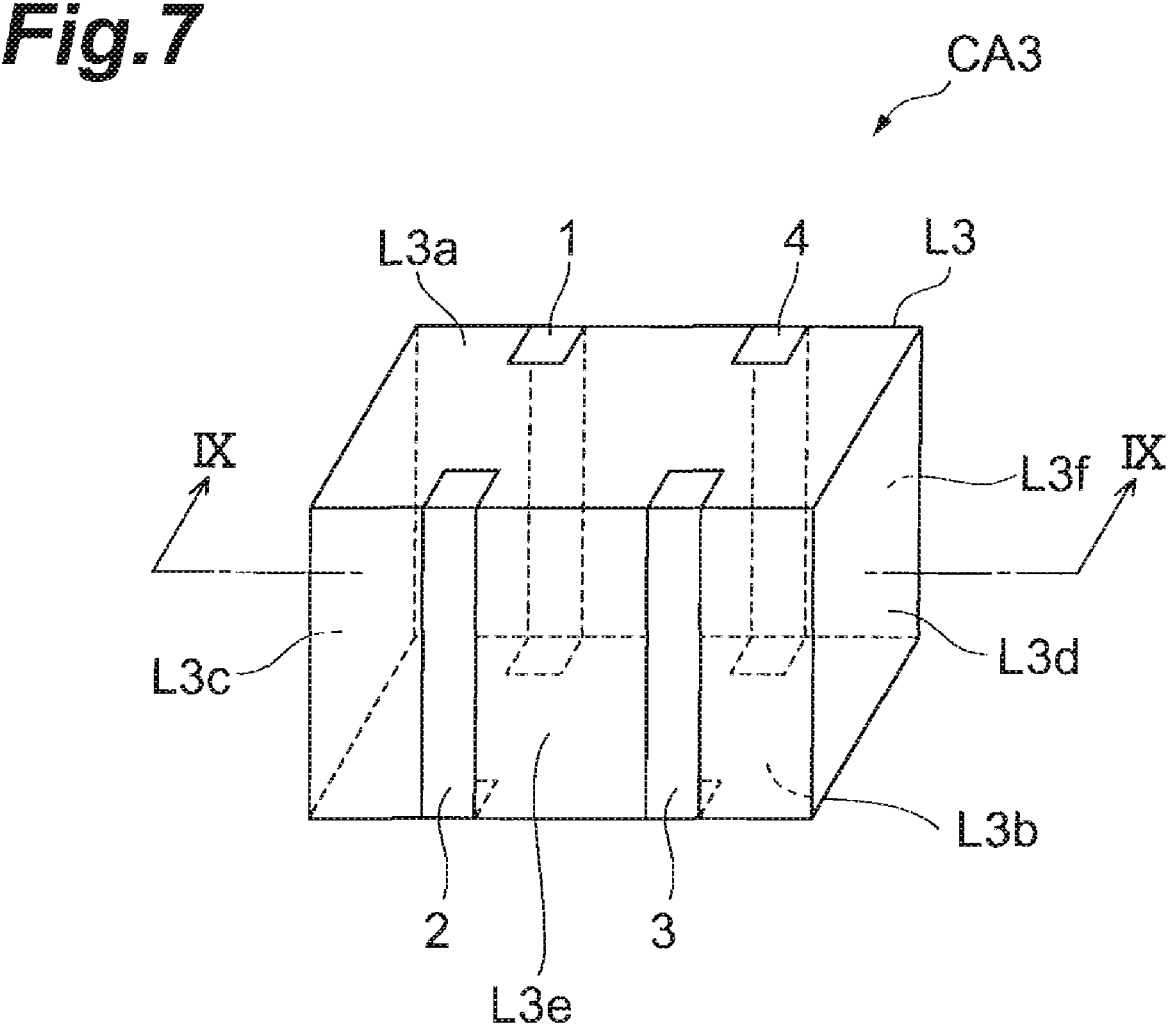
FIG. 7 is a perspective view of the multilayer capacitor array in accordance with the third embodiment.
Figure 8:
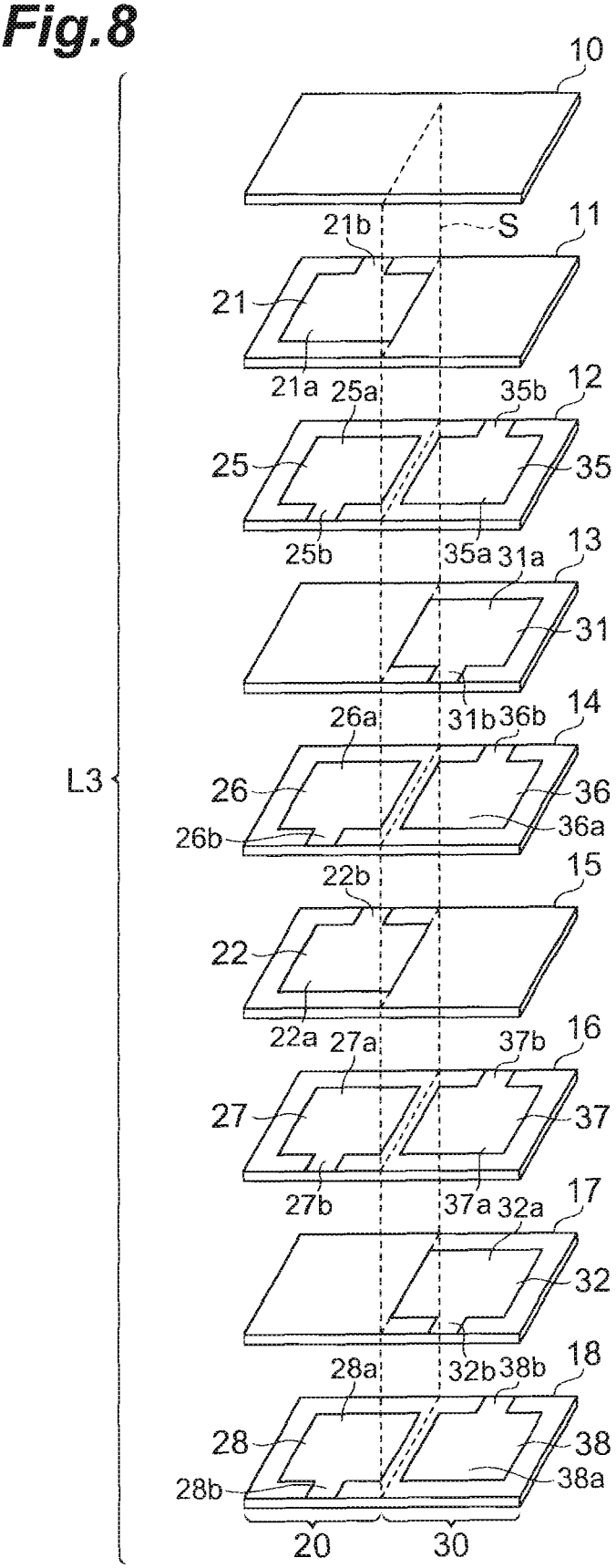
FIG. 8 is an exploded perspective view of the capacitor body included in the multilayer capacitor array in accordance with the third embodiment.
Figure 9:
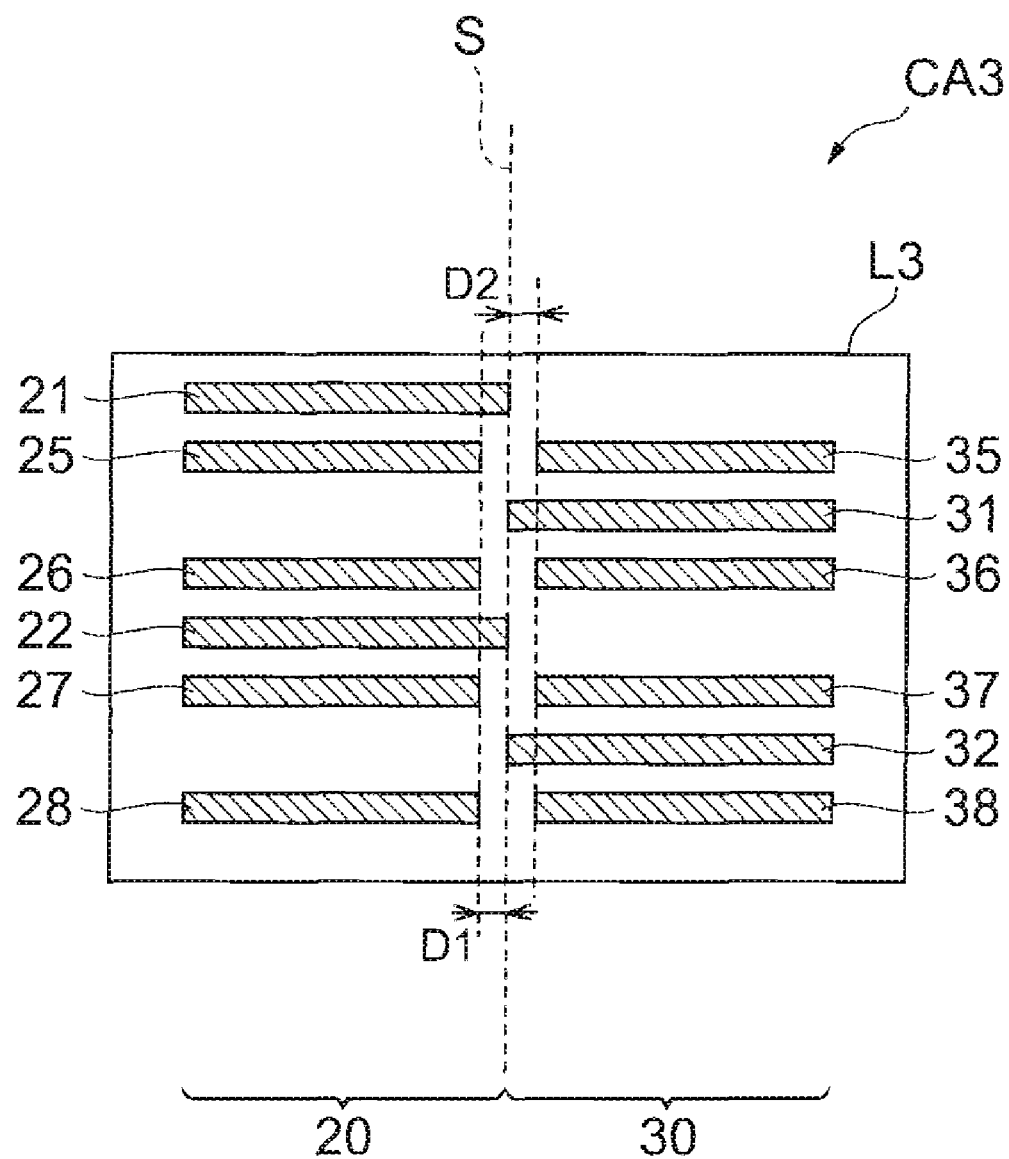
FIG. 9 is a view for explaining the structure of a cross section of the multilayer capacitor array taken along the line IX-IX of FIG. 7.

With reference to FIGS. 7 to 9, the structure of the multilayer capacitor array CA3 in accordance with the third embodiment will be explained. The capacitor array CA3 in accordance with the third embodiment differs from the capacitor array CA1 in accordance with the first embodiment in terms of the number and arrangement of first to fourth inner electrodes. FIG. 7 is a perspective view of the multilayer capacitor array in accordance with the third embodiment. FIG. 8 is an exploded perspective view of the capacitor body included in the multilayer capacitor array in accordance with the third embodiment. FIG. 9 is a view for explaining the structure of a cross section of the multilayer capacitor array taken along the line IX-IX of FIG. 7.

As shown in FIG. 7, the multilayer capacitor array CA3 in accordance with the third embodiment comprises a capacitor body L3 and first to fourth terminal electrodes 1 to 4 arranged on outer surface of the capacitor body L3.

As shown in FIG. 7, the capacitor body L3 is shaped like a rectangular parallelepiped having rectangular first and second main faces L3a, L3b opposing each other, first and second end faces L3c, L3d opposing each other and extending in the shorter-side direction of the first and second main faces L3a, L3b so as to connect them to each other, and first and second side faces L3e, L3f opposing each other and extending in the longer-side direction of the first and second main faces L3a, L3b so as to connect them to each other.

The second and third terminal electrodes 2, 3 are successively arranged on the first side face L 3e of the capacitor body L3 from the first end face L3c side to the second end face L3d side. The first and fourth terminal electrodes 1, 4 are successively arranged on the second side face L3f of the capacitor body L3 from the first end face L3c side to the second end face L3d side. The first and fourth side terminal electrodes 1, 4 oppose the second and third terminal electrodes 2, 3, respectively, along the opposing direction of the first and second side faces L3e, L3f.

As shown in FIG. 8, the capacitor body L3 has a plurality of (9 in this embodiment) laminated dielectric layers 10 to 18.

As shown in FIG. 8, the capacitor body L3 includes first and second electrode groups 20, 30. The first electrode group 20 has a plurality (2 layers in this embodiment) of first inner electrodes 21, 22 and a plurality (4 layers in this embodiment) of second inner electrodes 25, 26, 27, 28. The second electrode group 30 has a plurality (2 layers in this embodiment) of third inner electrodes 31, 32 and a plurality (4 layers in this embodiment) of fourth inner electrodes 35, 36, 37, 38. The first electrode group 20 and second electrode group 30 are arranged in a row along the opposing direction of the first and second end faces L3c, L3d within the capacitor body L3. Specifically, the first electrode group 20 is arranged on the first end face L3c side, while the second electrode group 30 is arranged on the second end face L3d side.

The first and second inner electrodes 21, 22, 25 to 28 included in the first electrode group 20 are arranged in the order of the first inner electrode 21, second inner electrode 25, second inner electrode 26, first inner electrode 22, second inner electrode 27, and second inner electrode 28 from the first main face L3a toward the second main face L3b. The third and fourth inner electrodes 31, 32, 35 to 38 included in the second electrode group 30 are arranged in the order of the fourth inner electrode 35, third inner electrode 31, fourth inner electrode 36, fourth inner electrode 37, third inner electrode 32, and fourth inner electrode 38 from the main face L3a toward the second main face L3b.

Within the capacitor body L3, the first inner electrodes 21, 22 are arranged at positions different from any of the third and fourth inner electrodes 31, 32, 35 to 38 in the opposing direction of the first and second main faces L3a, L3b. Within the capacitor body L3, the third inner electrodes 31, 32 are arranged at positions different from any of the first and second inner electrodes 21, 22, 25 to 28 in the opposing direction of the first and second main faces L3a, L3b.

Within the capacitor body L3, the second inner electrodes 25, 26, 27, 28 are arranged on the same layers as with the fourth inner electrodes 35, 36, 37, 38, respectively, in the opposing direction of the first and second main faces L3a, L3b.

Along the opposing direction of the first and second main faces L3a, L3b, the first and second inner electrodes 21, 25 oppose each other with one dielectric layer 11 therebetween, the first and second inner electrodes 22, 26 oppose each other with one dielectric layer 14 therebetween, and the first and second inner electrodes 22, 27 oppose each other with one dielectric layer 15 therebetween.

When seen in the opposing direction of the first and second main faces L3a, L3b, the second inner electrodes 25, 26 are arranged adjacent to each other with the dielectric layers 12, 13 therebetween. When seen in the opposing direction of the first and second main faces L3a, L3b, the second inner electrodes 27, 28 are arranged adjacent to each other with the dielectric layers 16, 17 therebetween.

Along the opposing direction of the first and second main faces L3a, L3b, the third and fourth inner electrodes 31, 35 oppose each other with one dielectric layer 12 therebetween, the third and fourth inner electrodes 31, 36 oppose each other with one dielectric layer 13 therebetween, the third and fourth inner electrodes 32, 37 oppose each other with one dielectric layer 16 therebetween, and the third and fourth inner electrodes 32, 38 oppose each other with one dielectric layer 17 therebetween.

When seen in the opposing direction of the first and second main faces L3a, L3b, the fourth inner electrode 35 and first main face L3a are arranged adjacent to each other with the dielectric layers 10, 11 therebetween. When seen in the opposing direction of the first and second main faces L3a, L3b, the fourth inner electrodes 36, 37 are arranged adjacent to each other with the dielectric layers 14, 15 therebetween.

The first inner electrodes 21, 22 include main electrode portions 21a, 22a and lead portions 21b, 22b extending from the main electrode portions 21a, 22a so as to be exposed at the second side face L3f. The lead portions 21, 22b are physically and electrically connected to the first terminal electrode 1.

The second inner electrodes 25 to 28 include main electrode portions 25a to 28a and lead portions 25b to 28b extending from the main electrode portions 25a to 28a so as to be exposed at the first side face L3e. The lead portions 25b to 28b are physically and electrically connected to the second terminal electrode 2.

The third inner electrodes 31, 32 include main electrode portions 31a, 32a and lead portions 31b, 32b extending from the main electrode portions 31a, 32a so as to be exposed at the first side face L3e. The lead portions 31b, 32b are physically and electrically connected to the third terminal electrode 3.

The fourth inner electrodes 35 to 38 include main electrode portions 35a to 38a and lead portions 35b to 38b extending from the main electrode portions 35a to 38a so as to be exposed at the second side face L3f. The lead portions 35b to 38b are physically and electrically connected to the fourth terminal electrode 4.

As shown in FIGS. 8 and 9, a virtual plane parallel to the opposing direction of the first and second main faces L3a, L3b is taken as a virtual reference plane S. When based on the virtual reference plane S, the first and second electrode groups 20, 30 are arranged in a row along a direction orthogonal to the opposing direction of the first and second main faces L3a, L3b which is a direction orthogonal to the reference plane S. Namely, within the capacitor body L3, the first and second inner electrodes 21, 22, 25 to 28 are arranged on the first end face L3c side of the reference plane S, while third and fourth inner electrodes 31, 32, 35 to 38 are arranged on the second end face L3d side of the reference plane S.

The first inner electrodes 21, 22 are arranged such that the sides on the second end face L3d side of the main electrode portions 21a, 22a are in contact with the reference plane S. The second inner electrodes 25 to 28 are arranged such that the sides on the second end face L3d side of the main electrode portions 25a to 28a are separated from the reference plane S by a predetermined distance D1 toward the first end face L3c.

The third inner electrodes 31, 32 are arranged such that the sides on the first end face L3c side of the main electrode portions 31a, 32a are in contact with the reference plane S. The fourth inner electrodes 35 to 38 are arranged such that the sides on the first end face L3c side of the main electrode portions 35a to 38a are separated from the reference plane S by a predetermined distance D2 toward the second end face L3d.

In the multilayer capacitor array CA3, the first and second inner electrodes 21, 22, 25 to 28 include inner electrodes opposing each other with a dielectric layer therebetween. These opposing first and second inner electrodes form one of capacitors included in the multilayer capacitor array CA3.

In the multilayer capacitor array CA3, the third and fourth inner electrodes 31, 32, 35 to 38 include inner electrodes opposing each other with a dielectric layer therebetween. These opposing third and fourth inner electrodes form one of the capacitors included in the multilayer capacitor array CA3.

When a voltage is applied to the capacitor formed by the first and second inner electrodes 21, 22, 25 to 28 and the capacitor formed by the third and fourth inner electrodes 31, 32, 35 to 38 in the multilayer capacitor array CA3 so that electrostriction is generated in each capacitor, electrostriction also occurs near the reference plane S, since the first and third inner electrodes 21, 22, 31, 32 are arranged in contact with the reference plane S as mentioned above. This restrains stresses from being concentrated near the reference plane S.

Restraining stresses from being concentrated can also keep cracks from occurring in the multilayer capacitor array CA3.

While the first inner electrodes 21, 22 are in contact with the reference plane S, the second inner electrodes 25 to 28 are positioned such as to be separated from the reference plane S by the predetermined distance D1. While the third inner electrodes 31, 32 are in contact with the reference plane S, the fourth inner electrodes 35 to 38 are positioned such as to be separated from the reference plane S by the predetermined distance D2. This restrains electrostriction from causing distortions in excess near the reference plane S.

The first inner electrodes 21, 22 are arranged at positions different from any of the third and fourth inner electrodes 31, 32, 35 to 38 in the opposing direction of the first and second main faces L3a, L3b. Therefore, in the multilayer capacitor array CA3, the gap (formed by the dielectric layers 10, 11) between the first main face L3a and fourth inner electrode 35 and the gap (formed by the dielectric layers 14, 15) between the fourth inner electrode 36, 37 can be made large, i.e., by two dielectric layers each. As a result, an electrostriction alleviating layer can be made greater, whereby the multilayer capacitor array CA3 can restrain vibrations from being caused by electrostriction.

The third inner electrodes 31, 32 are arranged at positions different from any of the first and second inner electrodes 21, 22, 25 to 28 in the opposing direction of the first and second main faces L3a, L3b. Therefore, in the multilayer capacitor array CA3, the gap (formed by the dielectric layers 12, 13) between the second inner electrodes 25, 26 and the gap (formed by the dielectric layers 16, 17) between the second inner electrodes 27, 28 can be made large, i.e., by two dielectric layers each. As a result, an electrostriction alleviating layer can be made greater, whereby the multilayer capacitor array CA3 can restrain vibrations from being caused by electrostriction.

When seen in the opposing direction of the first and second main faces L3a, L3b, two layers of second inner electrodes 25, 26 are arranged adjacent to each other, and two layers of second inner electrodes 27, 28 are arranged adjacent to each other. At the dielectric layers 12, 13 positioned between the inner electrodes 25, 26 of the same polarity adjacent to each other and opposing each other and the dielectric layers 16, 17 positioned between the inner electrodes 27, 28 of the same polarity adjacent to each other and opposing each other, no electric fields are caused by the opposing electrodes even when a voltage is applied to the multilayer capacitor array. This accordingly suppresses vibrations of the multilayer capacitor array CA3 caused by electrostriction.

Two layers of fourth inner electrodes 36, 37 are arranged adjacent to each other when seen in the opposing direction of the first and second main faces L3a, L3b. In areas of the dielectric layers 14, 15 corresponding to the second electrode group where the inner electrodes 36, 37 having the same polarity are adjacent to each other and oppose each other, no electric fields occur even when a voltage is applied to the multilayer capacitor array. This accordingly suppresses vibrations of the multilayer capacitor array CA3 caused by electrostriction.

Fourth Embodiment

Figure 10:
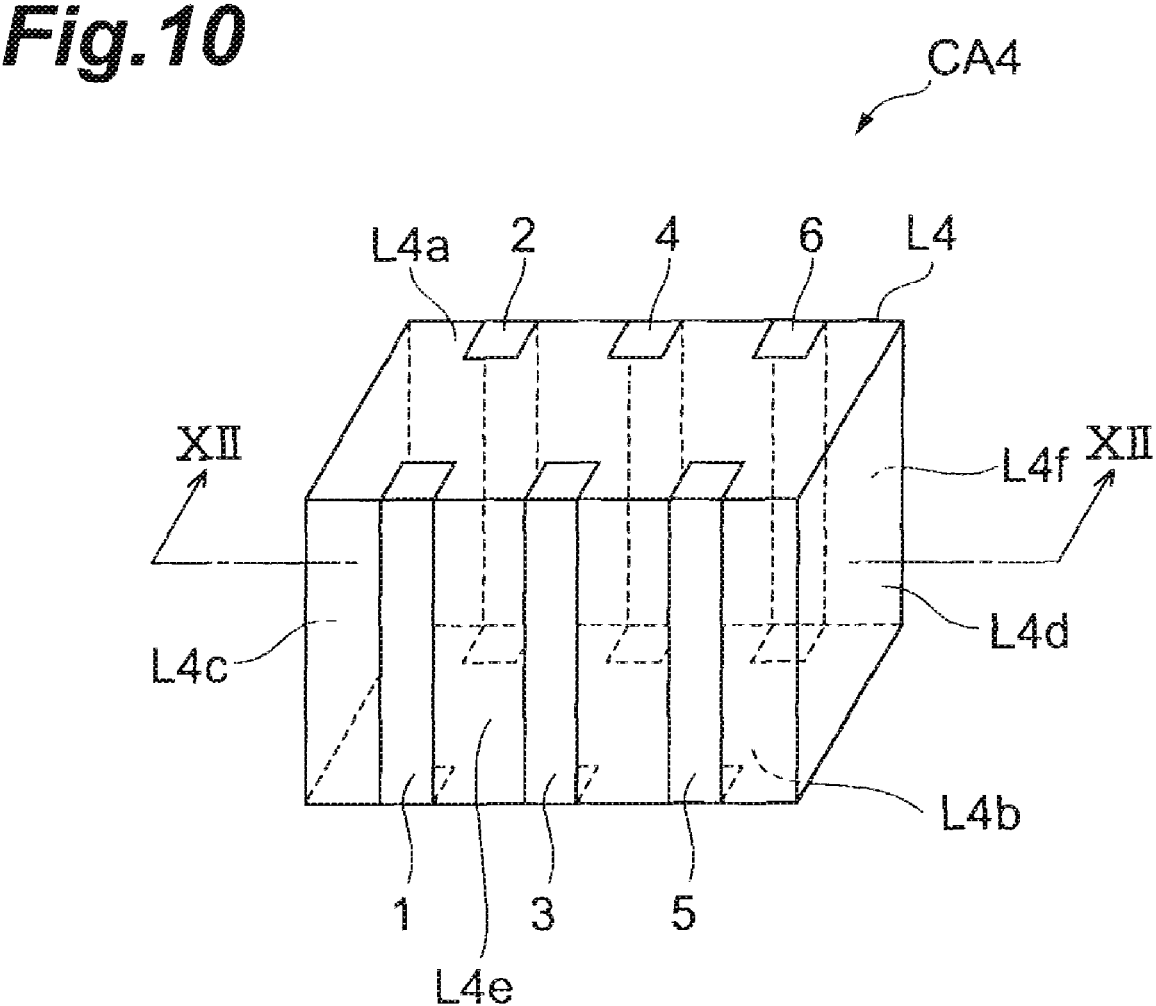
FIG. 10 is a perspective view of the multilayer capacitor array in accordance with the fourth embodiment.
Figure 11:
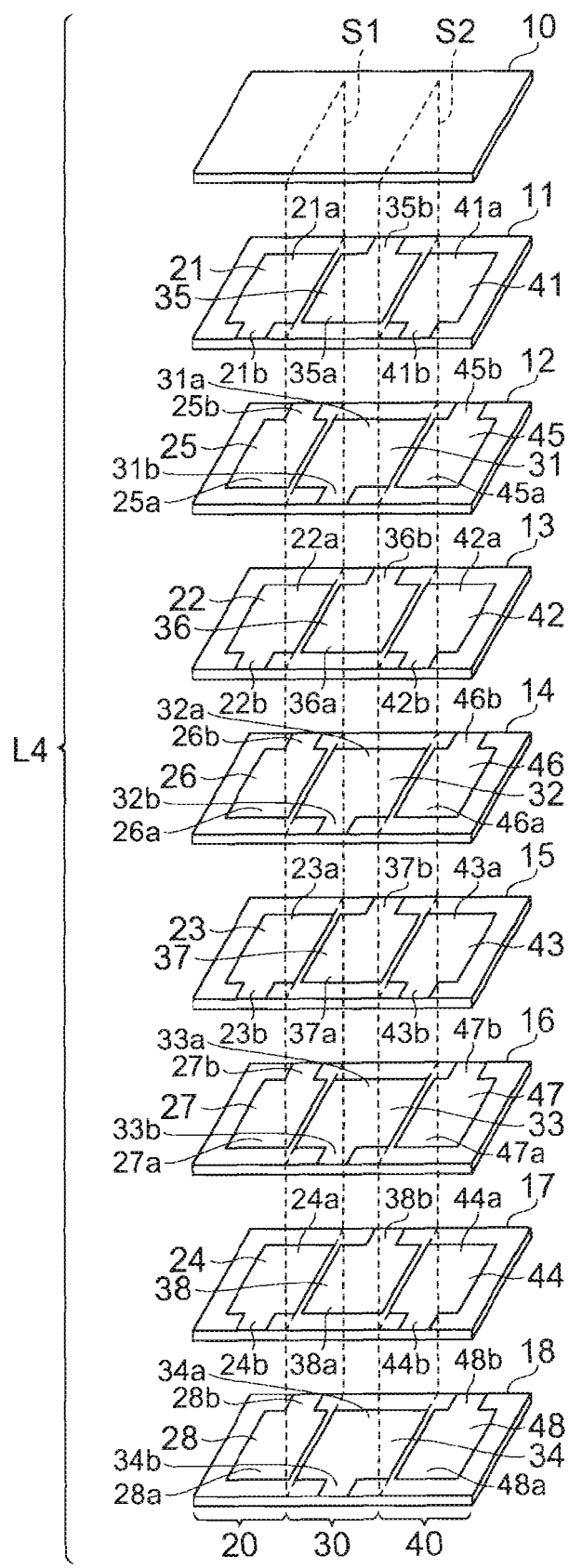
FIG. 11 is an exploded perspective view of the capacitor body included in the multilayer capacitor array in accordance with the fourth embodiment.
Figure 12:
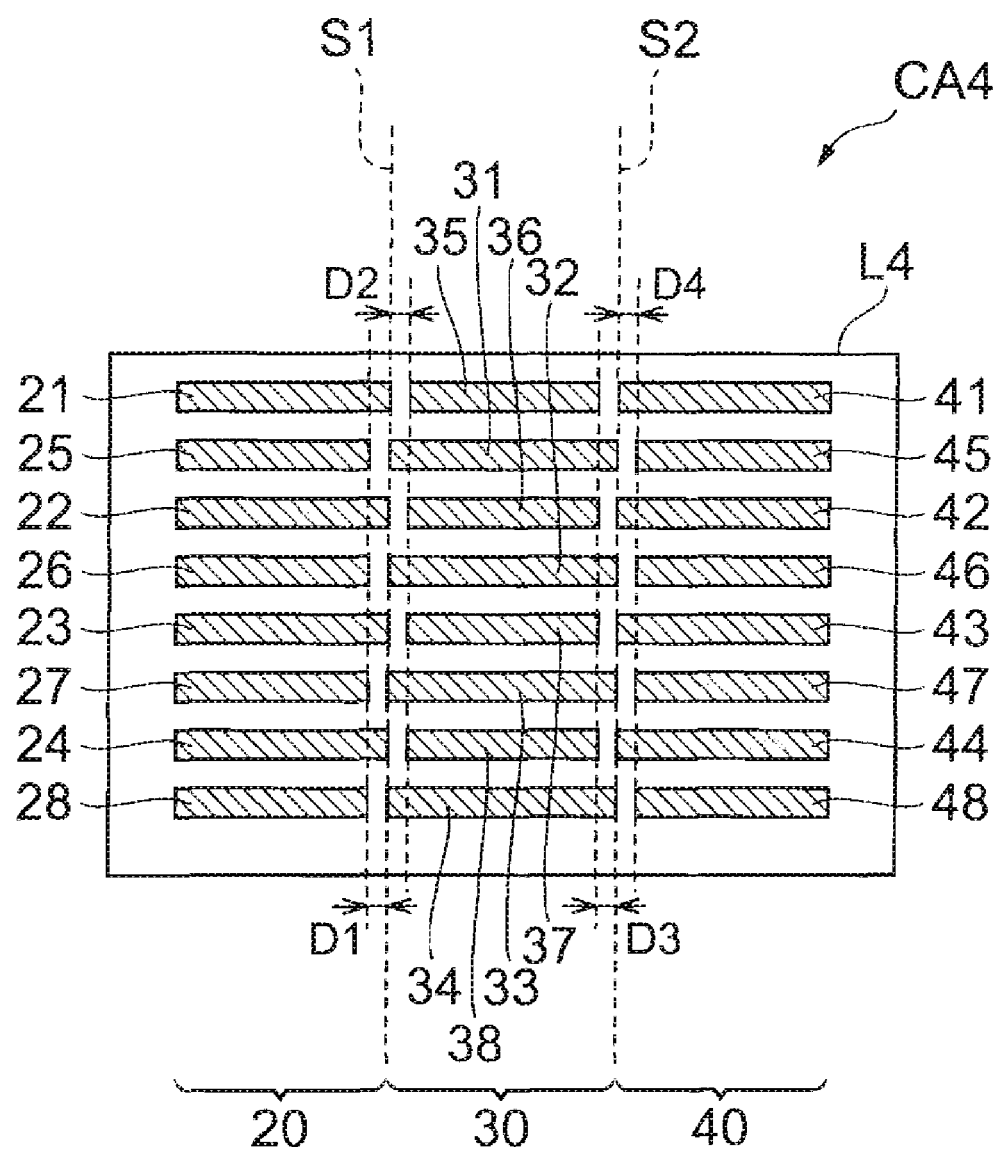
FIG. 12 is a view for explaining the structure of a cross section of the multilayer capacitor array taken along the line XII-XII of FIG. 10.

With reference to FIGS. 10 to 12, the structure of the multilayer capacitor array CA4 in accordance with the fourth embodiment will be explained. The capacitor array CA4 in accordance with the fourth embodiment differs from the capacitor array CA1 in accordance with the first embodiment in terms of the number of terminal electrodes. FIG. 10 is a perspective view of the multilayer capacitor array in accordance with the fourth embodiment. FIG. 11 is an exploded perspective view of the capacitor body included in the multilayer capacitor array in accordance with the fourth embodiment. FIG. 12 is a view for explaining the structure of a cross section of the multilayer capacitor array taken along the line XII-XII of FIG. 10.

As shown in FIG. 10, the multilayer capacitor array CA4 in accordance with the fourth embodiment comprises a capacitor body L4 and first to sixth terminal electrodes 1 to 6 arranged on outer surface of the capacitor body L4. The first to fourth terminal electrodes 1 to 6 are formed, for example, by attaching and burning a conductive paste, which contains a conductive metal powder and a glass frit, onto outer surface of the capacitor body. A plating layer may be formed on the burned terminal electrodes when necessary. The first to fourth terminal electrodes 1 to 6 are formed such as to be electrically insulated from each other on the surfaces of the capacitor body L4.

As shown in FIG. 10, the capacitor body L4 is shaped like a rectangular parallelepiped having rectangular first and second main faces L4a, L4b opposing each other; first and second end faces L4c, L4d opposing each other and extending in the shorter-side direction of the first and second main faces L4a, L4b so as to connect them to each other, and first and second side faces L4e, L4f opposing each other and extending in the longer-side direction of the first and second main faces L4a, L4b so as to connect them to each other.

The first, third, and fifth terminal electrodes 1, 3, 5 are successively arranged on the first side face L4e of the capacitor body L4 from the first end face L4c side to the second end face L4d side. The second, fourth, and sixth terminal electrodes 2, 4, 6 are successively arranged on the second side face L4f of the capacitor body L4 from the first end face L4c side to the second end face L4d side. The first, third, and fifth terminal electrodes 1, 3, 5 oppose the second, fourth, and sixth terminal electrodes 2, 4, 6, respectively, in the opposing direction of the first and second side faces L4e, L4f.

As shown in FIG. 11, the capacitor body L4 has a plurality of (9 in this embodiment) laminated dielectric layers 10 to 18. Each of the dielectric layers 10 to 18 is constituted by a sintered body of a ceramic green sheet containing a dielectric ceramic, for example.

As shown in FIG. 11, the capacitor body L4 includes first, second, and third electrode groups 20, 30, 40. The first electrode group 20 has a plurality (4 layers each in this embodiment) of first and second inner electrodes 21 to 24, 25 to 28. The second electrode group 30 has a plurality (4 layers each in this embodiment) of third and fourth inner electrodes 31 to 34, 35 to 38. The third electrode group 40 has a plurality (4 layers each in this embodiment) of fifth and sixth inner electrodes 41 to 44, 45 to 48.

Within the capacitor body L4, the first to third electrode groups 20, 30, 40 are arranged in a row along a direction orthogonal to the opposing direction of the first and second main faces L4a, L4b, i.e., the opposing direction of the first and second end faces L4c, L4d of the capacitor body L4. Specifically, the first to third electrode groups 20, 30, 40 are successively arranged from the first end face L4c side to the second end face L4d side. Each of the inner electrodes 21 to 24, 25 to 28, 31 to 34, 41 to 44, 45 to 48 is constituted by a sintered body of a conductive paste, for example.

The first and second inner electrodes 21 to 24, 25 to 28 included in the first electrode group 20 are arranged in the order of the first inner electrode 21, second inner electrode 25, first inner electrode 22, second inner electrode 26, first inner electrode 23, second inner electrode 27, first inner electrode 24, and second inner electrode 28 from the first main face L4a toward the second main face L4b. The third and fourth inner electrodes 31 to 34, 35 to 38 included in the second electrode group 30 are arranged in the order of the fourth inner electrode 35, third inner electrode 31, fourth inner electrode 36, third inner electrode 32, fourth inner electrode 37, third inner electrode 33, fourth inner electrode 38, and third inner electrode 34 from the first main face L4a toward the second main face L4b. The fifth and sixth inner electrodes 41 to 44, 45 to 48 included in the third electrode group 40 are arranged in the order of the fifth inner electrode 41, sixth inner electrode 45, fifth inner electrode 42, sixth inner electrode 46, fifth inner electrode 43, sixth inner electrode 47, fifth inner electrode 44, and sixth inner electrode 48 from the first main face L4a toward the second main face L4b.

Along the opposing direction of the first and second main faces L4a, L4b, the first and second inner electrodes 21, 25 oppose each other with the dielectric layer 11 therebetween, the first and second inner electrodes 22, 25 oppose each other with the dielectric layer 12 therebetween, the first and second inner electrodes 22, 26 oppose each other with the dielectric layer 13 therebetween, the first and second inner electrodes 23, 26 oppose each other with the dielectric layer 14 therebetween, the first and second inner electrodes 23, 27 oppose each other with the dielectric layer 15 therebetween, the first and second inner electrodes 24, 27 oppose each other with the dielectric layer 16 therebetween, and the first and second inner electrodes 24, 28 oppose each other with the dielectric layer 17 therebetween.

Along the opposing direction of the first and second main faces L4a, L4b, the third and fourth inner electrodes 31, 35 oppose each other with the dielectric layer 11 therebetween, the third and fourth inner electrodes 31, 36 oppose each other with the dielectric layer 12 therebetween, the third and fourth inner electrodes 32, 36 oppose each other with the dielectric layer 13 therebetween, the third and fourth inner electrodes 32, 37 oppose each other with the dielectric layer 14 therebetween, the third and fourth inner electrodes 33, 37 oppose each other with the dielectric layer 15 therebetween, the third and fourth inner electrodes 33, 38 oppose each other with the dielectric layer 16 therebetween, and the third and fourth inner electrodes 34, 38 oppose each other with the dielectric layer 17 therebetween.

Along the opposing direction of the first and second main faces L4a, L4b, the fifth and sixth inner electrodes 41, 45 oppose each other with the dielectric layer 11 therebetween, the fifth and sixth inner electrodes 42, 45 oppose each other with the dielectric layer 12 therebetween, the fifth and sixth inner electrodes 42, 46 oppose each other with the dielectric layer 13 therebetween, the fifth and sixth inner electrodes 43, 46 oppose each other with the dielectric layer 14 therebetween, the fifth and sixth inner electrodes 43, 47 oppose each other with the dielectric layer 15 therebetween, the fifth and sixth inner electrodes 44, 47 oppose each other with the dielectric layer 16 therebetween, and the fifth and sixth inner electrodes 44, 48 oppose each other with the dielectric layer 17 therebetween.

The first inner electrodes 21 to 24 include main electrode portions 21a to 24a and lead portions 21b to 24b extending from the main electrode portions 21a to 24a so as to be exposed at the first side face L4e. The lead portions 21b to 24b are physically and electrically connected to the first terminal electrode 1.

The second inner electrodes 25 to 28 include main electrode portions 25a to 28a and lead portions 25b to 28b extending from the main electrode portions 25a to 28a so as to be exposed at the second side face L4f. The lead portions 25b to 28b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the first side face L4e. The lead portions 31b to 34b are physically and electrically connected to the third terminal electrode 3.

The fourth inner electrodes 35 to 38 include main electrode portions 35a to 38a and lead portions 35b to 38b extending from the main electrode portions 35a to 38a so as to be exposed at the second side face L4f. The lead portions 35b to 38b are physically and electrically connected to the fourth terminal electrode 4.

The fifth inner electrodes 41 to 44 include quadrilateral main electrode portions 41a to 44a each having four sides parallel to the first and second end faces L4c, L4d and first and second side faces L4e, L4f, respectively, and lead portions 41b to 44b extending from the main electrode portions 41a to 44a so as to be exposed at the first side face L4e. The lead portions 41b to 44b exposed at the first side face L4e are physically and electrically connected to the fifth terminal electrode 5. Namely, the fifth inner electrodes 41 to 44 are connected to the fifth terminal electrode 5.

The sixth inner electrodes 45 to 48 include quadrilateral main electrode portions 45a to 48a each having four sides parallel to the first and second end faces L4c, L4d and first and second side faces L4e, L4f, respectively, and lead portions 45b to 48b extending from the main electrode portions 45a to 48a so as to be exposed at the second side face L4f. The lead portions 45b to 48b exposed at the second side face L4f are physically and electrically connected to the sixth terminal electrode 6. Namely, the sixth inner electrodes 45 to 48 are connected to the sixth terminal electrode 6.

As shown in FIGS. 11 and 12, a virtual plane parallel to the opposing direction of the first and second main faces L4a, L4b is taken as a virtual reference plane S1. When based on the virtual reference plane S1, the first and second electrode groups 20, 30 are arranged in a row along a direction orthogonal to the reference plane S1. The direction orthogonal to the reference plane S1 corresponds to a direction orthogonal to the opposing direction of the first and second main faces L4a, L4b. Namely, within the capacitor body L4, the first and second inner electrodes 21 to 24, 25 to 28 are arranged on the first end face L4c side of the reference plane S1, while the third and fourth inner electrodes 31 to 34, 35 to 38 are arranged on the second end face L4d side of the reference plane S1.

Further, a virtual plane parallel to the opposing direction of the first and second main faces L4a, L4b is taken as a virtual reference plane S2. When based on the virtual reference plane S2, the second and third electrode groups 30, 40 are arranged in a row along a direction orthogonal to the reference plane S2. The direction orthogonal to the reference plane S2 corresponds to a direction orthogonal to the opposing direction of the first and second main faces L4a, L4b. Namely, within the capacitor body L4, the third and fourth inner electrodes 31 to 34, 35 to 38 are arranged on the first end face L4c side of the reference plane S2, while the fifth and sixth inner electrodes 41 to 44, 45 to 48 are arranged on the second end face L4d side of the reference plane S2.

The first inner electrodes 21 to 24 are arranged in contact with the reference plane S1. Specifically, the sides on the second end face L4d side of the main electrode portions 21a to 24a of the first inner electrodes 21 to 24 are in contact with the reference plane S1.

The second inner electrodes 25 to 28 are arranged such as to be separated from the reference plane S1 by a predetermined distance. Specifically, the sides on the second end face L4d side of the main electrode portions 25a to 28a of the second inner electrodes 25 to 28 are arranged such as to be separated from the reference plane S1 by a predetermined distance D1 toward the first end face L4c.

The third inner electrodes 31 to 34 are arranged in contact with the reference planes S1 and S2. Specifically, the sides on the first end face L4c side of the main electrode portions 31a to 34a of the third inner electrodes 31 to 34 are in contact with the reference plane S1. The sides on the second end face L4d side of the main electrode portions 31a to 34a of the third inner electrodes 31 to 34 are in contact with the reference plane S2.

The fourth inner electrodes 35 to 38 are arranged such as to be separated from the reference planes S1 and S2 by predetermined distances. Specifically, the sides on the first end face L4c side of the main electrode portions 35a to 38a of the fourth inner electrodes 35 to 38 are arranged such as to be separated from the reference plane S1 by a predetermined distance D2 toward the second end face L4d. The sides on the second end face L4d side of the main electrode portions 35a to 38a of the fourth inner electrodes 35 to 38 are arranged such as to be separated from the reference plane S2 by a predetermined distance D3 toward the first end face L4c.

The fifth inner electrodes 41 to 44 are arranged in contact with the reference plane S2. Specifically, the sides on the first end face L4c side of the main electrode portions 41a to 44a of the fifth inner electrodes 41 to 44 are in contact with the reference plane S2.

The sixth inner electrodes 45 to 48 are arranged such as to be separated from the reference plane S2 by a predetermined distance. Specifically, the sides on the first end face L4c side of the main electrode portions 45a to 48a of the sixth inner electrodes 45 to 48 are arranged such as to be separated from the reference plane S2 by a predetermined distance D4 toward the second end face L4d.

In the multilayer capacitor array CA4, the first and second inner electrodes 21 to 24, 25 to 28 alternately oppose each other with the dielectric layers 11 to 17 therebetween. Therefore, the first and second inner electrodes 21 to 24, 25 to 28 form a capacitance C1, so as to construct one of capacitors included in the multilayer capacitor array CA4.

In the multilayer capacitor array CA4, the third and fourth inner electrodes 31 to 34, 35 to 38 alternately oppose each other with the dielectric layers 11 to 17 therebetween. Therefore, the third and fourth inner electrodes 31 to 34, 35 to 38 form a capacitance C2, so as to construct one of the capacitors included in the multilayer capacitor array CA4.

Figure 47:
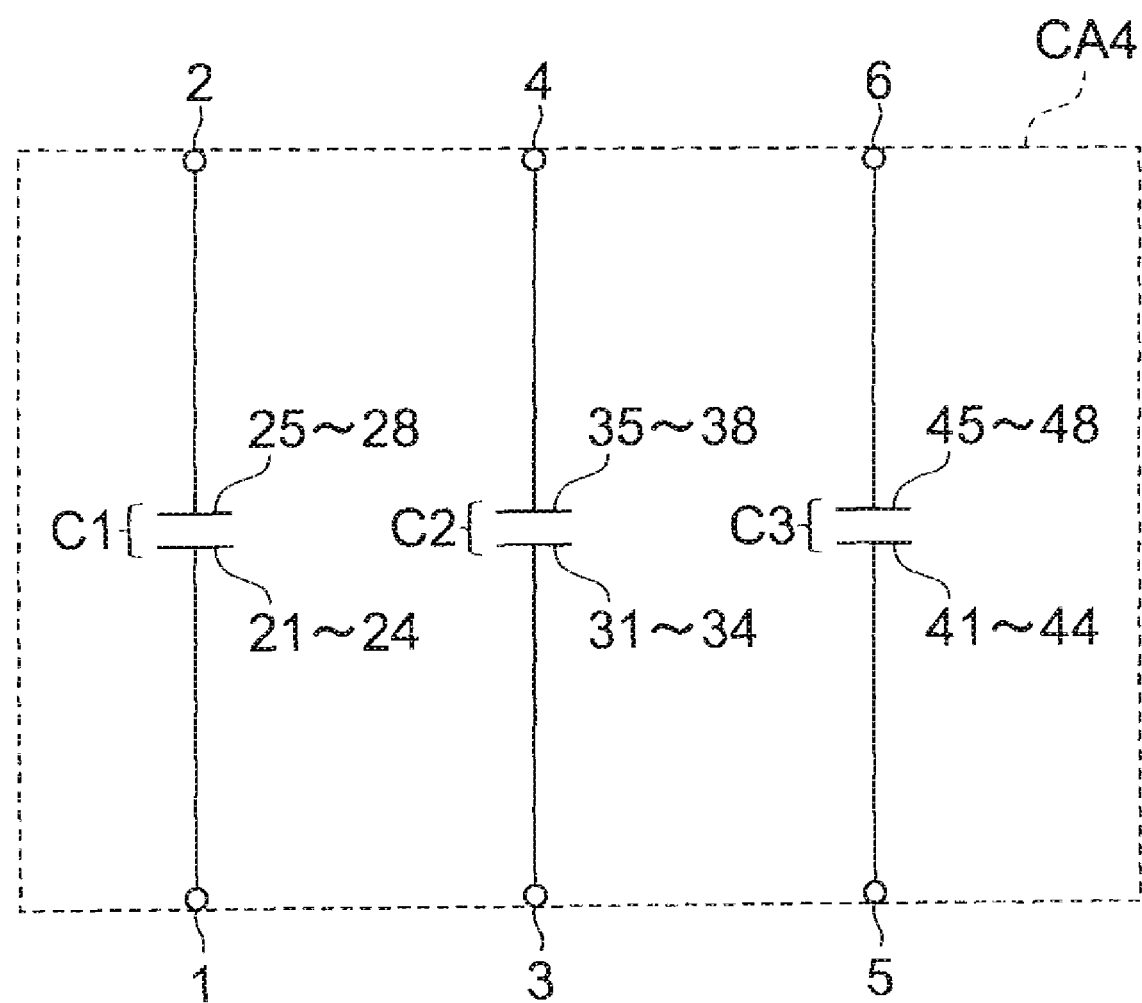
FIG. 47 is an equivalent circuit diagram of the multilayer capacitor array in accordance with the fourth embodiment.

In the multilayer capacitor array CA4, the fifth and sixth inner electrodes 41 to 44, 45 to 48 alternately oppose each other with the dielectric layers 11 to 17 therebetween. Therefore, the fifth and sixth inner electrodes 41 to 44, 45 to 48 form a capacitance C3, so as to construct one of the capacitors included in the multilayer capacitor array CA4. Hence, an equivalent circuit diagram of the multilayer capacitor array CA4 is illustrated as shown in FIG. 47.

When a voltage is applied to the capacitor formed by the first and second inner electrodes 21 to 24, 25 to 28 and the capacitor formed by the third and fourth inner electrodes 31 to 34, 35 to 38 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA4 as mentioned above. This restrains stresses from being concentrated near the reference plane S1.

When a voltage is applied to the capacitor formed by the third and fourth inner electrodes 31 to 34, 35 to 38 and the capacitor formed by the fifth and sixth inner electrodes 41 to 44, 45 to 48 so that electrostriction is generated in each capacitor, electrostriction also occurs near the reference plane S2, since the third and fifth inner electrodes 31 to 34, 41 to 44 are arranged in contact with the reference plane S2 in the multilayer capacitor array CA4. This restrains stresses from being concentrated near the reference plane S2.

Restraining stresses from being concentrated can also keep cracks from occurring in the multilayer capacitor array CA4.

While the first inner electrodes 21 to 24 are in contact with the reference plane S1, the second inner electrodes 25 to 28 are positioned such as to be separated from the reference plane S1 by the predetermined distance D1. While the third inner electrodes 31 to 34 are in contact with the reference plane S1, the fourth inner electrodes 35 to 38 are positioned such as to be separated from the reference plane S1 by the predetermined distance 1D2. This restrains electrostriction from causing distortions in excess near the reference plane S1.

While the third inner electrodes 31 to 34 are in contact with the reference plane S2, the fourth inner electrodes 35 to 38 are positioned such as to be separated from the reference plane 82 by the predetermined distance D3. While the fifth inner electrodes 41 to 44 are in contact with the reference plane S2, the sixth inner electrodes 45 to 48 are positioned such as to be separated from the reference plane S2 by the predetermined distance D4. This restrains electrostriction from causing distortions in excess near the reference plane S2.

Fifth Embodiment

Figure 13:
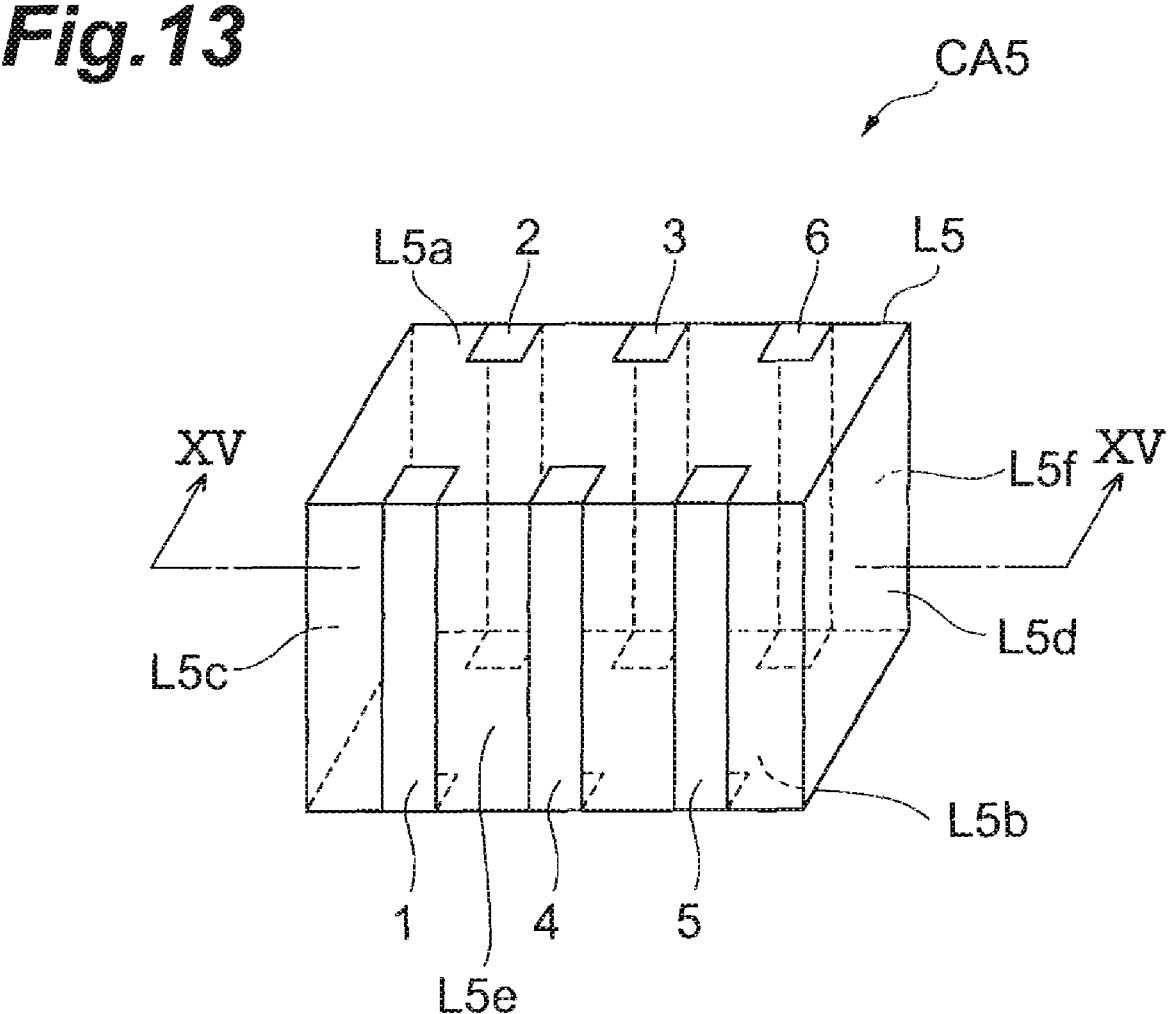
FIG. 13 is a perspective view of the multilayer capacitor array in accordance with the fifth embodiment.
Figure 14:
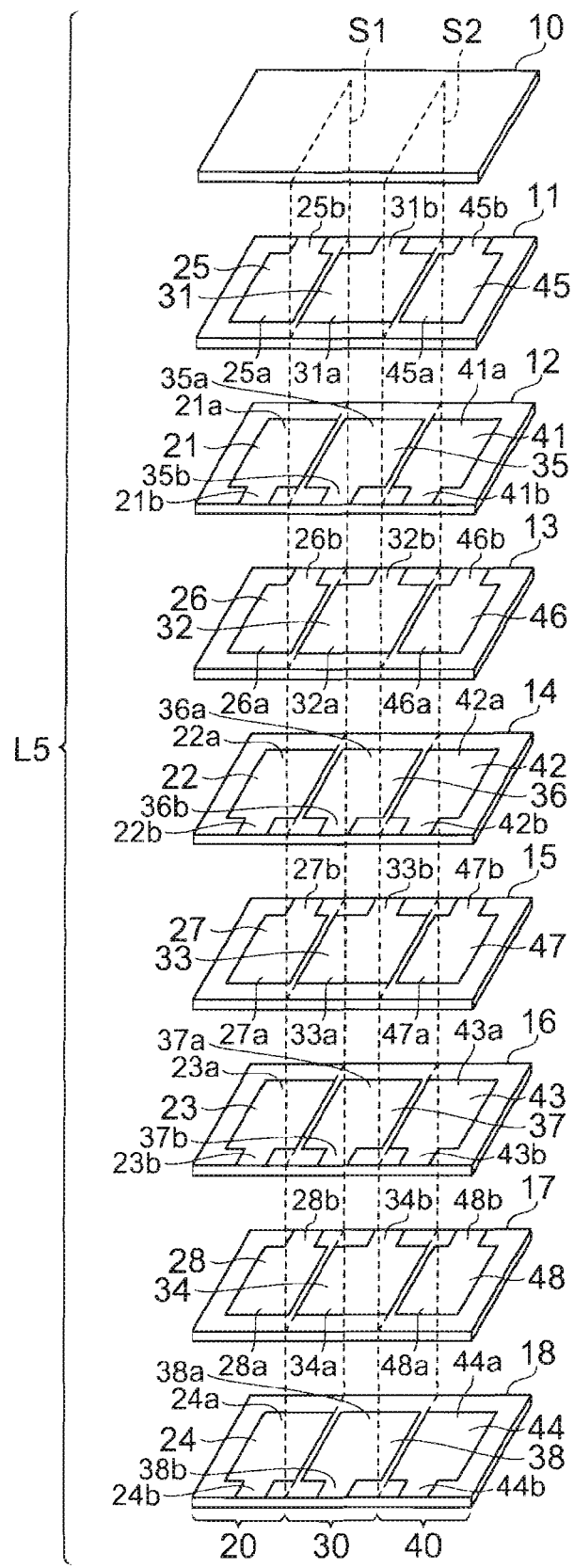
FIG. 14 is an exploded perspective view of the capacitor body included in the multilayer capacitor array in accordance with the fifth embodiment.
Figure 15:
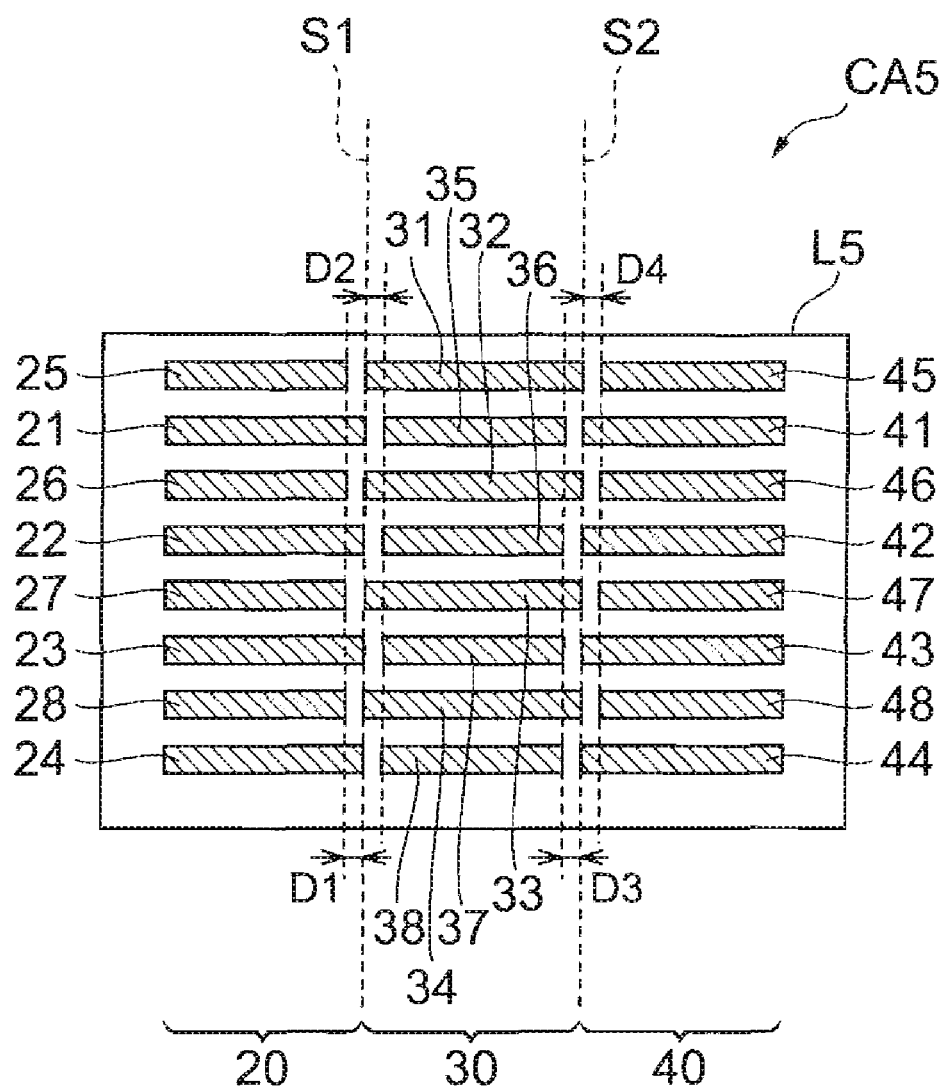
FIG. 15 is a view for explaining the structure of a cross section of the multilayer capacitor array taken along the line XV-XV of FIG. 13.

With reference to FIGS. 13 to 15, the structure of the multilayer capacitor array CA5 in accordance with the fifth embodiment will be explained. The capacitor array CA5 in accordance with the fifth embodiment differs from the capacitor array CA4 in accordance with the fourth embodiment in terms of the arrangement of first to sixth terminal electrodes and first to sixth inner electrodes. FIG. 13 is a perspective view of the multilayer capacitor array in accordance with the fifth embodiment. FIG. 14 is an exploded perspective view of the capacitor body included in the multilayer capacitor array in accordance with the fifth embodiment. FIG. 15 is a view for explaining the structure of a cross section of the multilayer capacitor array taken along the line XV-XV of FIG. 13.

As shown in FIG. 13, the multilayer capacitor array CA5 in accordance with the fifth embodiment comprises a capacitor body L5 and first to sixth terminal electrodes 1 to 6 arranged on outer surface of the capacitor body L5.

As shown in FIG. 13, the capacitor body L5 is shaped like a rectangular parallelepiped having rectangular first and second main faces L5a, L5b opposing each other, first and second end faces L5c, L5d opposing each other and extending in the shorter-side direction of the first and second main faces L5a, L5b so as to connect them to each other, and first and second side faces L5e, L5f opposing each other and extending in the longer-side direction of the first and second main faces L5a, L5b so as to connect them to each other.

The first, fourth, and fifth terminal electrodes 1, 4, 5 are successively arranged on the first side face L5e of the capacitor body L5 from the first end face L5c side to the second end face L5d side. The second, third, and sixth terminal electrodes 2, 3, 6 are successively arranged on the second side face L5f of the capacitor body L5 from the first end face L5c side to the second end face L5d side. The first, fourth, and fifth terminal electrodes 1, 4, 5 oppose the second, third, and sixth terminal electrodes 2, 3, 6, respectively, in the opposing direction of the first and second side faces L5e, L5f.

As shown in FIG. 14, the capacitor body L5 has a plurality of (9 in this embodiment) laminated dielectric layers 10 to 18.

As shown in FIG. 14, the capacitor body L5 includes first to third electrode groups 20, 30, 40. The first electrode group 20 has a plurality (4 layers each in this embodiment) of first and second inner electrodes 21 to 24, 25 to 28. The second electrode group 30 has a plurality (4 layers each in this embodiment) of third and fourth inner electrodes 31 to 34, 35 to 38. The third electrode group 40 has a plurality (4 layers each in this embodiment) of fifth and sixth inner electrodes 41 to 44, 45 to 48.

Within the capacitor body L5, the first to third electrode groups 20, 30, 40 are arranged in a row along the opposing direction of the first and second end faces L5c, L5d of the capacitor body L5. Specifically, the first to third electrode groups 20, 30, 40 are successively arranged from the first end face L5c side to the second end face L5d side.

The first and second inner electrodes 21 to 24, 25 to 28 included in the first electrode group 20 are arranged in the order of the second inner electrode 25, first inner electrode 21, second inner electrode 26, first inner electrode 22, second inner electrode 27, first inner electrode 23, second inner electrode 28, and first inner electrode 24 from the first main face L5a toward the second main face L5b. The third and fourth inner electrodes 31 to 34, 35 to 38 included in the second electrode group 30 are arranged in the order of the third inner electrode 31, fourth inner electrode 35, third inner electrode 32, fourth inner electrode 36, third inner electrode 33, fourth inner electrode 37, third inner electrode 34, and fourth inner electrode 38 from the first main face L5a toward the second main face L5b. The fifth and sixth inner electrodes 41 to 44, 45 to 48 included in the third electrode group 40 are arranged in the order of the sixth inner electrode 45, fifth inner electrode 41, sixth inner electrode 46, fifth inner electrode 42, sixth inner electrode 47, fifth inner electrode 43, sixth inner electrode 48, and fifth inner electrode 44 from the first main face L5a toward the second main face L5b.

Along the opposing direction of the first and second main faces L5a, L5b, the first and second inner electrodes 21, 25 oppose each other with the dielectric layer 11 therebetween, the first and second inner electrodes 21, 26 oppose each other with the dielectric layer 12 therebetween, the first and second inner electrodes 22, 26 oppose each other with the dielectric layer 13 therebetween, the first and second inner electrodes 22, 27 oppose each other with the dielectric layer 14 therebetween, the first and second inner electrodes 23, 27 oppose each other with the dielectric layer 15 therebetween, the first and second inner electrodes 23, 28 oppose each other with the dielectric layer 16 therebetween, and the first and second inner electrodes 24, 28 oppose each other with the dielectric layer 17 therebetween.

Along the opposing direction of the first and second main faces L5a, L5b, the third and fourth inner electrodes 31, 35 oppose each other with the dielectric layer 11 therebetween, the third and fourth inner electrodes 32, 35 oppose each other with the dielectric layer 12 therebetween, the third and fourth inner electrodes 32, 36 oppose each other with the dielectric layer 13 therebetween, the third and fourth, inner electrodes 33, 36 oppose each other with the dielectric layer 14 therebetween, the third and fourth inner electrodes 33, 37 oppose each other with the dielectric layer 15 therebetween, the third and fourth inner electrodes 34, 37 oppose each other with the dielectric layer 16 therebetween, and the third and fourth inner electrodes 34, 38 oppose each other with the dielectric layer 17 therebetween.

Along the opposing direction of the first and second main faces L5a, L5b, the fifth and sixth inner electrodes 41, 45 oppose each other with the dielectric layer 11 therebetween, the fifth and sixth inner electrodes 41, 46 oppose each other with the dielectric layer 12 therebetween, the fifth and sixth inner electrodes 42, 46 oppose each other with the dielectric layer 13 therebetween, the fifth and sixth inner electrodes 42, 47 oppose each other with the dielectric layer 14 therebetween, the fifth and sixth inner electrodes 43, 47 oppose each other with the dielectric layer 15 therebetween, the fifth and sixth inner electrodes 43, 48 oppose each other with the dielectric layer 16 therebetween, and the fifth and sixth inner electrodes 44, 48 oppose each other with the dielectric layer 17 therebetween.

The first inner electrodes 21 to 24 include main electrode portions 21a to 24a and lead portions 21b to 24b extending from the main electrode portions 21a to 24a so as to be exposed at the first side face L5e. The lead portions 21b to 24b are physically and electrically connected to the first terminal electrode 1.

The second inner electrodes 25 to 28 include main electrode portions 25a to 28a and lead portions 25b to 28b extending from the main electrode portions 25a to 28a so as to be exposed at the second side face L5f. The lead portions 25b to 28b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the second side face L5f. The lead portions 31b to 34b are physically and electrically connected to the third terminal electrode 3.

The fourth inner electrodes 35 to 38 include main electrode portions 35a to 38a and lead portions 35b to 38b extending from the main electrode portions 35a to 38a so as to be exposed at the first side face L5e. The lead portions 35b to 38b are physically and electrically connected to the fourth terminal electrode 4.

The fifth inner electrodes 41 to 44 include main electrode portions 41a to 44a and lead portions 41b to 44b extending from the main electrode portions 41a to 44a so as to be exposed at the first side face L5e. The lead portions 41b to 44b are physically and electrically connected to the fifth terminal electrode 5.

The sixth inner electrodes 45 to 48 include main electrode portions 45a to 48a and lead portions 45b to 48b extending from the main electrode portions 45a to 48a so as to be exposed at the second side face L5f. The lead portions 45b to 48b are physically and electrically connected to the sixth terminal electrode 6.

As shown in FIGS. 14 and 15, a virtual plane parallel to the opposing direction of the first and second main faces L5a, L5b is taken as a virtual reference plane S1. The first and second electrode groups 20, 30 are arranged, in a row along a direction orthogonal to the opposing direction of the first and second main faces L5a, L5b which is a direction orthogonal to the reference plane S1. Namely, within the capacitor body L5, the first and second inner electrodes 21 to 24, 25 to 28 are arranged on the first end face L5c side of the reference plane S1, while the third and fourth inner electrodes 31 to 34, 35 to 38 are arranged on the second end face L5d side of the reference plane S1.

Further, a virtual plane parallel to the opposing direction of the first and second main faces L5a, L5b is taken as a virtual reference plane S2. The second and third electrode groups 30, 40 are arranged in a row along a direction orthogonal to the opposing direction of the first and second main faces L5a, L5b which is a direction orthogonal to the reference plane S2. Namely, within the capacitor body L5, the third and fourth inner electrodes 31 to 34, 35 to 38 are arranged on the first end face L5c side of the reference plane S2, while the fifth and sixth inner electrodes 41 to 44, 45 to 48 are arranged on the second end face L5d side of the reference plane S2.

The first inner electrodes 21 to 24 are arranged such that the sides on the second end face L5d side of the main electrode portions 21a to 24a are in contact with the reference plane S1. The second inner electrodes 25 to 28 are arranged such that the sides on the second end face L5d side of the main electrode portions 25a to 28a are separated from the reference plane S1 by a predetermined distance D1 toward the first end face L5c.

The sides on the first end face L5c side of the main electrode portions 31a to 34a of the third inner electrodes 31 to 34 are in contact with the reference plane S1. The sides on the second end face L5d side of the main electrode portions 31a to 34a of the third inner electrodes 31 to 34 are in contact with the reference plane S2.

The fourth inner electrodes 35 to 38 are arranged such that the sides on the first end face L5c side of the main electrode portions 35a to 38a are separated from the reference plane S1 by a predetermined distance D2 toward the second end face L5d. The fourth inner electrodes 35 to 38 are arranged such that the sides on the second end face L5d side of the main electrode portions 35a to 38a are separated from the reference plane S2 by a predetermined distance D3 toward the first end face L5c.

The fifth inner electrodes 41 to 44 are arranged such that the sides on the first end face L5c side of the main electrode portions 41a to 44a are in contact with the reference plane S2. The sixth inner electrodes 45 to 48 are arranged such that the sides on the first end face L5c side of the main electrode portions 45a to 48a are separated from the reference plane S2 by a predetermined distance D4 toward the second end face L5d.

In the multilayer capacitor array CA5, the first and second inner electrodes 21 to 24, 25 to 28 include inner electrodes opposing each other with dielectric layers therebetween, and these opposing first and second inner electrodes form one of capacitors included in the multilayer capacitor array CA5.

In the multilayer capacitor array CA5, the third and fourth inner electrodes 31 to 34, 35 to 38 include inner electrodes opposing each other with dielectric layers therebetween, and these opposing third and fourth inner electrodes form one of the capacitors included in the multilayer capacitor array CA5.

In the multilayer capacitor array CA5, the fifth and sixth inner electrodes 41 to 44, 45 to 48 include inner electrodes opposing each other with dielectric layers therebetween, and these opposing fifth and sixth inner electrodes form one of the capacitors included in the multilayer capacitor array CA5.

When a voltage is applied to the capacitor formed by the first and second inner electrodes 21 to 24, 25 to 28 and the capacitor formed by the third and fourth inner electrodes 31 to 34, 35 to 38 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA5 as mentioned above. This restrains stresses from being concentrated near the reference plane S1.

When a voltage is applied to the capacitor formed by the third and fourth inner electrodes 31 to 34, 35 to 38 and the capacitor formed by the fifth and sixth inner electrodes 41 to 44, 45 to 48 so that electrostriction is generated in each capacitor, electrostriction also occurs near the reference plane S2, since the third and fifth inner electrodes 31 to 34, 41 to 44 are arranged in contact with the reference plane S2 in the multilayer capacitor array CA5. This restrains stresses from being concentrated near the reference plane S2.

Restraining stresses from being concentrated can also keep cracks from occurring in the multilayer capacitor array CA5.

While the first inner electrodes 21 to 24 are in contact with the reference plane S1, the second inner electrodes 25 to 28 are positioned such as to be separated from the reference plane S1 by the predetermined distance D1. While the third inner electrodes 31 to 34 are in contact with the reference plane S1, the fourth inner electrodes 35 to 38 are positioned such as to be separated from the reference plane S1 by the predetermined distance D2. This restrains electrostriction from causing distortions in excess near the reference plane S1.

While the third inner electrodes 31 to 34 are in contact with the reference plane S2, the fourth inner electrodes 35 to 38 are positioned such as to be separated from the reference plane S2 by the predetermined distance D3. While the fifth inner electrodes 41 to 44 are in contact with the reference plane S2, the sixth inner electrodes 45 to 48 are positioned such as to be separated from the reference plane S2 by the predetermined distance D4. This restrains electrostriction from causing distortions in excess near the reference plane S2.

Sixth Embodiment

Figure 16:
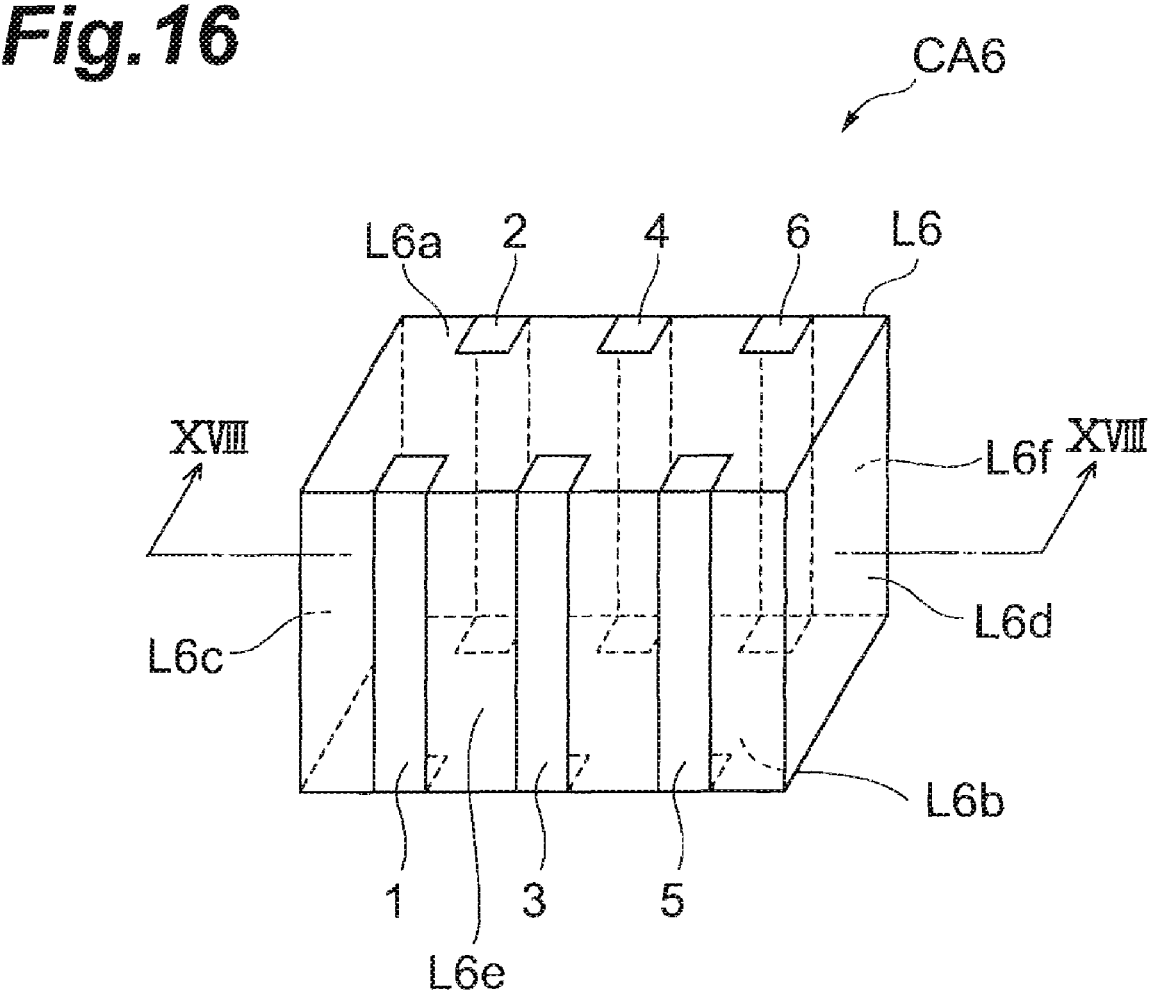
FIG. 16 is a perspective view of the multilayer capacitor array in accordance with the sixth embodiment.
Figure 17:
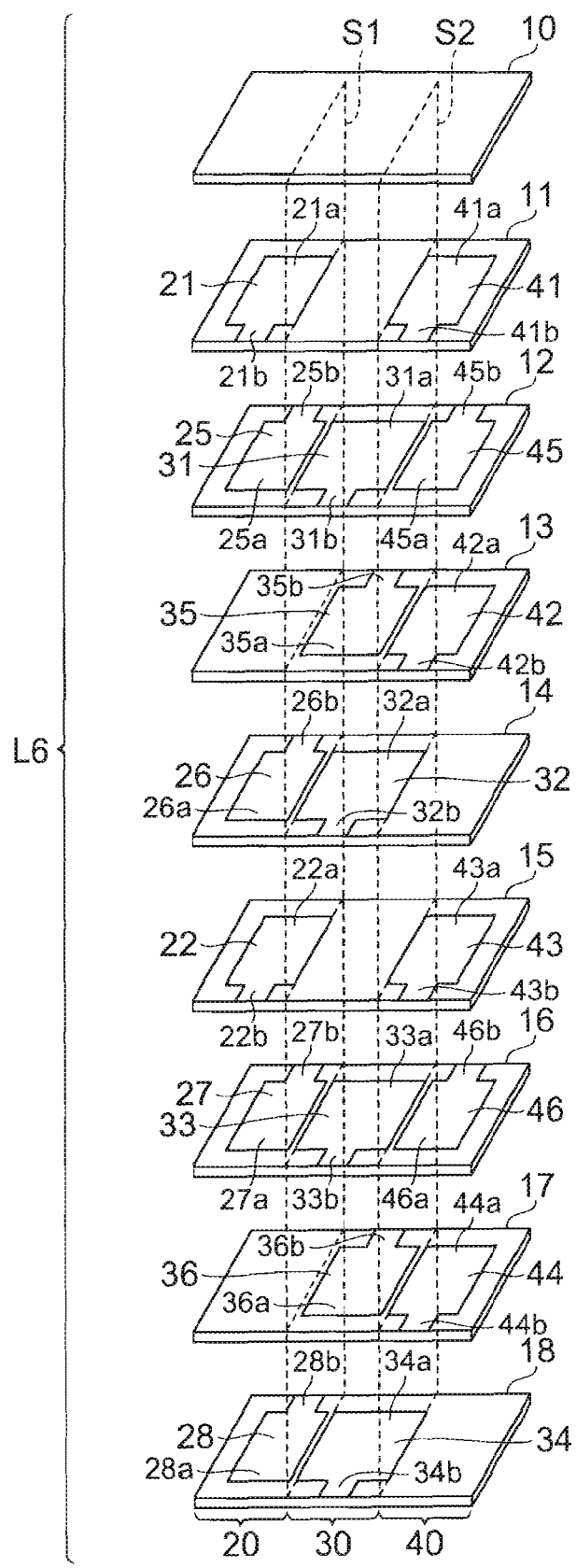
FIG. 17 is an exploded perspective view of the capacitor body included in the multilayer capacitor array in accordance with the sixth embodiment.
Figure 18:
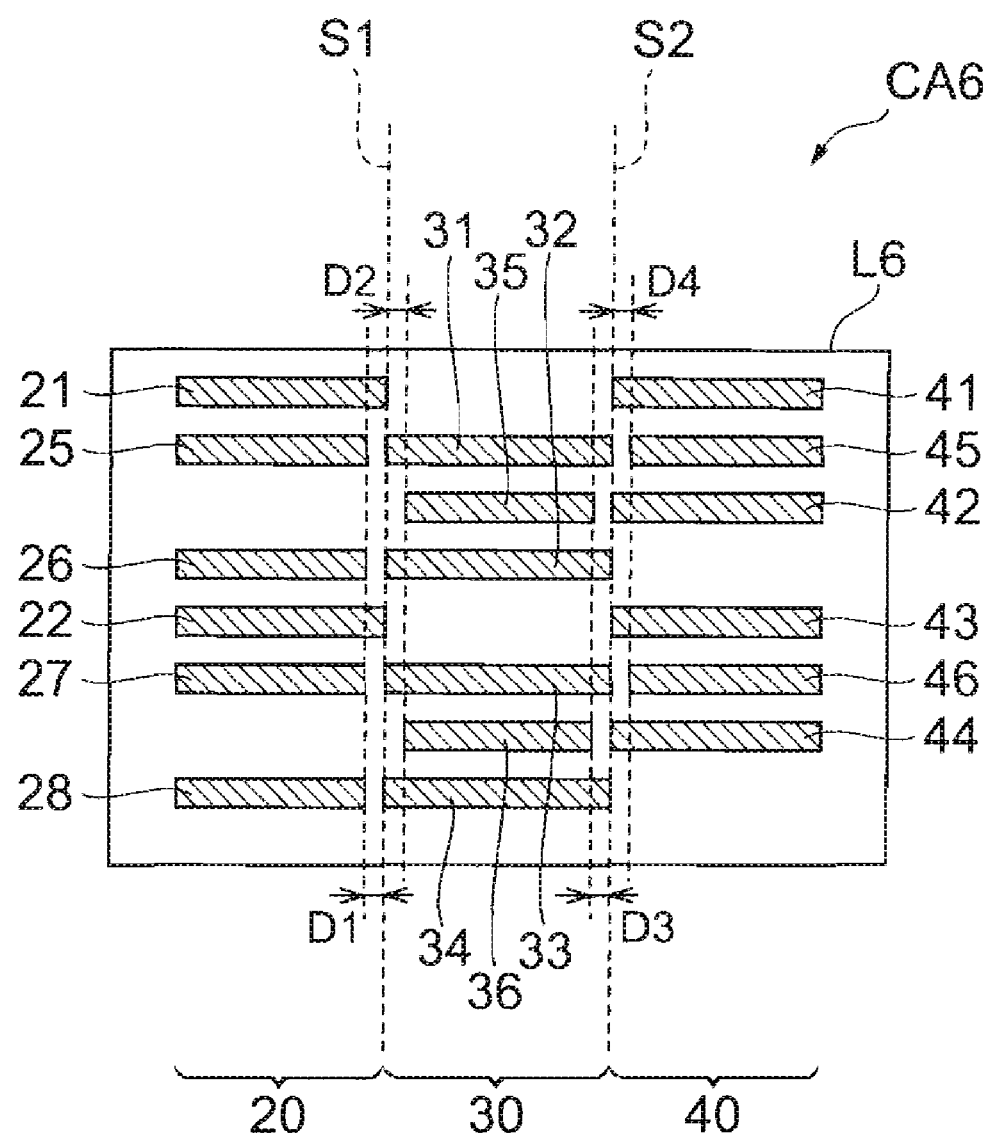
FIG. 18 is a view for explaining the structure of a cross section of the multilayer capacitor array taken along the line XVIII-XVIII of FIG. 16.

With reference to FIGS. 16 to 18, the structure of the multilayer capacitor array CA6 in accordance with the sixth embodiment will be explained. The capacitor array CA6 in accordance with the sixth embodiment differs from the capacitor array C14 in accordance with the fourth embodiment in terms of the arrangement of first to sixth terminal electrodes. FIG. 16 is a perspective view of the multilayer capacitor array in accordance with the sixth embodiment. FIG. 17 is an exploded perspective views of the capacitor body included in the multilayer capacitor array in accordance with the sixth embodiment. FIG. 18 is a view for explaining the structure of a cross section of the multilayer capacitor array taken along the line XVIII-XVIII of FIG. 16.

As shown in FIG. 16, the multilayer capacitor array CA6 in accordance with the sixth embodiment comprises a capacitor body L6 and first to sixth terminal electrodes 1 to 6 arranged on outer surface of the capacitor body L6.

As shown in FIG. 16, the capacitor body L6 is shaped like a rectangular parallelepiped having rectangular first and second main faces L6a, L6b opposing each other, first and second end faces L6c, L6d opposing each other and extending in the shorter-side direction of the first and second main faces L6a, L6b so as to connect them to each other, and first and second side faces L6e, L6f opposing each other and extending in the longer-side direction of the first and second main faces L6a, L6b so as to connect them to each other.

The first, third, and fifth terminal electrodes 1, 3, 5 are successively arranged on the first side face L6e of the capacitor body L6 from the first end face L6c side to the second end face L6d side. The second, fourth, and sixth terminal electrodes 2, 4, 6 are successively arranged on the second side face L6f of the capacitor body L6 from the first end face L6c side to the second end face L6d side. The first, third, and fifth terminal electrodes 1, 3, 5 oppose the second, fourth, and sixth terminal electrodes 2, 4, 6, respectively, in the opposing direction of the first and second side faces L6e, L6f.

As shown in FIG. 17, the capacitor body L5 has a plurality of (9 in this embodiment) laminated dielectric layers 10 to 18.

As shown in FIG. 17, the capacitor body L6 includes first to third electrode groups 20, 30, 40. The first electrode group 20 has a plurality (2 layers in this embodiment) of first inner electrodes 21, 22 and a plurality (4 layers in this embodiment) of second inner electrodes 25 to 28. The second electrode group 30 has a plurality (4 layers in this embodiment) of third inner electrodes 31 to 34 and a plurality (2 layers in this embodiment) of fourth inner electrodes 35, 36. The third electrode group 40 has a plurality (4 layers in this embodiment) of fifth inner electrodes 41 to 44 and a plurality (2 layers in this embodiment) of sixth inner electrodes 45, 46

Within the capacitor body 16, the first to third electrode groups 20, 30, 40 are arranged in a row along the opposing direction of the first and second end faces L6c, L6d. Specifically, the first to third electrode groups 20, 30, 40 are successively arranged from the first end face L6c side to the second end face L6d side.

The first and second inner electrodes 21, 22, 25 to 28 included in the first electrode group 20 are arranged in the order of the first inner electrode 21, second inner electrode 25, second inner electrode 26, first inner electrode 22, second inner electrode 27, and second inner electrode 28 from the first main face L6a toward the second main face L6b. The third and fourth inner electrodes 31 to 34, 35, 36 included in the second electrode group 30 are arranged in the order of the third inner electrode 31, fourth inner electrode 35, third inner electrode 32, third inner electrode 33, fourth inner electrode 36, and third inner electrode 34 from the first main face L6a toward the second main face L6b. The fifth and sixth inner electrodes 41 to 44, 45, 46 included in the third electrode group 40 are arranged in the order of the fifth inner electrode 41, sixth inner electrode 45, fifth inner electrode 42, fifth inner electrode 43, sixth inner electrode 46, and fifth inner electrode 44 from the first main face L6a toward the second main face L6b.

Within the capacitor body L6, the first inner electrodes 21, 12 are arranged at positions different from any of the third and fourth inner electrodes 31 to 34, 35, 36 in the opposing direction of the first and second main faces L6a, L6b. Within the capacitor body L6, the second inner electrodes 26, 28 are arranged at positions different from any of the fifth and sixth inner electrodes 41, 42, 45 to 48 in the opposing direction of the first and second main faces L6a, L6b.

Within the capacitor body L6, the fourth inner electrodes 35, 36 are arranged at positions different from any of the first and second inner electrodes 21, 22, 25 to 28 in the opposing direction of the first and second main faces L6a, L6b. Within the capacitor body L6, the third inner electrodes 32, 34 are arranged at positions different from any of the fifth and sixth inner electrodes 41, 42, 45 to 48 in the opposing direction of the first and second main faces L6a, L6b.

Within the capacitor body L6, the fifth inner electrodes 41, 43 are arranged at positions different from any of the third and fourth inner electrodes 31 to 34, 35, 36 in the opposing direction of the first and second main faces L6a, L6b. Within the capacitor body L6, the fifth inner electrodes 42, 44 are arranged at positions different from any of the first and second inner electrodes 21, 22, 25 to 28 in the opposing direction of the first and second main faces L6a, L6b.

Within the capacitor body L6, the first inner electrode 21 and fifth inner electrode 41 are arranged on the same layer, the first inner electrode 22, third inner electrode 31., and sixth inner electrode 45 are arranged on the same layer, the fourth inner electrode 35 and fifth inner electrode 42 are arranged on the same layer, the second inner electrode 26 and third inner electrode 32 are arranged on the same layer, the first inner electrode 22 and fifth inner electrode 43 are arranged on the same layer, the second inner electrode 27, third inner electrode 33, and sixth inner electrode 46 are arranged on the same layer, the fourth inner electrode 36 and fifth inner electrode 44 are arranged on the same layer, and the second inner electrode 28 and third inner electrode 34 are arranged on the same layer in the opposing direction of the first and second main faces L6a, L6b.

Along the opposing direction of the first and second main faces L6a, L6b, the first and second inner electrodes 21, 25 oppose each other with the dielectric layer 11 therebetween, the first and second inner electrodes 22, 26 oppose each other with the dielectric layer 14 therebetween, and the first and second inner electrodes 22, 27 oppose each other with the dielectric layer 15 therebetween.

When seen in the opposing direction of the first and second main faces L6a, L6b, the second inner electrodes 25, 26 are arranged adjacent to each other with the dielectric layers 12, 13 therebetween. When seen in the opposing direction of the first and second main faces L6a, L6b, the second inner electrodes 27, 28 are arranged adjacent to each other with the dielectric layers 16, 17 therebetween.

Along the opposing direction of the first and second main faces L6a, L6b, the third and fourth inner electrodes 31, 35 oppose each other with the dielectric layer 12 therebetween, the third and fourth inner electrodes 32, 35 oppose each other with the dielectric layer 13 therebetween, the third and fourth inner electrodes 33, 36 oppose each other with the dielectric layer 16 therebetween, and the third and fourth inner electrodes 34, 36 oppose each other with the dielectric layer 17 therebetween.

When seen in the opposing direction off the first and second main faces L6a, L6b, the third inner electrode 31 and first main face 6a are arranged adjacent to each other with the dielectric layers 10, 11 therebetween. When seen in the opposing direction of the first and second main faces L6a, L6b, the third inner electrodes 32, 33 are arranged adjacent to each other with the dielectric layers 14, 15 therebetween.

Along the opposing direction of the first and second main faces L6a, L6b, the fifth and sixth inner electrodes 41, 45 oppose each other with the dielectric layer 11 therebetween, the fifth and sixth inner electrodes 42, 45 oppose each other with the dielectric layer 12 therebetween, the fifth and sixth inner electrodes 43, 46 oppose each other with the dielectric layer 15 therebetween, and the fifth and sixth inner electrodes 44, 46 oppose each other with the dielectric layer 16 therebetween.

When seen in the opposing direction of the first and second main faces L6a, L6b, the fifth inner electrodes 42, 43 are arranged adjacent to each other with the dielectric layers 13, 14 therebetween. When seen in the opposing direction of the first and second main faces L6a, L6b, the fifth inner electrode 44 and second main face L6b are arranged adjacent to each other with the dielectric layers 17, 18 therebetween.

The first inner electrodes 21, 22 include main electrode portions 21a, 22a and lead portions 21b, 22b extending from the main electrode portions 21a, 22a so as to be exposed at the first side face L6e. The lead portions 21b, 22b are physically and electrically connected to the first terminal electrode 1.

The second inner electrodes 25 to 28 include main electrode portions 25a to 28a and lead portions 25b to 28b extending from the main electrode portions 25a to 28a so as to be exposed at the second side face L6f. The lead portions 25b to 28b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the first side face L6e. The lead portions 31b to 34b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the second side face L6f. The lead portions 35b, 36b are physically and electrically connected to the fourth terminal electrode 4.

The fifth inner electrodes 41 to 44 include main electrode portions 41a to 44a and lead portions 41b to 44b extending from the main electrode portions 41a to 44a so as to be exposed at the first side face L6e. The lead portions 41b to 44b are physically and electrically connected to the fifth terminal electrode 5.

The sixth inner electrodes 45, 46 include main electrode portions 45a, 46a and lead portions 45b, 46b extending from the main electrode portions 45a, 46a so as to be exposed at the second side face L6f. The lead portions 45b, 46b are physically and electrically connected to the sixth terminal electrode 6.

As shown in FIGS. 17 and 18, a virtual plane parallel to the opposing direction of the first and second main faces L6a, L6b is taken as a virtual reference plane S1. The first and second electrode groups 20, 30 are arranged in a row along a direction orthogonal to the opposing direction of the first and second main faces L6a, L6b which is a direction orthogonal to the reference plane S1. Namely, within the capacitor body L6, the first and second inner electrodes 21, 22, 25 to 28 are arranged on the first end face L6c side of the reference plane S1, while the third and fourth inner electrodes 31 to 34, 35, 36 are arranged on the second end face L6d side of the reference plane S1.

Further, a virtual plane parallel to the opposing direction of the first and second main faces L6a, L6b is taken as a virtual reference plane S2. The second and third electrode groups 30, 40 are arranged in a row along a direction orthogonal to the opposing direction of the first and second main faces L6a, L6b which is a direction orthogonal to the reference plane S2. Namely, within the capacitor body L6, the third and fourth inner electrodes 31 to 34, 35, 36 are arranged on the first end face L6c side of the reference plane S2, while the fifth and sixth inner electrodes 41 to 44, 45, 46 are arranged on the second end face L6d side of the reference plane S2.

The first inner electrodes 21, 22 are arranged such that the sides on the second end face L6d side of the main electrode portions 21a, 22a are in contact with the reference plane S1. The second inner electrodes 25 to 28 are arranged such that the sides on the second end face L6d side of the main electrode portions 25a to 28a are separated from the reference plane S1 by a predetermined distance D1 toward the first end face L6c.

The sides on the first end face L6c side of the main electrode portions 31a to 34a of the third inner electrodes 31 to 34 are in contact with the reference plane S1. The sides on the second end face L6d side of the main electrode portions 31a to 34a of the third inner electrodes 31 to 34 are in contact with the reference plane S2.

The fourth inner electrodes 35, 36 are arranged such that the sides on the first end face L6c side of the main electrode portions 35a, 36a are separated from the reference plane S1 by a predetermined distance D2 toward the second end face L6d. The fourth inner electrodes 35, 36 are arranged such that the sides on the second end face L6d side of the main electrode portions 35a, 35a are separated from the reference plane S2 by a predetermined distance D3 toward the first end face L6c.

The fifth inner electrodes 41 to 44 are arranged such that the sides on the first end race L6c side of the main electrode portions 41a to 44a are in contact with the reference plane S2. The sixth inner electrodes 45, 46 are arranged such that the sides on the first end face L6c side of the main electrode portions 45a, 46a are separated from the reference plane S2 by a predetermined distance D4 toward the second end face L6d.

In the multilayer capacitor array CA6, the first and second inner electrodes 21, 22, 25 to 28 include inner electrodes opposing each other with dielectric layers therebetween, and these opposing first and second inner electrodes form one of capacitors included in the multilayer capacitor array CA6.

In the multilayer capacitor array CA6, the third and fourth inner electrodes 31 to 34, 35, 36 include inner electrodes opposing each other with dielectric layers therebetween, and these opposing third and fourth inner electrodes form one of the capacitors included in the multilayer capacitor array CA6.

In the multilayer capacitor array CA6, the fifth and sixth inner electrodes 41 to 44, 45, 46 include inner electrodes opposing each other with dielectric layers therebetween, and these opposing fifth and sixth inner electrodes form one of the capacitors included in the multilayer capacitor array CA6.

When a voltage is applied to the capacitor formed by the first and second inner electrodes 21, 22, 25 to 28 and the capacitor formed by the third and fourth inner electrodes 31 to 34, 35, 36 so that electrostriction is generated in each capacitor, electrostriction also occurs near the reference plane S1, since the first and third inner electrodes 21, 22, 31 to 34 are arranged in contact with the reference plane S1 in the multilayer capacitor array CA6 as mentioned above. This restrains stresses from being concentrated near the reference plane S1.

When a voltage is applied to the capacitor formed by the third and fourth inner electrodes 31 to 34, 35, 36 and the capacitor formed by the fifth and sixth inner electrodes 41 to 44, 45, 46 so that electrostriction is generated in each capacitor, electrostriction also occurs near the reference plane S2, since the third and fifth inner electrodes 31 to 34, 41 to 44 are arranged in contact with the reference plane S2 in the multilayer capacitor array CA6. This restrains stresses from being concentrated near the reference plane S2.

Restraining stresses from being concentrated can also keep cracks from occurring in the multilayer capacitor array CA6.

While the first inner electrodes 21, 22 are in contact with the reference plane S1, the second inner electrodes 25 to 28 are positioned such as to be separated from the reference plane S1 by the predetermined distance D1. While the third inner electrodes 31 to 34 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31 to 34 are in contact with the reference plane S2, the fourth inner electrodes 35, 36 are positioned such as to be separated from the reference plane S2 by the predetermined distance D3. While the fifth inner electrodes 41 to 44 are in contact with the reference plane S2, the sixth inner electrodes 45, 46 are positioned such as to be separated from the reference plane S2 by the predetermined distance D4. This restrains electrostriction from causing distortions in excess near the reference plane S2.

The fourth inner electrodes 35, 36 are arranged at positions different from any of the first and second inner electrodes 21, 22, 25 to 28 in the opposing direction of the first and second main faces L6a, L6b. The fifth inner electrodes 42, 44 are arranged at positions different from any of the first and second inner electrodes 21, 22, 25 to 28 in the opposing direction of the first and second main faces L6a, L6b. Therefore, in the multilayer capacitor array CA6, the gap (formed by the dielectric layers 12, 13) between the second inner electrodes 25, 26 and the gap (formed by the dielectric layers 16, 17)

between the second inner electrodes 27, 28 can be made large, i.e., by two dielectric layers each. As a result, an electrostriction alleviating layer can be made greater, whereby the multilayer capacitor array CA6 can restrain vibrations from being caused by electrostriction.

The first inner electrodes 21, 22 are arranged at positions different from any of the third and fourth inner electrodes 31 to 34, 35, 36 in the opposing direction of the first and second main faces L6a, L6b. The fifth inner electrodes 41, 43 are arranged at positions different from any of the third and fourth inner electrodes 31 to 34, 35, 36 in the opposing direction of the first and second main faces L6a, L6b. Therefore, in the multilayer capacitor array CA6, the gap (formed by the dielectric layers 10, 11) between the first main face L6a and third inner electrode 31 and the gap (formed by the dielectric layers 14, 15) between the third inner electrodes 32, 33 can be made large, i.e., by two dielectric layers each. As a result, an electrostriction alleviating layer can be made greater, whereby the multilayer capacitor array CA6 can restrain vibrations from being caused by electrostriction.

The second inner electrodes 26, 28 are arranged at positions different from any of the fifth and sixth inner electrodes 41 to 44, 45, 46 in the opposing direction of the first and second main faces L6a, L6b. The third inner electrodes 32, 34 are arranged at positions different from any of the fifth and sixth inner electrodes 41 to 44, 45, 46 in the opposing direction of the first and second main faces L6a, L6b. Therefore, in the multilayer capacitor array CA6, the gap (formed by the dielectric layers 13, 14) between the fifth inner electrodes 42, 43 and the gap (formed by the dielectric layers 17, 18) between the fifth inner electrode 44 and second main face L6b can be made large, i.e., by two dielectric layers each. As a result, an electrostriction alleviating layer can be made greater, whereby the multilayer capacitor array CA6 can restrain vibrations from being caused by electrostriction.

When seen in the opposing direction of the first and second main faces L6a, L6b, two layers of second inner electrodes 25, 26 are arranged adjacent to each other, and two layers of second inner electrodes 27, 28 are arranged adjacent to each other. At the dielectric layers 12, 13 positioned between the inner electrodes 25, 26 of the same polarity adjacent to each other and opposing each other and the dielectric layers 16, 17 positioned between the inner electrodes 27, 28 of the same polarity adjacent to each other and opposing each other, no electric fields are caused by the opposing electrodes even when a voltage is applied to the multilayer capacitor array. This accordingly suppresses vibrations of the multilayer capacitor array CA6 caused by electrostriction.

Two layers of third inner electrodes 32, 33 are arranged adjacent to each other in the opposing direction of the first and second main faces L6a, L6b. At the dielectric layers 14, 15 positioned between the inner electrodes 32, 33 of the same polarity adjacent to each other and opposing each other, no electric fields occur even when a voltage is applied to the multilayer capacitor array. This accordingly suppresses vibrations of the multilayer capacitor array CA6 caused by electrostriction.

Two layers of fifth inner electrodes 42, 43 are arranged adjacent to each other when seen in the opposing direction of the first and second main faces L6a, L6b. At the dielectric layers 13, 14 positioned between the inner electrodes 42, 43 of the same polarity adjacent to each other and opposing each other, no electric fields occur even when a voltage is applied to the multilayer capacitor array. This accordingly suppresses vibrations of the multilayer capacitor array CA6 caused by electrostriction.

Seventh Embodiment

Figure 19:
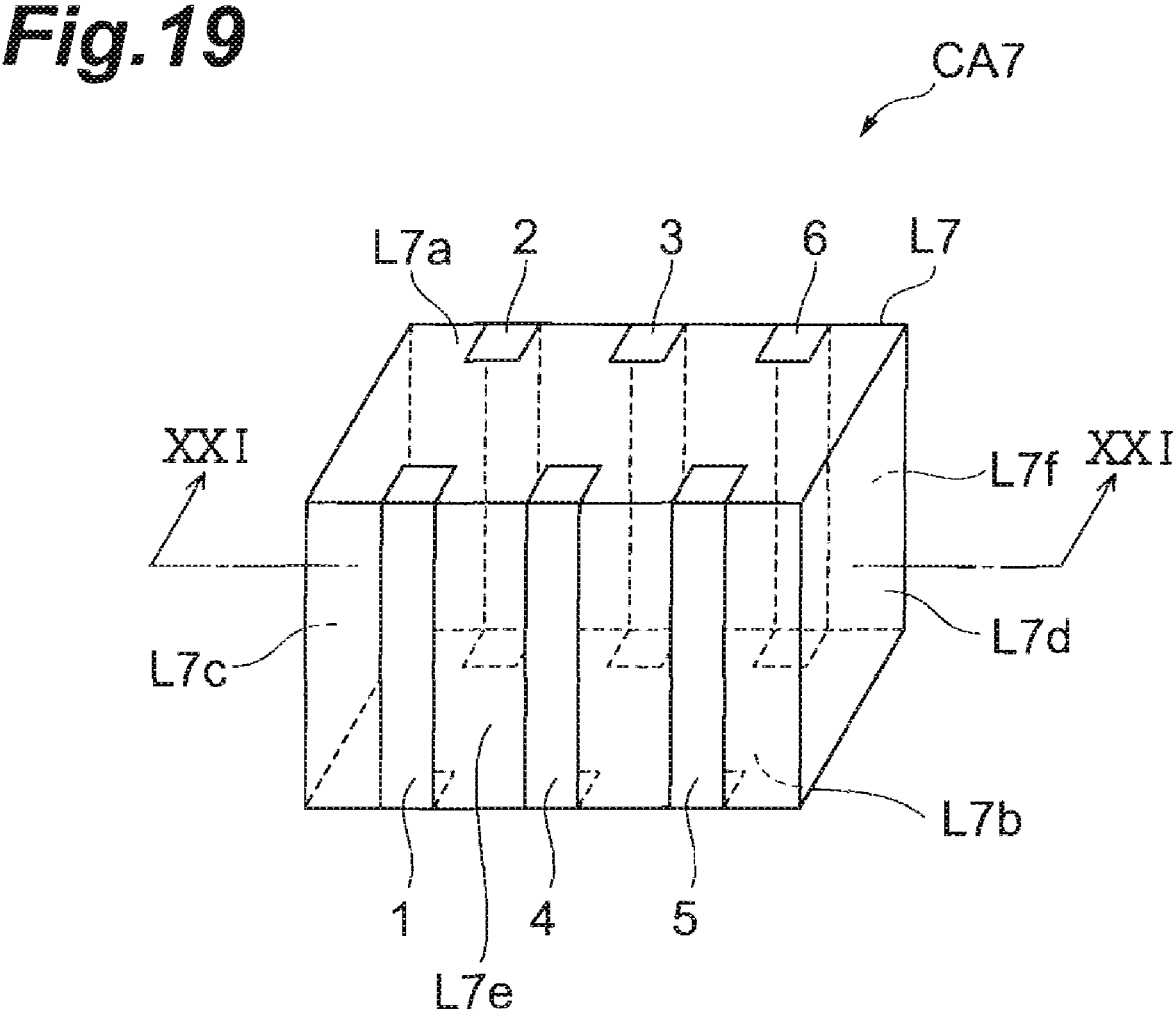
FIG. 19 is a perspective view of the multilayer capacitor array in accordance with the seventh embodiment.
Figure 20:
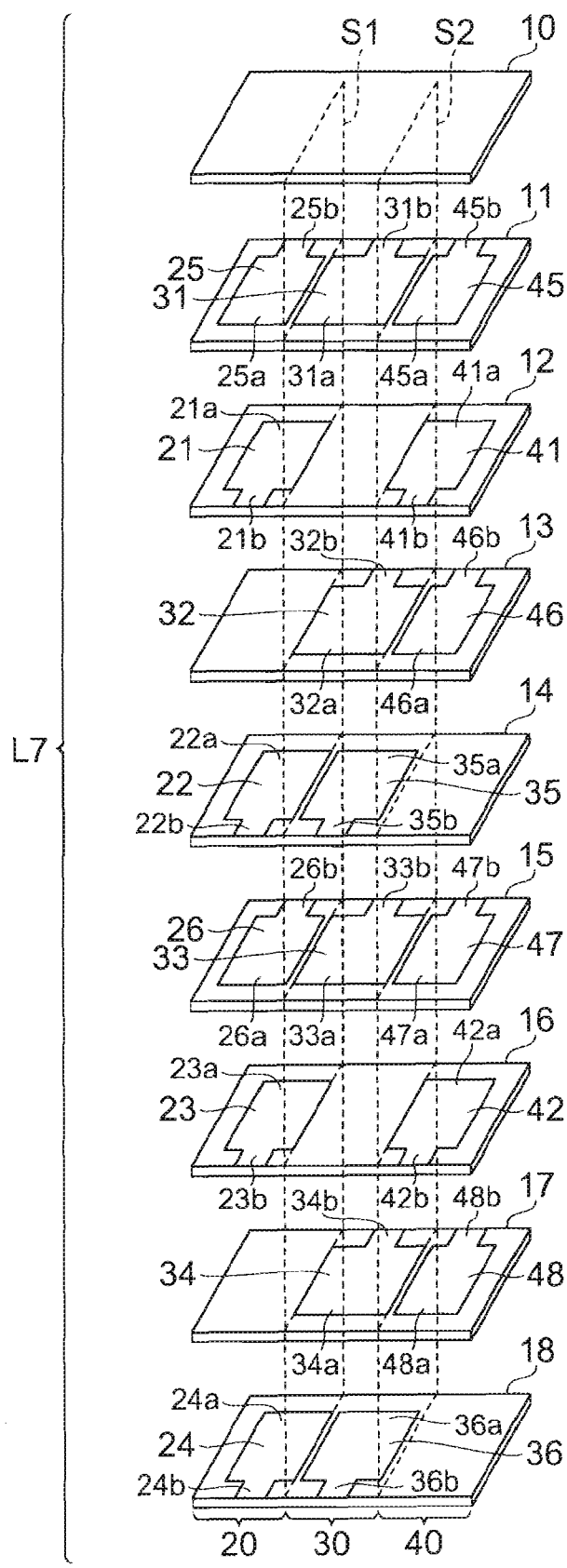
FIG. 20 is an exploded perspective view of the capacitor body included in the multilayer capacitor array in accordance with the seventh embodiment.
Figure 21:
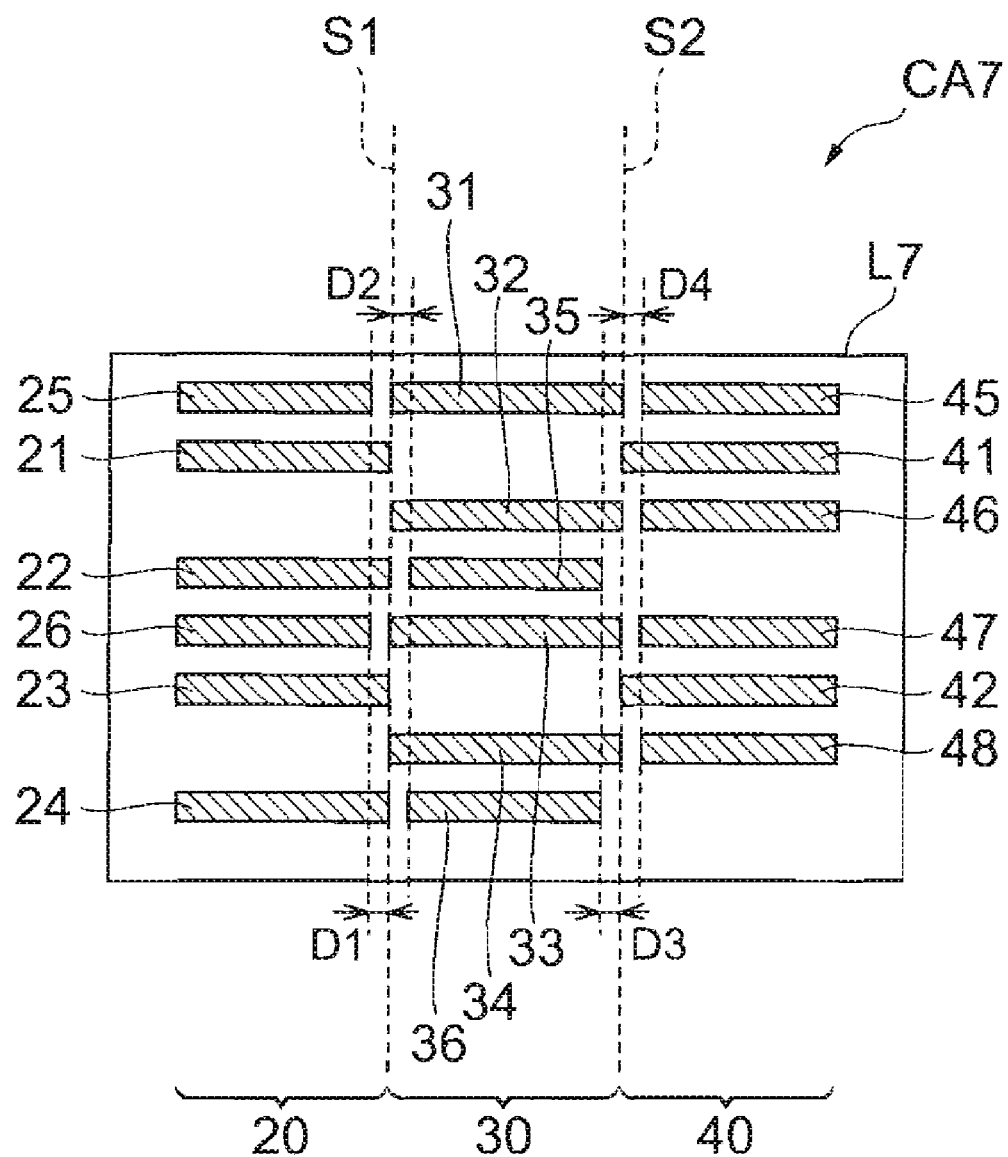
FIG. 21 is a view for explaining the structure of a cross section of the multilayer capacitor array taken along the line XXI-XXI of FIG. 19.

With reference to FIGS. 19 to 21, the structure of the multilayer capacitor array CA7 in accordance with the seventh embodiment will be explained. The capacitor array CA7 in accordance with the seventh embodiment differs from the capacitor array CA4 in accordance with the fourth embodiment in terms of the arrangement of first to sixth terminal electrodes 1 to 6 and first to sixth inner electrodes. FIG. 19 is a perspective view of the multilayer capacitor array in accordance with the seventh embodiment. FIG. 20 is an exploded perspective view of the capacitor body included in the multilayer capacitor array in accordance with the seventh embodiment. FIG. 21 is a view for explaining the structure of a cross section of the multilayer capacitor array taken along the line XXI-XXI of FIG. 19.

As shown in FIG. 19, the multilayer capacitor array CA7 in accordance with the seventh embodiment comprises a capacitor body L7 and first to sixth terminal electrodes 1 to 6 arranged on outer surface of the capacitor body L7.

As shown in FIG. 19, the capacitor body L7 is shaped like a rectangular parallelepiped having rectangular first and second main faces L7a, L7b opposing each other, first and second end faces L7c, L7d opposing each other and extending in the shorter-side direction of the first and second main faces L7a, L7b so as to connect them to each other, and first and second side faces L7e, L7f opposing each other and extending in the longer-side direction of the first and second main faces L7a, L7b so as to connect them to each other.

The first, fourth, and fifth terminal electrodes 1, 4, 5 are successively arranged on the first side face L7e of the capacitor body L7 from the first end face L7c side to the second end face L7d side. The second, third, and sixth terminal electrodes 2, 3, 6 are successively arranged on the second side face L7f of the capacitor body L7 from the first end face L7c side to the second end face L7d side. The first, fourth, and fifth terminal electrodes 1, 4, 5 oppose the second, third, and sixth terminal electrodes 2, 3, 6, respectively, in the opposing direction of the first and second side faces L7e, L7f.

As shown in FIG. 20, the capacitor body L7 has a plurality of (9 in this embodiment) laminated dielectric layers 10 to 18.

As shown in FIG. 20, the capacitor body L7 includes first to third electrode groups 20, 30, 40. The first electrode group 20 has a plurality (4 layers in this embodiment) of first inner electrodes 21 to 24 and a plurality (2 layers in this embodiment) of second inner electrodes 25, 26. The second electrode group 30 has a plurality (4 layers in this embodiment) of third inner electrodes 31 to 34 and a plurality (2 layers in this embodiment) of fourth inner electrodes 35, 36. The third electrode group 40 has a plurality (2 layers in this embodiment) of fifth inner electrodes 41, 42 and a plurality (4 layers in this embodiment) of sixth inner electrodes 45 to 48.

Within the capacitor body L7, the first to third electrode groups 20, 30, 40 are arranged in a row along the opposing direction of the first and second end faces L7c, L7d. Specifically, the first to third electrode groups 20, 30, 40 are successively arranged from the first end face L7c side to the second end face L7d side.

The first and second inner electrodes 21 to 24, 25, 26 included in the first electrode group 20 are arranged in the order of the second inner electrode 25, first inner electrode 21, first inner electrode 22, second inner electrode 26, first inner electrode 23, and first inner electrode 24 from the first main face L7a toward the second main face L7b. The third and fourth inner electrodes 31 to 34, 35, 36 included in the second electrode group 30 are arranged in the order of the third inner electrode 31, third inner electrode 32, fourth inner electrode 35, third inner electrode 33, third inner electrode 34, and fourth inner electrode 36 from the first main face L7a toward the second main face L7b. The fifth and sixth inner electrodes 41, 42, 45 to 48 included in the third electrode group 40 are arranged in the order of the sixth inner electrode 45, fifth inner electrode 41, sixth inner electrode 46, sixth inner electrode 47, fifth inner electrode 42, and sixth inner electrode 48 from the first main face L7a toward the second main face L7b.

Within the capacitor body L7, the first inner electrodes 21, 23 are arranged at positions different from any of the third and fourth inner electrodes 31 to 34, 35, 36 in the opposing direction of the first and second main faces L7a, L7b. Within the capacitor body 7, the first inner electrodes 22, 24 are arranged at positions different from any of the fifth and sixth inner electrodes 41, 42, 45 to 48 in the opposing direction of the first and second main faces L7a, L7b.

Within the capacitor body L7, the third inner electrodes 32, 34 are arranged at positions different from any of the first and second inner electrodes 21 to 24, 25, 26 in the opposing direction of the first and second main faces L7a, L7b. Within the capacitor body 7, the fourth inner electrodes 35, 36 are arranged at positions different from any of the fifth and sixth inner electrodes 41, 42, 45 to 48 in the opposing direction of the first and second main faces L7a, L7b.

Within the capacitor body L7, the fifth inner electrodes 41, 42 are arranged at positions different from any of the third and fourth inner electrodes 31 to 34, 35, 36 in the opposing direction of the first and second main faces L7a, L7b. Within the capacitor body 7, the sixth inner electrodes 46, 48 are arranged at positions different from any of the first and second inner electrodes 21 to 24, 25, 26 in the opposing direction of the first and second main faces L7a, L7b.

Within the capacitor body L7, the second inner electrode 25, third inner electrode 31, and sixth inner electrode 45 are arranged on the same layer, the first inner electrode 21 and fifth inner electrode 41 are arranged on the same layer, the third inner electrode 32 and sixth inner electrode 46 are arranged on the same layer, the first inner electrode 22 and fourth inner electrode 35 are arranged on the same layer, the second inner electrode 26, third inner electrode 33, and sixth inner electrode 47 are arranged on the same layer, the first inner electrode 23 and fifth inner electrode 42 are arranged on the same layer, the third inner electrode 34 and sixth inner electrode 48 are arranged on the same layer, and the first inner electrode 24 and fourth inner electrode 36 are arranged on the same layer in the opposing direction of the first and second main faces L7a, L7b.

Along the opposing direction of the first and second main faces L7a, L7b, the first and second inner electrodes 1, 25 oppose each other with the dielectric layer 11 therebetween, and the first and second inner electrodes 22, 26 oppose each other with the dielectric layer 14 therebetween.

When seen in the opposing direction of the first and second main faces L7a, L7b, the first inner electrodes 21, 22 are arranged adjacent to each other with the dielectric layers 12, 13 therebetween. When seen in the opposing direction of the first and second main faces L7a, L7b, the first inner electrodes 23, 24 are arranged adjacent to each other with the dielectric layers 16, 17 therebetween.

Along the opposing direction of the first and second main faces L7a, L7b, the third and fourth inner electrodes 32, 35 oppose each other with the dielectric layer 13 therebetween, the third and fourth inner electrodes 33, 35 oppose each other with the dielectric layer 14 therebetween, and the third and fourth inner electrodes 34, 36 oppose each other with the dielectric layer 17 therebetween.

When seen in the opposing direction of the first and second main faces L7a, L7b, the third inner electrodes 31, 32 are arranged adjacent to each other with the dielectric layers 11, 12 therebetween. When seen in the opposing direction of the first and second main faces L7a, L7b, the third inner electrodes 33, 34 are arranged adjacent to each other with the dielectric layers 15, 16 therebetween.

Along the opposing direction of the first and second main faces L7a, L7b, the fifth and sixth inner electrodes 41, 45 oppose each other with the dielectric layer 11 therebetween, the fifth and sixth inner electrodes 41, 46 oppose each other with the dielectric layer 12 therebetween, the fifth and sixth inner electrodes 42, 47 oppose each other with the dielectric layer 15 therebetween, and the fifth and sixth inner electrodes 42, 48 oppose each other with the dielectric layer 16 therebetween.

When seen in the opposing direction of the first and second main faces L7a, L7b, the sixth inner electrodes 46, 47 are arranged adjacent to each other with the dielectric layers 13, 14 therebetween. When seen in the opposing direction of the first and second main faces L7a, L7b, the sixth inner electrode 48 and second main face L7b are arranged adjacent to each other with the dielectric layers 17, 18 therebetween.

The first inner electrodes 21 to 24 include main electrode portions 21a to 24a and lead portions 21b to 24b extending from the main electrode portions 21a to 24a so as to be exposed at the first side face L7e. The lead portions 21b to 24b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side race L7f. The lead portions 25b, 26b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the second side face L7f. The lead portions 31b to 34b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the first side face L7e. The lead portions 35b, 36b are physically and electrically connected to the fourth terminal electrode 4.

The fifth inner electrodes 41, 42 include main electrode portions 41a, 42a and lead portions 41b, 42b extending from the main electrode portions 41a, 42a so as to be exposed at the first side face L7e. The lead portions 41b, 42b are physically and electrically connected to the fifth terminal electrode 5.

The sixth inner electrodes 45 to 48 include main electrode portions 45a to 48a and lead portions 45b to 48b extending from the main electrode portions 45a to 48a so as to be exposed at the second side face L7f. The lead portions 45b to 48b are physically and electrically connected to the sixth terminal electrode 6.

As shown in FIGS. 20 and 21, a virtual plane parallel to the opposing direction of the first and second main faces L7a, L7b is taken as a virtual reference plane S1. The first and second electrode groups 20, 30 are arranged in a row along a direction orthogonal to the opposing direction of the first and second main faces L7a, L7b which is a direction orthogonal to the reference plane S1. Namely, within the capacitor body L7, the first and second inner electrodes 21 to 24, 25, 26 are arranged on the first end face L7c side of the reference plane S1, while the third and fourth inner electrodes 31 to 34, 35, 36 are arranged on the second end face L7d side of the reference plane S1.

Further, a virtual plane parallel to the opposing direction of the first and second main faces L7a, L7b is taken as a virtual reference plane S2. The second and third electrode groups 30, 40 are arranged in a row along a direction orthogonal to the opposing direction of the first and second main faces L7a, L7b which is a direction orthogonal to the reference plane S2. Namely, within the capacitor body L7, the third and fourth inner electrodes 31 to 34, 35, 36 are arranged on the first end face L7c side of the reference plane S2, while the fifth and sixth inner electrodes 41, 42, 45 to 48 are arranged on the second end face L7d side of the reference plane S2.

The first inner electrodes 21 to 24 are arranged such that the sides on the second end face L7d side of the main electrode portions 21a to 24a are in contact with the reference plane S1. The second inner electrodes 25, 26 are arranged such that the sides on the second end face L7d side of the main electrode portions 25a, 26a are separated from the reference plane S1 by a predetermined distance D1 toward the first end face L7c.

The sides on the first end face L7c side of the main electrode portions 31a to 34a of the third inner electrodes 31 to 34 are in contact with the reference plane S1. The sides on the second end face L7d side of the main electrode portions 31a to 34a of the third inner electrodes 31 to 34 are in contact with the reference plane S2.

The fourth inner electrodes 35, 36 are arranged such that the sides on the first end face L7c side of the main electrode portions 35a, 36a are separated from the reference plane S1 by a predetermined distance D2 toward the second end face L7d. The fourth inner electrodes 35, 36 are arranged such that the sides on the second end face L7d side of the main electrode portions 35a, 35a are separated from the reference plane S2 by a predetermined distance D3 toward the first end face L7c.

The fifth inner electrodes 41, 42 are arranged such that the sides on the first end face L7c side of the main electrode portions 41a, 42a are in contact with the reference plane S2. The sixth inner electrodes 45 to 48 are arranged such that the sides on the first end face L7c side of the main electrode portions 45a to 48a are separated from the reference plane S2 by a predetermined distance D4 toward the second end face L7d.

In the multilayer capacitor array CA7, the first and second inner electrodes 21 to 24, 25, 26 include inner electrodes opposing each other with dielectric layers therebetween, and these opposing first and second inner electrodes form one of capacitors included in the multilayer capacitor array CA7.

In the multilayer capacitor array CA7, the third and fourth inner electrodes 31 to 34, 35, 36 include inner electrodes opposing each other with dielectric layers therebetween, and these opposing third and fourth inner electrodes form one of the capacitors included in the multilayer capacitor array CA7.

In the multilayer capacitor array CA7, the fifth and sixth inner electrodes 41, 42, 45 to 48 include inner electrodes opposing each other with dielectric layers therebetween, and these opposing fifth and sixth inner electrodes form one of the capacitors included in the multilayer capacitor array CA7.

When a voltage is applied to the capacitor formed by the first and second inner electrodes 21 to 24, 25, 26 and the capacitor formed by the third and fourth inner electrodes 31 to 34, 35, 36 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA7 as mentioned above. This restrains stresses from being concentrated near the reference plane S1.

When a voltage is applied to the capacitor formed by the third and fourth inner electrodes 31 to 34, 35, 36 and the capacitor formed by the fifth and sixth inner electrodes 41, 42, 45 to 48 so that electrostriction is generated in each capacitor, electrostriction also occurs near the reference plane S2, since the third and fifth inner electrodes 31 to 34, 41, 42 are arranged in contact with the reference plane S2 in the multilayer capacitor array CA7. This restrains stresses from being concentrated near the reference plane S2.

Restraining stresses from being concentrated can also keep cracks from occurring in the multilayer capacitor array CA7.

While the first inner electrodes 21 to 24 are in contact with the reference plane S11, the second inner electrodes 25, 26 are positioned such as to be separated from the reference plane S1 by the predetermined distance D1. While the third inner electrodes 31 to 34 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31 to 34 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45 to 48 are positioned such as to be separated from the reference plane S2 by the predetermined distance D4. This restrains electrostriction from causing distortions in excess near the reference plane S2.

The third inner electrodes 32, 34 are arranged at positions different from any of the first and second inner electrodes 21 to 24, 25, 26 in the opposing direction of the first and second main faces L7a, L7b. The sixth inner electrodes 46, 48 are arranged at positions different from any of the first and second inner electrodes 21 to 24, 25, 26 in the opposing direction of the first and second main faces L7a, L7b. Therefore, in the multilayer capacitor array CA7, the gap (formed by the dielectric layers 12, 13) between the first inner electrodes 21, 22 and the gap (formed by the dielectric layers 16, 17) between the first inner electrodes 23, 24 can be made large, i.e., by two dielectric layers each. As a result, an electrostriction alleviating layer can be made greater, whereby the multilayer capacitor array CA7 can restrain vibrations from being caused by electrostriction.

The first inner electrodes 21, 23 are arranged at positions different from any of the third and fourth inner electrodes 31 to 34, 35, 36 in the opposing direction of the first and second main faces L7a, L7b. The fifth inner electrodes 41, 42 are arranged at positions different from any of the third and fourth inner electrodes 31 to 34, 35, 36 in the opposing direction of the first and second main faces L7a, L7b. Therefore, in the multilayer capacitor array CA7, the gap (formed by the dielectric layers 11, 12) between the third inner electrodes 31, 32 and the gap (formed by the dielectric layers 15, 16) between the third inner electrodes 33, 34 can be made large, i.e., by two dielectric layers each. As a result, an electrostriction alleviating layer can be made greater, whereby the multilayer capacitor array CA7 can restrain vibrations from being caused by electrostriction.

The first inner electrodes 22, 24 are arranged at positions different from any of the fifth and sixth inner electrodes 41, 42, 45 to 48 in the opposing direction of the first and second main faces L7a, L7b. The fourth inner electrodes 35, 36 are arranged at positions different from any of the fifth and sixth inner electrodes 41, 42, 45 to 48 in the opposing direction of the first and second main faces L7a, L7b. Therefore, in the multilayer capacitor array CA7, the gap (formed by the dielectric layers 13, 14) between the sixth inner electrodes 46, 47 and the gap (formed by the dielectric layers 17, 18) between the sixth inner electrode 48 and second main face L7b can be made large, i.e., by two dielectric layers each. As a result, an electrostriction alleviating layer can be made greater, whereby the multilayer capacitor array CA7 can restrain vibrations from being caused by electrostriction.

When seen in the opposing direction of the first and second main faces 17a, L7b, two layers of first inner electrodes 21, 22 are arranged adjacent to each other, and two layers of first inner electrodes 23, 24 are arranged adjacent to each other. At the dielectric layers 12, 13 positioned between the inner electrodes 21, 22 of the same polarity adjacent to each other and opposing each other and the dielectric layers 16, 17 positioned between the inner electrodes 23, 24 of the same polarity adjacent to each other and opposing each other, no electric fields are caused by the opposing electrodes even when a voltage is applied to the multilayer capacitor array. This accordingly suppresses vibrations of the multilayer capacitor array CA7 caused by electrostriction.

When seen in the opposing direction of the first and second main faces L7a, L7b, two layers of third inner electrodes 31, 32 are arranged adjacent to each other, and two layers of third inner electrodes 33, 34 are arranged adjacent to each other. At the dielectric layers 11, 12 positioned between the inner electrodes 31, 32 of the same polarity adjacent to each other and opposing each other and the dielectric layers 15, 16 positioned between the inner electrodes 33, 34 of the same polarity adjacent to each other and opposing each other, no electric fields are caused by the opposing electrodes even when a voltage is applied to the multilayer capacitor array. This accordingly suppresses vibrations of the multilayer capacitor array CA7 caused by electrostriction.

When seen in the opposing direction of the first and second main faces L7a, L7b, two layers of sixth inner electrodes 46, 47 are arranged adjacent to each other. At the dielectric layers 13, 14 positioned between the inner electrodes 46, 47 of the same polarity adjacent to each other and opposing each other, no electric fields are caused by the opposing electrodes even when a voltage is applied to the multilayer capacitor array. This accordingly suppresses vibrations of the multilayer capacitor array CA7 caused by electrostriction.

Eighth Embodiment

Figure 22:
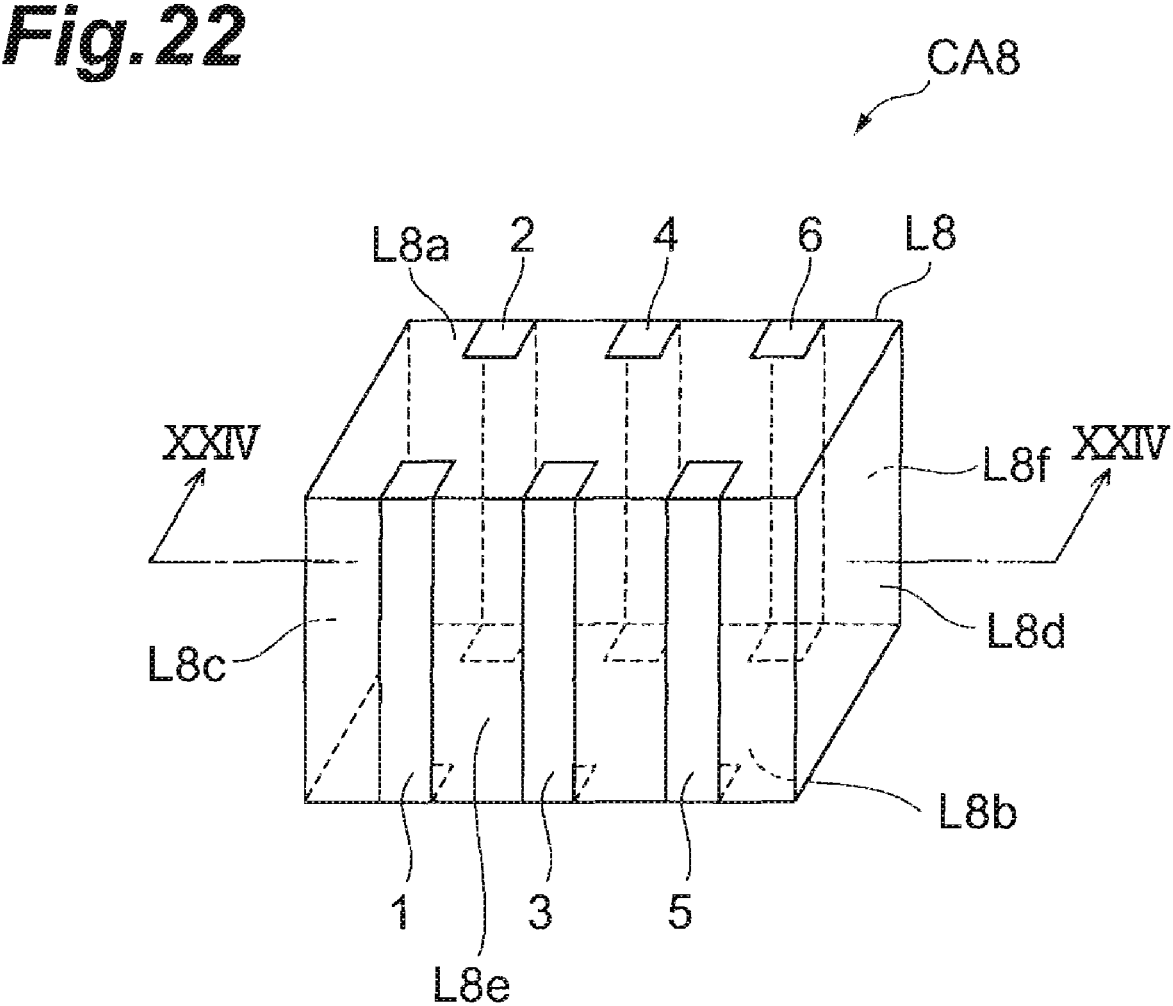
FIG. 22 is a perspective view of the multilayer capacitor array in accordance with the eighth embodiment.
Figure 23:
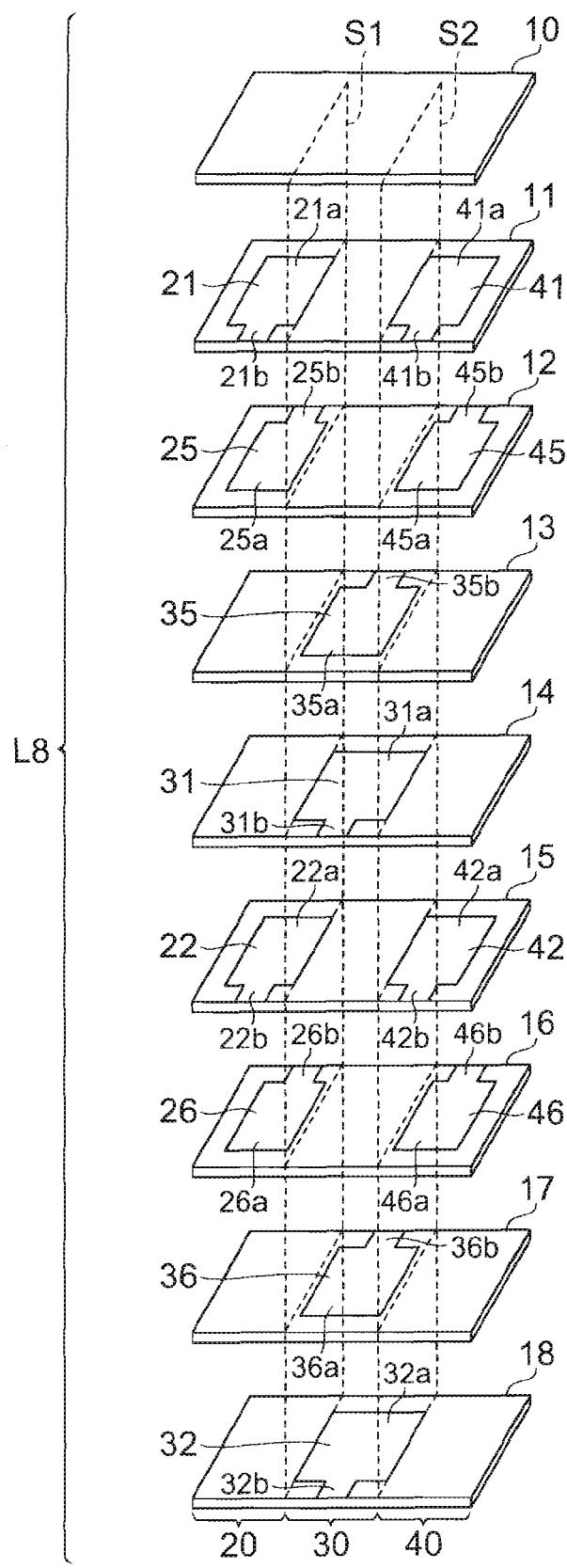
FIG. 23 is an exploded perspective view of the capacitor body included in the multilayer capacitor array in accordance with the eighth embodiment.
Figure 24:
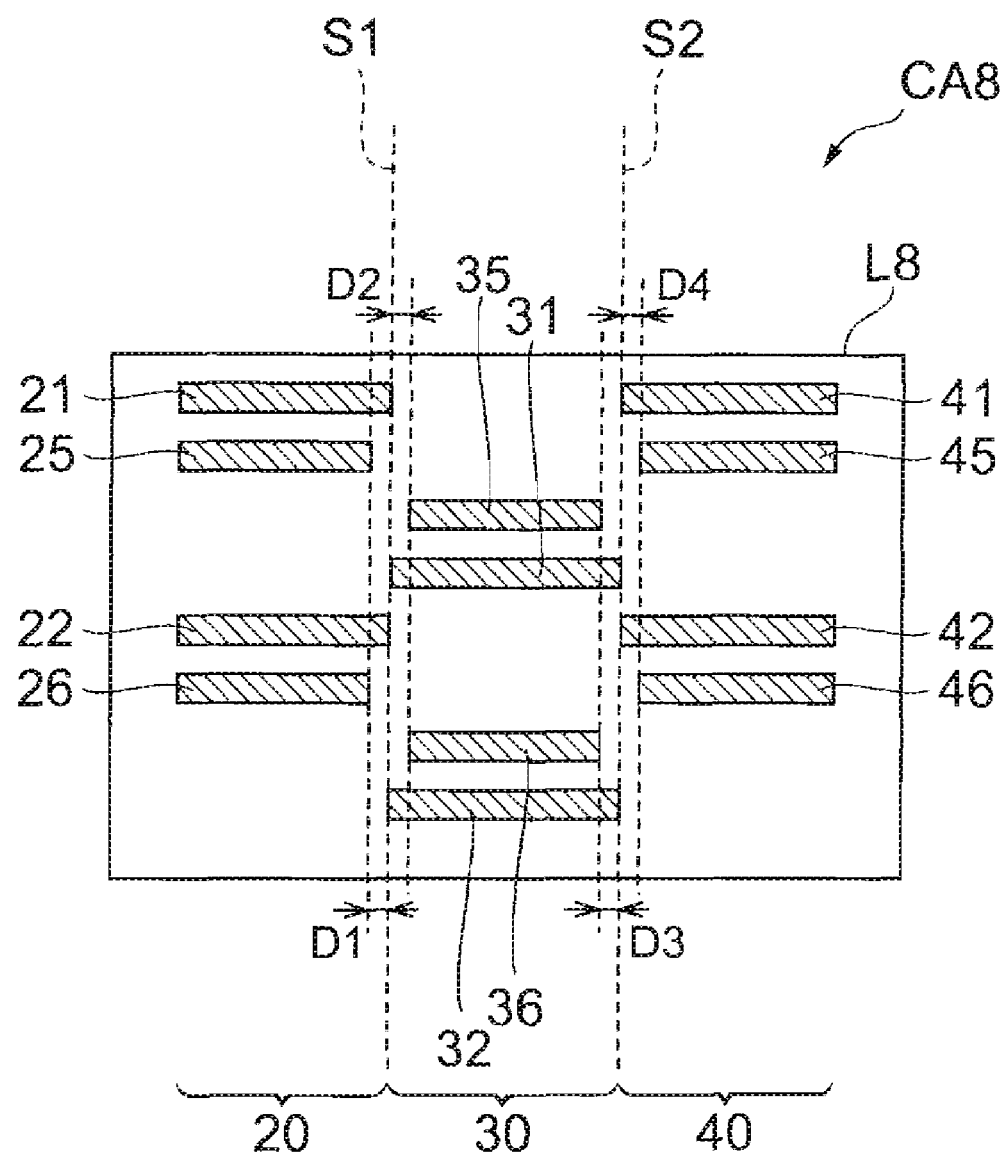
FIG. 24 is a view for explaining the structure of a cross section of the multilayer capacitor array taken along the line XXIV-XXIV of FIG. 22.

With reference to FIGS. 22 to 24, the structure of the multilayer capacitor array CA8 in accordance with the eighth embodiment will be explained. The capacitor array CA8 in accordance with the eighth embodiment differs from the capacitor array CA4 in accordance with the fourth embodiment in terms of the arrangement of first to sixth inner electrodes. FIG. 22 is a perspective view of the multilayer capacitor array in accordance with the eighth embodiment. FIG. 23 is an exploded perspective view of the capacitor body included in the multilayer capacitor array in accordance with the eighth embodiment. FIG. 24 is a view for explaining the structure of a cross section of the multilayer capacitor array taken along the line XXIV-XXIV of FIG. 22.

As shown in FIG. 22, the multilayer capacitor array CA8 in accordance with the eighth embodiment comprises a capacitor body L8 and first to sixth terminal electrodes 1 to 6 arranged on outer surface of the capacitor body L8.

As shown in FIG. 22, the capacitor body L8 is shaped like a rectangular parallelepiped having rectangular first and second main faces L8a, L8b opposing each other, first and second end faces L8c, L8d opposing each other and extending in the shorter-side direction of the first and second main faces L8a, L8b so as to connect them to each other, and first and second side faces L8e, L8f opposing each other and extending in the longer-side direction of the first and second main faces L8a, L8b so as to connect them to each other.

The first, third, and fifth terminal electrodes 1, 3, 5 are successively arranged on the first side face L8e of the capacitor body L8 from the first end face L8c side to the second end face L8d side. The second, fourth, and sixth terminal electrodes 2, 4, 6 are successively arranged on the second side face L8f of the capacitor body L8 from the first end face L8c side to the second end face L8d side. The first, third, and fifth terminal electrodes 1, 3, 5 oppose the second, fourth, and sixth terminal electrodes 2, 4, 6, respectively, in the opposing direction of the first and second side faces L8e, L8f.

As shown in FIG. 23, the capacitor body L8 has a plurality of (9 in this embodiment) laminated dielectric layers 10 to 18.

As shown in FIG. 23, the capacitor body L8 includes first to third electrode groups 20, 30, 40. The first electrode group 20 has a plurality (2 layers each in this embodiment) of first and second inner electrodes 21, 22, 25, 26. The second electrode group 30 has a plurality (2 layers each in this embodiment) of third and fourth inner electrodes 31, 32, 35, 36. The third electrode group 40 has a plurality (2 layers each in this embodiment) of fifth and sixth inner electrodes 41, 42, 45, 46.

Within the capacitor body L8, the first to third electrode groups 20, 30, 40 are arranged in a row along the opposing direction of the first and second end faces L8c, L8d. Specifically, the first to third electrode groups 20, 30, 40 are successively arranged from the first end face L8c side to the second end face L8d side.

The first and second inner electrodes 21, 22, 25, 26 included in the first electrode group 20 are arranged in the order of the first inner electrode 21, second inner electrode 25, first inner electrode 22, and second inner electrode 26 from the first main face L8a toward the second main face L8b. The third and fourth inner electrodes 31, 32, 35, 36 included in the second electrode group 30 are arranged in the order of the fourth inner electrode 35, third inner electrode 31, fourth inner electrode 36, and third inner electrode 32 from the first main face L 8a toward the second main face L8b. The fifth and sixth inner electrodes 41, 42, 45, 46 included in the third electrode group 40 are arranged in the order of the fifth inner electrode 41, sixth inner electrode 45, fifth inner electrode 42, and sixth inner electrode 46 from the first main face L8a toward the second main face L8b.

Within the capacitor body L8, the first and second inner electrodes 21, 22, 25, 26 are arranged at positions different from any of the third and fourth inner electrodes 31, 32, 35, 36 in the opposing direction of the first and second main faces L8a, L8b.

Within the capacitor body L8, the third and fourth inner electrodes 31, 32, 35, 36 are arranged at positions different from any of the first and second inner electrodes 21, 22, 25, 26 and fifth and sixth inner electrodes 41, 42, 45, 46 in the opposing direction of the first and second main faces L8a, L8b.

Within the capacitor body L8, the fifth and sixth inner electrodes 41, 42, 45, 46 are arranged at positions different from any of the third and fourth inner electrodes 31, 32, 35, 36 in the opposing direction of the first and second main faces L8a, L8b.

Within the capacitor body L1, the first inner electrode 21 and fifth inner electrode 41 are arranged on the same layer, the second inner electrode 25 and sixth inner electrode 45 are arranged on the same layer, the first inner electrode 22 and fifth inner electrode 42 are arranged on the same layer, and the second inner electrode 26 and sixth inner electrode 46 are arranged on the same layer in the opposing direction of the first and second main faces L8a, L8b.

Along the opposing direction of the first and second main faces L8a, L8b, the first and second inner electrodes 21, 25 oppose each other with the dielectric layer 11 therebetween, and the first and second inner electrodes 22, 26 oppose each other with the dielectric layer 15 therebetween. The first and second inner electrodes 22, 25 oppose each other with three dielectric layers 12, 13, 14 therebetween along the opposing direction of the first and second main faces L8a, L8b.

When seen in the opposing direction of the first and second main faces L8a, L8b, the second inner electrode 26 and second main face L8b are arranged adjacent to each other with the dielectric layers 16, 17, 18 therebetween.

Along the opposing direction of the first and second main faces L8a, L8b, the third and fourth inner electrodes 31, 35 oppose each other with the dielectric layer 13 therebetween, and the third and fourth inner electrodes 32, 36 oppose each other with the dielectric layer 17 therebetween. The third and fourth inner electrodes 31, 36 oppose each other with three dielectric layers 14, 15, 16 therebetween along the opposing direction of the first and second main faces L8a, L8b.

When seen in the opposing direction of the first and second main faces L8a, L8b, the first main face L8a and fourth inner electrode 35 are arranged adjacent to each other with the dielectric layers 10, 11, 12 therebetween.

Along the opposing direction of the first and second main faces L8a, L8b, the fifth and sixth inner electrodes 41, 45 oppose each other with the dielectric layer 11 therebetween, and the fifth and sixth inner electrodes 42, 46 oppose each other with the dielectric layer 15 therebetween. The fifth and sixth inner electrodes 42, 45 oppose each other with three dielectric layers 12, 13, 14 therebetween along the opposing direction of the first and second main faces L8a, L8b.

When seen in the opposing direction of the first and second main faces L8a, L1b, the fourth inner electrode 46 and second main face L8b are arranged adjacent to each other with the dielectric layers 16, 17, 18 therebetween.

The first inner electrodes 21, 22 include main electrode portions 21a, 22a and lead portions 21b, 22b extending from the main electrode portions 21a, 22a so as to be exposed at the first side face L8e. The lead portions 21b, 22b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side face L8f. The lead portions 25b, 26b are physically and electrically connected to the second terminal electrode 2.

The third inner electrodes 31, 32 include main electrode portions 31a, 32a and lead portions 31b, 32b extending from the main electrode portions 31a, 32a so as to be exposed at the first side face L8e. The lead portions 31b, 32b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the second side face L8f. The lead portions 35b, 36b are physically and electrically connected to the fourth terminal electrode 4.

The fifth inner electrodes 41, 42 include main electrode portions 41a, 42a and lead portions 41b, 42b extending from the main electrode portions 41a, 42a so as to be exposed at the first side face L8e. The lead portions 41b, 42b are physically and electrically connected to the fifth terminal electrode 5.

The sixth inner electrodes 45, 46 include main electrode portions 45a, 46a and lead portions 45b, 46b extending from the main electrode portions 45a, 46a so as to be exposed at the second side face L8f. The lead portions 45b, 46b are physically and electrically connected to the sixth terminal electrode 6.

As shown in FIGS. 23 and 24, a virtual plane parallel to the opposing direction of the first and second main faces L8a, L8b is taken as a virtual reference plane S1. The first and second electrode groups 20, 30 are arranged in a row along a direction orthogonal to the opposing direction of the first and second main faces L8a, L8b which is a direction orthogonal to the reference plane S1. Namely, within the capacitor body L8, the first and second inner electrodes 21, 22, 25, 26 are arranged on the first end face L8c side of the reference plane S1, while the third and fourth inner electrodes 31, 32, 35, 36 are arranged on the second end face L8d side of the reference plane S1.

Further, a virtual plane parallel to the opposing direction of the first and second main faces L8a, L8b is taken as a virtual reference plane S2. The second and third electrode groups 30, 40 are arranged in a row along a direction orthogonal to the opposing direction of the first and second main faces L8a, L8b which is a direction orthogonal to the reference plane S8. Namely, within the capacitor body L8, the third and fourth inner electrodes 31, 32, 35, 36 are arranged on the first end face L8c side of the reference plane S2, while the fifth and sixth inner electrodes 41, 42, 45, 46 are arranged on the second end face L8d side of the reference plane S2.

The first inner electrodes 21, 22 are arranged such that the sides on the second end face L8d side of the main electrode portions 21a, 22a are in contact with the reference plane S1. The second inner electrodes 25, 26 are arranged such that the sides on the second end face L8d side of the main electrode portions 25a, 26a are separated from the reference plane S1 by a predetermined distance D1 toward the first end face L8c.

The sides on the first end face L8c side of the main electrode portions 31a, 32a of the third inner electrodes 31, 32 are in contact with the reference plane S1. The sides on the second end face L8d side of the main electrode portions 31a, 32a of the third inner electrodes 31, 32 are in contact with the reference plane S2.

The fourth inner electrodes 35, 36 are arranged such that the sides on the first end face L8c side of the main electrode portions 35a, 36a are separated from the reference plane S1 by a predetermined distance D2 toward the second end face L8d. The fourth inner electrodes 35, 36 are arranged such that the sides on the second end face L8d side of the main electrode portions 35a, 35a are separated from the reference plane S2 by a predetermined distance D3 toward the first end face L8c.

The fifth inner electrodes 41, 42 are arranged such that the sides on the first end face L8c side of the main electrode portions 41a, 42a are in contact with the reference plane S2. The sixth inner electrodes 45, 46 are arranged such that the sides on the first end face L8c side of the main electrode portions 45a, 46a are separated from the reference plane S2 by a predetermined distance D4 toward the second end face L8d.

In the multilayer capacitor array CA8, the first and second inner electrodes 21, 22, 25, 26 include inner electrodes opposing each other with dielectric layers therebetween, and these opposing first and second inner electrodes form one of capacitors included in the multilayer capacitor array CA8.

In the multilayer capacitor array CA8, the third and fourth inner electrodes 31, 32, 35, 36 include inner electrodes opposing each other with dielectric layers therebetween, and these opposing third and fourth inner electrodes form one of the capacitors included in the multilayer capacitor array CA8.

In the multilayer capacitor array CA8, the fifth and sixth inner electrodes 41, 42, 45, 46 include inner electrodes opposing each other with dielectric layers therebetween, and these opposing fifth and sixth inner electrodes form one of the capacitors included in the multilayer capacitor array CA8.

When a voltage is applied to the capacitor formed by the first and second inner electrodes 21, 22, 25, 26 and the capacitor formed by the third and fourth inner electrodes 31, 32, 35, 36 so that electrostriction is generated in each capacitor, electrostriction also occurs near the reference plane S1, since the first and third inner electrodes 21, 22, 31, 32 are arranged in contact with the reference plane S1 in the multilayer capacitor array CA8 as mentioned above. This restrains stresses from being concentrated near the reference plane S1.

When a voltage is applied to the capacitor formed by the third and fourth inner electrodes 31, 32, 35, 36 and the capacitor formed by the fifth and sixth inner electrodes 41, 42, 45, 46 so that electrostriction is generated in each capacitor, electrostriction also occurs near the reference plane S9, since the third and fifth inner electrodes 31, 32, 41, 42 are arranged in contact with the reference plane S2 in the multilayer capacitor array CA8. This restraints stresses from being concentrated near the reference plane S2.

Restraining stresses from being concentrated can also keep cracks from occurring in the multilayer capacitor array CA8.

While the first inner electrodes 21, 22 are in contact with the reference plane S1, the second inner electrodes 25, 26 are positioned such as to be separated from the reference plane S1 by the predetermined distance D1. While the third inner electrodes 31, 32 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31, 32 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45, 46 are positioned such as to be separated from the reference plane S2 by the predetermined distance D4. This restrains electrostriction from causing distortions in excess near the reference plane S2.

The third and fourth inner electrodes 31, 32, 35, 36 are arranged at positions different from any of the first and second inner electrodes 21, 22, 25, 26 in the opposing direction of the first and second main faces L8a, L8b. Therefore, in the multilayer capacitor array CA8, three dielectric layers 12, 13, 14 can be arranged between the first and second inner electrodes 22, 25, and three dielectric layers 16, 17, 18 can be arranged between the second inner electrode 26 and second main face L8b. As a result, an electrostriction alleviating layer can be made greater; whereby the multilayer capacitor array CA8 can restrain vibrations from being caused by electrostriction.

The first and second inner electrodes 21, 22, 25, 26 and fifth and sixth inner electrodes 41, 42, 45, 46 are arranged at positions different from any of the third and fourth inner electrodes 31, 32, 35, 36 in the opposing direction of the first and second main faces L8a, L8b. Therefore, in the multilayer capacitor array CA8, three dielectric layers 10, 11, 12 can be arranged between the first main face L8a and fourth inner electrode 35, and three dielectric layers 14, 15, 16 can be arranged between the third and fourth inner electrodes 31, 36. As a result, an electrostriction alleviating layer can be made greater, whereby the multilayer capacitor array CA8 can restrain vibrations from being caused by electrostriction.

The third and fourth inner electrodes 31, 32, 35, 36 are arranged at positions different from any of the fifth and sixth inner electrodes 41, 42, 45, 46 in the opposing direction of the first and second main faces L8a, L8b. Therefore, in the multilayer capacitor array CA8, three dielectric layers 12, 13, 14 can be arranged between the fifth and sixth inner electrodes 42, 45, and three dielectric layers 16, 17, 18 can be arranged between the sixth inner electrode 46 and second main face L8b. As a result, an electrostriction alleviating layer can be made greater, whereby the multilayer capacitor array CA8 can restrain vibrations from being caused by electrostriction.

Ninth Embodiment

Figure 25:
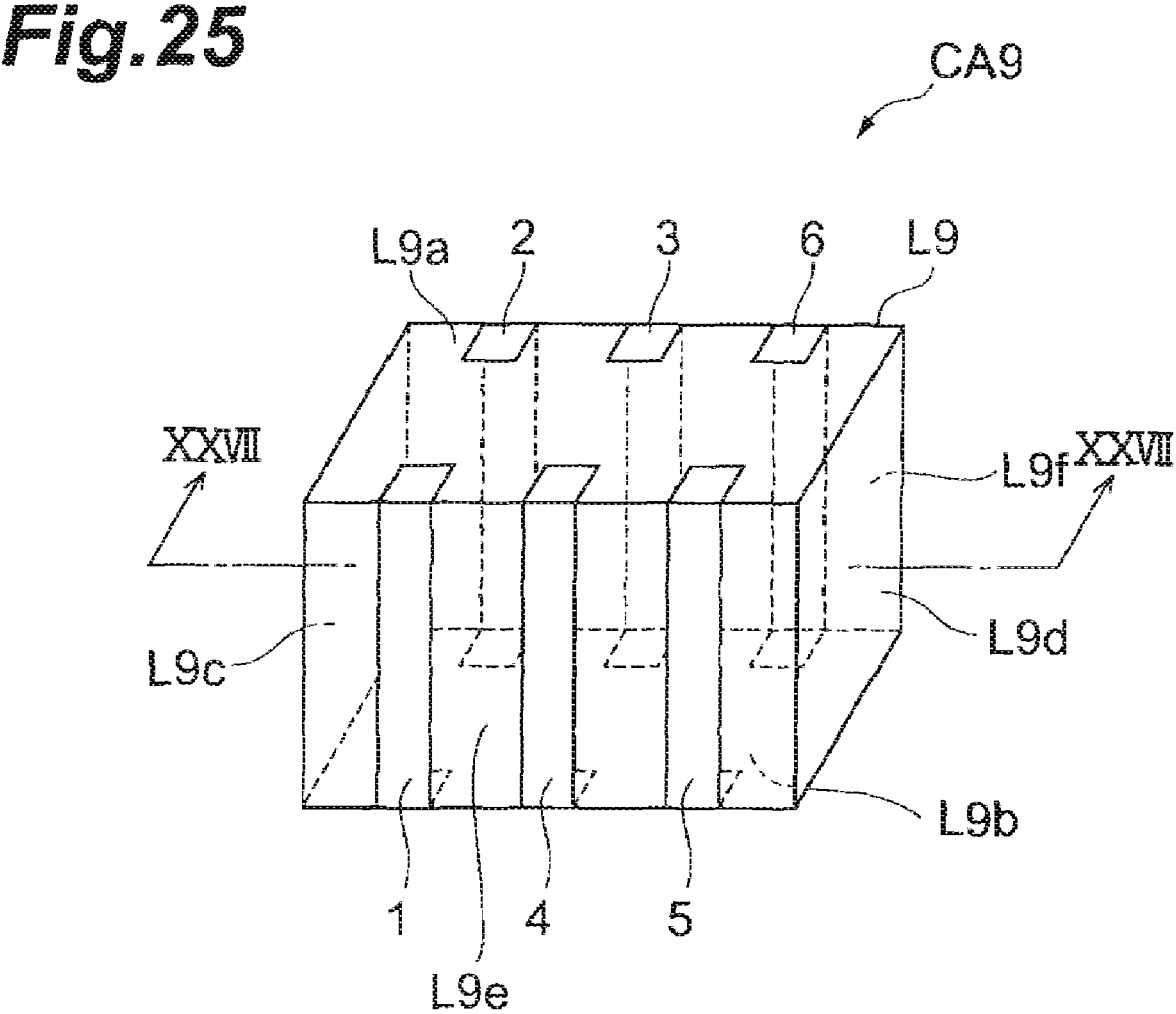
FIG. 25 is a perspective view of the multilayer capacitor array in accordance with the ninth embodiment.
Figure 26:
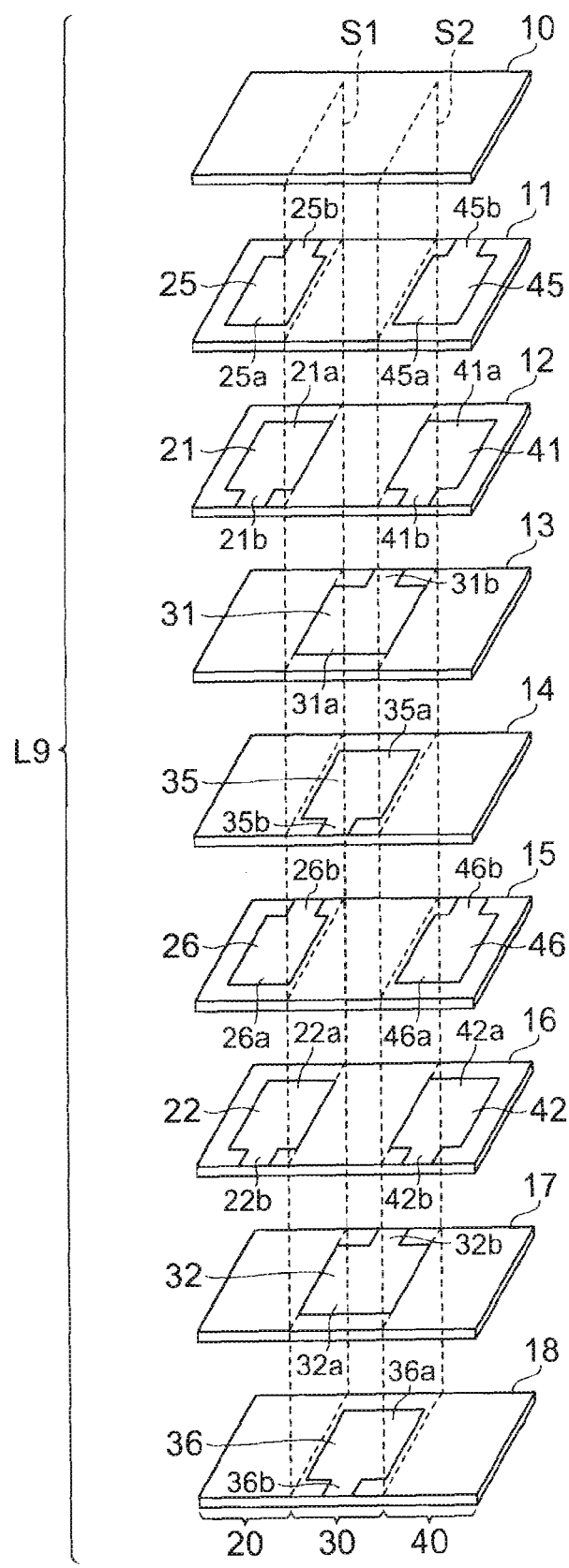
FIG. 26 is an exploded perspective view of the capacitor body included in the multilayer capacitor array in accordance with the ninth embodiment.
Figure 27:
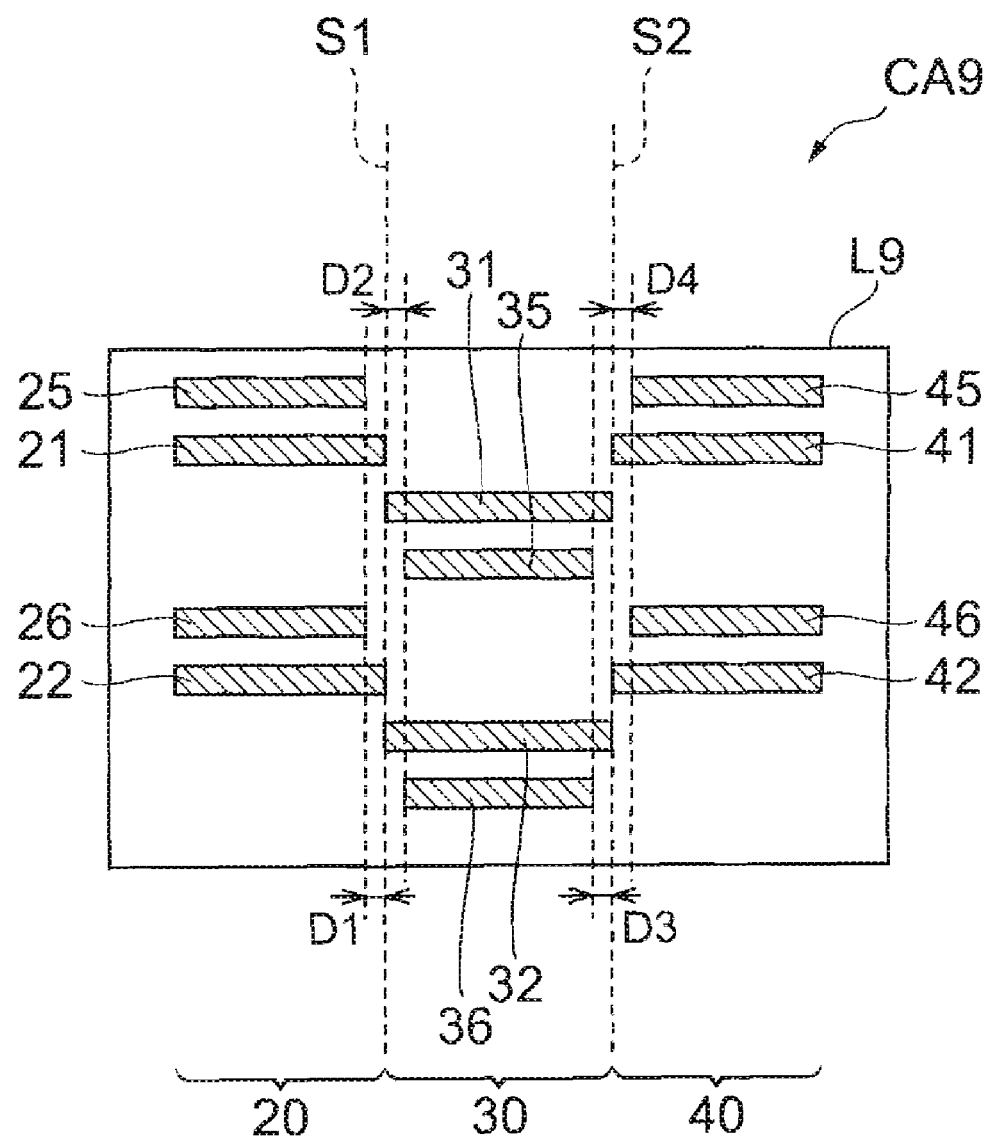
FIG. 27 is a view for explaining the structure of a cross section of the multilayer capacitor array taken along the line XXVII-XXVII of FIG. 25.

With reference to FIGS. 25 to 27, the structure of the multilayer capacitor array CA9 in accordance with the ninth embodiment will be explained. The capacitor array CA9 in accordance with the ninth embodiment differs from the capacitor array CA4 in accordance with the fourth embodiment in terms of the arrangement of first to sixth terminal electrodes 1 to 6 and first to sixth inner electrodes. FIG. 25 is a perspective view of the multilayer capacitor array in accordance with the ninth embodiment. FIG. 26 is an exploded perspective view of the capacitor body included in the multilayer capacitor array in accordance with the ninth embodiment. FIG. 27 is a view for explaining the structure of a cross section of the multilayer capacitor array taken along the line XXVII-XXVII of FIG. 95.

As shown in FIG. 25, the multilayer capacitor array CA9 in accordance with the ninth embodiment comprises a capacitor body L9 and first to sixth terminal electrodes 1 to 6 arranged on outer surface of the capacitor body L9.

As shown in FIG. 25, the capacitor body L9 is shaped like a rectangular parallelepiped having rectangular first and second main faces L9a, L9b opposing each other, first and second end faces L9c, L9d opposing each other and extending in the shorter-side direction of the first and second main faces L9a, L9b so as to connect them to each other, and first and second side faces L9e, L9f opposing each other and extending in the longer-side direction of the first and second main faces L9a, L9b so as to connect them to each other.

The first, fourth, and fifth terminal electrodes 1, 4, 5 are successively arranged on the first side face L9e of the capacitor body L9 from the first end face L9c side to the second end face L9d side. The second, third, and sixth terminal electrodes 2, 3, 6 are successively arranged on the second side face L9f of the capacitor body L9 from the first end face L9c side to the second end face L9d side. The first, fourth, and fifth terminal electrodes 1, 4, 5 oppose the second, third, and sixth terminal electrodes 2, 3, 6, respectively, in the opposing direction of the first and second side faces L9e, L9f.

As shown in FIG. 26, the capacitor body L9 has a plurality of (9 in this embodiment) laminated dielectric layers 10 to 18.

As shown in FIG. 26, the capacitor body L9 includes first to third electrode groups 20, 30, 40. The first electrode group 20 has a plurality (2 layers each in this embodiment) of first and second inner electrodes 21, 22, 25, 26. The second electrode group 30 has a plurality, (2 layers each in this embodiment) of third and fourth inner electrodes 31, 32, 35, 36. The third electrode group 40 has a plurality (2 layers each in this embodiment) of fifth and sixth inner electrodes 41, 42, 45, 46.

Within the capacitor body L9, the first to third electrode groups 20, 30, 40 are arranged in a row along the opposing direction of the first and second end faces L9c, L9d. Specifically, the first to third electrode groups 20, 30, 40 are successively arranged from the first end face L9c side to the second end face L9d side.

The first and second inner electrodes 21, 22, 25, 26 included in the first electrode group 20 are arranged in the order of the second inner electrode 25, first inner electrode 21, second inner electrode 26, and first inner electrode 22 from the first main face L9a toward the second main face L9b. The third and fourth inner electrodes 31, 32, 35, 36 included in the second electrode group 30 are arranged in the order of the third inner electrode 31, fourth inner electrode 35, third inner electrode 32, and fourth inner electrode 36 from the first main face L9a toward the second main face L9b. The fifth and sixth inner electrodes 41, 42, 45, 46 included in the third electrode group 40 are arranged in the order of the sixth inner electrode 45, fifth inner electrode 41, sixth inner electrode 46, and fifth inner electrode 42 from the first main face L9a toward the second main face L9b.

Within the capacitor body L9, the first and second inner electrodes 21, 22, 25, 26 are arranged at positions different from any of the third and fourth inner electrodes 31, 32, 35, 36 in the opposing direction of the first and second main faces L9a, L9b.

Within the capacitor body L9, the third and fourth inner electrodes 31, 32, 35, 36 are arranged at positions different from any of the first and second inner electrodes 21, 22, 25, 26 and fifth and sixth inner electrodes 41, 42, 45, 46 in the opposing direction of the first and second main faces L9a, L9b.

Within the capacitor body 19, the fifth and sixth inner electrodes 41, 42, 45, 46 are arranged at positions different from any of the third and fourth inner electrodes 31, 32, 35, 36 in the opposing direction of the first and second main faces L9a, L9b.

Within the capacitor body L9, the second inner electrode 25 and sixth inner electrode 45 are arranged on the same layer the first inner electrode 21 and fifth inner electrode 41 are arranged on the same layer, the second inner electrode 26 and sixth inner electrode 46 are arranged on the same layer, and the first inner electrode 22 and fifth inner electrode 42 are arranged on the same layer in the opposing direction of the first and second main faces L9a, L9b.

Along the opposing direction of the first and second main faces L9a, L9b, the first and second inner electrodes 21, 25 oppose each other with the dielectric layer 11 therebetween, and the first and second inner electrodes 22, 26 oppose each other with the dielectric layer 15 therebetween. The first and second inner electrodes 21, 26 oppose each other with three dielectric layers 12, 13, 14 therebetween along the opposing direction of the first and second main faces L9a, L9b.

When seen in the opposing direction of the first and second main faces L9a. L9b, the first inner electrode 22 and second main face L9b are arranged adjacent to each other with the dielectric layers 16, 17, 18 therebetween.

Along the opposing direction of the first and second main faces L9a, L9b, the third and fourth inner electrodes 31, 35 oppose each other with the dielectric layer 13 therebetween, and the third and fourth inner electrodes 32, 36 oppose each other with the dielectric layer 17 therebetween. The third and fourth inner electrodes 32, 35 oppose each other with three dielectric layers 14, 15, 16 therebetween along the opposing direction of the first and second main faces L9a, L9b.

When seen in the opposing direction of the first and second main faces L9a, L9b, the first main face L9a and third inner electrode 31 are arranged adjacent to each other with the dielectric layers 10, 11, 12 therebetween.

Along the opposing direction of the first and second main faces L9a, L9b, the fifth and sixth inner electrodes 41, 45 oppose each other with the dielectric layer 11 therebetween, and the fifth and sixth inner electrodes 42, 46 oppose each other with the dielectric layer 15 therebetween. The fifth and sixth inner electrodes 41, 46 oppose each other with three dielectric layers 12, 13, 14 therebetween along the opposing direction of the first and second main faces L9a, L9b.

When seen in the opposing direction of the first and second main faces L9a, L9b, the fourth inner electrode 46 and second main face L9b are arranged adjacent to each other with the dielectric layers 16, 17, 18 therebetween.

The first inner electrodes 21, 22 include main electrode portions 21a, 22a and lead portions 21b, 22b extending from the main electrode portions 21a, 22a so as to be exposed at the first side face L9e. The lead portions 21b, 22b are physically and electrically connected to the first terminal electrode 1. The second inner electrodes 25, 26 include main electrode portions 25a, 26a and lead portions 25b, 26b extending from the main electrode portions 25a, 26a so as to be exposed at the second side face L9f. The lead portions 25b, 26b are physically and electrically connected to the second terminal electrode 2.

The third inner electrodes 31, 32 include main electrode portions 31a, 32a and lead portions 31b, 32b extending from the main electrode portions 31a, 32a so as to be exposed at the second side face L9f. The lead portions 31b, 32b are physically and electrically connected to the third terminal electrode 3. The fourth inner electrodes 35, 36 include main electrode portions 35a, 36a and lead portions 35b, 36b extending from the main electrode portions 35a, 36a so as to be exposed at the first side face L9e. The lead portions 35b, 36b are physically and electrically connected to the fourth terminal electrode 4.

The fifth inner electrodes 41, 42 include main electrode portions 41a, 42a and lead portions 41b, 42b extending from the main electrode portions 41a, 42a so as to be exposed at the first side face L9e. The lead portions 41b, 42b are physically and electrically connected to the fifth terminal electrode 5. The sixth inner electrodes 45, 46 include main electrode portions 45a, 46a and lead portions 45b, 46b extending from the main electrode portions 45a, 46a so as to be exposed at the second side face L9f. The lead portions 45b, 46b are physically and electrically connected to the sixth terminal electrode 6.

As shown in FIGS. 26 and 27, a virtual plane parallel to the opposing direction of the first and second main faces L9a, L9b is taken as a virtual reference plane S1. The first and second electrode groups 20, 30 are arranged in a row along a direction orthogonal to the opposing direction of the first and second main faces L9a, L9b which is a direction orthogonal to the reference plane S1. Namely, within the capacitor body L9, the first and second inner electrodes 21, 22, 25, 26 are arranged on the first end face L9c side of the reference plane S1, while the third and fourth inner electrodes 31, 32, 35, 36 are arranged on the second end face L9d side of the reference plane S1.

Further, a virtual plane parallel to the opposing direction of the first and second main faces L9a, L9b is taken as a virtual reference plane S2. The second and third electrode groups 30, 40 are arranged in a row along a direction orthogonal to the opposing direction of the first and second main faces L9a, L9b which is a direction orthogonal to the reference plane S2. Namely, within the capacitor body L9, the third and fourth inner electrodes 31, 32, 35, 36 are arranged on the first end face L9c side of the reference plane S2, while the fifth and sixth inner electrodes 41, 42, 45, 46 are arranged on the second end face L9d side of the reference plane S2.

The first inner electrodes 21, 22 are arranged such that the sides on the second end face L9d side of the main electrode portions 21a, 22a are in contact with the reference plane S1. The second inner electrodes 25, 26 are arranged such that the sides on the second end face L9d side of the main electrode portions 25a, 26a are separated from the reference plane S1 by a predetermined distance D1 toward the first end face L9c.

The sides on the first end face L9c side of the main electrode portions 31a, 32a of the third inner electrodes 31, 32 are in contact with the reference plane S1. The sides on the second end face L9d side of the main electrode portions 31a, 32a of the third inner electrodes 31, 32 are in contact with the reference plane S2.

The fourth inner electrodes 35, 36 are arranged such that the sides on the first end face L9c side of the main electrode portions 35a, 36a are separated from the reference plane S1 by a predetermined distance D2 toward the second end face L9d. The fourth inner electrodes 35, 36 are arranged such that the sides on the second end face L9d side of the main electrode portions 35a, 35a are separated from the reference plane S2 by a predetermined distance D3 toward the first end face L9c.

The fifth inner electrodes 41, 42 are arranged such that the sides on the first end face L9c side of the main electrode portions 41a, 42a are in contact with the reference plane S2. The sixth inner electrodes 45, 46 are arranged such that the sides on the first end face L9c side of the main electrode portions 45a, 46a are separated from the reference plane S2 by a predetermined distance D4 toward the second end face L9d.

In the multilayer capacitor array CA9, the first and second inner electrodes 21, 22, 25, 26 include inner electrodes opposing each other with dielectric layers therebetween, and these opposing first and second inner electrodes form one of capacitors included in the multilayer capacitor array CA9.

In the multilayer capacitor array CA9, the third and fourth inner electrodes 31, 32, 35, 36 include inner electrodes opposing each other with dielectric layers therebetween, and these opposing third and fourth inner electrodes form one of the capacitors included in the multilayer capacitor array CA9.

In the multilayer capacitor array CA9, the fifth and sixth inner electrodes 41, 42, 45, 46 include inner electrodes opposing each other with dielectric layers therebetween, and these opposing fifth and sixth inner electrodes form one of the capacitors included in the multilayer capacitor array CA9.

When a voltage is applied to the capacitor formed by the first and second inner electrodes 21, 22, 25, 26 and the capacitor formed by the third and fourth inner electrodes 31, 32, 35, 36 so that electrostriction is generated in each capacitor, electrostriction also occurs near the reference plane S1, since the first and third inner electrodes 21, 22, 31, 32 are arranged in contact with the reference plane S1 in the multilayer capacitor array CA9 as mentioned above. This restrains stresses from being concentrated near the reference plane S1.

When a voltage is applied to the capacitor formed by the third and fourth inner electrodes 31, 32, 35, 36 and the capacitor formed by the fifth and sixth inner electrodes 41, 42, 45, 46 so that electrostriction is generated in each capacitor, electrostriction also occurs near the reference plane S2, since the third and fifth inner electrodes 31, 32, 41, 42 are arranged in contact with the reference plane S2 in the multilayer capacitor array CA9. This restrains stresses from being concentrated near the reference plane S2.

Restraining stresses from being concentrated can also keep cracks from occurring in the multilayer capacitor array CA9.

While the first inner electrodes 21, 22 are in contact with the reference plane S1, the second inner electrodes 25, 26 are positioned such as to be separated from the reference plane S1 by the predetermined distance D1. While the third inner electrodes 31, 32 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31, 32 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45, 46 are positioned such as to be separated from the reference plane S1 by the predetermined distance D4. This restrains electrostriction from causing distortions in excess near the reference plane S2.

The third and fourth inner electrodes 31, 32, 35, 36 are arranged at positions different from any of the first and second inner electrodes 21, 22, 25, 26 in the opposing direction of the first and second main faces L9a, L9b. Therefore, in the multilayer capacitor array CA9, three dielectric layers 12, 13, 14 can be arranged between the first and second inner electrodes 21, 26, and three dielectric layers 16, 17, 18 can be arranged between the first inner electrode 22 and second main face L9b. As a result, an electrostriction alleviating layer can be made greater, whereby the multilayer capacitor array CA9 can restrain vibrations from being caused by electrostriction.

The first and second inner electrodes 21, 22, 25, 26 and fifth and sixth inner electrodes 41, 42, 45, 46 are arranged at positions different from any of the third and fourth inner electrodes 31, 32, 35, 36 in the opposing direction of the first and second main faces L9a, L9b. Therefore, in the multilayer capacitor array CA9, three dielectric layers 10, 11, 12 can be arranged between the first main face L9a and third inner electrode 31, and three dielectric layers 14, 15, 16 can be arranged between the third and fourth inner electrodes 32, 35. As a result, an electrostriction alleviating layer can be made greater, whereby the multilayer capacitor array CA9 can restrain vibrations from being caused by electrostriction.

The third and fourth inner electrodes 31, 32, 35, 36 are arranged at positions different from any of the fifth and sixth inner electrodes 41, 42, 45, 46 in the opposing direction of the first and second main faces L9a, L9b. Therefore, in the multilayer capacitor array CA9, three dielectric layers 12, 13, 14 can be arranged between the fifth and sixth inner electrodes 41, 46 and three dielectric layers 16, 17, 18 can be arranged between the fifth inner electrode 42 and second main face L9b. As a result, an electrostriction alleviating layer can be made greater, whereby the multilayer capacitor array CA9 can restrain vibrations from being caused by electrostriction.

Tenth Embodiment

Figure 28:
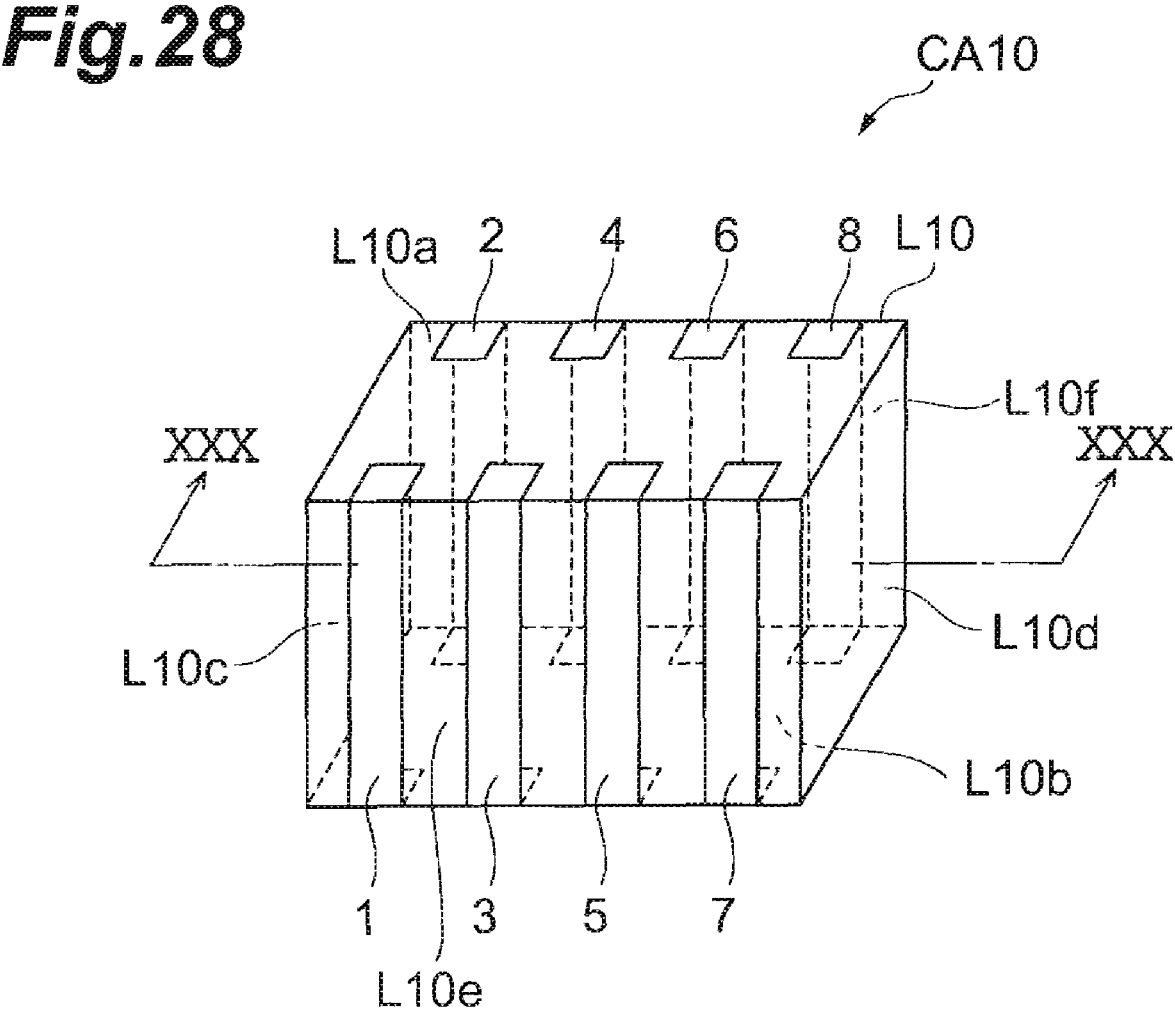
FIG. 28 is a perspective view of the multilayer capacitor array in accordance with the tenth embodiment.
Figure 29:
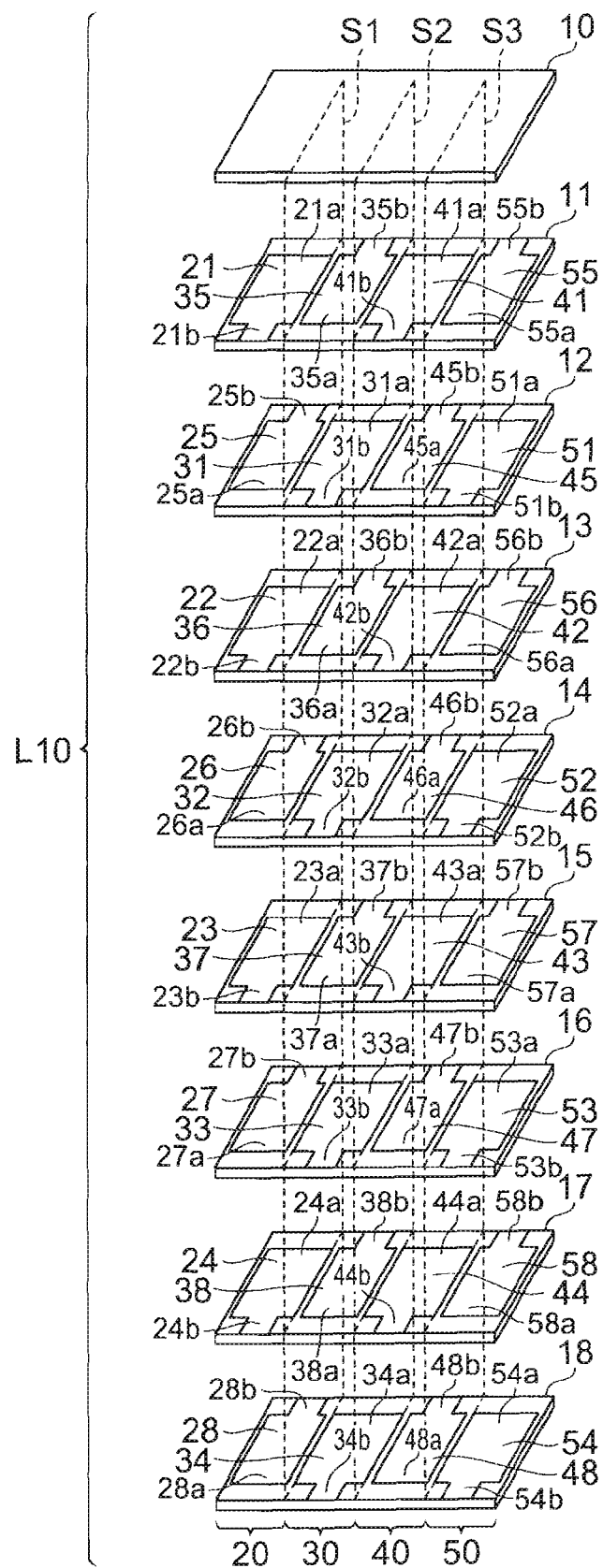
FIG. 29 is an exploded perspective view of the capacitor body included in the multilayer capacitor array in accordance with the tenth embodiment.
Figure 30:
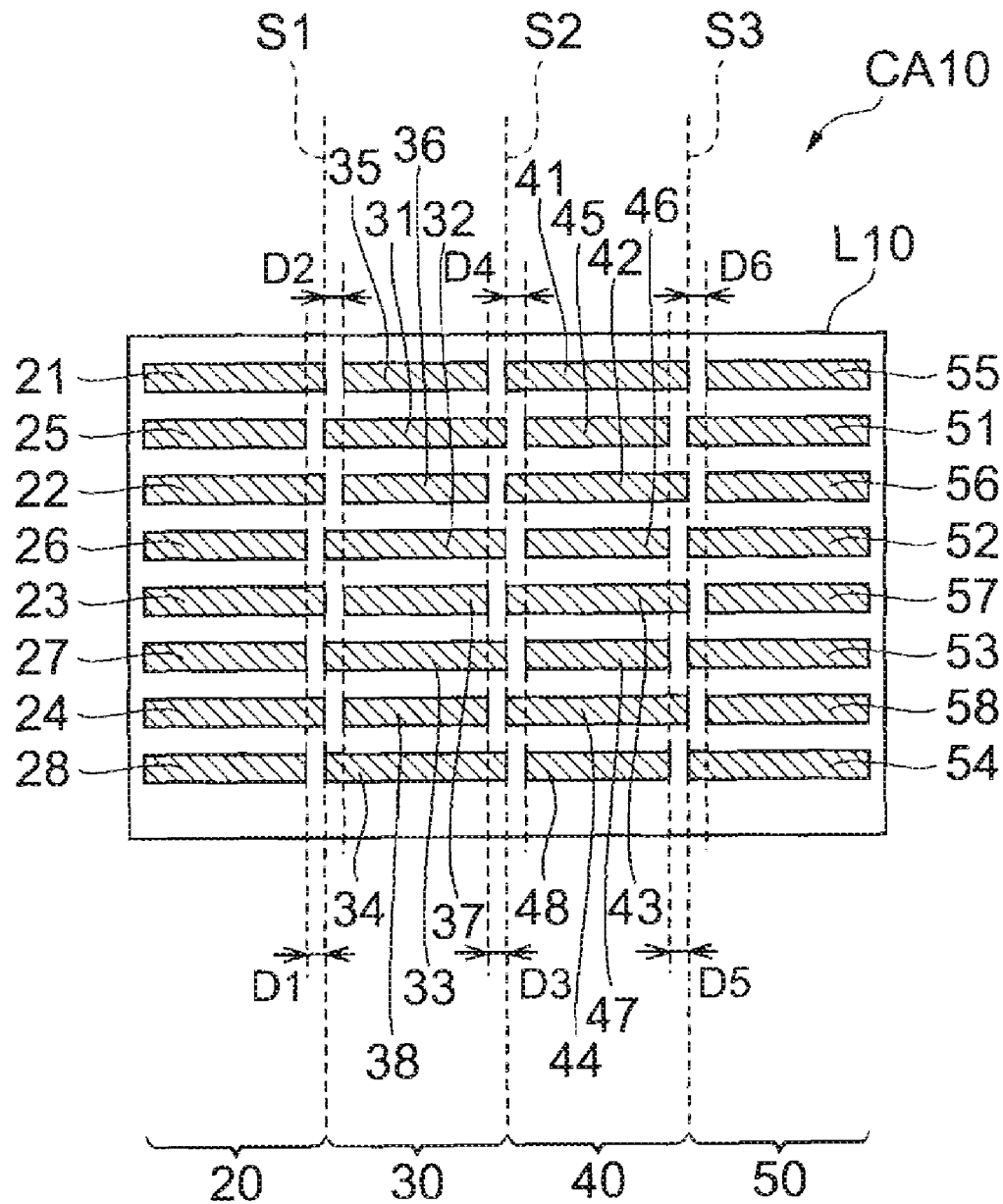
FIG. 30 is a view for explaining the structure of a cross section of the multilayer capacitor array taken along the line XXX-XXX of FIG. 28.

With reference to FIGS. 28 to 30, the structure of the multilayer capacitor array CA10 in accordance with the tenth embodiment will be explained. The capacitor array CA10 in accordance with the tenth embodiment differs from the capacitor array CA1 in accordance with the first embodiment in terms of the number of terminal electrodes. FIG. 28 is a perspective view of the multilayer capacitor array in accordance with the tenth embodiment. FIG. 29 is an exploded perspective view of the capacitor body included in the multilayer capacitor array in accordance with the tenth embodiment. FIG. 30 is a view for explaining the structure of a cross section of the multilayer capacitor array taken along the line XXX-XXX of FIG. 28.

As shown in FIG. 28, the multilayer capacitor array CA10 in accordance with the tenth embodiment comprises a capacitor body L10 and first to eighth terminal electrodes 1 to 8 arranged on outer surface of the capacitor body L10. The first to eighth terminal electrodes 1 to 8 are formed, for example, by attaching and burning a conductive paste, which contains a conductive metal powder and a glass frit, onto outer surface of the capacitor body. A plating layer may be formed on the burned terminal electrodes when necessary. The first to eighth terminal electrodes 1 to 8 are formed such as to be electrically insulated from each other on the surfaces of the capacitor body L10.

As shown in FIG. 28, the capacitor body L10 is shaped like a rectangular parallelepiped having rectangular first and second main faces L10a, L10b opposing each other, first and second end faces L10c, L10d opposing each other and extending in the shorter-side direction of the first and second main faces L10a, L10b so as to connect them to each others and first and second side faces L10e, L10f opposing each other and extending in the longer-side direction of the first and second main faces L10a, L10b so as to connect them to each other.

The first, third, fifth, and seventh terminal electrodes 1, 3, 5, 7 are successively arranged on the first side face L10e of the capacitor body L10 from the first end face L10c side to the second end face L10d side. The second, fourth, sixth, and eighth terminal electrodes 2, 4, 6, 8 are successively arranged on the second side face L10f of the capacitor body L10 from the first end face L10c side to the second end face L10d side. The first, third, fifth, and seventh terminal electrodes 1, 3, 5, 7 oppose the second, fourth, sixth, and eighth terminal electrodes 2, 4, 6, 8, respectively, in the opposing direction of the first and second side faces L10e, L10f.

As shown in FIG. 29, the capacitor body L10 has a plurality of (9 in this embodiment) laminated dielectric layers 10 to 18. Each of the dielectric layers 10 to 18 is constituted by a sintered body of a ceramic green sheet containing a dielectric ceramic, for example.

As shown in FIG. 29, the capacitor body L10 includes first, second, third, and fourth electrode groups 20, 30, 40, 50. The first electrode group 20 has a plurality (4 layers each in this embodiment) of first and second inner electrodes 21 to 24, 25 to 28. The second electrode group 30 has a plurality (4 layers each in this embodiment) of third and fourth inner electrodes 31 to 34, 35 to 38. The third electrode group 40 has a plurality (4 layers each in this embodiment) of fifth and sixth inner electrodes 41 to 44, 45 to 48. The fourth electrode group 50 has a plurality (4 layers each in this embodiment) of seventh and eighth inner electrodes 51 to 54, 55 to 58.

Within the capacitor body L10, the first to fourth electrode groups 20, 30, 40, 50 are arranged in a row along a direction orthogonal to the opposing direction of the first and second main faces L10a, L10b, i.e., the opposing direction of the first and second end faces L10c, L10d of the capacitor body L10. Specifically, the first to fourth electrode groups 20, 30, 40, 50 are successively arranged from the first end face L10c side to the second end face L10d side. Each of the inner electrodes 21 to 24, 25 to 28, 31 to 34, 41 to 44, 45 to 48, 51 to 54, 55 to 58 is constituted by a sintered body of a conductive paste, for example.

The first and second inner electrodes 21 to 24, 25 to 28 included in the first electrode group 20 are arranged in the order of the first inner electrode 21, second inner electrode 25, first inner electrode 22, second inner electrode 26, first inner electrode 23, second inner electrode 27, first inner electrode 24, and second inner electrode 28 from the first main face L10a toward the second main face L10b. The third and fourth inner electrodes 31 to 34, 35 to 38 included in the second electrode group 30 are arranged in the order of the fourth inner electrode 35, third inner electrode 313 fourth inner electrode 36, third inner electrode 32, fourth inner electrode 37, third inner electrode 33, fourth inner electrode 38, and third inner electrode 34 from the first main face L10a toward the second main face L10b. The fifth and sixth inner electrodes 41 to 44, 45 to 48 included in the third electrode group 40 are arranged in the order of the fifth inner electrode 41, sixth inner electrode 45, fifth inner electrode 42, sixth inner electrode 46, fifth inner electrode 43, sixth inner electrode 47, fifth inner electrode 44, and sixth inner electrode 48 from the first main face L10a toward the second main face L10b. The seventh and eighth inner electrodes 51 to 54, 55 to 58 included in the fourth electrode group 50 are arranged in the order of the eighth inner electrode 55, seventh inner electrode 51, eighth inner electrode 56, seventh inner electrode 52, eighth inner electrode 57, seventh inner electrode 53, eighth inner electrode 58, and seventh inner electrode 54 from the first main face L10a toward the second main face L10b.

Along the opposing direction of the first and second main faces L10a, L10b, the first and second inner electrodes 21, 25 oppose each other with the dielectric layer 11 therebetween, the first and second inner electrodes 22, 25 oppose each other with the dielectric layer 12 therebetween, the first and second inner electrodes 22, 26 oppose each other with the dielectric layer 13 therebetween, the first and second inner electrodes 23, 26 oppose each other with the dielectric layer 14 therebetween, the first and second inner electrodes 23, 27 oppose each other with the dielectric layer 15 therebetween, the first and second inner electrodes 24, 27 oppose each other with the dielectric layer 16 therebetween, and the first and second inner electrodes 24, 28 oppose each other with the dielectric layer 17 therebetween.

Along the opposing direction of the first and second main faces L10a, L10b, the third and fourth inner electrodes 31, 35 oppose each other with the dielectric layer 11 therebetween, the third and fourth inner electrodes 31, 36 oppose each other with the dielectric layer 12 therebetween, the third and fourth inner electrodes 32, 36 oppose each other with the dielectric layer 13 therebetween, the third and fourth inner electrodes 32, 37 oppose each other with the dielectric layer 14 therebetween, the third and fourth inner electrodes 33, 37 oppose each other with the dielectric layer 15 therebetween, the third and fourth inner electrodes 33, 38 oppose each other with the dielectric layer 16 therebetween, and the third and fourth inner electrodes 34, 38 oppose each other with the dielectric layer 17 therebetween.

Along the opposing direction of the first and second main faces L10a, L10b, the fifth and sixth inner electrodes 41, 45 oppose each other with the dielectric layer 11 therebetween, the fifth and sixth inner electrodes 42, 45 oppose each other with the dielectric layer 12 therebetween, the fifth and sixth inner electrodes 42, 46 oppose each other with the dielectric layer 13 therebetween, the fifth and sixth inner electrodes 43, 46 oppose each other with the dielectric layer 14 therebetween, the fifth and sixth inner electrodes 43, 47 oppose each other with the dielectric layer 15 therebetween, the fifth and sixth inner electrodes 44, 47 oppose each other with the dielectric layer 16 therebetween, and the fifth and sixth inner electrodes 44, 48 oppose each other with the dielectric layer 17 therebetween.

Along the opposing direction of the first and second main faces L10a, L10b, the seventh and eighth inner electrodes 51, 55 oppose each other with the dielectric layer 11 therebetween, the seventh and eighth inner electrodes 51, 56 oppose each other with the dielectric layer 12 therebetween, the seventh and eighth inner electrodes 52, 56 oppose each other with the dielectric layer 13 therebetween, the seventh and eighth inner electrodes 52, 57 oppose each other with the dielectric layer 14 therebetween, the seventh and eighth inner electrodes 53, 57 oppose each other with the dielectric layer 15 therebetween, the seventh and eighth inner electrodes 53, 58 oppose each other with the dielectric layer 16 therebetween, and the seventh and eighth inner electrodes 54, 58 oppose each other with the dielectric layer 17 therebetween.

The first inner electrodes 21 to 24 include main electrode portions 21a to 24a and lead portions 21b to 24b extending from the main electrode portions 21a to 24a so as to be exposed at the first side face L10e. The lead portions 21b to 24b are physically and electrically connected to the first terminal electrode 1.

The second inner electrodes 25 to 28 include main electrode portions 25a to 28a and lead portions 25b to 28b extending from the main electrode portions 25a to 28a so as to be exposed at the second side face L10f. The lead portions 25b to 28b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the first side face L10e. The lead portions 31b to 34b are physically and electrically connected to the third terminal electrode 3.

The fourth inner electrodes 35 to 38 include main electrode portions 35a to 38a and lead portions 35b to 38b extending from the main electrode portions 35a to 38a so as to be exposed at the second side face L10f. The lead portions 35b to 38b are physically and electrically connected to the fourth terminal electrode 4.

The fifth inner electrodes 41 to 44 include main electrode portions 41a to 44a and lead portions 41b to 44b extending from the main electrode portions 41a to 44a so as to be exposed at the first side face L10e. The lead portions 41b to 44b are physically and electrically connected to the fifth terminal electrode 5.

The sixth inner electrodes 45 to 48 include main electrode portions 45a to 48a and lead portions 45b to 48b extending from the main electrode portions 45a to 48a so as to be exposed at the second side face L10f. The lead portions 45b to 48b are physically and electrically connected to the sixth terminal electrode 6.

The seventh inner electrodes 51 to 54 include quadrilateral main electrode portions 51a to 54a each having four sides parallel to the first and second end faces L10c, L10d and first and second side faces L10e, L10f, respectively, and lead portions 51b to 54b extending from the main electrode portions 51a to 54a so as to be exposed at the second side face L10f. The lead portions 51b to 54b exposed at the second side face L10f are physically and electrically connected to the seventh terminal electrode 7. Namely, the seventh inner electrodes 51 to 54 are connected to the seventh terminal electrode 7.

The eighth inner electrodes 55 to 58 include quadrilateral main electrode portions 55a to 58a each having four sides parallel to the first and second end faces L10c, L10d and first and second side faces L10e, L10f, respectively, and lead portions 55b to 58b extending from the main electrode portions 55a to 58a so as to be exposed at the second side face L10f. The lead portions 55b to 58b exposed at the second side face L10f are physically and electrically connected to the eighth terminal electrode 8. Namely, the eighth inner electrodes 55 to 58 are connected to the eighth terminal electrode 8.

As shown in FIGS. 29 and 30, a virtual plane parallel to the opposing direction of the first and second main faces L10a, L10b is taken as a virtual reference plane S1. When based on the virtual reference plane S1, the first and second electrode groups 20, 30 are arranged in a row along a direction orthogonal to the reference plane S1. The direction orthogonal to the reference plane S1 corresponds to a direction orthogonal to the opposing direction of the first and second main faces L10a, L10b. Namely, within the capacitor body L10, the first and second inner electrodes 21 to 24, 25 to 28 are arranged on the first end face L10c side of the reference plane S1, while the third and fourth inner electrodes 31 to 34, 35 to 38 are arranged on the second end face L10d side of the reference plane S1.

Further, a virtual plane parallel to the opposing direction of the first and second main faces L10a, L10b is taken as a virtual reference plane S2. When based on the virtual reference plane S2, the second and third electrode groups 30, 40 are arranged in a row along a direction orthogonal to the reference plane S2. The direction orthogonal to the reference plane S2 corresponds to a direction orthogonal to the opposing direction of the first and second main faces L10a, L10b. Namely, within the capacitor body L10, the third and fourth inner electrodes 31 to 34, 35 to 38 are arranged on the first end face L10c side of the reference plane S2, while the fifth and sixth inner electrodes 41 to 44, 45 to 48 are arranged on the second end face L10d side of the reference plane S2.

Furthermore, a virtual plane parallel to the opposing direction of the first and second main faces L10a, L10b is taken as a virtual reference plane S3. When based on the virtual reference plane S3, the third and fourth electrode groups 40, 50 are arranged in a row along a direction orthogonal to the reference plane S3. The direction orthogonal to the reference plane S3 corresponds to a direction orthogonal to the opposing direction of the first and second main faces L10a, L10b. Namely, within the capacitor body L10, the fifth and sixth inner electrodes 41 to 44, 45 to 48 are arranged on the first end face L10c side of the reference plane S3, while the seventh and eighth inner electrodes 51 to 54, 55 to 58 are arranged on the second end face L10d side of the reference plane S3.

The first inner electrodes 21 to 24 are arranged in contact with the reference plane S1. Specifically, the sides on the second end face L10d side of the main electrode portions 21a to 24a of the first inner electrodes 21 to 24 are in contact with the reference plane S1.

The second inner electrodes 25 to 28 are arranged such as to be separated from the reference plane S1 by a predetermined distance. Specifically, the sides on the second end face L10d side of the main electrode portions 25a to 28a of the second inner electrodes 25 to 28 are arranged such as to be separated from the reference plane S1 by a predetermined distance D1 toward the first end face L10c.

The third inner electrodes 31 to 34 are arranged in contact with the reference planes S1 and S2. Specifically, the sides on the first end race L10c side of the main electrode portions 31a to 34a of the third inner electrodes 31 to 34 are in contact with the reference plane S1. The sides on the second end face L10d side of the main electrode portions 31a to 34a of the third inner electrodes 31 to 34 are in contact with the reference plane S2.

The fourth inner electrodes 35 to 38 are arranged such as to be separated from the reference planes S1 and S2 by predetermined distances. Specifically, the sides on the first end face L10c side of the main electrode portions 35a to 38a of the fourth inner electrodes 35 to 38 are arranged such as to be separated from the reference plane S1 by a predetermined distance D2 toward the second end face L10d. The sides on the second end face L10d side of the main electrode portions 35a to 38a of the fourth inner electrodes 35 to 38 are arranged such as to be separated from the reference plane S2 by a predetermined distance D3 toward the first end face L10c.

The fifth inner electrodes 41 to 44 are arranged in contact with the reference planes S2 and S3. Specifically, the sides on the first end face L10c side of the main electrode portions 41a to 44a of the fifth inner electrodes 41 to 44 are in contact with the reference plane S2. The sides on the second end face L10d side of the main electrode portions 41a to 44a of the fifth inner electrodes 41 to 44 are in contact with the reference plane S3.

The sixth inner electrodes 45 to 48 are arranged such as to be separated from the reference planes S2 and S3 by predetermined distances. Specifically, the sides on the first end face L10c side of the main electrode portions 45a to 48a of the sixth inner electrodes 45 to 48 are arranged such as to be separated from the reference plane S2 by a predetermined distance D4 toward the second end face L10d. The sides on the second end face L10d side of the main electrode portions 45a to 48a of the sixth inner electrodes 45 to 48 are arranged such as to be separated from the reference plane S3 by a predetermined distance D5 toward the first end face L10c.

The seventh inner electrodes 51 to 54 are arranged in contact with the reference plane S3. Specifically, the sides on the first end face L10c side of the main electrode portions 51a to 54a of the fifth inner electrodes 51 to 54 are in contact with the reference plane S3.

The eighth inner electrodes 55 to 58 are arranged such as to be separated from the reference plane S3 by a predetermined distance. Specifically, the sides on the first end face L10c side of the main electrode portions 55a to 58a of the eighth inner electrodes 55 to 58 are arranged such as to be separated from the reference plane S3 by a predetermined distance D6 toward the second end face L10d.

In the multilayer capacitor array CA10, the first and second inner electrodes 21 to 24, 25 to 28 alternately oppose each other with the dielectric layers 11 to 17 therebetween. Therefore, the first and second inner electrodes 21 to 24, 25 to 28 form a capacitance C1, so as to construct one of capacitors included in the multilayer capacitor array CA10.

In the multilayer capacitor array CA10, the third and fourth inner electrodes 31 to 34, 35 to 38 alternately oppose each other with the dielectric layers 11 to 17 therebetween. Therefore, the third and fourth inner electrodes 31 to 34, 35 to 38 form a capacitance C2, so as to construct one of the capacitors included in the multilayer capacitor array CA10.

In the multilayer capacitor array CA10, the fifth and sixth inner electrodes 41 to 44, 45 to 48 alternately oppose each other with the dielectric layers 11 to 17 therebetween. Therefore, the fifth and sixth inner electrodes 41 to 44, 45 to 48 form a capacitance C3, so as to construct one of the capacitors included in the multilayer capacitor array CA10.

Figure 48:
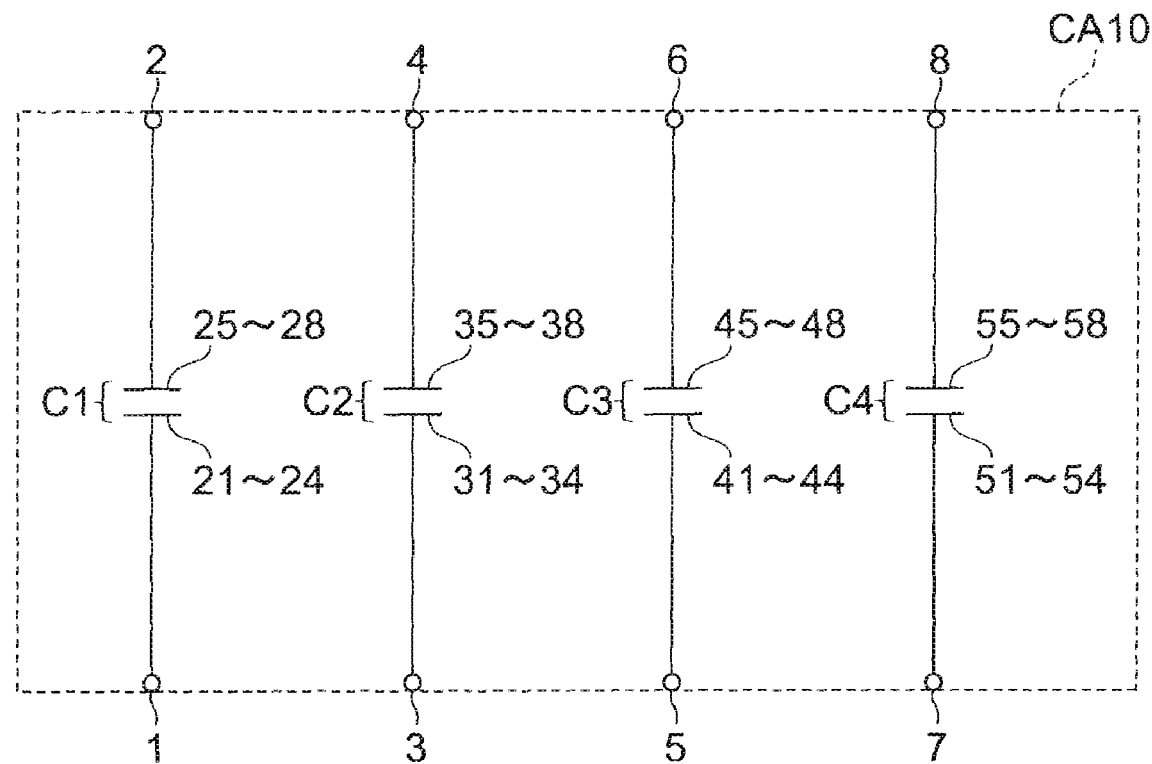
FIG. 48 is an equivalent circuit diagram of the multilayer capacitor array in accordance with the tenth embodiment.

In the multilayer capacitor array CA10, the seventh and eighth inner electrodes 51 to 54, 55 to 58 alternately oppose each other with the dielectric layers 11 to 17 therebetween. Therefore, the seventh and eighth inner electrodes 51 to 54, 55 to 58 form a capacitance C4, so as to construct one of the capacitors included in the multilayer capacitor array CA10. Hence, an equivalent circuit diagram of the multilayer capacitor array CA10 is illustrated as shown in FIG. 48.

When a voltage is applied to the capacitor formed by the first and second inner electrodes 21 to 24, 25 to 28 and the capacitor formed by the third and fourth inner electrodes 31 to 34, 35 to 38 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA10 as mentioned above. This restrains stresses from being concentrated near the reference plane S1.

When a voltage is applied to the capacitor formed by the third and fourth inner electrodes 31 to 34, 35 to 38 and the capacitor formed by the fifth and sixth inner electrodes 41 to 44, 45 to 48 so that electrostriction is generated in each capacitor, electrostriction also occurs near the reference plane S2, since the third and fifth inner electrodes 31 to 34, 41 to 44 are arranged in contact with the reference plane S1 in the multilayer capacitor array CA10. This restrains stresses from being concentrated near the reference plane S2.

When a voltage is applied to the capacitor formed by the fifth and sixth inner electrodes 41 to 44, 45 to 48 and the capacitor formed by the seventh and eighth inner electrodes 51 to 54, 55 to 58 so that electrostriction is generated in each capacitor, electrostriction also occurs near the reference plane S3, since the fifth and seventh inner electrodes 41 to 44, 51 to 54 are arranged in contact with the reference plane S3 in the multilayer capacitor array CA10. This restrains stresses from being concentrated near the reference plane S3.

Restraining stresses from being concentrated can also keep cracks from occurring in the multilayer capacitor array CA10.

While the first inner electrodes 21 to 24 are in contact with the reference plane S1, the second inner electrodes 25 to 28 are positioned such as to be separated from the reference plane S1 by the predetermined distance D1. While the third inner electrodes 31 to 34 are in contact with the reference plane S1, the fourth inner electrodes 35 to 38 are positioned such as to be separated from the reference plane S1 by the predetermined distance D2. This restrains electrostriction from causing distortions in excess near the reference plane S1

While the third inner electrodes 31 to 34 are in contact with the reference plane S2, the fourth inner electrodes 35 to 38 are positioned such as to be separated from the reference plane S2 by the predetermined distance D3. While the fifth inner electrodes 41 to 44 are in contact with the reference plane S2, the sixth inner electrodes 45 to 48 are positioned such as to be separated from the reference plane S2 by the predetermined distance D4. This restrains electrostriction from causing distortions in excess near the reference plane S2.

While the fifth inner electrodes 41 to 44 are in contact with the reference plane S3, the sixth inner electrodes 45 to 48 are positioned such as to be separated from the reference plane S3 by the predetermined distance D5. While the seventh inner electrodes 51 to 54 are in contact with the reference plane S3, the eighth inner electrodes 55 to 58 are positioned such as to be separated from the reference plane S3 by the predetermined distance D6. This restrains electrostriction from causing distortions in excess near the reference plane S3.

Eleventh Embodiment

Figure 31:
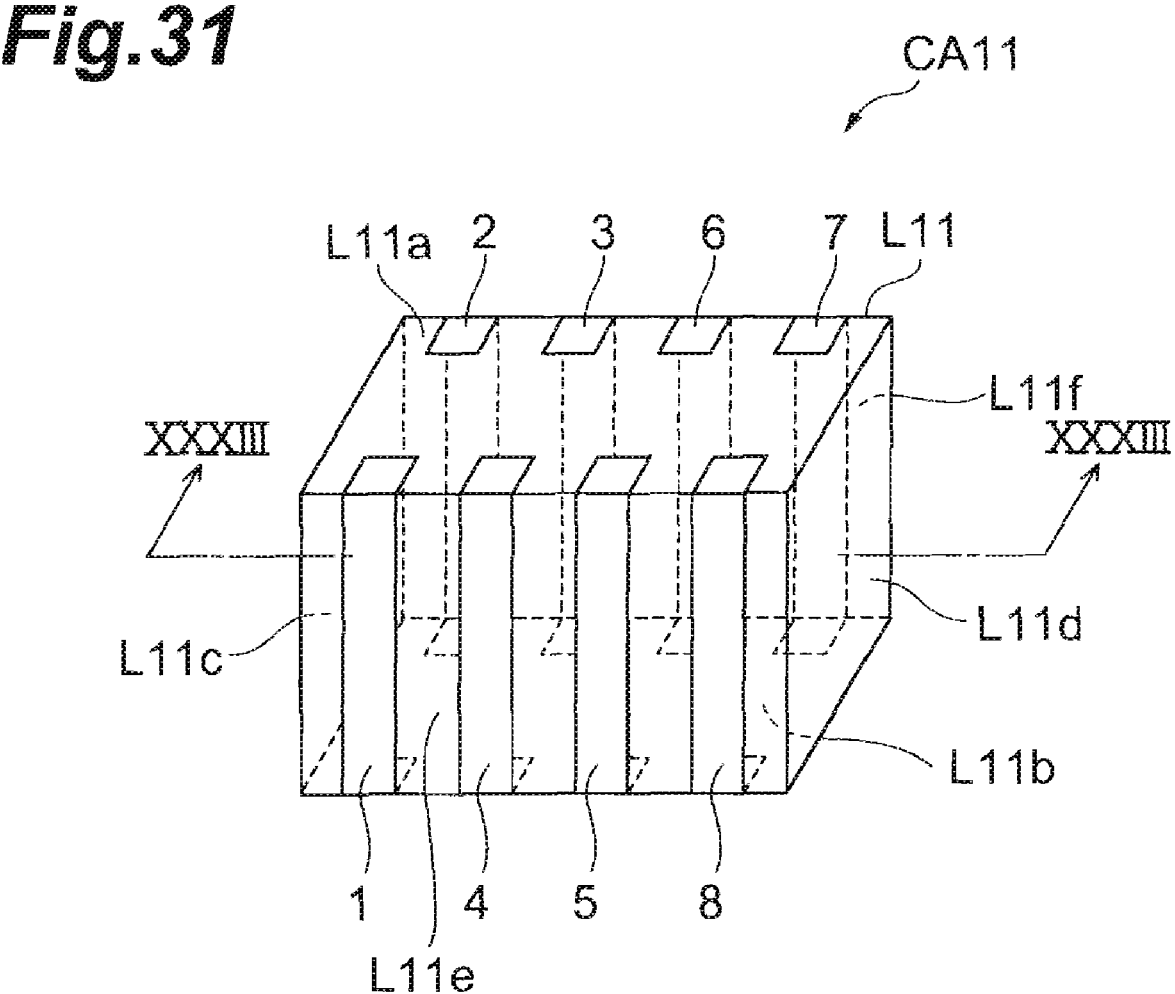
FIG. 31 is a perspective view of the multilayer capacitor array in accordance with the eleventh embodiment.
Figure 32:
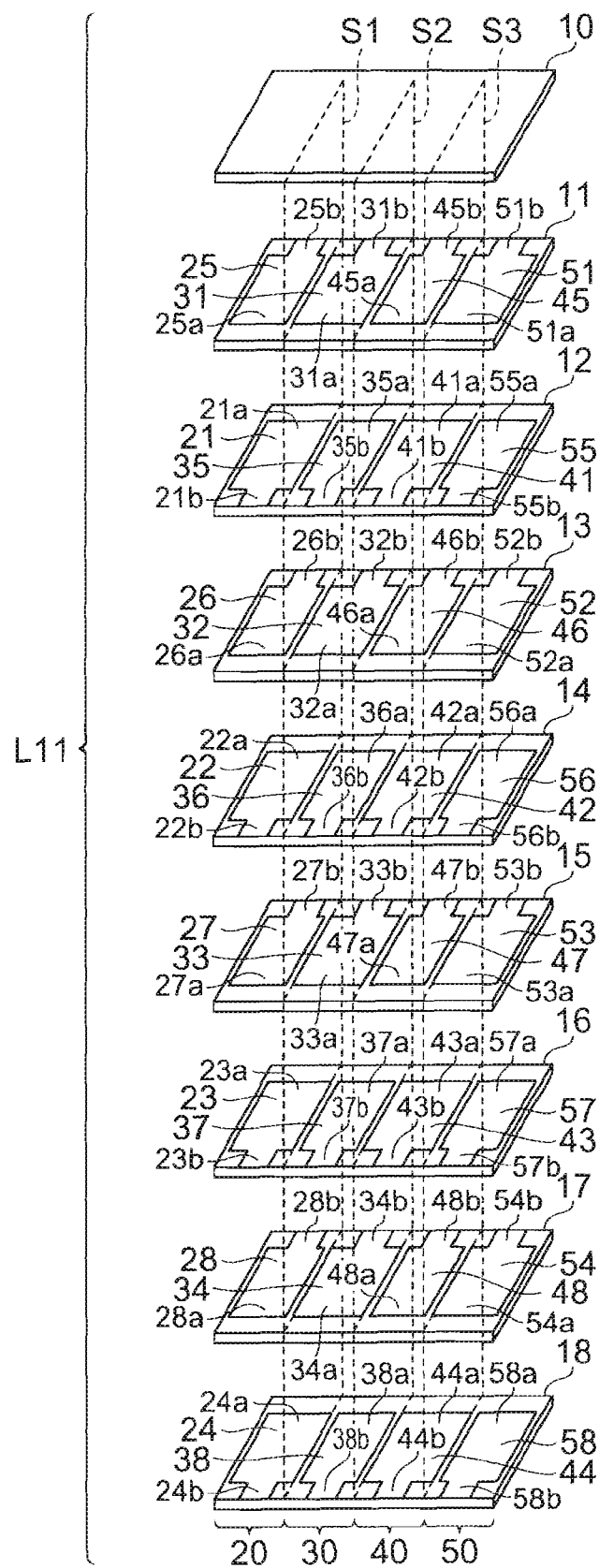
FIG. 32 is an exploded perspective view of the capacitor body included in the multilayer capacitor array in accordance with the eleventh embodiment.
Figure 33:
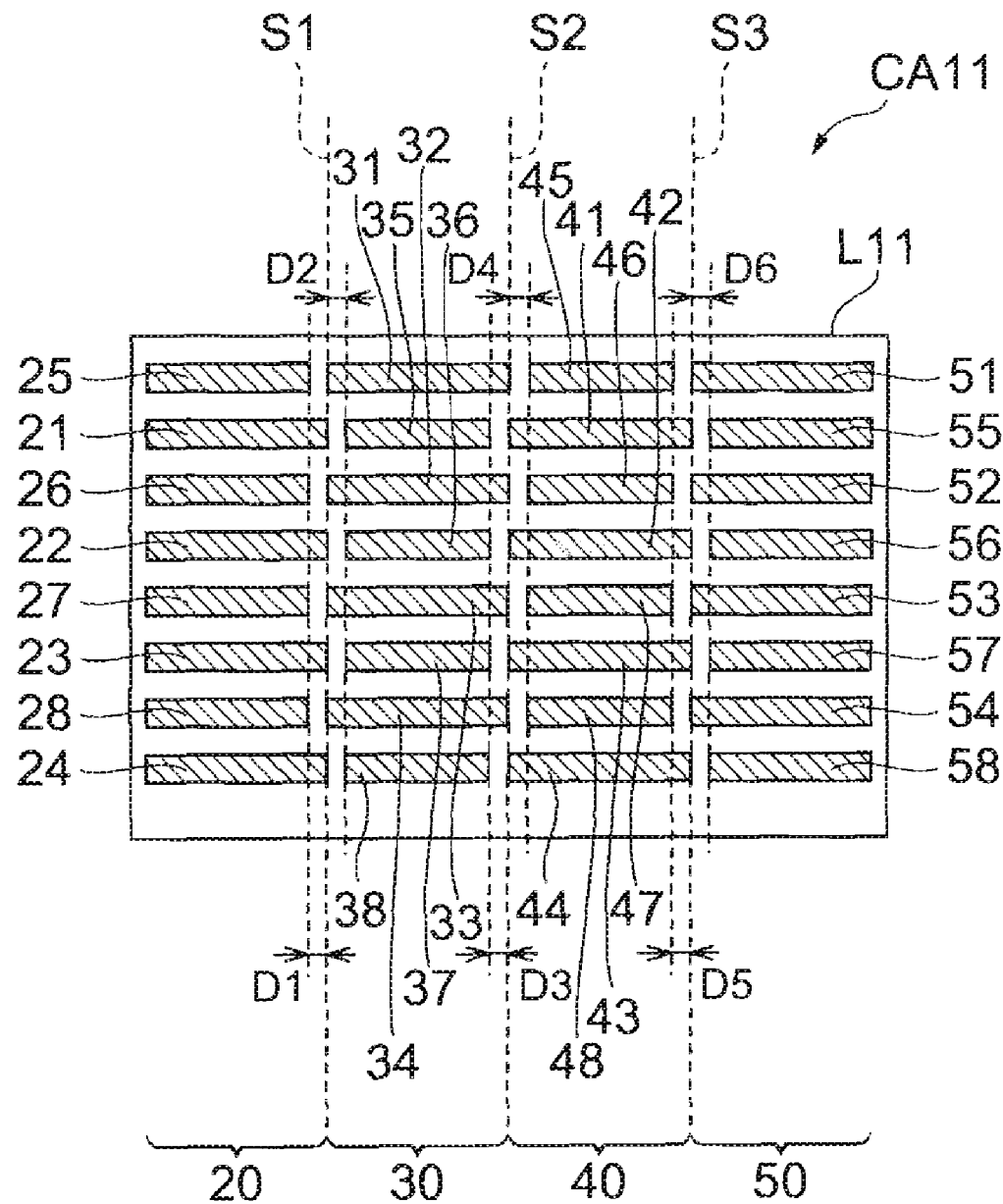
FIG. 33 is a view for explaining the structure of a cross section of the multilayer capacitor array taken along the line XXXIII-XXXIII of FIG. 31.

With reference to FIGS. 31 to 33, the structure of the multilayer capacitor array CA11 in accordance with the eleventh embodiment will be explained. The capacitor array CA11 in accordance with the eleventh embodiment differs from the capacitor array CA10 in accordance with the tenth embodiment in terms of the arrangement of first to eighth terminal electrodes and first to eighth inner electrodes. FIG. 31 is a perspective view of the multilayer capacitor array in accordance with the eleventh embodiment. FIG. 32 is an exploded perspective view of the capacitor body included in the multilayer capacitor array in accordance with the eleventh embodiment. FIG. 33 is a view for explaining the structure of a cross section of the multilayer capacitor array taken along the line XXXIII-XXXIII of FIG. 31.

As shown in FIG. 31, the multilayer capacitor array CA11 in accordance with the eleventh embodiment comprises a capacitor body L11 and first to eighth terminal electrodes 1 to 8 arranged on outer surface of the capacitor body L11.

As shown in FIG. 31, the capacitor body L11 is shaped like a rectangular parallelepiped having rectangular first and second main faces L11a, L11b opposing each other, first and second end faces L11c, L11d opposing each other and extending in the shorter-side direction of the first and second main faces L11a, L11b so as to connect them to each other, and first and second side faces L11e, L11f opposing each other and extending in the longer-side direction of the first and second main faces L11a, L11b so as to connect them to each other.

The first, fourth, fifth, and eighth terminal electrodes 1, 4, 5, 8 are successively arranged on the first side face L11e of the capacitor body L11 from the first end face L11c side to the second end face L11d side. The second, third, sixth, and seventh terminal electrodes 2, 3, 6, 7 are successively arranged on the second side face L11f of the capacitor body L11 from the first end face L11c side to the second end face L11d side. The first, fourth, fifth, and eighth terminal electrodes 1, 4, 5, 8 oppose the second, third, sixth, and seventh terminal electrodes 2, 3, 6, 7, respectively, in the opposing direction of the first and second side faces L11e, L11f.

As shown in FIG. 32, the capacitor body L11 has a plurality of (9 in this embodiment) laminated dielectric layers 10 to 18.

As shown in FIG. 32, the capacitor body L11 includes first to fourth electrode groups 20, 30, 40, 50. The first electrode group 20 has a plurality (4 layers each in this embodiment) of first and second inner electrodes 21 to 24, 25 to 28. The second electrode group 30 has a plurality (4 layers each in this embodiment) of third and fourth inner electrodes 31 to 34, 35 to 38. The third electrode group has a plurality (4 layers each in this embodiment) of fifth and sixth inner electrodes 41 to 44, 45 to 48. The fourth electrode group has a plurality (4 layers each in this embodiment) of seventh and eighth inner electrodes 51 to 54, 55 to 58.

Within the capacitor body L11, the first to fourth electrode groups 20, 30, 40, 50 are arranged in a row along the opposing direction of the first and second end faces L11c, L11d. Specifically, the first to fourth electrode groups 20, 30, 40, 50 are successively arranged from the first end face L11c side to the second end face L11d side.

The first and second inner electrodes 21 to 24, 25 to 28 included in the first electrode group 20 are arranged in the order of the second inner electrode 25, first inner electrode 21, second inner electrode 26, first inner electrode 22, second inner electrode 27, first inner electrode 23, second inner electrode 28, and first inner electrode 24 from the first main face L11a toward the second main face L11b. The third and fourth inner electrodes 31 to 34, 35 to 38 included in the second electrode group 30 are arranged in the order of the third inner electrode 31, fourth inner electrode 35, third inner electrode 32, fourth inner electrode 36, third inner electrode 33, fourth inner electrode 37, third inner electrode 34, and fourth inner electrode 38 from the first main face L11a toward the second main face L11b. The fifth and sixth inner electrodes 41 to 44, 45 to 48 included in the third electrode group 40 are arranged in the order of the sixth inner electrode 45, fifth inner electrode 41, sixth inner electrode 46, fifth inner electrode 42, sixth inner electrode 47, fifth inner electrode 43, sixth inner electrode 48, and fifth inner electrode 44 from the first main face L11a toward the second main face L11b. The seventh and eighth inner electrodes 51 to 54, 55 to 58 included in the fourth electrode group 50 are arranged in the order of the seventh inner electrode 51, eighth inner electrode 55, seventh inner electrode 52, eighth inner electrode 56, seventh inner electrode 53, eighth inner electrode 57, seventh inner electrode 54, and eighth inner electrode 58 from the first main face L11a toward the second main face L11b.

Along the opposing direction of the first and second main faces L11a, L11b, the first and second inner electrodes 21, 25 oppose each other with the dielectric layer 11 therebetween, the first and second inner electrodes 21, 26 oppose each other with the dielectric layer 12 therebetween, the first and second inner electrodes 22, 26 oppose each other with the dielectric layer 13 therebetween, the first and second inner electrodes 22, 27 oppose each other with the dielectric layer 14 therebetween, the first and second inner electrodes 23, 27 oppose each other with the dielectric layer 15 therebetween, the first and second inner electrodes 23, 28 oppose each other with the dielectric layer 16 therebetween, and the first and second inner electrodes 24, 28 oppose each other with the dielectric layer 17 therebetween.

Along the opposing direction of the first and second main faces L11a, L11b, the third and fourth inner electrodes 31, 35 oppose each other with the dielectric layer 11 therebetween, the third and fourth inner electrodes 32, 35 oppose each other with the dielectric layer 12 therebetween, the third and fourth inner electrodes 32, 36 oppose each other with the dielectric layer 13 therebetween, the third and fourth inner electrodes 33, 36 oppose each other with the dielectric layer 14 therebetween, the third and fourth inner electrodes 33, 37 oppose each other with the dielectric layer 15 therebetween, the third and fourth inner electrodes 34, 37 oppose each other with the dielectric layer 16 therebetween, and the third and fourth inner electrodes 34, 38 oppose each other with the dielectric layer 17 therebetween.

Along the opposing direction of the first and second main faces L11a, L11b, the fifth and sixth inner electrodes 41, 45 oppose each other with the dielectric layer 11 therebetween, the fifth and sixth inner electrodes 41, 46 oppose each other with the dielectric layer 12 therebetween, the fifth and sixth inner electrodes 42, 46 oppose each other with the dielectric layer 13 therebetween, the fifth and sixth inner electrodes 42, 47 oppose each other with the dielectric layer 14 therebetween, the fifth and sixth inner electrodes 43, 47 oppose each other with the dielectric layer 15 therebetween, the fifth and sixth inner electrodes 43, 48 oppose each other with the dielectric layer 16 therebetween, and the fifth and sixth inner electrodes 44, 48 oppose each other with the dielectric layer 17 therebetween.

Along the opposing direction of the first and second main faces L11a, L11b, the seventh and eighth inner electrodes 51, 55 oppose each other with the dielectric layer 11 therebetween, the seventh and eighth inner electrodes 52, 55 oppose each other with the dielectric layer 12 therebetween, the seventh and eighth inner electrodes 52, 56 oppose each other with the dielectric layer 13 therebetween, the seventh and eighth inner electrodes 53, 56 oppose each other with the dielectric layer 14 therebetween, the seventh and eighth inner electrodes 53, 57 oppose each other with the dielectric layer 15 therebetween, the seventh and eighth inner electrodes 54, 57 oppose each other with the dielectric layer 16 therebetween, and the seventh and eighth inner electrodes 54, 58 oppose each other with the dielectric layer 17 therebetween.

The first inner electrodes 21 to 24 include main electrode portions 21a to 24a and lead portions 21b to 24b extending from the main electrode portions 21a to 24a so as to be exposed at the first side face L11e. The lead portions 21b to 24b are physically and electrically connected to the first terminal electrode 1.

The second inner electrodes 25 to 28 include main electrode portions 25a to 28a and lead portions 25b to 28b extending from the main electrode portions 25a to 28a so as to be exposed at the second side face L11f. The lead portions 25b to 28b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the second side face L11f. The lead portions 31b to 34b are physically and electrically connected to the third terminal electrode 3.

The fourth inner electrodes 35 to 38 include main electrode portions 35a to 38a and lead portions 35b to 38b extending from the main electrode portions 35a to 38a so as to be exposed at the first side face L11e. The lead portions 35b to 38b are physically and electrically connected to the fourth terminal electrode 4.

The fifth inner electrodes 41 to 44 include main electrode portions 41a to 44a and lead portions 41b to 44b extending from the main electrode portions 41a to 44a so as to be exposed at the first side face L11e. The lead portions 41b to 44b are physically and electrically connected to the fifth terminal electrode 5.

The sixth inner electrodes 45 to 48 include main electrode portions 45a to 48a and lead portions 45b to 48b extending from the main electrode portions 45a to 48a so as to be exposed at the second side face L11f. The lead portions 45b to 48b are physically and electrically connected to the sixth terminal electrode 6.

The seventh inner electrodes 51 to 54 include main electrode portions 51a to 54a and lead portions 51b to 54b extending from the main electrode portions 51a to 54a so as to be exposed at the second side face L11f. The lead portions 51b to 54b are physically and electrically connected to the seventh terminal electrode 7.

The eighth inner electrodes 55 to 58 include main electrode portions 55a to 58a and lead portions 55b to 58b extending from the main electrode portions 55a to 58a so as to be exposed at the first side face L11e. The lead portions 55b to 58b are physically and electrically connected to the eighth terminal electrode 8.

As shown in FIGS. 32 and 33, a virtual plane parallel to the opposing direction of the first and second main faces L11a, L11b is taken as a virtual reference plane S1. The first and second electrode groups 20, 30 are arranged in a row along a direction orthogonal to the opposing direction of the first and second main faces L11a, L11b which is a direction orthogonal to the reference plane S1. Namely, within the capacitor body L11, the first and second inner electrodes 21 to 24, 25 to 28 are arranged on the first end face L11c side of the reference plane S1, while the third and fourth inner electrodes 31 to 34, 35 to 38 are arranged on the second end face L11d side of the reference plane S1.

Further, a virtual plane parallel to the opposing direction of the first and second main faces L11a, L11b is taken as a virtual reference plane S2. The second and third electrode groups 30, 40 are arranged in a row along a direction orthogonal to the opposing direction of the first and second main faces L11a, L11b which is a direction orthogonal to the reference plane S2. Namely, within the capacitor body L11, the third and fourth inner electrodes 31 to 34, 35 to 38 are arranged on the first end face L11c side of the reference plane S2, while the fifth and sixth inner electrodes 41 to 44, 45 to 48 are arranged on the second end face L11d side of the reference plane S2.

Furthermore, a virtual plane parallel to the opposing direction of the first and second main faces L11a, L11b is taken as a virtual reference plane S3. The third and fourth electrode groups 40, 50 are arranged in a row along a direction orthogonal to the opposing direction of the first and second main faces L11a, L11b which is a direction orthogonal to the reference plane S3. Namely, within the capacitor body L11, the fifth and sixth inner electrodes 41 to 44, 45 to 48 are arranged on the first end face L11c side of the reference plane S3, while the seventh and eighth inner electrodes 51 to 54, 55 to 58 are arranged on the second end face L11d side of the reference plane S3.

The first inner electrodes 21 to 24 are arranged such that the sides on the second end face L11d side of the main electrode portions 21a to 24a are in contact with the reference plane S1. The second inner electrodes 25 to 28 are arranged such that the sides on the second end face L11d side of the main electrode portions 25a to 28a are separated from the reference plane S1 by a predetermined distance D1 toward the first end face L11c.

The sides on the first end face L11c side of the main electrode portions 31a to 34a of the third inner electrodes 31 to 34 are in contact with the reference plane S1. The sides on the second end face L11d side of the main electrode portions 31a to 34a of the third inner electrodes 31 to 34 are in contact with the reference plane S2.

The fourth inner electrodes 35 to 38 are arranged such that the sides on the first end face L11c side of the main electrode portions 35a to 38a are separated from the reference plane S1 by a predetermined distance D2 toward the second end face L11d. The fourth inner electrodes 35 to 38 are arranged such that the sides on the second end face L11d side of the main electrode portions 35a to 38a are separated from the reference plane S2 by a predetermined distance D3 toward the first end face L11c.

The sides on the first end face L11c side of the main electrode portions 41a to 44a of the fifth inner electrodes 41 to 44 are in contact with the reference plane S2. The sides on the second end face L11d side of the main electrode portions 41a to 44a of the fifth inner electrodes 41 to 44 are in contact with the reference plane S3.

The sixth inner electrodes 45 to 48 are arranged such that the sides on the first end face L11c side of the main electrode portions 45a to 48a are separated from the reference plane S2 by a predetermined distance D4 toward the second end face L11d. The sixth inner electrodes 45 to 48 are arranged such that the sides on the second end face L11d side of the main electrode portions 45a to 48a are separated from the reference plane S3 by a predetermined distance D5 toward the first end face L11c.

The seventh inner electrodes 51 to 54 are arranged such that the sides on the first end face L11c side of the main electrode portions 51a to 54a are in contact with the reference plane S3. The eighth inner electrodes 55 to 58 are arranged such that the sides on the first end face L11c side of the main electrode portions 55a to 58a are separated from the reference plane S3 by a predetermined distance D6 toward the second end face L11d.

In the multilayer capacitor array CA11, the first and second inner electrodes 21 to 24, 25 to 28 include inner electrodes opposing each other with dielectric layers therebetween, and these opposing first and second inner electrodes form one of capacitors included in the multilayer capacitor array CA11.

In the multilayer capacitor array CA11, the third and fourth inner electrodes 31 to 34, 35 to 38 include inner electrodes opposing each other with dielectric layers therebetween, and these opposing thirds and fourth inner electrodes form one of the capacitors included in the multilayer capacitor array CA11.

In the multilayer capacitor array CA11, the fifth and sixth inner electrodes 41 to 44, 45 to 48 include inner electrodes opposing each other with dielectric layers therebetween, and these opposing fifth and sixth inner electrodes form one of the capacitors included in the multilayer capacitor array CA11.

In the multilayer capacitor array CA11, the seventh and eighth inner electrodes 51 to 54, 55 to 58 include inner electrodes opposing each other with dielectric layers therebetween, and these opposing seventh and eighth inner electrodes form one of the capacitors included in the multilayer capacitor array CA11.

When a voltage is applied to the capacitor formed by the first and second inner electrodes 21 to 24, 25 to 28 and the capacitor formed by the third and fourth inner electrodes 31 to 34, 35 to 38 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA11 as mentioned above. This restrains stresses from being concentrated near the reference plane S1.

When a voltage is applied to the capacitor formed by the third and fourth inner electrodes 31 to 34, 35 to 38 and the capacitor formed by the fifth and sixth inner electrodes 41 to 44, 45 to 48 so that electrostriction is generated in each capacitor, electrostriction also occurs near the reference plane S2, since the third and fifth inner electrodes 31 to 34, 41 to 44 are arranged in contact with the reference plane S2 in the multilayer capacitor array CA11. This restrains stresses from being concentrated near the reference plane S2.

When a voltage is applied to the capacitor formed by the fifth and sixth inner electrodes 41 to 44, 45 to 48 and the capacitor formed by the seventh and eighth inner electrodes 51 to 54, 55 to 58 so that electrostriction is generated in each capacitor, electrostriction also occurs near the reference plane S3, since the fifth and seventh inner electrodes 41 to 44, 51 to 54 are arranged in contact with the reference plane S3 in the multilayer capacitor array CA11. This restrains stresses from being concentrated near the reference plane S3.

Restraining stresses from being concentrated can also keep cracks from occurring in the multilayer capacitor array CA11.

While the first inner electrodes 21 to 24 are in contact with the reference plane S1, the second inner electrodes 25 to 28 are positioned such as to be separated from the reference plane S1 by the predetermined distance D1. While the third inner electrodes 31 to 34 are in contact with the reference plane S1, the fourth inner electrodes 35 to 38 are positioned such as to be separated from the reference plane S1 by the predetermined distance D2. This restrains electrostriction from causing distortions in excess near the reference plane S1.

While the third inner electrodes 31 to 34 are in contact with the reference plane S2, the fourth inner electrodes 35 to 38 are positioned such as to be separated from the reference plane S2 by the predetermined distance D3. While the fifth inner electrodes 41 to 44 are in contact with the reference plane S2, the sixth inner electrodes 45 to 48 are positioned such as to be separated from the reference plane S2 by the predetermined distance D4. This restrains electrostriction from causing distortions in excess near the reference plane S2.

While the fifth inner electrodes 41 to 44 are in contact with the reference plane S3, the sixth inner electrodes 45 to 48 are positioned such as to be separated from the reference plane S3 by the predetermined distance D5. While the seventh inner electrodes 51 to 54 are in contact with the reference plane S3, the eighth inner electrodes 55 to 58 are positioned such as to be separated from the reference plane S3 by the predetermined distance D6. This restrains electrostriction from causing distortions in excess near the reference plane S3.

Twelfth Embodiment

Figure 34:
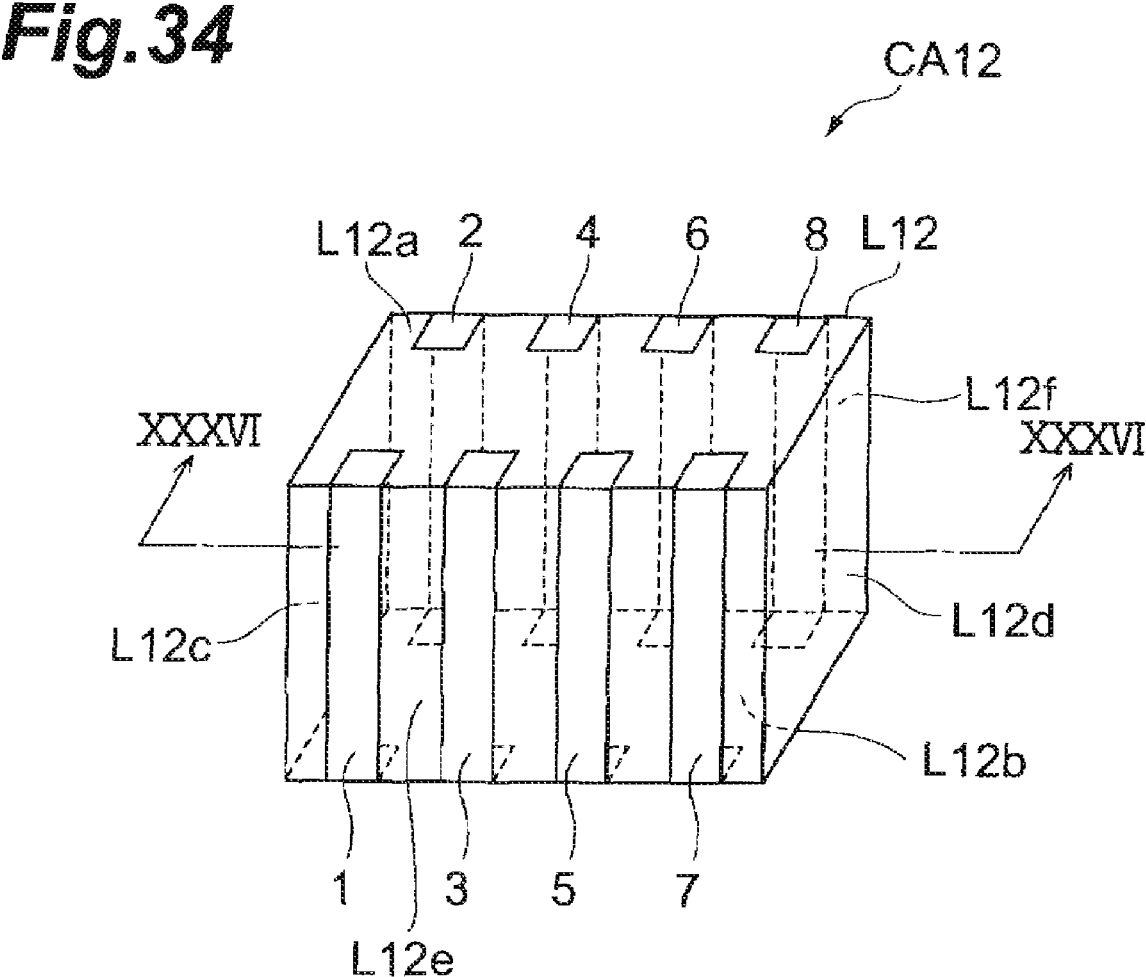
FIG. 34 is a perspective view of the multilayer capacitor array in accordance with the twelfth embodiment.
Figure 35:
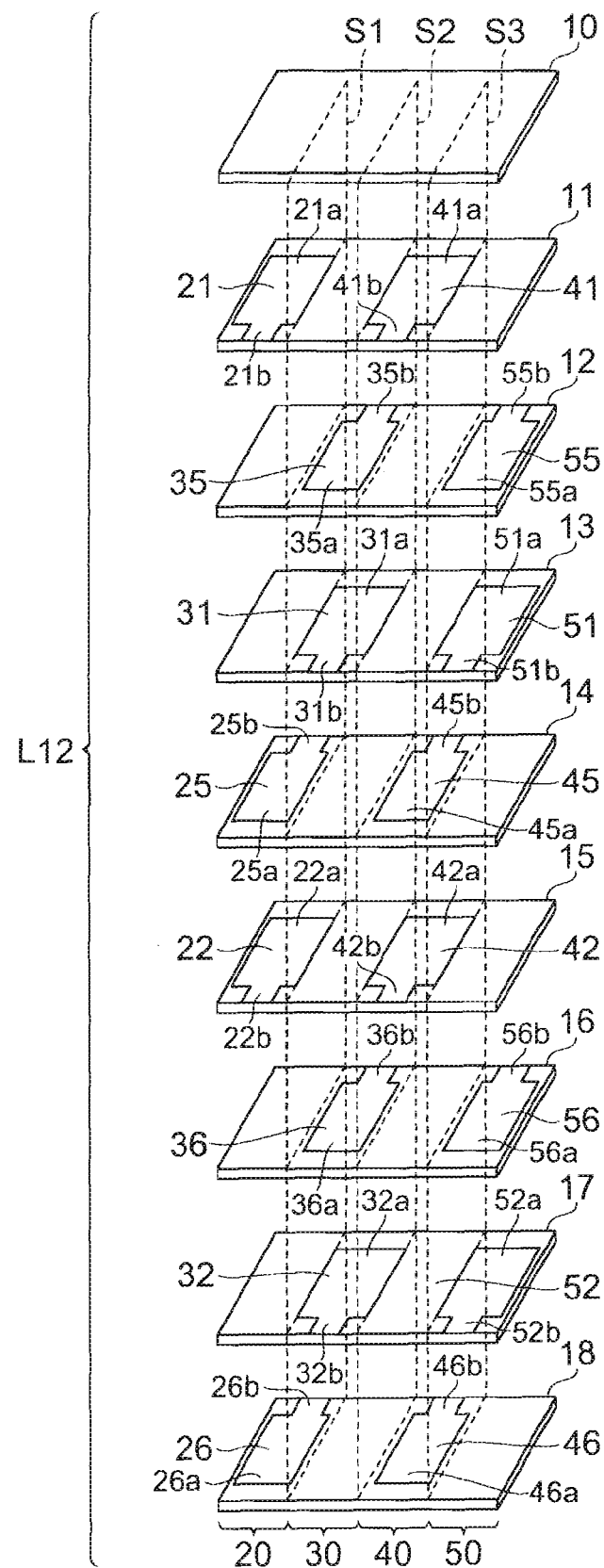
FIG. 35 is an exploded perspective view of the capacitor body included in the multilayer capacitor array in accordance with the twelfth embodiment.
Figure 36:
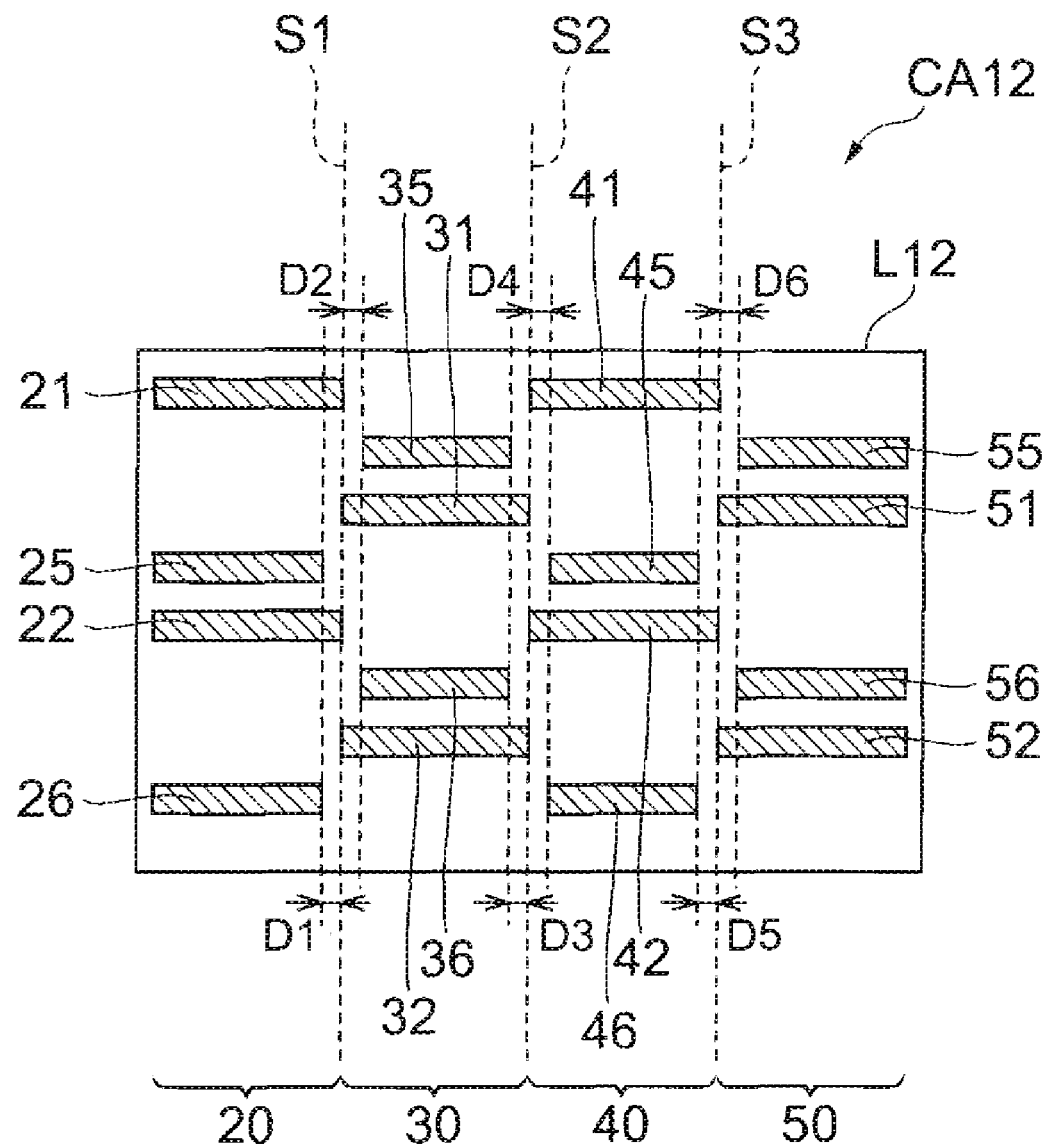
FIG. 36 is a view for explaining the structure of a cross section of the multilayer capacitor array taken along the line XXXVI-XXXVI of FIG. 34.

With reference to FIGS. 34 to 36, the structure of the multilayer capacitor array CA12 in accordance with the twelfth embodiment will be explained. The capacitor array CA12 in accordance with the twelfth embodiment differs from the capacitor array CA10 in accordance with the tenth embodiment in terms of the arrangement of first to eighth inner electrodes. FIG. 34 is a perspective view of the multilayer capacitor array in accordance with the twelfth embodiment. FIG. 35 is an exploded perspective view of the capacitor body included in the multilayer capacitor array in accordance with the twelfth embodiment. FIG. 36 is a view for explaining the structure of a cross section of the multilayer capacitor array taken along the line XXXVI-XXXVI of FIG. 34.

As shown in FIG. 34, the multilayer capacitor array CA12 in accordance with the twelfth embodiment comprises a capacitor body L12 and first to eighth terminal electrodes 1 to 8 arranged on outer surface of the capacitor body L12.

As shown in FIG. 34, the capacitor body L12 is shaped like a rectangular parallelepiped having rectangular first and second main faces L12a, L12b opposing each other, first and second end faces L12c, L12d opposing each other and extending in the shorter-side direction of the first and second main faces L12a, L12b so as to connect them to each other, and first and second side faces L12e, L12f opposing each other and extending in the longer-side direction of the first and second main faces L12a, L12b so as to connect them to each other.

The first, third, fifth, and seventh terminal electrodes 1, 3, 5, 7 are successively arranged on the first side face L12e of the capacitor body L12 from the first end face L12c side to the second end face L12d side. The second, fourth, sixth, and eighth terminal electrodes 2, 4, 6, 8 are successively arranged on the second side face L12f of the capacitor body L12 from the first end face L12c side to the second end face L12d side. The first, third, fifth, and seventh terminal electrodes 1, 3, 5, 7 oppose the second, fourth, sixth, and eighth terminal electrodes 2, 4, 6, 8, respectively, in the opposing direction of the first and second side faces L12e, L12f.

As shown in FIG. 35, the capacitor body L12 has a plurality of (9 in this embodiment) laminated dielectric layers 10 to 18.

As shown in FIG. 35, the capacitor body L12 includes first to fourth electrode groups 20, 30, 40, 50. The first electrode group 20 has a plurality (2 layers each in this embodiment) of first and second inner electrodes 21, 22, 25, 26. The second electrode group 30 has a plurality (2 layers each in this embodiment) of third and fourth inner electrodes 31, 32, 35, 36. The third electrode group 40 has a plurality (2 layers each in this embodiment) of fifth and sixth inner electrodes 41, 42, 45, 46. The fourth electrode group 50 has a plurality (2 layers each in this embodiment) of seventh and eighth inner electrodes 51, 52, 55, 56.

Within the capacitor body L12, the first to fourth electrode groups 20, 30, 40, 50 are arranged in a row along the opposing direction of the first and second end faces L12c, L12d. Specifically, the first to fourth electrode groups 20, 30, 40, 50 are successively arranged from the first end face L11c side to the second end face L12d side.

The first and second inner electrodes 21, 22, 25, 26 included in the first electrode group 20 are arranged in the order of the first inner electrode 21, second inner electrode 25, first inner electrode 22, and second inner electrode 26 from the first main face L12a toward the second main face L12b. The third and fourth inner electrodes 31, 32, 35, 36 included in the second electrode group 30 are arranged in the order of the fourth inner electrode 35, third inner electrode 31, fourth inner electrode 36, and third inner electrode 32 from the first main face L12a toward the second main face L12b. The fifth and sixth inner electrodes 41, 42, 45, 46 included in the third electrode group 40 are arranged in the order of the fifth inner electrode 41, sixth inner electrode 45, fifth inner electrode 42, and sixth inner electrode 46 from the first main face L12a toward the second main face L12b. The seventh and eighth inner electrodes 51, 52, 55, 56 included in the fourth electrode group 50 are arranged in the order of the eighth inner electrode 55, seventh inner electrode 51, eighth inner electrode 56, and seventh inner electrode 52 from the first main face L12a toward the second main face L12b.

Within the capacitor body L12, the first and second inner electrodes 21, 22, 25, 26 are arranged at positions different from any of the third and fourth inner electrodes 31, 32, 35, 36 and seventh and eighth inner electrodes 51, 52, 55, 56 in the opposing direction of the first and second main faces L12a, L12b.

Within the capacitor body L12, the third and fourth inner electrodes 31, 32, 35, 36 are arranged at positions different from any of the first and second inner electrodes 21, 22, 25, 26 and fifth and sixth inner electrodes 41, 42, 45, 46 in the opposing direction of the first and second main faces L12a, L12b.

Within the capacitor body L12, the fifth and sixth inner electrodes 41, 42, 45, 46 are arranged at positions different from any of the third and fourth inner electrodes 31, 32, 35, 36 and seventh and eighth inner electrodes 51, 52, 55, 56 in the opposing direction of the first and second main faces L12a, L12b.

Within the capacitor body L12, the seventh and eighth inner electrodes 51, 52, 55, 56 are arranged at positions different from any of the first and second inner electrodes 21, 22, 25, 26 and fifth and sixth inner electrodes 41, 42, 45, 46 in the opposing direction of the first and second main faces L12a, L12b.

Within the capacitor body L12, the first inner electrode 21 and fifth inner electrode 41 are arranged on the same layer, the second inner electrode 25 and sixth inner electrode 45 are arranged on the same layer, the first inner electrode 22 and fifth inner electrode 42 are arranged on the same layer, and the second inner electrode 26 and sixth inner electrode 46 are arranged on the same layer in the opposing direction of the first and second main faces L12a, L12b. Within the capacitor body L12, the fourth inner electrode 35 and eighth inner electrode 55 are arranged on the same layer, the third inner electrode 31 and seventh inner electrode 51 are arranged on the same layer, the fourth inner electrode 36 and eighth inner electrode 56 are arranged on the same layer, and the third inner electrode 32 and seventh inner electrode 52 are arranged on the same layer in the opposing direction of the first and second main faces L12a, L12b.

The first and second inner electrodes 22, 25 oppose each other with the dielectric layer 14 therebetween along the opposing direction of the first and second main faces L12a, L12b. Along the opposing direction of the first and second main faces L12a, L12b, the first and second inner electrodes 21, 25 oppose each other with three dielectric layers 11, 12, 13 therebetween, and the first and second inner electrodes 22, 26 oppose each other with three dielectric layers 15, 16, 17 therebetween.

Along the opposing direction of the first and second main faces L12a, L12b, the third and fourth inner electrodes 31, 35 oppose each other with the dielectric layer 12 therebetween, and the third and fourth inner electrodes 32, 36 oppose each other with the dielectric layer 16 therebetween. The third and fourth inner electrodes 31, 36 oppose each other with three dielectric layers 13, 14, 15 therebetween along the opposing direction of the first and second main faces L12a, L12b.

When seen in the opposing direction of the first and second main faces L12a, L12b, the first main face L11a and fourth inner electrode 35 are arranged adjacent to each other with the dielectric layers 10, 11 therebetween. When seen in the opposing direction of the first and second main faces L12a, L12b, the second main face L12b and third inner electrode 32 are arranged adjacent to each other with the dielectric layers 17, 18 therebetween.

The fifth and sixth inner electrodes 42, 45 oppose each other with the dielectric layer 14 therebetween along the opposing direction of the first and second main faces L12a, L12b. Along the opposing direction of the first and second main faces L12a, L12b, the fifth and sixth inner electrodes 41, 45 oppose each other with three dielectric layers 11, 12, 13 therebetween, and the fifth and sixth inner electrodes 42, 46 oppose each other with three dielectric layers 15, 16, 17 therebetween.

Along the opposing direction of the first and second main faces L12a, L12b, the seventh and eighth inner electrodes 51, 55 oppose each other with the dielectric layer 12 therebetween, and the seventh and eighth inner electrodes 52, 56 oppose each other with the dielectric layer 16 therebetween. The seventh and eighth inner electrodes 51, 56 oppose each other with three dielectric layers 13, 14, 15 therebetween along the opposing direction of the first and second main faces L12a, L12b.

When seen in the opposing direction of the first and second main faces L12a, L12b, the first main face L12a and eighth inner electrode 55 are arranged adjacent to each other with the dielectric layers 10, 11 therebetween. When seen in the opposing direction of the first and second main faces L12a, L12b, the second main face L12b and seventh inner electrode 52 are arranged adjacent to each other with the dielectric layers 17, 18 therebetween.

The first inner electrodes 21, 22 include main electrode portions 21a, 22a and lead portions 21b, 22b extending from the main electrode portions 21a, 22a so as to be exposed at the first side face L12e. The lead portions 21b, 22b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side face L12f. The lead portions 25b, 26b are physically and electrically connected to the second terminal electrode 2.

The third inner electrodes 31, 32 include main electrode portions 31a, 32a and lead portions 31b, 32b extending from the main electrode portions 31a, 32a so as to be exposed at the first side face L12e. The lead portions 31b, 32b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the second side face L12f. The lead portions 35b, 36b are physically and electrically connected to the fourth terminal electrode 4.

The fifth inner electrodes 41, 42 include main electrode portions 41a, 42a and lead portions 41b, 42b extending from the main electrode portions 41a, 42a so as to be exposed at the first side face L12e. The lead portions 41b, 42b are physically and electrically connected to the fifth terminal electrode 5.

The sixth inner electrodes 45, 46 include main electrode portions 45a, 46a and lead portions 45b, 46b extending from the main electrode portions 45a, 46a so as to be exposed at the second side face L12f. The lead portions 45b, 46b are physically and electrically connected to the sixth terminal electrode 6.

The seventh inner electrodes 51, 52 include main electrode portions 51a, 52a and lead portions 51b, 52b extending from the main electrode portions 51a, 52a so as to be exposed at the first side face L12e. The lead portions 51b, 52b are physically and electrically connected to the seventh terminal electrode 7.

The eighth inner electrodes 55, 56 include main electrode portions 55a, 56a and lead portions 55b, 56b extending from the main electrode portions 55a, 56a so as to be exposed at the second side face L12f. The lead portions 55b, 56b are physically and electrically connected to the eighth terminal electrode 8.

As shown in FIGS. 35 and 36, a virtual plane parallel to the opposing direction of the first and second main faces L12a, L12b is taken as a virtual reference plane S1. The first and second electrode groups 20, 30 are arranged in a row along a direction orthogonal to the opposing direction of the first and second main faces L12a, L12b which is a direction orthogonal to the reference plane S1. Namely, within the capacitor body L12, the first and second inner electrodes 21, 22, 25, 26 are arranged on the first end face L12c side of the reference plane S1, while the third and fourth inner electrodes 31, 32, 35, 36 are arranged on the second end face L12d side of the reference plane S1.

Further, a virtual plane parallel to the opposing direction of the first and second main faces L12a, L12b is taken as a virtual reference plane S2. The second and third electrode groups 30, 40 are arranged in a row along a direction orthogonal to the opposing direction of the first and second main faces L12a, L12b which is a direction orthogonal to the reference plane S2. Namely, within the capacitor body L12, the third and fourth inner electrodes 31, 32, 35, 36 are arranged on the first end face L12c side of the reference plane S2, while the fifth and sixth inner electrodes 41, 42, 45, 46 are arranged on the second end face L12d side of the reference plane S2.

Furthermore, a virtual plane parallel to the opposing direction of the first and second main faces L12a, L12b is taken as a virtual reference plane S3. The third and fourth electrode groups 40, 50 are arranged in a row along a direction orthogonal to the opposing direction of the first and second main faces L12a, L12b which is a direction orthogonal to the reference plane S3. Namely, within the capacitor body L12, the fifth and sixth inner electrodes 41, 42, 45, 46 are arranged on the first end face L12c side of the reference plane S3, while the seventh and eighth inner electrodes 51, 52, 55, 56 are arranged on the second end face L12d side of the reference plane S3.

The first inner electrodes 21, 22 are arranged such that the sides on the second end face L12d side of the main electrode portions 21a, 22a are in contact with the reference plane S1. The second inner electrodes 25, 26 are arranged such that the sides on the second end face L12d side of the main electrode portions 25a, 26a are separated from the reference plane S1 by a predetermined distance D1 toward the first end face L12c.

The sides on the first end face L12c side of the main electrode portions 31a, 32a of the third inner electrodes 31, 32 are in contact with the reference plane S1. The sides on the second end face L12d side of the main electrode portions 31a, 32a of the third inner electrodes 31, 32 are in contact with the reference plane S2.

The fourth inner electrodes 35, 36 are arranged such that the sides on the first end face L12c side of the main electrode portions 35a, 36a are separated from the reference plane S1 by a predetermined distance D2 toward the second end face L12d. The fourth inner electrodes 35, 36 are arranged such that the sides on the second end face L12d side of the main electrode portions 35a, 36a are separated from the reference plane S2 by a predetermined distance D3 toward the first end face L12c.

The sides on the first end face L12c side of the main electrode portions 41a, 42a of the fifth inner electrodes 41, 42 are in contact with the reference plane S2. The sides on the second end face L12d side of the main electrode portions 41a, 42a of the fifth inner electrodes 41, 42 are in contact with the reference plane S3.

The sixth inner electrodes 45, 46 are arranged such that the sides on the first end face L12c side of the main electrode portions 45a, 46a are separated from the reference plane S2 by a predetermined distance D2 toward the second end face L12d. The sixth inner electrodes 45, 46 are arranged such that the sides on the second end face L12d side of the main electrode portions 45a, 46a are separated from the reference plane S3 by a predetermined distance D5 toward the first end face L12c.

The seventh inner electrodes 51, 52 are arranged such that the sides on the first end face L12c side of the main electrode portions 51a, 52a are in contact with the reference plane S3. The eighth inner electrodes 55, 563 are arranged such that the sides on the first end face L12c side of the main electrode portions 55a, 56a are separated from the reference plane S3 by a predetermined distance D6 toward the second end face L12d.

In the multilayer capacitor array CA12, the first and second inner electrodes 21, 22, 25, 26 include inner electrodes opposing each other with dielectric layers therebetween, and these opposing first and second inner electrodes form one of capacitors included in the multilayer capacitor array CA12.

In the multilayer capacitor array CA12, the third and fourth inner electrodes 31, 32, 35, 36 include inner electrodes opposing each other with dielectric layers therebetween, and these opposing third and fourth inner electrodes form one of the capacitors included in the multilayer capacitor array CA12.

In the multilayer capacitor array CA12, the fifth and sixth inner electrodes 41, 42, 45, 46 include inner electrodes opposing each other with dielectric layers therebetween, and these opposing fifth and sixth inner electrodes form one of the capacitors included in the multilayer capacitor array CA12.

In the multilayer capacitor array CA12, the seventh and eighth inner electrodes 51, 52, 55, 56 include inner electrodes opposing each other with dielectric layers therebetween, and these opposing seventh and eighth inner electrodes form one of the capacitors included in the multilayer capacitor array CA12.

When a voltage is applied to the capacitor formed by the first and second inner electrodes 21, 22, 25, 26 and the capacitor formed by the third and fourth inner electrodes 31, 32, 35, 36 so that electrostriction is generated in each capacitor, electrostriction also occurs near the reference plane S1, since the first and third inner electrodes 21, 22, 31, 32 are arranged in contact with the reference plane S1 in the multilayer capacitor array CA12 as mentioned above. This restrains stresses from being concentrated near the reference plane S1.

When a voltage is applied to the capacitor formed by the third and fourth inner electrodes 31, 32, 35, 36 and the capacitor formed by the fifth and sixth inner electrodes 41, 42, 45, 46 so that electrostriction is generated in each capacitor, electrostriction also occurs near the reference plane S2, since the third and fifth inner electrodes 31, 32, 41, 42 are arranged in contact with the reference plane S2 in the multilayer capacitor array CA12. This restrains stresses from being concentrated near the reference plane S2.

When a voltage is applied to the capacitor formed by the fifth and sixth inner electrodes 41, 42, 45, 46 and the capacitor formed by the seventh and eighth inner electrodes 51, 52, 55, 56 so that electrostriction is generated in each capacitor, electrostriction also occurs near the reference plane S3, since the fifth and seventh inner electrodes 41, 42, 51, 52 are arranged in contact with the reference plane S3 in the multilayer capacitor array CA12. This restrains stresses from being concentrated near the reference plane S3.

Restraining stresses from being concentrated can also keep cracks from occurring in the multilayer capacitor array CA12.

While the first inner electrodes 21, 22 are in contact with the reference plane S1, the second inner electrodes 25, 26 are positioned such as to be separated from the reference plane S1 by the predetermined distance D1. While the third inner electrodes 31, 32 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31, 32 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45, 46 are positioned such as to be separated from the reference plane S2 by the predetermined distance D4. This restrains electrostriction from causing distortions in excess near the reference plane S2.

While the fifth inner electrodes 41, 42 are in contact with the reference plane S3, the sixth inner electrodes 45, 46 are positioned such as to be separated from the reference plane S3 by the predetermined distance D5. While the seventh inner electrodes 51, 52 are in contact with the reference plane S3, the eighth inner electrodes 55, 56 are positioned such as to be separated from the reference plane S3 by the predetermined distance D6. This restrains electrostriction from causing distortions in excess near the reference plane S3.

The third and fourth inner electrodes 31, 32, 35, 36 and seventh and eighth inner electrodes 51, 52, 55, 56 are arranged at positions different from any of the first and second inner electrodes 21, 22, 25, 26 in the opposing direction of the first and second main faces L12a, L12b. Therefore, in the multilayer capacitor array CA12, three dielectric layers 11, 12, 13 can be arranged between the first and second inner electrodes 21, 25, and three dielectric layers 15, 16, 17 can be arranged between the first and second inner electrodes 22, 26. As a result, an electrostriction alleviating layer can be made greater, whereby the multilayer capacitor array CA12 can restrain vibrations from being caused by electrostriction.

The first and second inner electrodes 21, 22, 25, 26 and fifth and sixth inner electrodes 41, 42, 45, 46 are arranged at positions different from any of the third and fourth inner electrodes 31, 32, 35, 36 in the opposing direction of the first and second main faces L12a, L12b. Therefore, in the multilayer capacitor array CA12, three dielectric layers 13, 14, 15 can be arranged between the third and fourth inner electrodes 31, 36. Further, in the multilayer capacitor array CA12, two dielectric layers 10, 11 can be arranged between the first main face L12a and fourth inner electrode 35, and two dielectric layers 17, 18 can be arranged between the third inner electrode 32 and second main face L12b. As a result, an electrostriction alleviating layer can be made greater, whereby the multilayer capacitor array CA12 can restrain vibrations from being caused by electrostriction.

The third and fourth inner electrodes 31, 32, 35, 36 and seventh and eighth inner electrodes 51, 52, 55, 56 are arranged at positions different from any of the fifth and sixth inner electrodes 41, 42, 45, 46 in the opposing direction of the first and second main faces L12a, L12b. Therefore, in the multilayer capacitor array CA12, three dielectric layers 11, 12, 13 can be arranged between the fifth and sixth inner electrodes 41, 45, and three dielectric layers 15, 16, 17 can be arranged between the fifth and sixth inner electrodes 42, 46. As a result, an electrostriction alleviating layer can be made greater, whereby the multilayer capacitor array CA12 can restrain vibrations from being caused by electrostriction.

The first and second inner electrodes 21, 22, 25, 26 and fifth and sixth inner electrodes 41, 42, 45, 46 are arranged at positions different from any of the seventh and eighth inner electrodes 51, 52, 55, 56 in the opposing direction of the first and second main faces L12a, L12b. Therefore, in the multilayer capacitor array CA12, three dielectric layers 13, 14, 15 can be arranged between the seventh and eighth inner electrodes 51, 56. Further, in the multilayer capacitor array CA12, two dielectric layers 10, 11 can be arranged between the first main face L12a and eighth inner electrode 55, and two dielectric layers 17, 18 can be arranged between the seventh inner electrode 52 and second main face L12b. As a result, an electrostriction alleviating layer can be made greater whereby the multilayer capacitor array CA12 can restrain vibrations from being caused by electrostriction.

Thirteenth Embodiment

Figure 37:
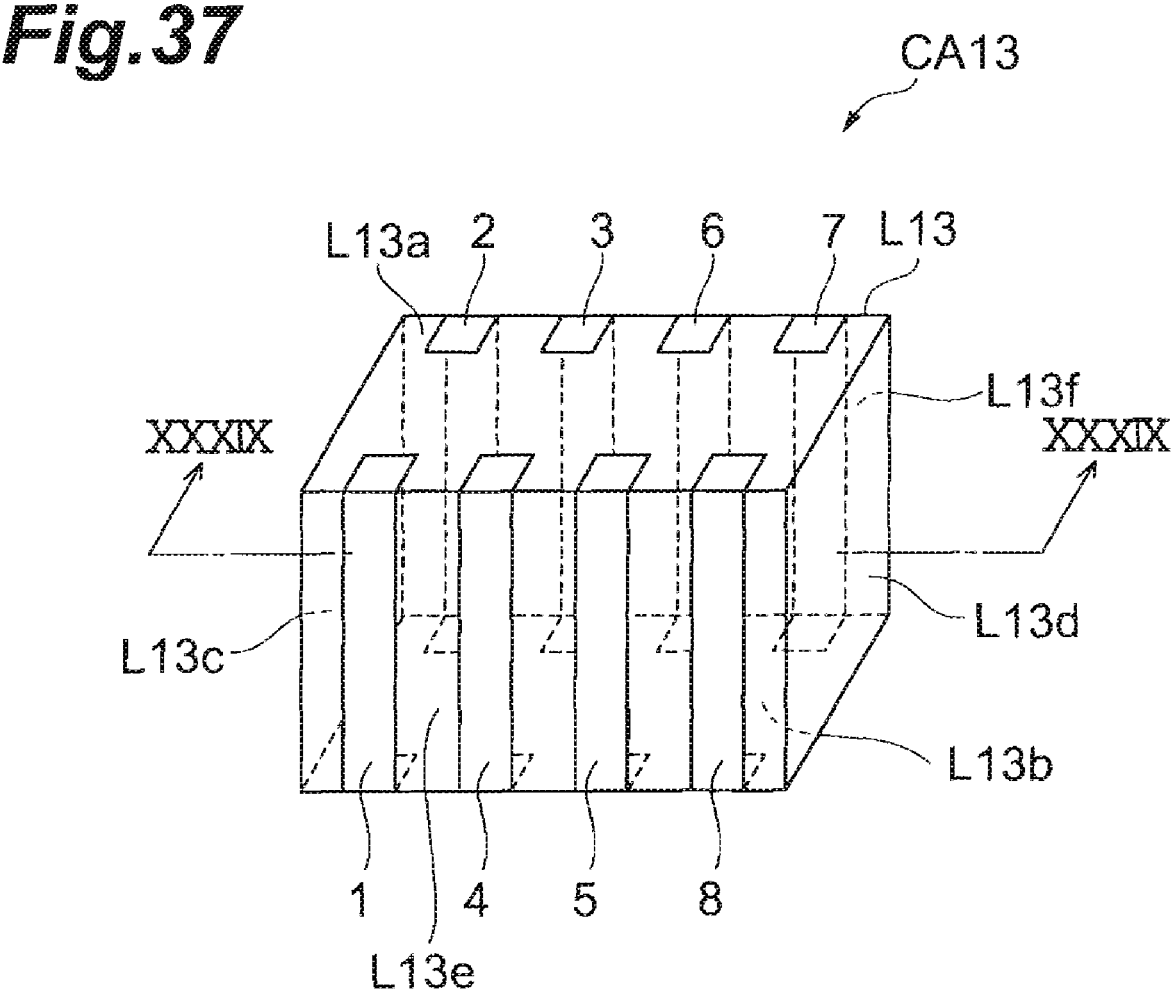
FIG. 37 is a perspective view of the multilayer capacitor array in accordance with the thirteenth embodiment.
Figure 38:
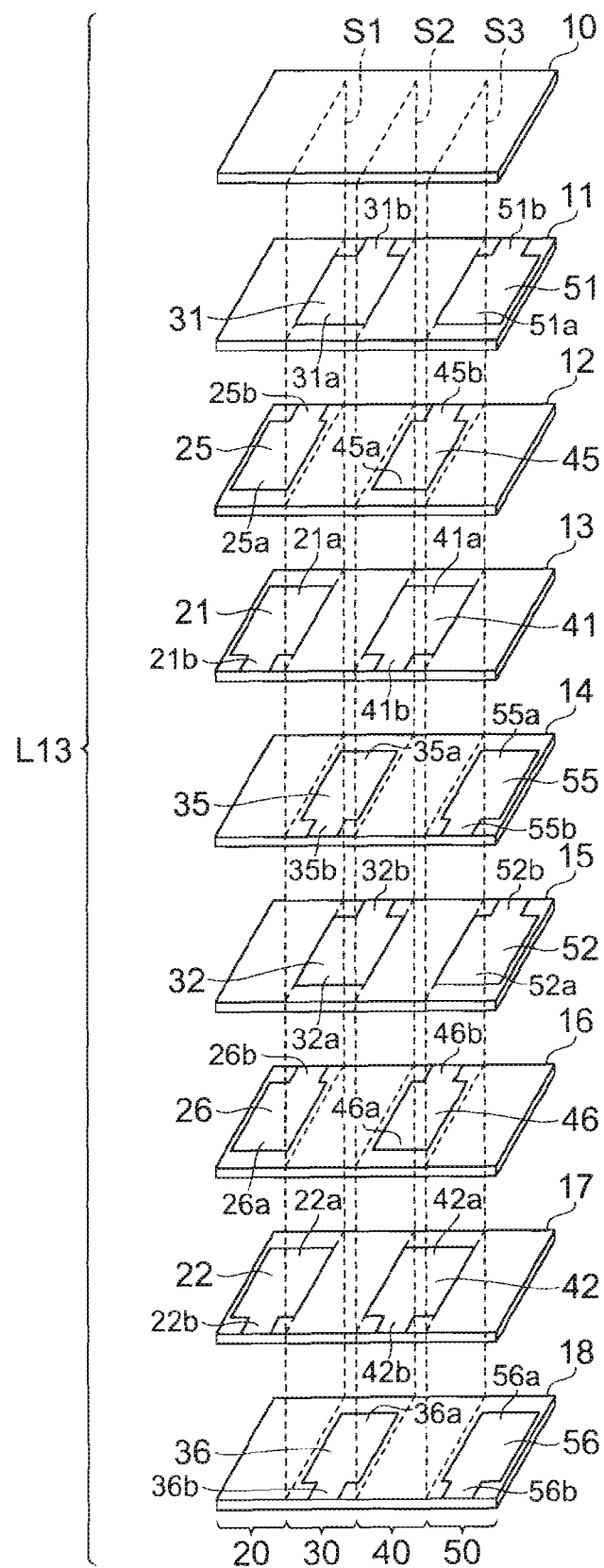
FIG. 38 is an exploded perspective view of the capacitor body included in the multilayer capacitor array in accordance with the thirteenth embodiment.
Figure 39:
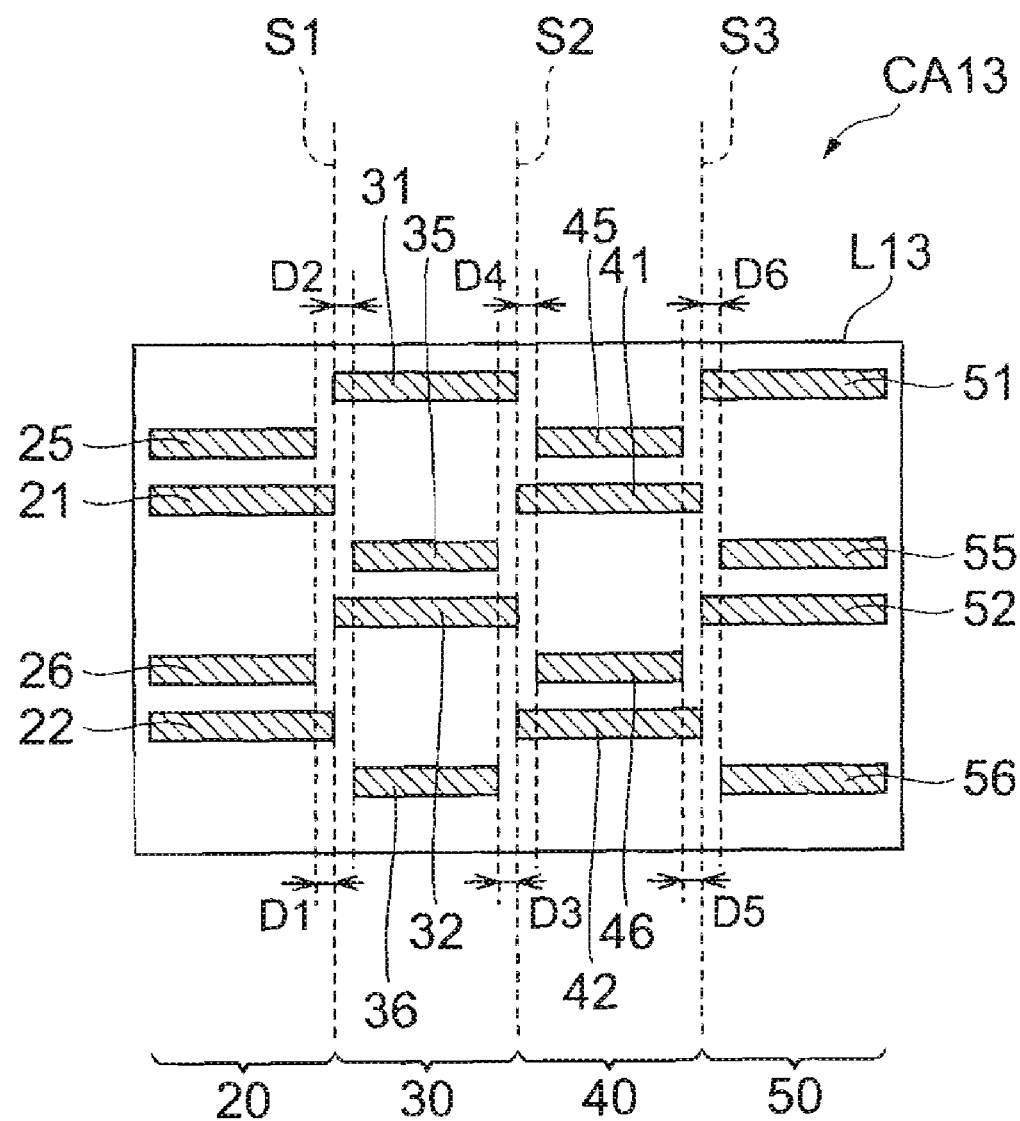
FIG. 39 is a view for explaining the structure of a cross section of the multilayer capacitor array taken along the line XXXIX-XXXIX of FIG. 37.

With reference to FIGS. 37 to 39, the structure of the multilayer capacitor array CA13 in accordance with the thirteenth embodiment will be explained. The capacitor array CA13 in accordance with the thirteenth embodiment differs from the capacitor array CA10 in accordance with the tenth embodiment in terms of the arrangement of first to eighth terminal electrodes 1 to 8 and first to eighth inner electrodes. FIG. 37 is a perspective view of the multilayer capacitor array in accordance with the thirteenth embodiment. FIG. 38 is an exploded perspective view of the capacitor body included in the multilayer capacitor array in accordance with the thirteenth embodiment. FIG. 39 is a view for explaining the structure of a cross section of the multilayer capacitor array taken along the line XXXIX-XXXIX of FIG. 37.

As shown in FIG. 37, the multilayer capacitor array CA13 in accordance with the thirteenth embodiment comprises a capacitor body L13 and first to eighth terminal electrodes 1 to 8 arranged on outer surface of the capacitor body L13.

As shown in FIG. 37, the capacitor body L13 is shaped like a rectangular parallelepiped having rectangular first and second main faces L13a, L13b opposing each other, first and second end faces L13c, L13d opposing each other and extending in the shorter-side direction of the first and second main faces L13a, L13b so as to connect them to each other, and first and second side faces L13e, L13f opposing each other and extending in the longer-side direction of the first and second main faces L13a, L13b so as to connect them to each other.

The first, fourth, fifth, and eighth terminal electrodes 1, 4, 5, 8 are successively arranged on the first side face L13e of the capacitor body L13 from the first end face L13c side to the second end face L13d side. The second, third, sixth, and seventh terminal electrodes 2, 3, 6, 7 are successively arranged on the second side face L13f of the capacitor body L13 from the first end face L13c side to the second end face L13d side. The first, fourth, fifth, and eighth terminal electrodes 1, 4, 5, 8 oppose the second, third, sixth, and seventh terminal electrodes 2, 3, 6, 7, respectively, in the opposing direction of the first and second side faces L13e, L13f.

As shown in FIG. 38, the capacitor body L13 has a plurality of (9 in this embodiment) laminated dielectric layers 10 to 18.

As shown in FIG. 38, the capacitor body L13 includes first to fourth electrode groups 20, 30, 40, 50. The first electrode group 20 has a plurality (2 layers each in this embodiment) of first and second inner electrodes 21, 22, 25, 26. The second electrode group 30 has a plurality (2 layers each in this embodiment) of third and fourth inner electrodes 31, 32, 35, 36. The third electrode group has a plurality (2 layers each in this embodiment) of fifth and sixth inner electrodes 41, 42, 45, 46. The fourth electrode group has a plurality (2 layers each in this embodiment) of seventh and eighth inner electrodes 51, 52, 55, 56.

Within the capacitor body L13, the first to fourth electrode groups 20, 30, 40, 50 are arranged in a row along the opposing direction of the first and second end faces L13c, L13d. Specifically, the first to fourth electrode groups 20, 30, 40, 50 are successively arranged from the first end face L13c side to the second end face L13d side.

The first and second inner electrodes 21, 22, 25, 26 included in the first electrode group 20 are arranged in the order of the second inner electrode 25, first inner electrode 21, second inner electrode 26, and first inner electrode 22 from the first main face L13a toward the second main face L13b. The third and fourth inner electrodes 31, 32, 35, 36 included in the second electrode group 30 are arranged in the order of the third inner electrode 31, fourth inner electrode 35, third inner electrode 32, and fourth inner electrode 36 from the first main face L13a toward the second main face L13b. The fifth and sixth inner electrodes 41, 42, 45, 46 included in the third electrode group 40 are arranged in the order of the sixth inner electrode 45, fifth inner electrode 41, sixth inner electrode 46, and fifth inner electrode 42 from the first main face L13a toward the second main face L13b. The seventh and eighth inner electrodes 51, 52, 55, 56 included in the third electrode group 50 are arranged in the order of the seventh inner electrode 51, eighth inner electrode 55, seventh inner electrode 52, and eighth inner electrode 56 from the first main face L13a toward the second main face L13b.

Within the capacitor body L13, the first and second inner electrodes 21, 22, 25, 26 are arranged at positions different from any of the third and fourth inner electrodes 31, 32, 35, 36 and seventh and eighth inner electrodes 51, 52, 55, 56 in, the opposing direction of the first and second main faces L13a, L13b.

Within the capacitor body L13, the third and fourth inner electrodes 31, 32, 35, 36 are arranged at positions different from any of the first and second inner electrodes 21, 22, 25, 26 and fifth and sixth inner electrodes 41, 42, 45, 46 in the opposing direction of the first and second main faces L13a, L13b.

Within the capacitor body L13, the fifth and sixth inner electrodes 41, 42, 45, 46 are arranged at positions different from any of the third and fourth inner electrodes 31, 32, 35, 36 and seventh and eighth inner electrodes 51, 52, 55, 56 in the opposing direction of the first and second main faces L13a, L13b.

Within the capacitor body L13, the seventh and eighth inner electrodes 51, 52, 55, 56 are arranged at positions different from any of the first and second inner electrodes 21, 22, 25, 26 and fifth and sixth inner electrodes 41, 42, 45, 46 in the opposing direction of the first and second main faces L13a, L13b.

Within the capacitor body L13, the second inner electrode 25 and sixth inner electrode 45 are arranged on the same layer, the first inner electrode 21 and fifth inner electrode 41 are arranged on the same layer, the second inner electrode 26 and sixth inner electrode 46 are arranged on the same layer, and the first inner electrode 22 and fifth inner electrode 42 are arranged on the same layer in the opposing direction of the first and second main faces L13a, L13b. Within the capacitor body L13, the third inner electrode 31 and seventh inner electrode 51 are arranged on the same layer, the fourth inner electrode 35 and eighth inner electrode 55 are arranged on the same layer, the third inner electrode 32 and seventh inner electrode 52 are arranged on the same layer, and the fourth inner electrode 36 and eighth inner electrode 56 are arranged on the same layer in the opposing direction of the first and second main faces L13a, L13b.

Along the opposing direction of the first and second main faces L13a, L13b, the first and second inner electrodes 21, 25 oppose each other with the dielectric layer 12 therebetween, and the first and second inner electrodes 22, 26 oppose each other with the dielectric layer 16 therebetween. The first and second inner electrodes 21, 26 oppose each other with three dielectric layers 13, 14, 15 therebetween along the opposing direction of the first and second main faces L13a, L13b.

When seen in the opposing direction of the first and second main faces L13a, L13b, the first main face L13a and second inner electrode 25 are arranged adjacent to each other with the dielectric layers 10, 11 therebetween. When seen in the opposing direction of the first and second main faces L13a, L13b, the second main face L13b and first inner electrode 22 are arranged adjacent to each other with the dielectric layers 17, 18 therebetween.

The third and fourth inner electrodes 32, 35 oppose each other with the dielectric layer 14 therebetween along the opposing direction of the first and second main faces L13a, L13b. Along the opposing direction of the first and second main faces L13a, L13b, the third and fourth inner electrodes 31, 35 oppose each other with three dielectric layers 11, 12, 13 therebetween, and the third and fourth inner electrodes 32, 36 oppose each other with three dielectric layers 15, 16, 17 therebetween.

Along the opposing direction of the first and second main faces L13a, L13b, the fifth and sixth inner electrodes 41, 45 oppose each other with the dielectric layer 12 therebetween, and the fifth and sixth inner electrodes 42, 46 oppose each other with the dielectric layer 16 therebetween. The fifth and sixth inner electrodes 41, 46 oppose each other with three dielectric layers 13, 14, 15 therebetween along the opposing direction of the first and second main faces L13a, L13b.

When seen in the opposing direction of the first and second main faces L13a, L13b, the first main face L13a and sixth inner electrode 45 are arranged adjacent to each other with the dielectric layers 10, 11 therebetween. When seen in the opposing direction of the first and second main faces L13a, L13b, the second main face L13b and fifth inner electrode 42 are arranged adjacent to each other with the dielectric layers 17, 18 therebetween.

Along the opposing direction of the first and second main faces L13a, L13b, the seventh and eighth inner electrodes 52, 55 oppose each other with the dielectric layer 14 therebetween. Along the opposing direction of the first and second main faces L13a, L13b, the seventh and eighth inner electrodes 51, 55 oppose each other with three dielectric layers 11, 12, 13 therebetween, and the seventh and eighth inner electrodes 52, 56 oppose each other with three dielectric layers 15, 16, 17 therebetween.

The first inner electrodes 21, 22 include main electrode portions 21a, 22a and lead portions 21b, 22b extending from the main electrode portions 21a, 22a so as to be exposed at the first side face L13e. The lead portions 21b, 22b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side face L13f. The lead portions 25b, 26b are physically and electrically connected to the second terminal electrode 2.

The third inner electrodes 31, 32 include main electrode portions 31a, 32a and lead portions 31b, 32b extending from the main electrode portions 31a, 32a so as to be exposed at the second side face L13f. The lead portions 31b, 32b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the first side face L13e. The lead portions 35b, 36b are physically and electrically connected to the fourth terminal electrode 4.

The fifth inner electrodes 41, 42 include main electrode portions 41a, 42a and lead portions 41b, 42b extending from the main electrode portions 41a, 42a so as to be exposed at the first side face L13e. The lead portions 41b, 42b are physically and electrically connected to the fifth terminal electrode 5.

The sixth inner electrodes 45, 46 include main electrode portions 45a, 46a and lead portions 45b, 46b extending from the main electrode portions 45a, 46a so as to be exposed at the second side face L13f. The lead portions 45b, 46b are physically and electrically connected to the sixth terminal electrode 6.

The seventh inner electrodes 51, 52 include main electrode portions 51a, 52a and lead portions 51b, 52b extending from the main electrode portions 51a, 52a so as to be exposed at the second side face 113f. The lead portions 51b, 52b are physically and electrically connected to the seventh terminal electrode 7.

The eighth inner electrodes 55, 56 include main electrode portions 55a, 56a and lead portions 55b, 56b extending from the main electrode portions 55a, 56a so as to be exposed at the first side face L13e. The lead portions 55b, 56b are physically and electrically connected to the eighth terminal electrode 8.

As shown in FIGS. 38 and 39, a virtual plane parallel to the opposing direction of the first and second main faces L13a, L13b is taken as a virtual reference plane S1. The first and second electrode groups 20, 30 are arranged in a row along a direction orthogonal to the opposing direction of the first and second main faces L13a, L13b which is a direction orthogonal to the reference plane S1. Namely, within the capacitor body L13, the first and second inner electrodes 21, 22, 25, 26 are arranged on the first end face L13c side of the reference plane S1, while the third and fourth inner electrodes 31, 32, 35, 36 are arranged on the second end face L13d side of the reference plane S1.

Further, a virtual plane parallel to the opposing direction of the first and second main faces L13a, L13b is taken as a virtual reference plane S2. The second and third electrode groups 30, 40 are arranged in a row along a direction orthogonal to the opposing direction of the first and second main faces L13a, L13b which is a direction orthogonal to the reference plane S2. Namely, within the capacitor body L13, the third and fourth inner electrodes 31, 32, 35, 36 are arranged on the first end face L13c side of the reference plane S2, while the fifth and sixth inner electrodes 41, 42, 45, 46 are arranged on the second end face L13d side of the reference plane S2.

Furthermore, a virtual plane parallel to the opposing direction of the first and second main faces L13a, L13b is taken as a virtual reference plane S3. The third and fourth electrode groups 40, 50 are arranged in a row along a direction orthogonal to the opposing direction of the first and second main faces L13a, L13b which is a direction orthogonal to the reference plane S3. Namely, within the capacitor body L13, the fifth and sixth inner electrodes 41, 42, 45, 46 are arranged on the first end face L13c side of the reference plane S3, while the seventh and eighth inner electrodes 51, 52, 55, 56 are arranged on the second end face L13d side of the reference plane S3.

The first inner electrodes 21, 22 are arranged such that the sides on the second end face L13d side of the main electrode portions 21a, 22a are in contact with the reference plane S1. The second inner electrodes 25, 26 are arranged such that the sides on the second end face L13d side of the main electrode portions 25a, 26a are separated from the reference plane S1 by a predetermined distance D1 toward the first end face L13c.

The sides on the first end face L13c side of the main electrode portions 31a, 32a of the third inner electrodes 31, 32 are in contact with the reference plane S1. The sides on the second end face L13d side of the main electrode portions 31a, 32a of the third inner electrodes 31, 32 are in contact with the reference plane S2.

The fourth inner electrodes 35, 36 are arranged such that the sides s on the first end face L13c side of the main electrode portions 35a, 36a are separated from the reference plane S1 by a predetermined distance D2 toward the second end face L13d. The fourth inner electrodes 35, 36 are arranged such that the sides on the second end face L13d side of the main electrode portions 35a, 36a are separated from the reference plane 82 by a predetermined distance D3 toward the first end face L13c.

The sides on the first end face L13c side of the main electrode portions 41a, 42a of the fifth inner electrodes 41, 42 are in contact with the reference plane S2. The sides on the second end face L13d side of the main electrode portions 41a, 42a of the fifth inner electrodes 41, 42 are in contact with the reference plane S3.

The sixth inner electrodes 45, 46 are arranged such that the sides on the first end face L13c side of the main electrode portions 45a, 46a are separated from the reference plane S2 by a predetermined distance D2 toward the second end face L13d. The sixth inner electrodes 45, 46 are arranged such that the sides on the second end face L13d side of the main electrode portions 45a, 46a are separated from the reference plane S3 by a predetermined distance D5 toward the first end face L13c.

The seventh inner electrodes 51, 52 are arranged such that the sides on the first end face L13c side of the main electrode portions 51a, 52a are in contact with the reference plane S3. The eighth inner electrodes 55, 56 are arranged such that the sides on the first end face L13c side of the main electrode portions 55a, 56a are separated from the reference plane S3 by a predetermined distance D6 toward the second end face L13d.

In the multilayer capacitor array CA13, the first and second inner electrodes 21, 22, 25, 26 include inner electrodes opposing each other with dielectric layers therebetween, and these opposing first and second inner electrodes form one of capacitors included in the multilayer capacitor array CA13.

In the multilayer capacitor array CA13, the third and fourth inner electrodes 31, 32, 35, 36 include inner electrodes opposing each other with dielectric layers therebetween, and these opposing third and fourth inner electrodes form one of the capacitors included in the multilayer capacitor array CA13.

In the multilayer capacitor array CA13, the fifth and sixth inner electrodes 41, 42, 45, 46 include inner electrodes opposing each other with dielectric layers therebetween, and these opposing fifth and sixth inner electrodes form one of the capacitors included in the multilayer 1 capacitor array CA13.

In the multilayer capacitor array CA13, the seventh and eighth inner electrodes 51, 52, 55, 56 include inner electrodes opposing each other with dielectric layers therebetween, and these opposing seventh and eighth inner electrodes form one of the capacitors included in the multilayer capacitor array CA13.

When a voltage is applied to the capacitor formed by the first and second inner electrodes 21, 22, 25, 26 and the capacitor formed by the third and fourth inner electrodes 31, 32, 35, 36 so that electrostriction is generated in each capacitor, electrostriction also occurs near the reference plane S1, since the first and third inner electrodes 21, 22, 31, 32 are arranged in contact with the reference plane S1 in the multilayer capacitor array CA13 as mentioned above. This restrains stresses from being concentrated near the reference plane S1.

When a voltage is applied to the capacitor formed by the third and fourth inner electrodes 31, 32, 35, 36 and the capacitor formed by the fifth and sixth inner electrodes 41, 42, 45, 46 so that electrostriction is generated in each capacitor, electrostriction also occurs near the reference plane S2, since the third and fifth inner electrodes 31, 32, 35, 36 are arranged in contact with the reference plane S2 in the multilayer capacitor array CA13. This restrains stresses from being concentrated near the reference plane S2.

When a voltage is applied to the capacitor formed by the fifth and sixth inner electrodes 41, 42, 45, 46 and the capacitor formed by the seventh and eighth inner electrodes 51, 52, 55, 56 so that electrostriction is generated in each capacitor, electrostriction also occurs near the reference plane S3, since the fifth and seventh inner electrodes 41, 42, 51, 52 are arranged in contact with the reference plane S3 in the multilayer capacitor array CA13. This restrains stresses from being concentrated near the reference plane S3.

Restraining stresses from being concentrated can also keep cracks from occurring in the multi layer capacitor array CA13.

While the first inner electrodes 21, 22 are in contact with the reference plane S1, the second inner electrodes 25, 26 are positioned such as to be separated from the reference plane S1 by the predetermined distance D1. While the third inner electrodes 31, 32 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31, 32 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45, 46 are positioned such as to be separated from the reference plane S2 by the predetermined distance D4. This restrains electrostriction from causing distortions in excess near the reference plane S2.

While the fifth inner electrodes 41, 42 are in contact with the reference plane S3, the sixth inner electrodes 45, 46 are positioned such as to be separated from the reference plane S3 by the predetermined distance D5. While the seventh inner electrodes 51, 52 are in contact with the reference plane S3, the eighth inner electrodes 55, 56 are positioned such as to be separated from the reference plane S3 by the predetermined distance D6. This restrains electrostriction from causing distortions in excess near the reference plane S3.

The third and fourth inner electrodes 31, 32, 35, 36 and seventh and eighth inner electrodes 51, 52, 55, 56 are arranged at positions different from any of the first and second inner electrodes 21, 22, 25, 26 in the opposing direction of the first and second main faces L13a, L13b. Therefore, in the multilayer capacitor array CA13, three dielectric layers 13, 14, 15 can be arranged between the first and second inner electrodes 21, 26. Further, in the multilayer capacitor array CA13, two dielectric layers 10, 11 can be arranged between the first main face L13a and second inner electrode 25, and two dielectric layers 17, 18 can be arranged between the first inner electrode 22 and second main face L13b. As a result, an electrostriction alleviating layer can be made greater, whereby the multilayer capacitor array CA13 can restrain vibrations from being caused by electrostriction.

The first and second inner electrodes 21, 22, 25, 26 and fifth and sixth inner electrodes 41, 42, 45, 46 are arranged at positions different from any of the third and fourth inner electrodes 31, 32, 35, 36 in the opposing direction of the first and second main faces L13a, L13b. Therefore, in the multilayer capacitor array CA13, three dielectric layers 11, 12, 13 can be arranged between the third and fourth inner electrodes 31, 35, and three dielectric layers 15, 16, 17 can be arranged between the third and fourth inner electrodes 32, 36. As a result, an electrostriction alleviating layer can be made greater, whereby the multilayer capacitor array CA13 can restrain vibrations from being caused by electrostriction.

The third and fourth inner electrodes 31, 32, 35, 36 and seventh and eighth inner electrodes 51, 52, 55, 56 are arranged at positions different from any of the fifth and sixth inner electrodes 41, 42, 45, 46 in the opposing direction of the first and second main faces L13a, L13b. Therefore, in the multilayer capacitor array CA13, three dielectric layers 13, 14, 15 can be arranged between the fifth and sixth inner electrodes 41, 46. Further, in the multilayer capacitor array CA13, two dielectric layers 10, 11 can be arranged between the first main face L13a and sixth inner electrode 45, and two dielectric layers 17, 18 can be arranged between the fifth inner electrode 42 and second main face L13b. As a result, an electrostriction alleviating layer can be made greater, whereby the multilayer capacitor array CA13 can restrain vibrations from being caused by electrostriction.

The first and second inner electrodes 21, 22, 25, 26 and fifth and sixth inner electrodes 41, 42, 45, 46 are arranged at positions different from any of the seventh and eighth inner electrodes 51, 52, 55, 56 in the opposing direction of the first and second main faces L13a, L13b. Therefore, in the multilayer capacitor array CA13, three dielectric layers 11, 12, 13 can be arranged between the seventh and eighth inner electrodes 51, 55, and three dielectric layers 15, 16, 17 can be arranged between the seventh and eighth inner electrodes 52, 56. As a result, an electrostriction alleviating layer can be made greaten whereby the multilayer capacitor array CA13 can restrain vibrations from being caused by electrostriction.

Fourteenth Embodiment

Figure 40:
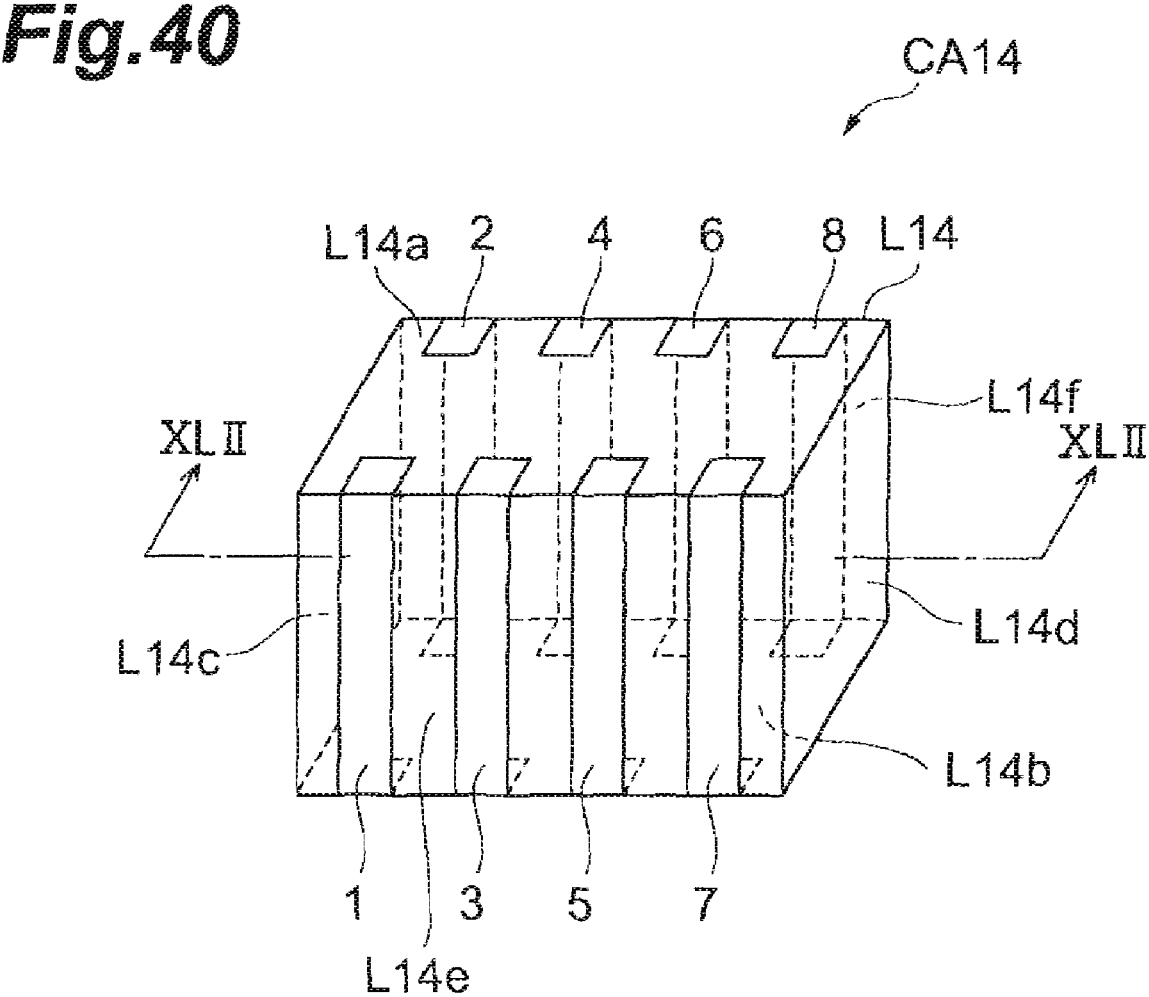
FIG. 40 is a perspective view of the multilayer capacitor array in accordance with the fourteenth embodiment.
Figure 41:
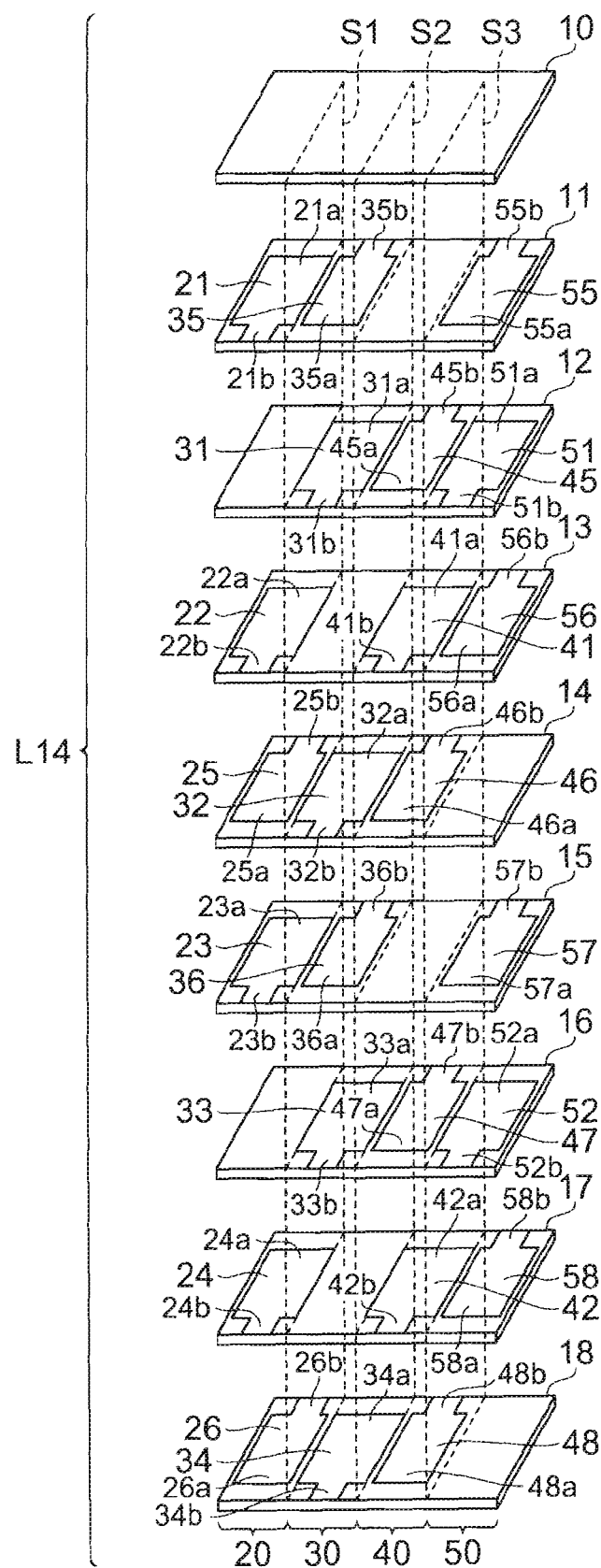
FIG. 41 is an exploded perspective view of the capacitor body included in the multilayer capacitor array in accordance with the fourteenth embodiment.
Figure 42:
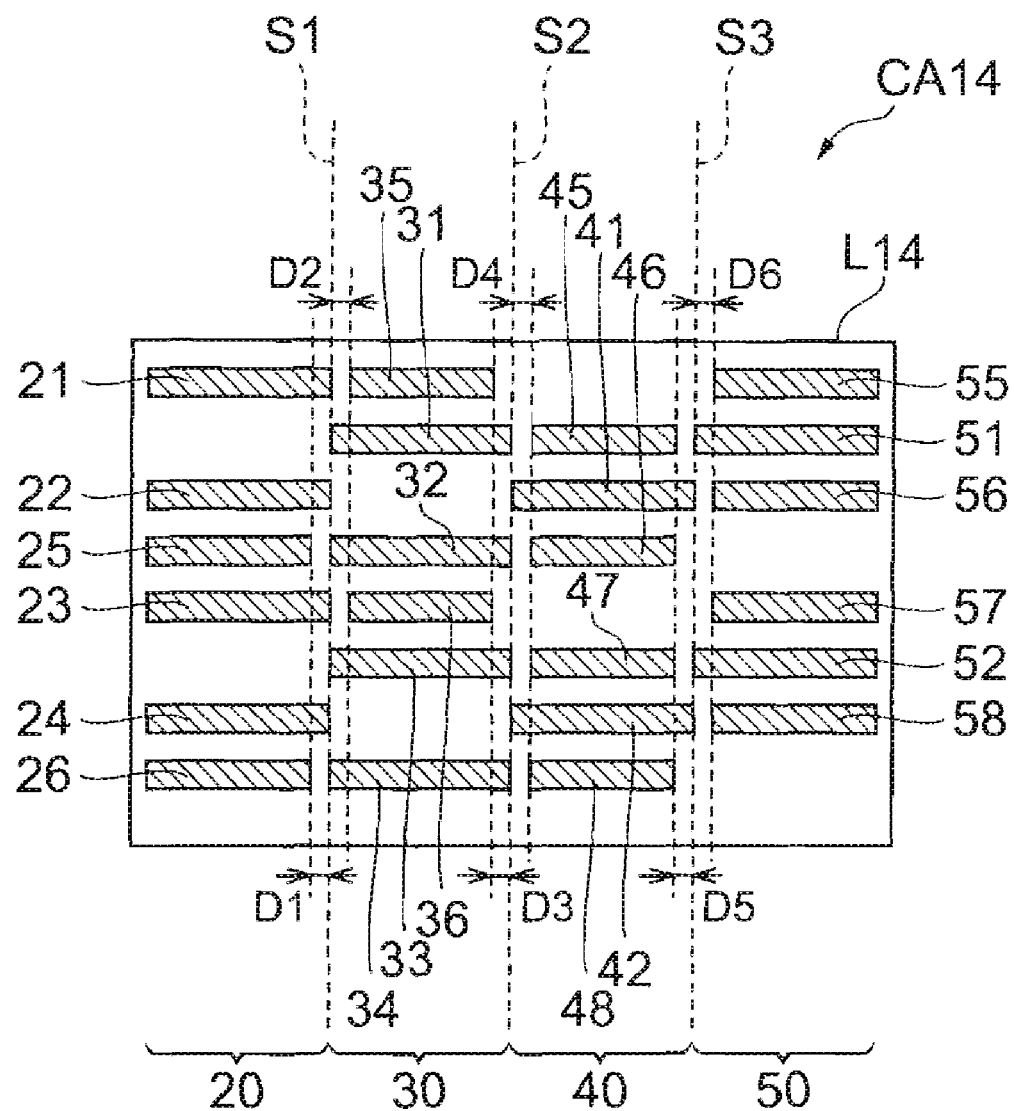
FIG. 42 is a view for explaining the structure of a cross section of the multilayer capacitor array taken along the line XLII-XLII of FIG. 40.

With reference to FIGS. 40 to 42, the structure of the multilayer capacitor array CA14 in accordance with the fourteenth embodiment will be explained. The capacitor array CA14 in accordance with the fourteenth embodiment differs from the capacitor array CA10 in accordance with the tenth embodiment in terms of the arrangement of first to eighth inner electrodes. FIG. 40 is a perspective view of the multilayer capacitor array in accordance with the fourteenth embodiment. FIG. 41 is an exploded perspective view of the capacitor body included in the multilayer capacitor array in accordance with the fourteenth embodiment. FIG. 42 is a view for explaining the structure of a cross section of the multilayer capacitor array taken along the line XLII-XLII of FIG. 40.

As shown in FIG. 40, the multilayer capacitor array CA14 in accordance with the fourteenth embodiment comprises a capacitor body L14 and first to eighth terminal electrodes 1 to 8 arranged on outer surface of the capacitor body L14.

As shown in FIG. 40, the capacitor body L14 is shaped like a rectangular parallelepiped having rectangular first and second main faces L14a, L14b opposing each other, first and second end faces L14c, L14d opposing each other and extending in the shorter-side direction of the first and second main faces L14a, L14b so as to connect them to each other, and first and second side faces L14e, L14f opposing each other and extending in the longer-side direction of the first and second main faces L14a, L14b so as to connect them to each other.

The first, third, fifth, and seventh terminal electrodes 1, 3, 5, 7 are successively arranged on the first side face L14e of the capacitor body L14 from the first end face L14c side to the second end face L14d side. The second, fourth, sixth, and eighth terminal electrodes 2, 4, 6, 8 are successively arranged on the second side face L14f of the capacitor body L14 from the first end face L14c side to the second end face L14d side. The first third, fifth and seventh terminal electrodes 1, 3, 5, 7 oppose the second, fourth, sixth, and eighth terminal electrodes 2, 4, 6, 8, respectively, in the opposing direction of the first and second side faces L14e, L14f.

As shown in FIG. 41, the capacitor body L14 has a plurality of (9 in this embodiment) laminated dielectric layers 10 to 18.

As shown in FIG. 41, the capacitor body L14 includes first to fourth electrode groups 20, 30, 40, 50. The first electrode group 20 has a plurality (4 layers in this embodiment) of first inner electrodes 21 to 24 and a plurality (2 layers in this embodiment) of second inner electrodes 25, 26. The second electrode group 30 has a plurality (4 layers in this embodiment) of third inner electrodes 31 to 34 and a plurality (2 layers in this embodiment) of fourth inner electrodes 35, 36. The third electrode group 40 has a plurality (2 layers in this embodiment) of fifth inner electrodes 41, 42 and a plurality (4 layers in this embodiment) of sixth inner electrodes 45 to 48. The fourth electrode group 50 has a plurality (2 layers in this embodiment) of seventh inner electrodes 51, 52 and a plurality (4 layers in this embodiment) of eighth inner electrodes 55 to 58.

Within the capacitor body L14, the first to fourth electrode groups 20, 30, 40, 50 are arranged in a row along the opposing direction of the first and second end faces L14c, L14d. Specifically, the first to fourth electrode groups 20, 30, 40, 50 are successively arranged from the first end face L14c side to the second end face L14d side.

The first and second inner electrodes 21 to 24, 25, 26 included in the first electrode group 20 are arranged in the order of the first inner electrode 21, first inner electrode 22, second inner electrode 25, first inner electrode 23, first inner electrode 24, and second inner electrode 26 from the first main face L14a toward the second main face L14b. The third and fourth inner electrodes 31 to 34, 35, 36 included in second electrode group 30 are arranged in the order of the fourth inner electrode 35, third inner electrode 31, third inner electrode 32, fourth inner electrode 36, third inner electrode 33, and third inner electrode 34 from the first main face L14a toward the second main face L14b. The fifth and sixth inner electrodes 41, 42, 45 to 48 included in the third electrode group 40 are arranged in the order of the sixth inner electrode 45, fifth inner electrode 41, sixth inner electrode 46, sixth inner electrode 47, fifth inner electrode 42, and sixth inner electrode 48 from the first main face L14a toward the second main face L14b. The seventh and eighth inner electrodes 51, 52, 55 to 58 included in the fourth electrode group 50 are arranged in the order of the eighth inner electrode 55, seventh inner electrode 51, eighth inner electrode 56, eighth inner electrode 57, seventh inner electrode 52, and eighth inner electrode 58 from the first main face L14a toward the second main face L14b.

Within the capacitor body L14, the first inner electrodes 22, 24 are arranged at positions different from any of the third and fourth inner electrodes 31 to 34, 35, 36 in the opposing direction of the first and second main faces L14a, L14b. Within the capacitor body L14, the first inner electrodes 21, 23 are arranged at positions different from any of the fifth and sixth inner electrodes 41, 42, 45 to 48 in the opposing direction of the first and second main faces L14a, L14b. Within the capacitor body L14, the second inner electrodes 25, 26 are arranged at positions different from any of the seventh and eighth inner electrodes 51, 52, 55 to 58 in the opposing direction of the first and second main faces L14a, L14b.

Within the capacitor body L14, the third inner electrodes 31, 33 are arranged at positions different from any of the first and second inner electrodes 21 to 24, 25, 26 in the opposing direction of the first and second main faces L14a, L14b. Within the capacitor body L14, the fourth inner electrodes 35, 36 are arranged at positions different from any of the fifth and sixth inner electrodes 41, 42, 45 to 48 in the opposing direction of the first and second main faces L14a, L14b. Within the capacitor body L14, the third inner electrodes 32, 34 are arranged at positions different from any of the seventh and eighth inner electrodes 51, 52, 55 to 58 in the opposing direction of the first and second main faces L14a, L14b.

Within the capacitor body L14, the sixth inner electrodes 45, 47 are arranged at positions different from any of the first and second inner electrodes 21 to 24, 25, 26 in the opposing direction of the first and second main faces L14a, L14b. Within the capacitor body L14, the fifth inner electrodes 41, 42 are arranged at positions different from any of the third and fourth inner electrodes 31 to 34, 35, 36 in the opposing direction of the first and second main faces L14a, L14b. Within the capacitor body L14, the sixth inner electrodes 46, 48 are arranged at positions different from any of the seventh and eighth inner electrodes 51, 52, 55 to 58 in the opposing direction of the first and second main faces L14a, L14b.

Within the capacitor body L14, the seventh inner electrodes 51, 52 are arranged at positions different from any of the first and second inner electrodes 21 to 24, 25, 26 in the opposing direction of the first and second main faces L14a, L14b. Within the capacitor body L14, the eighth inner electrodes 56, 58 are arranged at positions different from any of the third and fourth inner electrodes 31 to 34, 35, 36 in the opposing direction of the first and second main faces L14a, L14b. Within the capacitor body L14, the eighth inner electrodes 55, 57 are arranged at positions different from any of the fifth and sixth inner electrodes 41, 42, 45 to 48 in the opposing direction of the first and second main faces L14a, L14b.

Within the capacitor body L14, the first inner electrode 21, fourth inner electrode 35, and eighth inner electrode 55 are arranged on the same layer, the third inner electrode 31, sixth inner electrode 45, and seventh inner electrode 51 are arranged on the same layer, the first inner electrode 22, fifth inner electrode 41, and eighth inner electrode 56 are arranged on the same layer, the second inner electrode 25, fourth inner electrode 32, and sixth inner electrode 46 are arranged on the same layer, the first inner electrode 23, fourth inner electrode 36, and eighth inner electrode 57 are arranged on the same layer, the third inner electrode 33, sixth inner electrode 47, and seventh inner electrode 52 are arranged on the same layer, the first inner electrode 24, fifth inner electrode 42, and eighth inner electrode 58 are arranged on the same layer; and the second inner electrode 26, fourth inner electrode 34, and sixth inner electrode 48 are arranged on the same layer along the opposing direction of the first and second main faces L14a, L14b.

Along the opposing direction of the first and second main faces L14a, L14b, the first and second inner electrodes 22, 25 oppose each other with the dielectric layer 13 therebetween, the first and second inner electrodes 23, 25 oppose each other with the dielectric layer 14 therebetween, and the first and second inner electrodes 24, 26 oppose each other with the dielectric layer 16 therebetween.

When seen in the opposing direction of the first and second main faces L14a, L14b, the first inner electrodes 21, 22 are arranged adjacent to each other with the dielectric layers 11, 12 therebetween. When seen in the opposing direction of the first and second main faces L14a, L14b, the first inner electrodes 23, 24 are arranged adjacent to each other with the dielectric layers 15, 16 therebetween.

Along the opposing direction of the first and second main faces L14a, L14b, the third and fourth inner electrodes 31, 35 oppose each other with the dielectric layer 11 therebetween, the third and fourth inner electrodes 32, 36 oppose each other with the dielectric layer 14 therebetween, and the third and fourth inner electrodes 33, 36 oppose each other with the dielectric layer 15 therebetween.

When seen in the opposing direction of the first and second main faces L14a, L14b, the third inner electrodes 31, 32 are arranged adjacent to each other with the dielectric layers 12, 13 therebetween. When seen in the opposing direction of the first and second main faces L14a, L14b, the third inner electrodes 33, 34 are arranged adjacent to each other with the dielectric layers 16, 17 therebetween.

Along the opposing direction of the first and second main faces L14a, L14b, the fifth and sixth inner electrodes 41, 45 oppose each other with the dielectric layer 12 therebetween, the fifth and sixth inner electrodes 41, 46 oppose each other with the dielectric layer 13 therebetween, the fifth and sixth inner electrodes 42, 47 oppose each other with the dielectric layer 16 therebetween, and the fifth and sixth inner electrodes 42, 48 oppose each other with the dielectric layer 17 therebetween.

When seen in the opposing direction of the first and second main faces L14a, L14b, the first main face L14a and sixth inner electrode 45 are arranged adjacent to each other with the dielectric layers 10, 11 therebetween. When seen in the opposing direction of the first and second main faces L14a, L14b, the sixth inner electrodes 46, 47 are arranged adjacent to each other with the dielectric layers 14, 15 therebetween.

Along the opposing direction of the first and second main faces L14a, L14b, the seventh and eighth inner electrodes 51, 55 oppose each other with the dielectric layer 11 therebetween, the seventh and eighth inner electrodes 51, 56 oppose each other with the dielectric layer 12 therebetween, the seventh and eighth inner electrodes 52, 57 oppose each other with the dielectric layer 15 therebetween, and the seventh and eighth inner electrodes 52, 58 oppose each other with the dielectric layer 16 therebetween.

When seen in the opposing direction of the first and second main faces L14a, L14b, the eighth inner electrodes 56, 57 are arranged adjacent to each other with the dielectric layers 13, 14 therebetween. When seen in the opposing direction of the first and second main faces L14a, L14b, the eighth inner electrode 58 and second main face L14b are arranged adjacent to each other with the dielectric layers 17, 18 therebetween.

The first inner electrodes 21 to 24 include main electrode portions 21a to 24a and lead portions 21b to 24b extending from the main electrode portions 21a to 24a so as to be exposed at the first side face L14e. The lead portions 21b to 24b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side face L14f. The lead portions 25b, 26b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the first side face L14e. The lead portions 31b to 34b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the second side face L14f. The lead portions 35b, 36b are physically and electrically 161, connected to the fourth terminal electrode 4.

The fifth inner electrodes 41, 42 include main electrode portions 41a, 42a and lead portions 41b, 42b extending from the main electrode portions 41a, 42a so as to be exposed at the first side face L14e. The lead portions 41b, 42b are physically and electrically connected to the fifth terminal electrode 5.

The sixth inner electrodes 45 to 48 include main electrode portions 45a to 48a and lead portions 45b to 48b extending from the main electrode portions 45a to 48a so as to be exposed at the second side face L14f. The lead portions 45b to 48b are physically and electrically connected to the sixth terminal electrode 6.

The seventh inner electrodes 51, 52 include main electrode portions 51a, 52a and lead portions 51b, 52b extending from the main electrode portions 51a, 52a so as to be exposed at the first side face L14e. The lead portions 51b, 52b are physically and electrically connected to the seventh terminal electrode 7.

The eighth inner electrodes 55 to 58 include main electrode portions 55a to 58a and lead portions 55b to 58b extending from the main electrode portions 55a to 58a so as to be exposed at the second side face L14f. The lead portions 55b to 58b are physically and electrically connected to the eighth terminal electrode 8.

As shown in FIGS. 41 and 42, a virtual plane parallel to the opposing direction of the first and second main faces L14a, L14b is taken as a virtual reference plane S1. The first and second electrode groups 20, 30 are arranged in a row along a direction orthogonal to the opposing direction of the first and second main faces L14a, L14b which is a direction orthogonal to the reference plane S1. Namely, within the capacitor body L14, the first and second inner electrodes 21 to 24, 25, 26 are arranged on the first end face L14c side of the reference plane S1, while the third and fourth inner electrodes 31 to 34, 35, 36 are arranged on the second end face L14d side of the reference plane S1.

Further, a virtual plane parallel to the opposing direction of the first and second main faces L14a, L14b is taken as a virtual reference plane S2. The second and third electrode groups 30, 40 are arranged in a row along a direction orthogonal to the opposing direction of the first and second main faces L14a, L14b which is a direction orthogonal to the reference plane S2. Namely, within the capacitor body L14, the third and fourth inner electrodes 31 to 34, 35, 36 are arranged on the first end face L14c side of the reference plane S2, while the fifth and sixth inner electrodes 41, 42, 45 to 48 are arranged on the second end face L14d side of the reference plane S1.

Furthermore, a virtual plane parallel to the opposing direction of the first and second main faces L14a, L14b is taken as a virtual reference plane S3. The third and fourth electrode groups 40, 50 are arranged in a row along a direction orthogonal to the opposing direction of the first and second main faces L14a, L14b which is a direction orthogonal to the reference plane S3. Namely, within the capacitor body L14, the fifth and sixth inner electrodes 41, 42, 45 to 48 are arranged on the first end face L14c side of the reference plane S3, while the seventh and eighth inner electrodes 51, 52, 55 to 58 are arranged on the second end face L14d side of the reference plane S3.

The first inner electrodes 21 to 24 are arranged such that the sides on the second end face L14d side of the main electrode portions 21a to 24a are in contact with the reference plane S1. The second inner electrodes 25, 26 are arranged such that the sides on the second end face L14d side of the main electrode portions 25a, 26a are separated from the reference plane S1 by a predetermined distance D1 toward the first end face L14c.

The sides on the first end face L14c side of the main electrode portions 31a to 34a of the third inner electrodes 31 to 34 are in contact with the reference plane S1. The sides on the second end face L14d side of the main electrode portions 31a to 34a of the third inner electrodes 31 to 34 are in contact with the reference plane S2.

The fourth inner electrodes 35, 36 are arranged such that the sides on the first end face L14c side of the main electrode portions 35a, 36a are separated from the reference plane S1 by a predetermined distance D2 toward the second end face L14d. The fourth inner electrodes 35, 36 are arranged such that the sides on the second end face L14d side of the main electrode portions 35a, 36a are separated from the reference plane S2 by a predetermined distance D3 toward the first end face L14c.

The sides on the first end face L14c side of the main electrode portions 41a, 42a of the fifth inner electrodes 41, 42 are in contact with the reference plane S2. The sides on the second end face L14d side of the main electrode portions 41a, 42a of the fifth inner electrodes 41, 42 are in contact with the reference plane S3.

The sixth inner electrodes 45 to 48 are arranged such that the sides on the first end face L14c side of the main electrode portions 45a to 48a are separated from the reference plane S2 by a predetermined distance D4 toward the second end face L14d. The sixth inner electrodes 45 to 48 are arranged such that the sides on the second end face L14d side of the main electrode portions 45a to 48a are separated from the reference plane S3 by a predetermined distance D5 toward the first end face L14c.

The seventh inner electrodes 51, 52 are arranged such that the sides on the first end face L14c side of the main electrode portions 51a, 52a are in contact with the reference plane S3. The eighth inner electrodes 55 to 58 are arranged such that the sides on the first end face L14c side of the main electrode portions 55a to 58a are separated from the reference plane S3 by a predetermined distance D6 toward the second end face L14d.

In the multilayer capacitor array CA14, the first and second inner electrodes 21 to 24, 25, 26 include inner electrodes opposing each other with dielectric layers therebetween, and these opposing first and second inner electrodes form one of capacitors included in the multilayer capacitor array CA14.

In the multilayer capacitor array CA14, the third and fourth inner electrodes 31 to 34, 35, 36 include inner electrodes opposing each other with dielectric layers therebetween, and these opposing third and fourth inner electrodes form one of the capacitors included in the multilayer capacitor array CA14.

In the multilayer capacitor array CA14, the fifth and sixth inner electrodes 41, 42, 45 to 48 include inner electrodes opposing each other with dielectric layers therebetween, and these opposing fifth and sixth inner electrodes form one of the capacitors included in the multilayer capacitor array CA14.

In the multilayer capacitor array CA14, the seventh and eighth inner electrodes 51 to 54, 55 to 58 include inner electrodes opposing each other with dielectric layers therebetween, and these opposing seventh and eighth inner electrodes form one of the capacitors included in the multilayer capacitor array CA14.

When a voltage is applied to the capacitor formed by the first and second inner electrodes 21 to 24, 25, 26 and the capacitor formed by the third and fourth inner electrodes 31 to 34, 35, 36 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA14 as mentioned above. This restrains stresses from being concentrated near the reference plane S1.

When a voltage is applied to the capacitor formed by the third and fourth inner electrodes 31 to 34, 35, 36 and the capacitor formed by the fifth and sixth inner electrodes 41, 42, 45 to 48 so that electrostriction is generated in each capacitor, electrostriction also occurs near the reference plane S2, since the third and fifth inner electrodes 31 to 34, 41, 42 are arranged in contact with the reference plane S2 in the multilayer capacitor array CA14. This restrains stresses from being concentrated near the reference plane S2.

When a voltage is applied to the capacitor formed by the fifth and sixth inner electrodes 41, 42, 45 to 48 and the capacitor formed by the seventh and eighth inner electrodes 51, 52, 55 to 58 so that electrostriction is generated in each capacitor, electrostriction also occurs near the reference plane S3, since the fifth and seventh inner electrodes 41, 42, 51, 52 are arranged in contact with the reference plane S3 in the multilayer capacitor array CA14. This restrains stresses from being concentrated near the reference plane S3.

Restraining stresses from being concentrated can also keep cracks from occurring in the multilayer capacitor array CA14.

while the first inner electrodes 21 to 24 are in contact with the reference plane S1, the second inner electrodes 25, 26 are positioned such as to be separated from the reference plane S1 by the predetermined distance D1. While the third inner electrodes 31 to 34 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31 to 34 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45 to 48 are positioned such as to be separated from the reference plane S2 by the predetermined distance D4. This restrains electrostriction from causing distortions in excess near the reference plane S2.

While the fifth inner electrodes 41, 42 are in contact with the reference plane S3, the sixth inner electrodes 45 to 48 are positioned such as to be separated from the reference plane S3 by the predetermined distance D5. While the seventh inner electrodes 51, 52 are in contact with the reference plane S3, the eighth inner electrodes 55 to 58 are positioned such as to be separated from the reference plane S3 by the predetermined distance D6. This restrains electrostriction from causing distortions in excess near the reference plane S3.

The third inner electrodes 31, 33, sixth inner electrodes 45, 47, and seventh inner electrodes 51, 52 are arranged at positions different from any of the first and second inner electrodes 21 to 24, 25, 26 in the opposing direction of the first and second main faces L14a, L14b. Therefore, in the multilayer capacitor array CA14, two dielectric layers 11, 12 can be arranged between the first inner electrodes 21, 22, and two dielectric layers 15, 16 can be arranged between the first inner electrodes 23, 24. As a result, an electrostriction alleviating layer can be made greater, whereby the multilayer capacitor array CA14 can restrain vibrations from being caused by electrostriction.

The first inner electrodes 22, 24, fourth inner electrodes 41, 42, and eighth inner electrodes 55, 58 are arranged at positions different from any of the third and fourth inner electrodes 31 to 34, 35, 36 in the opposing direction of the first and second main faces L14a, L14b. Therefore, in the multilayer capacitor array CA14, two dielectric layers 12, 13 can be arranged between the third inner electrodes 31, 32, and two dielectric layers 16, 17 can be arranged between the third inner electrodes 33, 34. As a result, an electrostriction alleviating layer can be made greater, whereby the multilayer capacitor array CA14 can restrain vibrations from being caused by electrostriction.

The first inner electrodes 21, 23, fourth inner electrodes 35, 36, and eighth inner electrodes 55, 57 are arranged at positions different from any of the fifth and sixth inner electrodes 41, 42, 45 to 48 in the opposing direction of the first and second main faces L14a, L14b. Therefore, in the multilayer capacitor array CA14, two dielectric layers 10, 11 can be arranged between the first main face L14a and sixth inner electrode 45, and two dielectric layers 14, 15 can be arranged between the sixth inner electrodes 46, 47. As a result, an electrostriction alleviating layer can be made greater, whereby the multilayer capacitor array CA14 can restrain vibrations from being caused by electrostriction.

The second inner electrodes 25, 26, third inner electrodes 32, 34, and sixth inner electrodes 46, 48 are arranged at positions different from any of the seventh and eighth inner electrodes 51, 52, 55 to 58 in the opposing direction of the first and second main faces L14a, L14b. Therefore, in the multilayer capacitor array CA14, two dielectric layers 13, 14 can be arranged between the eighth inner electrodes 56, 57, and two dielectric layers 17, 18 can be arranged between the eighth inner electrode 58 and second main face L14b. As a result, an electrostriction alleviating layer can be made greater, whereby the multilayer capacitor array CA14 can restrain vibrations from being caused by electrostriction.

Fifteenth Embodiment

Figure 43:
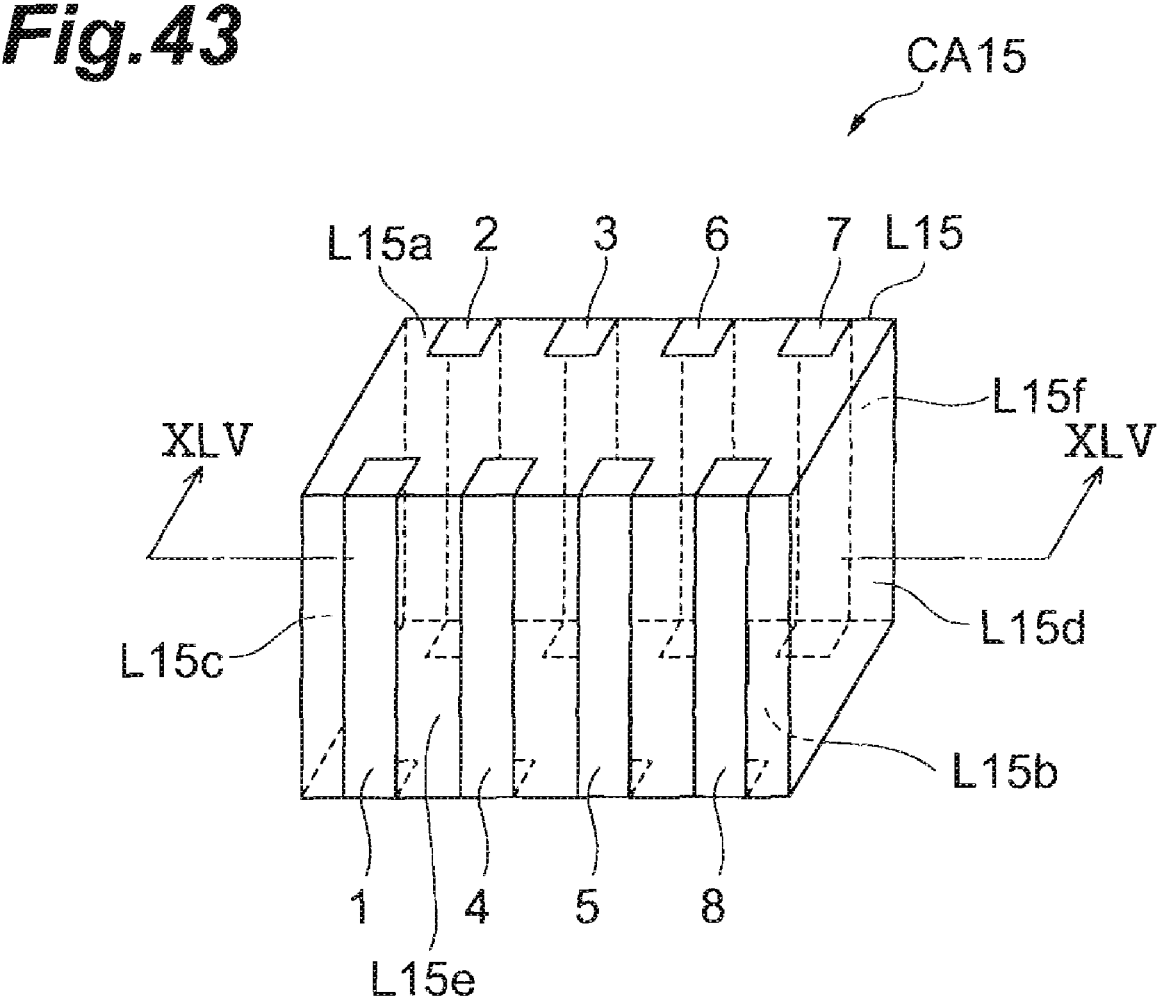
FIG. 43 is a perspective view of the multilayer capacitor array in accordance with the fifteenth embodiment.
Figure 44:
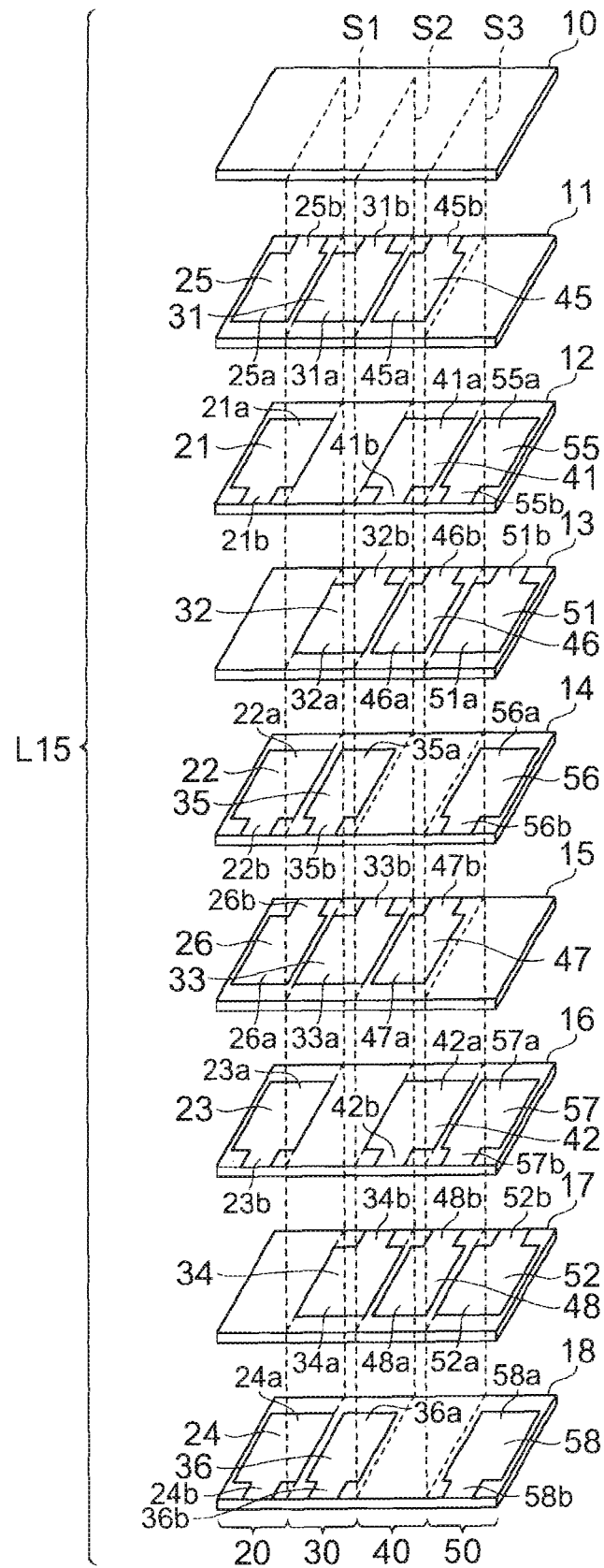
FIG. 44 is an exploded perspective view of the capacitor body included in the multilayer capacitor array in accordance with the fifteenth embodiment.
Figure 45:
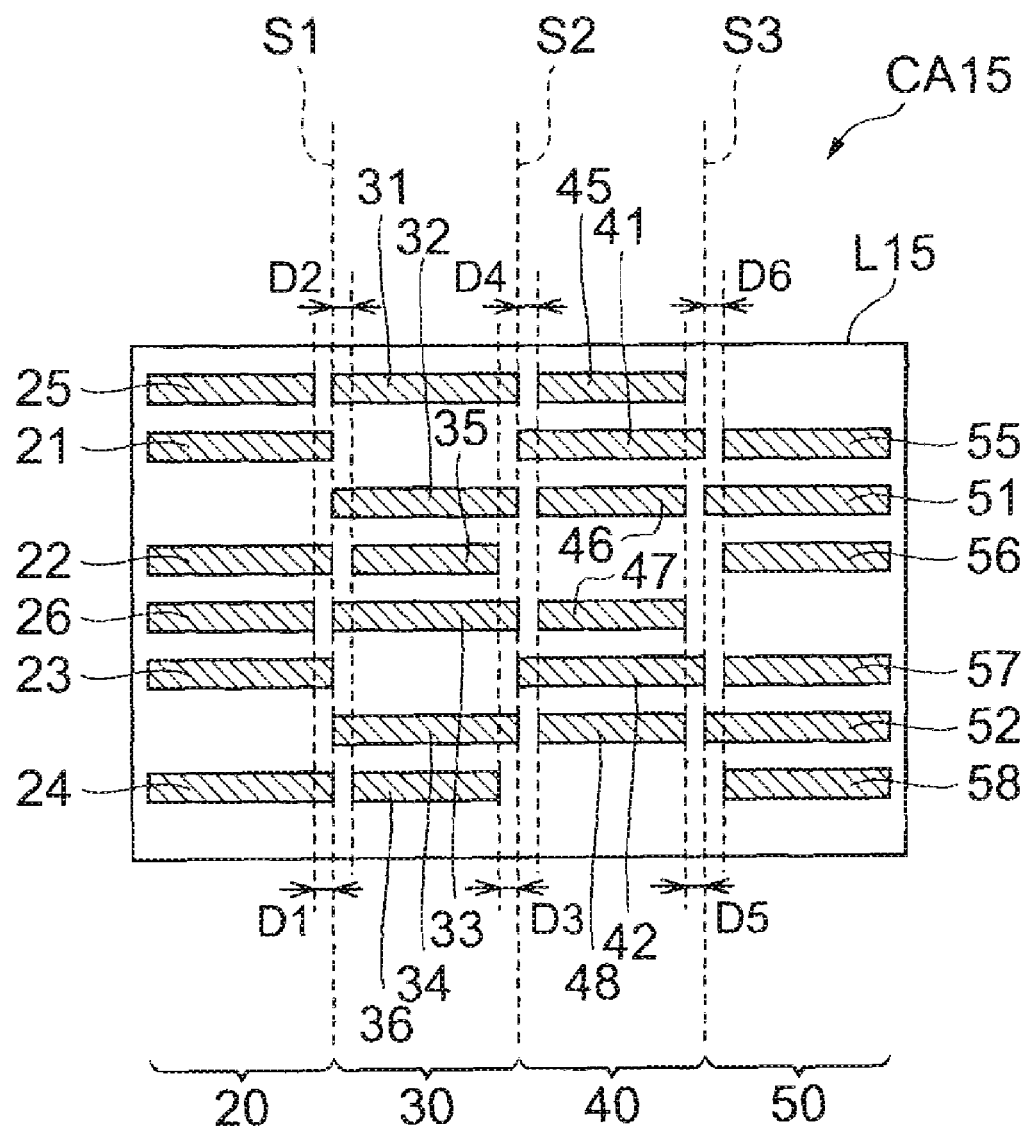
FIG. 45 is a view for explaining the structure of a cross section of the multilayer capacitor array taken along the line XLV-XLV of FIG. 43.

With reference to FIGS. 43 to 45, the structure of the multilayer capacitor array CA15 in accordance with the fifteenth embodiment will be explained. The capacitor array CA15 in accordance with the fifteenth embodiment differs from the capacitor array CA10 in accordance with the tenth embodiment in terms of the arrangement of first to eighth terminal electrodes 1 to 8 and first to eighth inner electrodes. FIG. 43 is a perspective view of the multilayer capacitor array in accordance with the fifteenth embodiment. FIG. 44 is an exploded perspective view of the capacitor body included in the multilayer capacitor array in accordance with the fifteenth embodiment. FIG. 45 is a view for explaining the structure of a cross section of the multilayer capacitor array taken along the line XLV-XLV of FIG. 43.

As shown in FIG. 43, the multilayer capacitor array CA15 in accordance with the fifteenth embodiment comprises a capacitor body L15 and first to eighth terminal electrodes 1 to 8 arranged on outer surface of the capacitor body L15.

As shown in FIG. 43, the capacitor body L15 is shaped like a rectangular parallelepiped having rectangular first and second main faces L15a, L15b opposing each other, first and second end faces L15c, L15d opposing each other and extending in the shorter-side direction of the first and second main faces L15a, L15b so as to connect them to each other, and first and second side faces L15e, L15f opposing each other and extending in the longer-side direction of the first and second main faces L15a, L15b so as to connect them to each other.

The first, fourth, fifth, and eighth terminal electrodes 1, 4, 5, 8 are successively arranged on the first side face L15e of the capacitor body L15 from the first end face L15c side to the second end face L15d side. The second, third, sixth, and seventh terminal electrodes 2, 3, 6, 7 are successively arranged on the second side face L15f of the capacitor body L15 from the first end face L15e side to the second end face L15d side. The first, fourth, fifth, and eighth terminal electrodes 1, 4, 5, 8 oppose the second, third, sixth, and seventh terminal electrodes 2, 3, 6, 7, respectively, in the opposing direction of the first and second side faces L15e, L15f.

As shown in FIG. 44, the capacitor body L15 has a plurality of (9 in this embodiment) laminated dielectric layers 10 to 18.

As shown in FIG. 44, the capacitor body L15 includes first to fourth electrode groups 20, 30, 40, 50. The first electrode group 20 has a plurality (4 layers in this embodiment) of first inner electrodes 21 to 24 and a plurality (2 layers in this embodiment) of second inner electrodes 25, 26. The second electrode group 30 has a plurality (4 layers in this embodiment) of third inner electrodes 31 to 34 and a plurality (2 layers in this embodiment) of fourth inner electrodes 35, 36. The third electrode group 40 has a plurality (2 layers in this embodiment) of fifth inner electrodes 41, 42 and a plurality (4 layers in this embodiment) of sixth inner electrodes 45 to 48. The fourth electrode group 50 has a plurality (2 layers in this embodiment) of seventh inner electrodes 51, 52 and a plurality (4 layers in this embodiment) of eighth inner electrodes 55 to 58.

Within the capacitor body L15, the first to fourth electrode groups 20, 30, 40, 50 are arranged in a row along the opposing direction of the first and second end faces L15c, L15d. Specifically, the first to fourth electrode groups 20, 30, 40, 50 are successively arranged from the first end face L15c side to the second end face L15d side.

The first and second inner electrodes 21 to 24, 25, 26 included in the first electrode group 20 are arranged in the order of the second inner electrode 25, first inner electrode 21, first inner electrode 22, second inner electrode 26, first inner electrode 23, and first inner electrode 24 from the first main face L15a toward the second main face L15b. The third and fourth inner electrodes 31 to 34, 35, 36 included in second electrode group 30 are arranged in the order of the third inner electrode 31, third inner electrode 32, fourth inner electrode 35, third inner electrode 33, third inner electrode 34, and fourth inner electrode 36 from the first main face L15a toward the second main face L15b. The fifth and sixth inner electrodes 41, 42, 45 to 48 included in the third electrode group 40 are arranged in the order of the sixth inner electrode 45, fifth inner electrode 41, sixth inner electrode 46, sixth inner electrode 47, fifth inner electrode 42, and sixth inner electrode 48 from the first main face L15a toward the second main face L15b. The seventh and eighth inner electrodes 51, 52, 55 to 58 included in the fourth electrode group 50 are arranged in the order of the eighth inner electrode 55, seventh inner electrode 51, eighth inner electrode 56, eighth inner electrode 57, seventh inner electrode 52, and eighth inner electrode 58 from the first main face L15a toward the second main face L15b.

Within the capacitor body L15, the first inner electrodes 21, 23 are arranged at positions different from any of the third and fourth inner electrodes 31 to 34, 35, 36 in the opposing direction of the first and second main faces L15a, L15b. Within the capacitor body L15, the first inner electrodes 22, 24 are arranged at positions different from any of the fifth and sixth inner electrodes 41, 42, 45 to 48 in the opposing direction of the first and second main faces L15a, L15b. Within the capacitor body L15, the second inner electrodes 25, 26 are arranged at positions different from any of the seventh and eighth inner electrodes 51, 52, 55 to 58 in the opposing direction of the first and second main faces L15a, L15b.

Within the capacitor body L15, the third inner electrodes 32, 34 are arranged at positions different from any of the first and second inner electrodes 21 to 24, 25, 26 in the opposing direction of the first and second main faces L15a, L15b. Within the capacitor body L15, the fourth inner electrodes 35, 36 are arranged at positions different from any of the fifth and sixth inner electrodes 41, 42, 45 to 48 in the opposing direction of the first and second main faces L15a, L15b. Within the capacitor body L15, the third inner electrodes 31, 33 are arranged at positions different from any of the seventh and eighth inner electrodes 51, 52, 55 to 58 in the opposing direction of the first and second main faces L15a, L15b.

Within the capacitor body L15, the sixth inner electrodes 46, 48 are arranged at positions different from any of the first and second inner electrodes 21 to 24, 25, 26 in the opposing direction of the first and second main faces L15a, L15b. Within the capacitor body L15, the fifth inner electrodes 41, 42 are arranged at positions different from any of the third and fourth inner electrodes 31 to 34, 35, 36 in the opposing direction of the first and second main faces L15a, L15b. Within the capacitor body L15, the sixth inner electrodes 45, 47 are arranged at positions different from any of the seventh and eighth inner electrodes 51, 52, 55 to 58 in the opposing direction of the first and second main faces L15a, L15b.

Within the capacitor body L15, the seventh inner electrodes 51, 52 are arranged at positions different from any of the first and second inner electrodes 21 to 24, 25, 26 in the opposing direction of the first and second main faces L15a, L15b. Within the capacitor body L15, the eighth inner electrodes 55, 57 are arranged at positions different from any of the third and fourth inner electrodes 31 to 34, 35, 36 in the opposing direction of the first and second main faces L15a, L15b. Within the capacitor body L15, the eighth inner electrodes 56, 58 are arranged at positions different from any of the fifth and sixth inner electrodes 41, 42, 45 to 48 in the opposing direction of the first and second main faces L15a, L15b.

Within the capacitor body L15, the second inner electrode 25, third inner electrode 31, and sixth inner electrode 45 are arranged on the same layer, the first inner electrode 21, fifth inner electrode 41, and eighth inner electrode 55 are arranged on the same layer, the third inner electrode 32, sixth inner electrode 46, and seventh inner electrode 51 are arranged on the same layer, the first inner electrode 22, fourth inner electrode 35, and eighth inner electrode 56 are arranged on the same layer, the second inner electrode 26, third inner electrode 33, and sixth inner electrode 47 are arranged on the same layer, the first inner electrode 23, fifth inner electrode 42, and eighth inner electrode 57 are arranged on the same layer, the third inner electrode 34, sixth inner electrode 48, and seventh inner electrode 52 are arranged on the same layer, and the first inner electrode 24, fourth inner electrode 36, and eighth inner electrode 58 are arranged on the same layer in the opposing direction of the first and second main faces L15a, L15b.

Along the opposing direction of the first and second main faces L15a, L15b, the first and second inner electrodes 21, 25 oppose each other with the dielectric layer 11 therebetween, the first and second inner electrodes 22, 26 oppose each other with the dielectric layer 14 therebetween, and the first and second inner electrodes 23, 26 oppose each other with the dielectric layer 15 therebetween.

When seen in the opposing direction of the first and second main faces L15a, L15b, the first inner electrodes 21, 22 are arranged adjacent to each other with the dielectric layers 12, 13 therebetween. When seen in the opposing direction of the first and second main faces L15a, L15b, the first inner electrodes 23, 24 are arranged adjacent to each other with the dielectric layers 16, 17 therebetween.

Along the opposing direction of the first and second main faces L15a, L15b, the third and fourth inner electrodes 32, 35 oppose each other with the dielectric layer 13 therebetween, the third and fourth inner electrodes 33, 35 oppose each other with the dielectric layer 14 therebetween, ad the third and fourth inner electrodes 34, 36 oppose each other with the dielectric layer 17 therebetween.

When seen in the opposing direction of the first and second main faces L15a, L15b, the third inner electrodes 31, 32 are arranged adjacent to each other with the dielectric layers 11, 12 therebetween. When seen in the opposing direction of the first and second main faces L15a, L15b, the third inner electrodes 33, 34 are arranged adjacent to each other with the dielectric layers 15, 16 therebetween.

Along the opposing direction of the first and second main faces L15a, L15b, the fifth and sixth inner electrodes 41, 45 are arranged adjacent to each other with the dielectric layer 11 therebetween, the fifth and sixth inner electrodes 41, 46 are arranged adjacent to each other with the dielectric layer 12 therebetween, fifth and sixth inner electrodes 42, 47 are arranged adjacent to each other with the dielectric layer 15 therebetween, and the fifth and sixth inner electrodes 42, 48 are arranged adjacent to each other with the dielectric layer 16 therebetween.

When seen in the opposing direction of the first and second main faces L15a, L15b, the sixth inner electrodes 46, 47 are arranged adjacent to each other with the dielectric layers 13, 14 therebetween. When seen in the opposing direction of the first and second main faces L15a, L15b, the sixth inner electrode 48 and second main face L15b are arranged adjacent to each other with the dielectric layers 17, 18 therebetween.

Along the opposing direction of the first and second main faces L15a, L15b, the seventh and eighth inner electrodes 51, 55 are arranged adjacent to each other with the dielectric layer 12 therebetween, the seventh and eighth inner electrodes 51, 56 are arranged adjacent to each other with the dielectric layer 13 therebetween, seventh and eighth inner electrodes 52, 57 are arranged adjacent to each other with the dielectric layer 16 therebetween, and the seventh and eighth inner electrodes 52, 58 are arranged adjacent to each other with the dielectric layer 17 therebetween.

When seen in the opposing direction of the first and second main faces L15a, L15b, the first main face L15a and eighth inner electrode 55 are arranged adjacent to each other with the dielectric layers 10, 11 therebetween. When seen in the opposing direction of the first and second main faces L15a, L15b, the eighth inner electrodes 56, 57 are arranged adjacent to each other with the dielectric layers 14, 15 therebetween.

The first inner electrodes 21 to 24 include main electrode portions 21a to 24a and lead portions 21b to 24b extending from the main electrode portions 21a to 24a so as to be exposed at the first side face L15e. The lead portions 21b to 24b are physically and electrically connected to the first terminal electrode 1.

The second inner electrodes 25, 26 include main electrode portions 25a, 26a and lead portions 25b, 26b extending from the main electrode portions 25a, 26a so as to be exposed at the second side face L if. The lead portions 25b, 26b are physically and electrically connected to the second terminal electrode 2.

The third inner electrodes 31 to 34 include main electrode portions 31a to 34a and lead portions 31b to 34b extending from the main electrode portions 31a to 34a so as to be exposed at the second side face L15f. The lead portions 31b to 34b are physically and electrically connected to the third terminal electrode 3.

The fourth inner electrodes 35, 36 include main electrode portions 35a, 36a and lead portions 35b, 36b extending from the main electrode portions 35a, 36a so as to be exposed at the first side face L15e. The lead portions 35b, 36b are physically and electrically connected to the fourth terminal electrode 4.

The fifth inner electrodes 41, 42 include main electrode portions 41a, 42a and lead portions 41b, 42b extending from the main electrode portions 41a, 42a so as to be exposed at the first side face L15e. The lead portions 41b, 42b are physically and electrically connected to the fifth terminal electrode 5.

The sixth inner electrodes 45 to 48 include main electrode portions 45a to 48a and lead portions 45b to 48b extending from the main electrode portions 45a to 48a so as to be exposed at the second side face L15f. The lead portions 45b to 48b are physically and electrically connected to the sixth terminal electrode 6.

The seventh inner electrodes 51, 52 include main electrode portions 51a, 52a and lead portions 51b, 52b extending from the main electrode portions 51a, 52a so as to be exposed at the second side face L15f. The lead portions 51b, 52b are physically and electrically connected to the seventh terminal electrode 7.

The eighth inner electrodes 55 to 58 include main electrode portions 55a to 58a and lead portions 55b to 58b extending from the main electrode portions 55a to 58a so as to be exposed at the first side face L15e. The lead portions 55b to 58b are physically and electrically connected to the eighth terminal electrode 8.

As shown in FIGS. 44 and 45, a virtual plane parallel to the opposing direction of the first and second main faces L15a, L15b is taken as a virtual reference plane S1. The first and second electrode groups 20, 30 are arranged in a row along a direction orthogonal to the opposing direction of the first and second main faces L15a, L15b which is a direction orthogonal to the reference plane S1. Namely, within the capacitor body L15, the first and second inner electrodes 21 to 24, 25, 26 are arranged on the first end face L15c side of the reference plane S1, while the third and fourth inner electrodes 31 to 34, 35, 36 are arranged on the second end face L15d side of the reference plane S1.

Further, a virtual plane parallel to the opposing direction of the first and second main faces L15a, L15b is taken as a virtual reference plane S2. The second and third electrode groups 30, 40 are arranged in a row along a direction orthogonal to the opposing direction of the first and second main faces L15a, L15b which is a direction orthogonal to the reference plane S2. Namely, within the capacitor body L15, the third and fourth inner electrodes 31 to 34, 35, 36 are arranged on the first end face L15c side of the reference plane S2, while the fifth and sixth inner electrodes 41, 42, 45 to 48 are arranged on the second end face L15d side of the reference plane S2.

Furthermore, a virtual plane parallel to the opposing direction of the first and second main faces L15a, L15b is taken as a virtual reference plane S3. The third and fourth electrode groups 40, 50 are arranged in a row along a direction orthogonal to the opposing direction of the first and second main faces L15a, L15b which is a direction orthogonal to the reference plane S3. Namely, within the capacitor body L15, the fifth and sixth inner electrodes 41, 42, 45 to 48 are arranged on the first end face L15c side of the reference plane S3, while the seventh and eighth inner electrodes 51, 52, 55 to 58 are arranged on the second end face L15d side of the reference plane S3.

The first inner electrodes 21 to 24 are arranged such that the sides on the second end face L15d side of the main electrode portions 21a to 24a are in contact with the reference plane S1. The second inner electrodes 25, 26 are arranged such that the sides on the second end face L15d side of the main electrode portions 25a, 26a are separated from the reference plane S1 by a predetermined distance D1 toward the first end face L15c.

The sides on the first end face L15c side of the main electrode portions 31a to 34a of the third inner electrodes 31 to 34 are in contact with the reference plane S1. The sides on the second end face L15d side of the main electrode portions 31a to 34a of the third inner electrodes 31 to 34 are in contact with the reference plane S2.

The fourth inner electrodes 35, 36 are arranged such that the sides on the first end face L15c side of the main electrode portions 35a, 36a are separated from the reference plane S1 by a predetermined distance D2 toward the second end face L15d. The fourth inner electrodes 35, 36 are arranged such that the sides on the second end face L15d side of the main electrode portions 35a, 36a are separated from the reference plane S2 by a predetermined distance D3 toward the first end face L15c.

The sides on the first end face L15c side of the main electrode portions 41a, 42a of the fifth inner electrodes 41, 42 are in contact with the reference plane S2. The sides on the second end face L15d side of the main electrode portions 41a, 42a of the fifth inner electrodes 41, 42 are in contact with the reference plane S3.

The sixth inner electrodes 45 to 48 are arranged such that the sides on the first end face L15c side of the main electrode portions 45a to 48a are separated from the reference plane S2 by a predetermined distance D4 toward the second end face L15d. The sixth inner electrodes 45 to 48 are arranged such that the sides on the second end face L15d side of the main electrode portions 45a to 48a are separated from the reference plane S3 by a predetermined distance D5 toward the first end face L15c.

The seventh inner electrodes 51, 52 are arranged such that the sides on the first end face L15c side of the main electrode portions 51a, 59a are in contact with the reference plane S3.

The eighth inner electrodes 55 to 58 are arranged such that the sides on the first end face L15c side of the main electrode portions 55a to 58a are separated from the reference plane S3 by a predetermined distance D6 toward the second end face L15d.

In the multilayer capacitor array CA15, the first and second inner electrodes 21 to 24, 25, 26 include inner electrodes opposing each other with dielectric layers therebetween, and these opposing first and second inner electrodes form one of capacitors included in the multilayer capacitor array CA15.

In the multilayer capacitor array CA15, the third and fourth inner electrodes 31 to 34, 35, 36 include inner electrodes opposing each other with dielectric layers therebetween, and these opposing third and fourth inner electrodes form one of the capacitors included in the multilayer capacitor array CA 15.

In the multilayer capacitor array CA15, the fifth and sixth inner electrodes 41, 42, 45 to 48 include inner electrodes opposing each other with dielectric layers therebetween, and these opposing fifth and sixth inner electrodes form one of the capacitors included in the multilayer capacitor array CA15.

In the multilayer capacitor array CA15, the seventh and eighth inner electrodes 51 to 54, 55 to 58 include inner electrodes opposing each other with dielectric layers therebetween, and these opposing seventh and eighth inner electrodes form one of the capacitors included in the multilayer capacitor array CA15.

When a voltage is applied to the capacitor formed by the first and second inner electrodes 21 to 24, 25, 26 and the capacitor formed by the third and fourth inner electrodes 31 to 34, 35, 36 so that electrostriction is generated in each capacitor, electrostriction also occurs near the reference plane S1, since the first and third inner electrodes 21 to 24, 31 to 34 are arranged in contact with the reference plane S1 in the multilayer capacitor array CA15 as mentioned above. This restrains stresses from being concentrated near the reference plane S1.

When a voltage is applied to the capacitor formed by the third and fourth inner electrodes 31 to 34, 35, 36 and the capacitor formed by the fifth and sixth inner electrodes 41, 42, 45 to 48 so that electrostriction is generated in each capacitor, electrostriction also occurs near the reference plane S2, since the third and fifth inner electrodes 31 to 34, 41, 42 are arranged in contact with the reference plane S2 in the multilayer capacitor array CA15. This restrains stresses from being concentrated near the reference plane S2.

When a voltage is applied to the capacitor formed by the fifth and sixth inner electrodes 41, 42, 45 to 48 and the capacitor formed by the seventh and eighth inner electrodes 51, 52, 55 to 58 so that electrostriction is generated in each capacitor, electrostriction also occurs near the reference plane S3, since the fifth and seventh inner electrodes 41, 42, 51, 52 are arranged in contact with the reference plane S3 in the multilayer capacitor array CA15. This restrains stresses from being concentrated near the reference plane S3.

Restraining stresses from being concentrated can also keep cracks from occurring in the multilayer capacitor array CA15.

While the first inner electrodes 21 to 24 are in contact with the reference plane S1, the second inner electrodes 25, 26 are positioned such as to be separated from the reference plane S1 by the predetermined distance D1. While the third inner electrodes 31 to 34 are in contact with the reference plane S1, the fourth inner electrodes 35, 36 are positioned such as to be separated from the reference plane S1 by the predetermined distance D2. This restrains electrostriction from causing distortions in excess near the reference plane S1.

While the third inner electrodes 31 to 34 are in contact with the reference plane S2, the fourth inner electrodes 35, 36 are positioned such as to be separated from the reference plane S2 by the predetermined distance D3. While the fifth inner electrodes 41, 42 are in contact with the reference plane S2, the sixth inner electrodes 45 to 48 are positioned such as to be separated from the reference plane S2 by the predetermined distance D4. This restrains electrostriction from causing distortions in excess near the reference plane S2.

While the fifth inner electrodes 41, 42 are in contact with the reference plane S3, the sixth inner electrodes 45 to 48 are positioned such as to be separated from the reference plane S3 by the predetermined distance D5. While the seventh inner electrodes 51, 52 are in contact with the reference plane S3, the eighth inner electrodes 55 to 58 are positioned such as to be separated from the reference plane S3 by the predetermined distance D6. This restrains electrostriction from causing distortions in excess near the reference plane S3.

The third inner electrodes 32, 34, sixth inner electrodes 46, 48, and seventh inner electrodes 51, 52 are arranged at positions different from any of the first and second inner electrodes 21 to 24, 25, 26 in the opposing direction of the first and second main faces L15a, L15b. Therefore, in the multilayer capacitor array CA15, two dielectric layers 12, 13 can be arranged between the first inner electrodes 21, 22, and two dielectric layers 16, 17 can be arranged between the first inner electrodes 23, 24. As a result, an electrostriction alleviating layer can be made greater, whereby the multilayer capacitor array CA15 can restrain vibrations from being caused by electrostriction.

The first inner electrodes 21, 23, fourth inner electrodes 41, 42, and eighth inner electrodes 55, 57 are arranged at positions different from any of the third and fourth inner electrodes 31 to 34, 35, 36 in the opposing direction of the first and second main faces L15a, L15b. Therefore, in the multilayer capacitor array CA15, two dielectric layers 11, 12 can be arranged between the third inner electrodes 31, 32, and two dielectric layers 15, 16 can be arranged between the third inner electrodes 33, 34. As a result, an electrostriction alleviating layer can be made greater, whereby the multilayer capacitor array CA15 can restrain vibrations from being caused by electrostriction.

The first inner electrodes 22, 24, fourth inner electrodes 35, 36, and eighth inner electrodes 56, 58 are arranged at positions different from any of the fifth and sixth inner electrodes 41, 42, 45 to 48 in the opposing direction of the first and second main faces L15a, L15b. Therefore, in the multilayer capacitor array CA15, two dielectric layers 13, 14 can be arranged between the sixth inner electrodes 46, 47, and two dielectric layers 17, 18 can be arranged between the sixth inner electrode 48 and second main face L15b. As a result, an electrostriction alleviating layer can be made greater, whereby the multilayer capacitor array CA15 can restrain vibrations from being caused by electrostriction.

The second inner electrodes 25, 26, third inner electrodes 31, 33, and sixth inner electrodes 45, 47 are arranged at positions different from any of the seventh and eighth inner electrodes 51, 52, 55 to 58 in the opposing direction of the first and second main faces L15a, L15b. Therefore, in the multilayer capacitor array CA15, two dielectric layers 10, 11 can be arranged between the first main face L15a and eighth inner electrode 55, and two dielectric layers 14, 15 can be arranged between the eighth inner electrodes 56, 57. As a result, an electrostriction alleviating layer can be made greater, whereby the multilayer capacitor array CA15 can restrain vibrations from being caused by electrostriction.

Though preferred embodiments of the present invention are explained in detail in the foregoing, the present invention is not limited to the above-mentioned embodiments. For example, the number of capacitors included in the multilayer capacitor array may be 5 or greater without being restricted to the numbers described in the above-mentioned embodiments. Also, the number of terminal electrodes 1 to 8 is not limited to those described in the above-mentioned embodiments.

The number of laminations of dielectric layers 10 to 18 and the numbers of laminations of first to eighth electrodes 21 to 24, 25 to 28, 31 to 34, 41 to 44, 45 to 48, 51 to 54, 55 to 58 are not limited to those described in the above-mentioned embodiments. For example, it will be sufficient if first to fourth inner electrodes are included by one layer each. The number of laminations of inner electrodes may vary among capacitors included in the multilayer capacitor array.

Forms of the first to eighth inner electrodes 21 to 24, 25 to 28, 31 to 34, 35 to 38, 41 to 44, 45 to 48, 51 to 54, 55 to 58 are not limited to those described in the above-mentioned embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array comprising:

a capacitor body including rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other, the capacitor body having a dielectric characteristic; and first, second, third, and fourth terminal electrodes arranged on outer surface of the capacitor body;

wherein a first electrode group including first and second inner electrodes and a second electrode group including third and fourth inner electrodes are arranged in a row in a direction orthogonal to the opposing direction of the first and second main faces in the capacitor body;

wherein the first inner electrode is connected to the first terminal electrode;

wherein the second inner electrode is connected to the second terminal electrode;

wherein the third inner electrode is connected to the third terminal electrode;

wherein the fourth inner electrode is connected to the fourth terminal electrode;

wherein the first and second inner electrodes are arranged within the capacitor body such as to oppose each other along the opposing direction of the first and second main faces with a portion of the capacitor body therebetween;

wherein the third and fourth inner electrodes are arranged within the capacitor body such as to oppose each other along the opposing direction of the first and second main faces with a portion of the capacitor body therebetween;

wherein a reference plane is taken parallel to the opposing direction of the first and second main faces between the first and second electrode groups;

wherein each of the first and third inner electrodes is arranged in contact with the reference plane; and wherein each of the second and fourth inner electrodes is arranged such as to be separated by a predetermined distance from the reference plane.

2. A multilayer capacitor array according to claim 1, wherein at least one of the first and second inner electrodes is arranged at a position different from any of the third and fourth inner electrodes in the opposing direction of the first and second main faces.

3. A multilayer capacitor array according to claim 1, wherein the first electrode group includes a plurality of first and second inner electrodes arranged along the opposing direction of the first and second main faces; and wherein the plurality of first and second inner electrodes include at least one of a set constituted by at least two first inner electrodes arranged adjacent to each other as seen in the opposing direction of the first and second main faces and a set constituted by at least two second inner electrodes arranged adjacent to each other as seen in the opposing direction of the first and second main faces.

4. A multilayer capacitor array according to claim 1, wherein the second electrode group includes a plurality of third and fourth inner electrodes arranged along the opposing direction of the first and second main faces; and wherein the plurality of third and fourth inner electrodes include at least one of a set constituted by at least two third inner electrodes arranged adjacent to each other as seen in the opposing direction of the first and second main faces and a set constituted by at least two fourth inner electrodes arranged adjacent to each other as seen in the opposing direction of the first and second main faces.

* * * * *